United States Patent
Copp et al.

(10) Patent No.: US 9,849,821 B1
(45) Date of Patent: Dec. 26, 2017

(54) FOLDING/RETRACTABLE PICKUP TRUCK BOX COVER

(71) Applicant: Peragon Enterprises, Inc., Spooner, WI (US)

(72) Inventors: Heath Copp, Town of Trego, WI (US); Joel Amiel Anderson, Lammers Township, MN (US)

(73) Assignee: Peragon Enterprises, Inc., Bemidji, MN (US)

( * ) Notice: Subject to any disclaimer, the term of this patent is extended or adjusted under 35 U.S.C. 154(b) by 0 days.

(21) Appl. No.: 15/081,417

(22) Filed: Mar. 25, 2016

Related U.S. Application Data

(62) Division of application No. 14/179,217, filed on Feb. 12, 2014, now Pat. No. 9,296,285.

(Continued)

(51) Int. Cl.
*B60P 7/02* (2006.01)
*B60J 10/246* (2016.01)
(Continued)

(52) U.S. Cl.
CPC ............ *B60P 7/02* (2013.01); *B60J 10/246* (2016.02); *B60J 10/248* (2016.02); *B60J 10/90* (2016.02); *B62D 33/02* (2013.01)

(58) Field of Classification Search
CPC .... B60P 7/02; B60J 10/90; B60J 10/80; B60J 10/82; B60J 10/246; B60J 10/248; B60J 10/20; B60J 10/277; B60J 10/10
(Continued)

(56) References Cited

U.S. PATENT DOCUMENTS 2,559,929 A 12/1947 Bjork
4,210,361 A 7/1980 Marvin et al.
(Continued)

OTHER PUBLICATIONS http://web.archive.org/web/20090823121617/http:/www.peragon.com, by Way Back Machine, dated Aug. 23, 2009, 2 pp.
(Continued)

*Primary Examiner* — Gregory Blankenship
(74) *Attorney, Agent, or Firm* — Merchant & Gould P.C.

(57) ABSTRACT

A retractable pickup truck box cover system includes a pivot joint with improved strength, durability, and manufacturability between panels of a panel assembly of the cover system. A sealing system between the panels and along ends of the panel assembly provides improved weather resistance to the cover system. A lateral support system provides resistance to binding loads when opening and closing the panel assembly. The lateral support system may also aid installation of the cover system. A ramp adjustment system allows fine tuning of the ramps that guide folding and unfolding of the panel assembly. An improved locking system and the pivot joints allow more compact storage of the panel assembly. The improved locking system includes lock rods that engage rails of the cover system. Connecting structures connect adjacent panel pairs when the cover system is deployed and do not connect the adjacent panels when the cover system is stowed. A seal of the sealing system includes angled and/or transvers ribs to support a bulb of the seal when pivotally scrubbing against the panels. The seal includes a plurality of interior portions that selectively compress and bulge between the panels. The seal includes a coating that may provide stiffness, wear resistance, hardness, and/or reduced friction. A clamping system allows installation of the cover system without drilling holes and includes built-in fixturing for locating clamps and thereby locating the cover system on the pickup truck box.

20 Claims, 129 Drawing Sheets

Related U.S. Application Data

(60) Provisional application No. 61/763,901, filed on Feb. 12, 2013.

(51) Int. Cl.
*B60J 10/248* (2016.01)
*B60J 10/90* (2016.01)
*B62D 33/02* (2006.01)

(58) Field of Classification Search
USPC .......... 296/100.06, 100.09, 107.04; 49/498.1
See application file for complete search history.

(56) References Cited

U.S. PATENT DOCUMENTS

| | | | |
|---|---|---|---|
| 4,550,945 A | 11/1985 | Englehardt | |
| 4,826,232 A * | 5/1989 | Wissler | E06B 7/2309 156/293 |
| 4,861,092 A | 8/1989 | Bogard | |
| 4,867,220 A | 9/1989 | Matsumoto et al. | |
| 5,040,843 A | 8/1991 | Russell et al. | |
| 5,087,093 A | 2/1992 | Repetti | |
| 5,344,159 A | 9/1994 | Powell | |
| 5,653,491 A * | 8/1997 | Steffens | B60J 7/141 160/187 |
| 5,823,605 A | 10/1998 | Seargeant | |
| 6,113,176 A | 9/2000 | Bernardo | |
| 6,158,171 A * | 12/2000 | Kellogg | E06B 7/2303 49/475.1 |
| 6,321,819 B1 | 11/2001 | Copp et al. | |
| 6,382,699 B1 * | 5/2002 | Hanson | B60J 7/141 296/100.07 |
| 6,533,343 B2 * | 3/2003 | Bohm | B60J 7/041 296/100.02 |
| 6,827,389 B1 | 12/2004 | Pandorf | |
| 6,997,634 B2 | 2/2006 | Zheng | |
| 7,021,693 B2 * | 4/2006 | Keller | B60J 7/141 296/100.06 |
| 7,066,523 B2 * | 6/2006 | Verduci | B60J 7/19 296/100.06 |
| 7,246,839 B1 * | 7/2007 | Nyberg | B60J 7/11 296/100.01 |
| 7,278,674 B1 | 10/2007 | Bogard | |
| 8,672,388 B2 | 3/2014 | Rusher et al. | |
| 9,004,571 B1 | 4/2015 | Bernardo et al. | |
| 2004/0079032 A1 * | 4/2004 | Russell | F16J 15/027 49/498.1 |
| 2004/0245799 A1 | 12/2004 | Rusu | |
| 2005/0155293 A1 * | 7/2005 | Dron | B60J 10/277 49/490.1 |
| 2006/0012211 A1 | 1/2006 | Keller | |
| 2006/0049658 A1 * | 3/2006 | Sugimoto | B60J 7/141 296/100.03 |
| 2007/0113482 A1 * | 5/2007 | Dumke | B60J 10/248 49/498.1 |
| 2007/0210609 A1 | 9/2007 | Maimin et al. | |
| 2010/0109372 A1 | 5/2010 | Walser et al. | |
| 2012/0260579 A1 | 10/2012 | DeMello | |
| 2013/0229027 A1 * | 9/2013 | Copp | B60J 7/198 296/100.08 |
| 2014/0312646 A1 * | 10/2014 | Copp | B60J 7/141 296/100.12 |
| 2015/0165960 A1 * | 6/2015 | Yue | B60J 7/141 296/100.09 |
| 2017/0050503 A1 * | 2/2017 | Roth | B60J 10/248 |

OTHER PUBLICATIONS http://web.archive.org/web/20110209084413/http:/www.peragon.com, by Way Back Machine, dated Feb. 9, 2011, and related product information, 46 pp.
Truck and Van Products/Tite-Lok, https://web.archive.org/web/20060520959 51/http:/www.lavanture.com/tl_clamps.html, 3 pages, by Way Back Machine, dated May 12, 2006.
Welcome to SiraWeb.com. Tite Lok mounting clamp for typically used to mount soft tonneau covers, http://www.siraweb.com/p/10916/tl-2022, 2 pages. (Copyright 2014.).

* cited by examiner

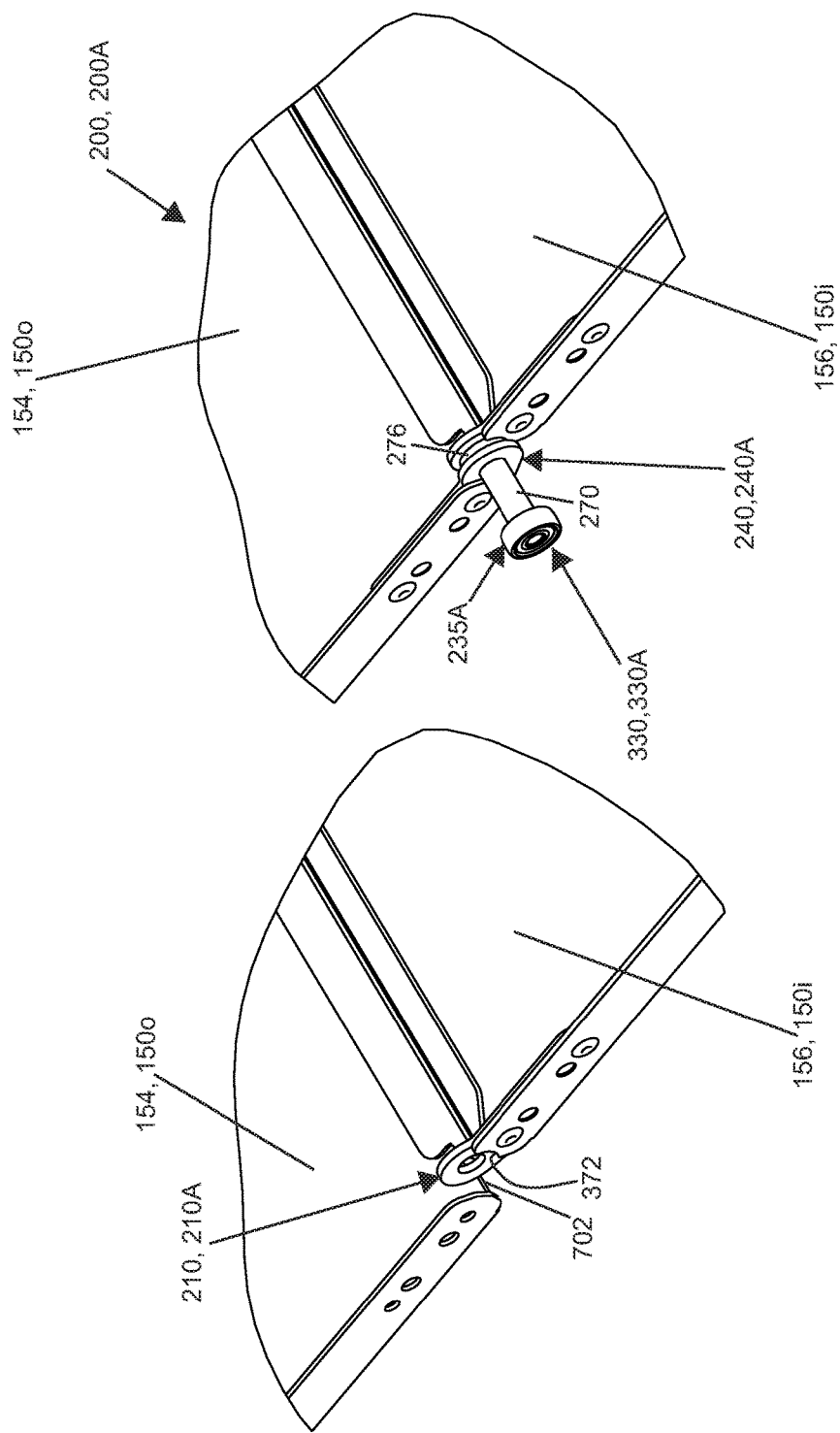

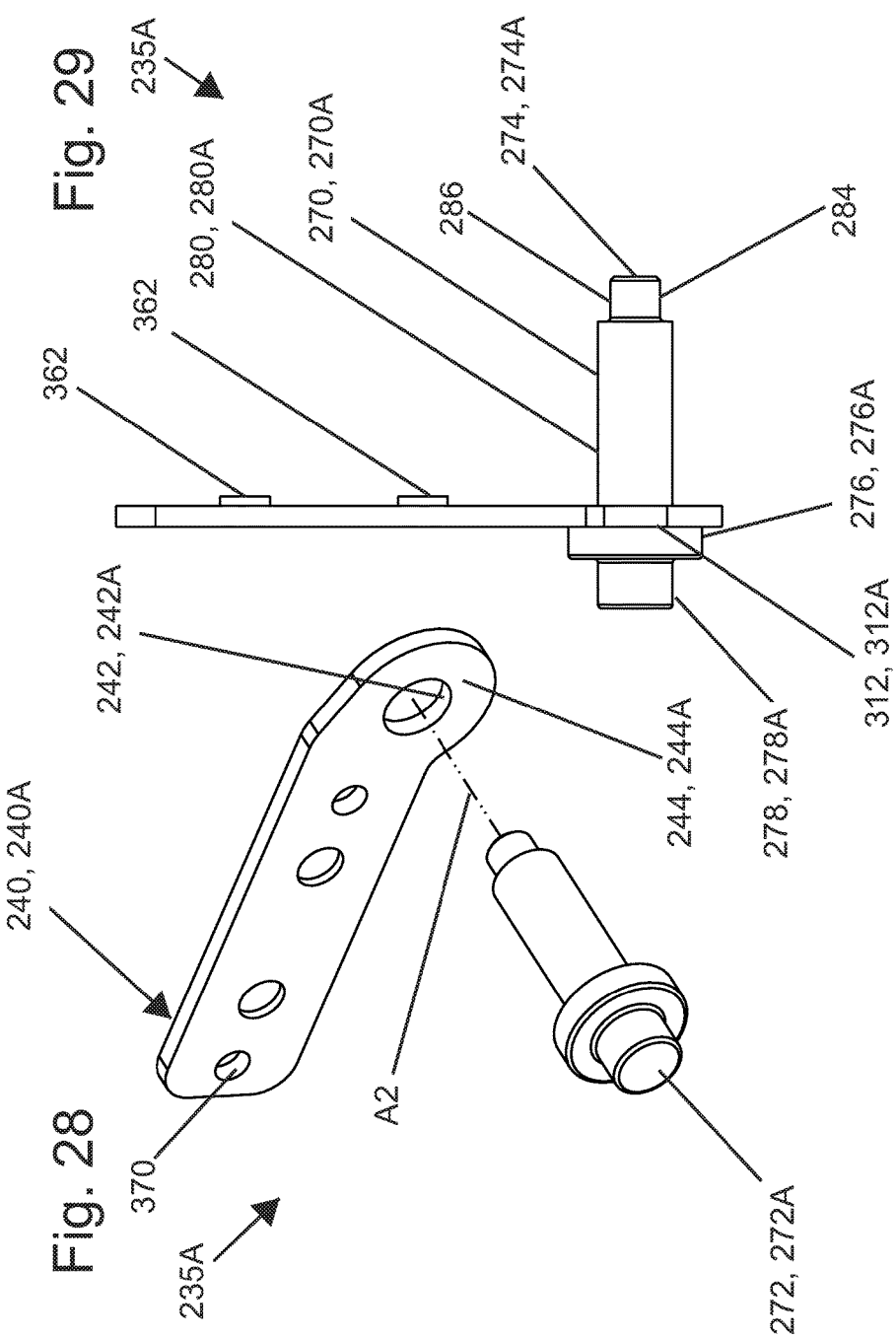

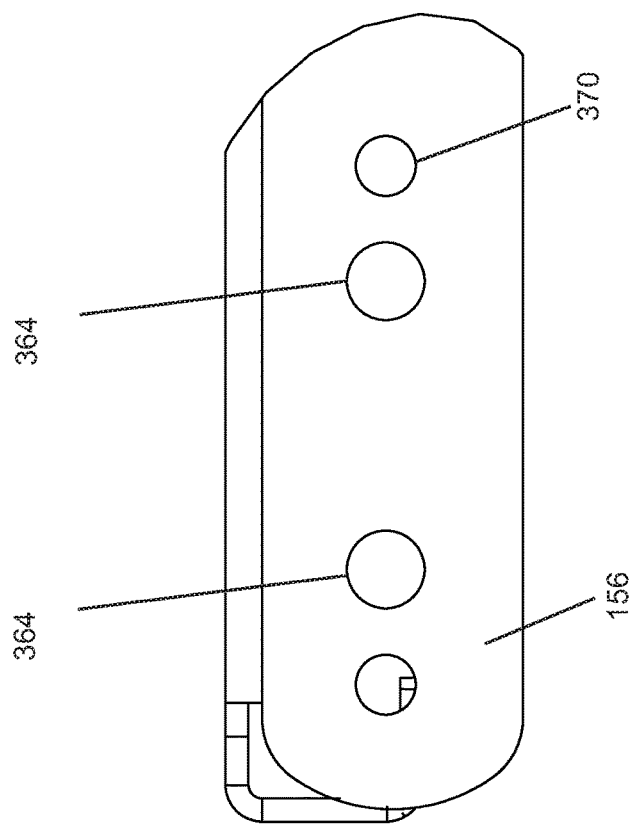
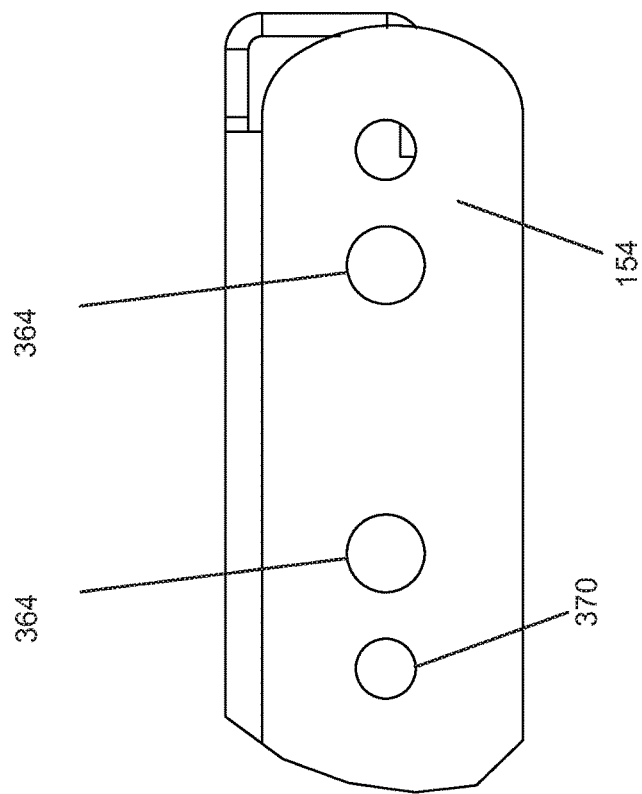
Fig. 35

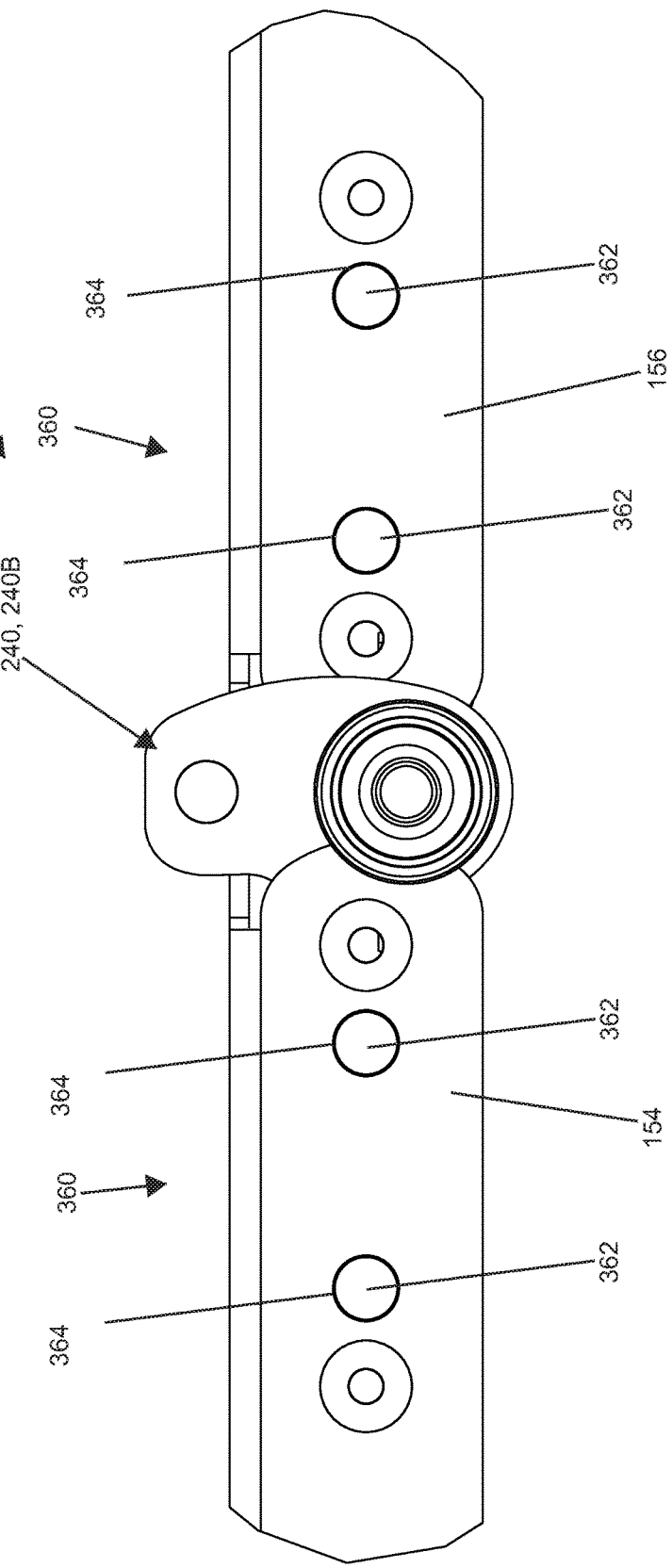

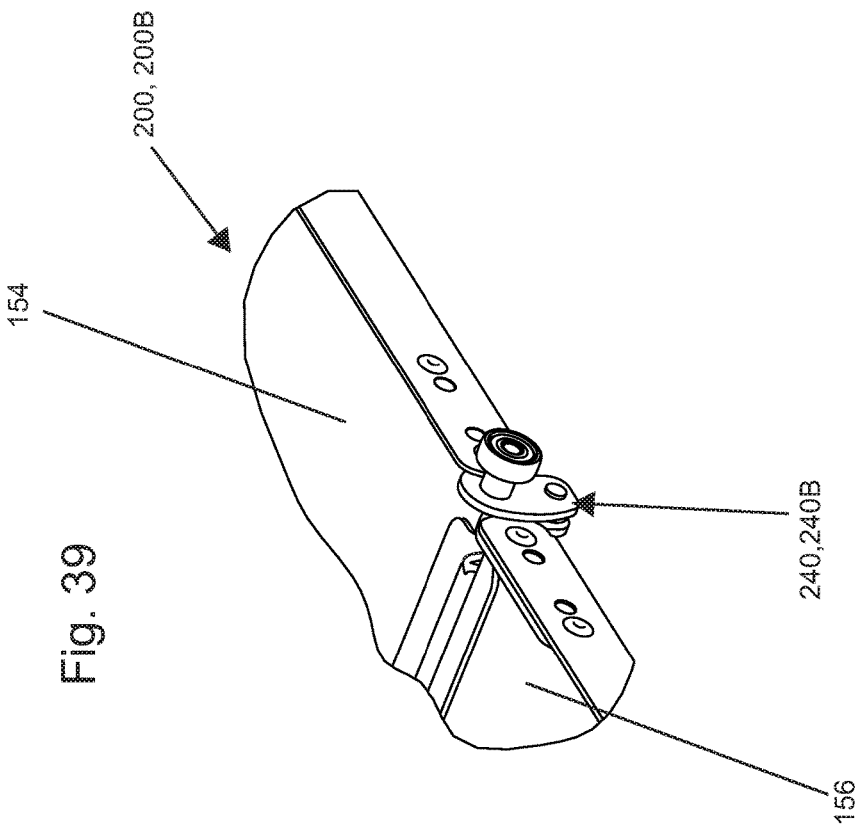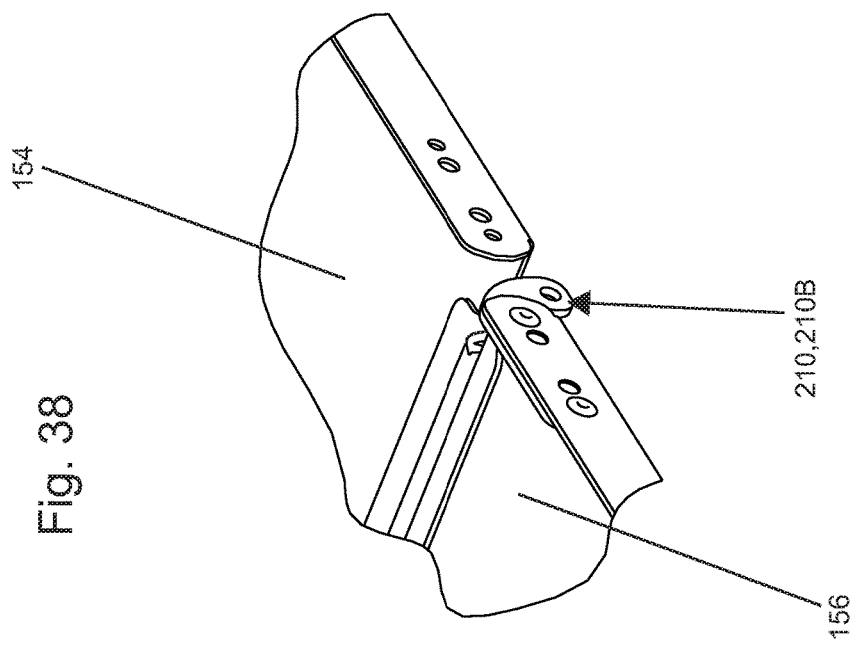

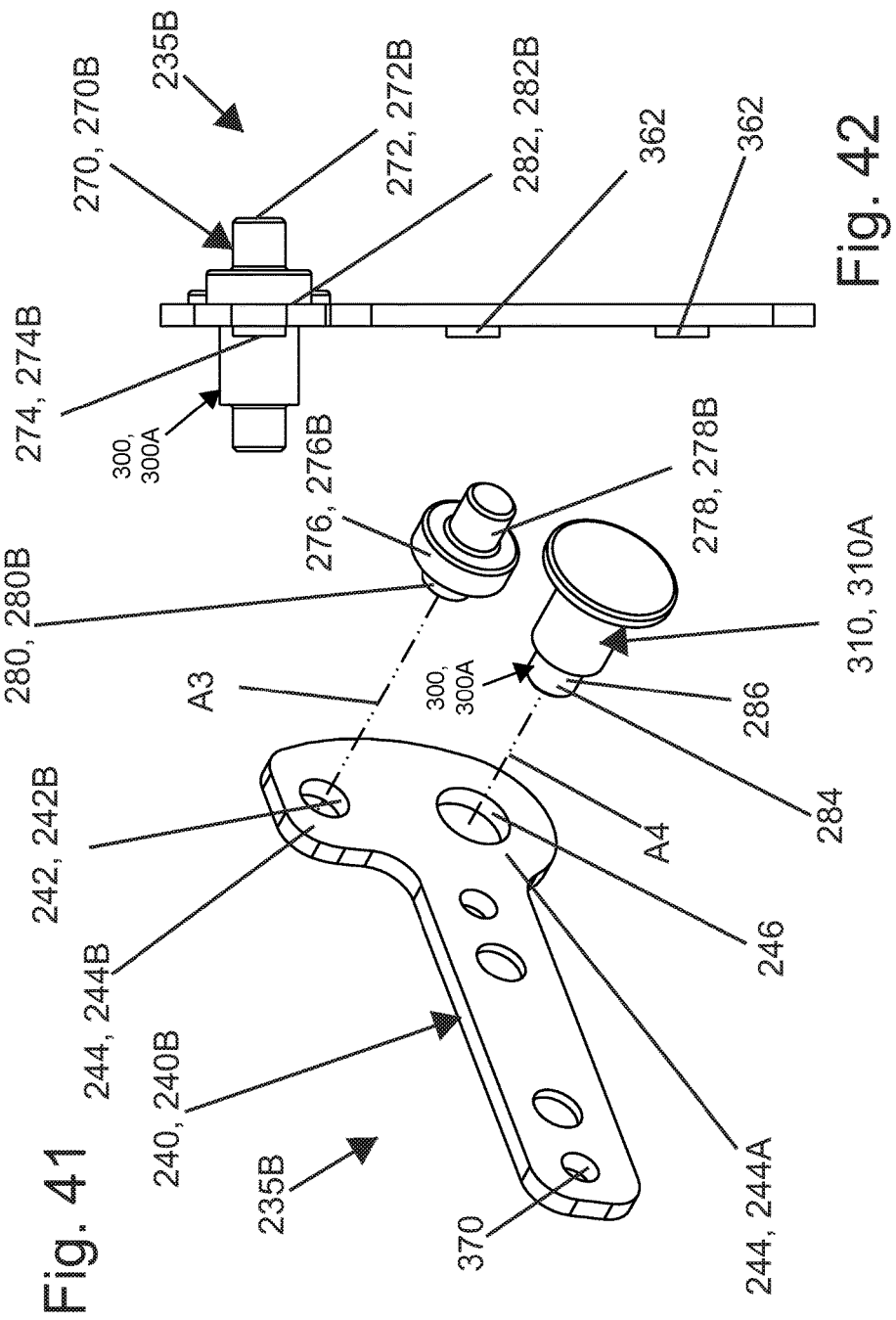

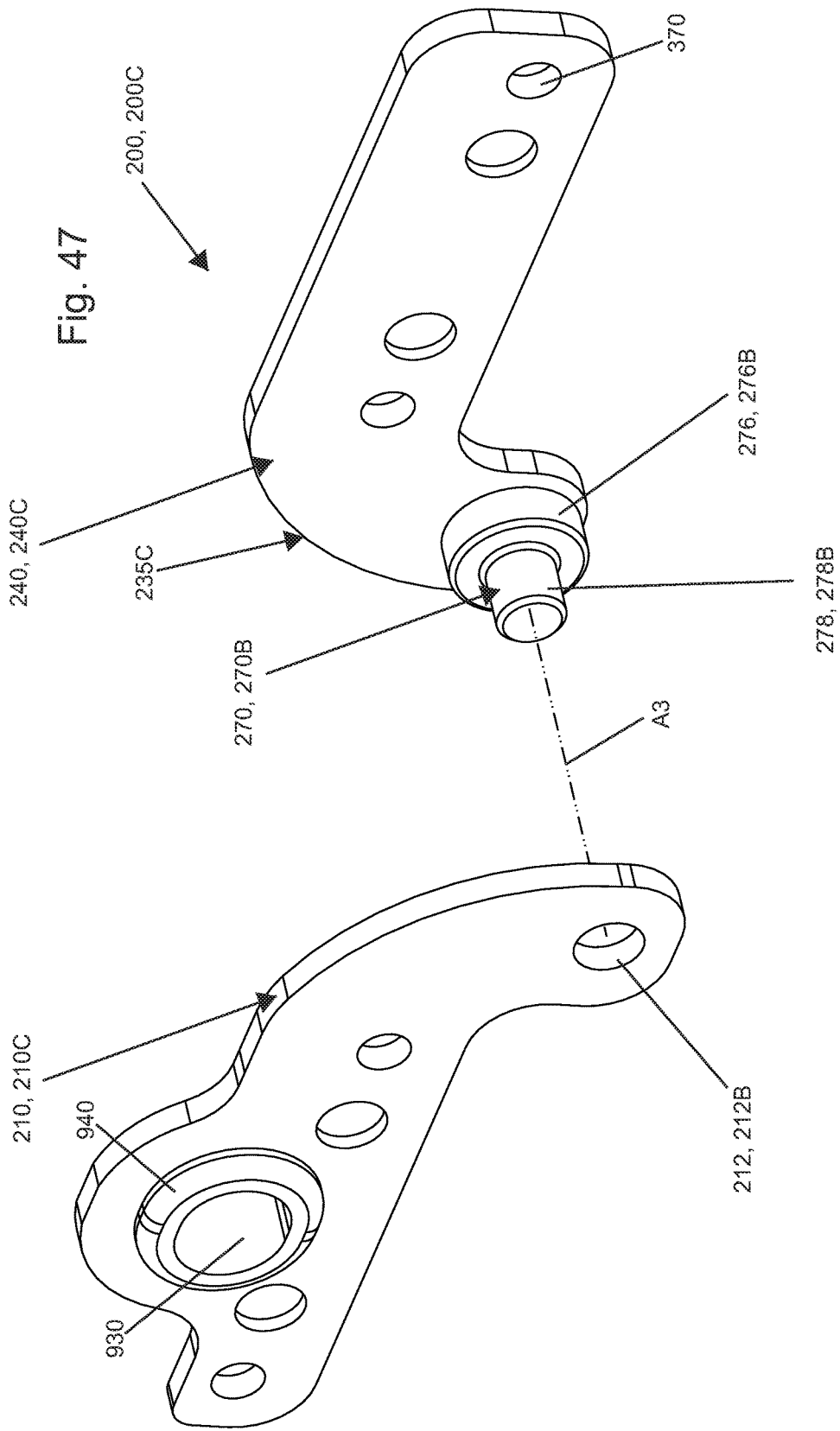

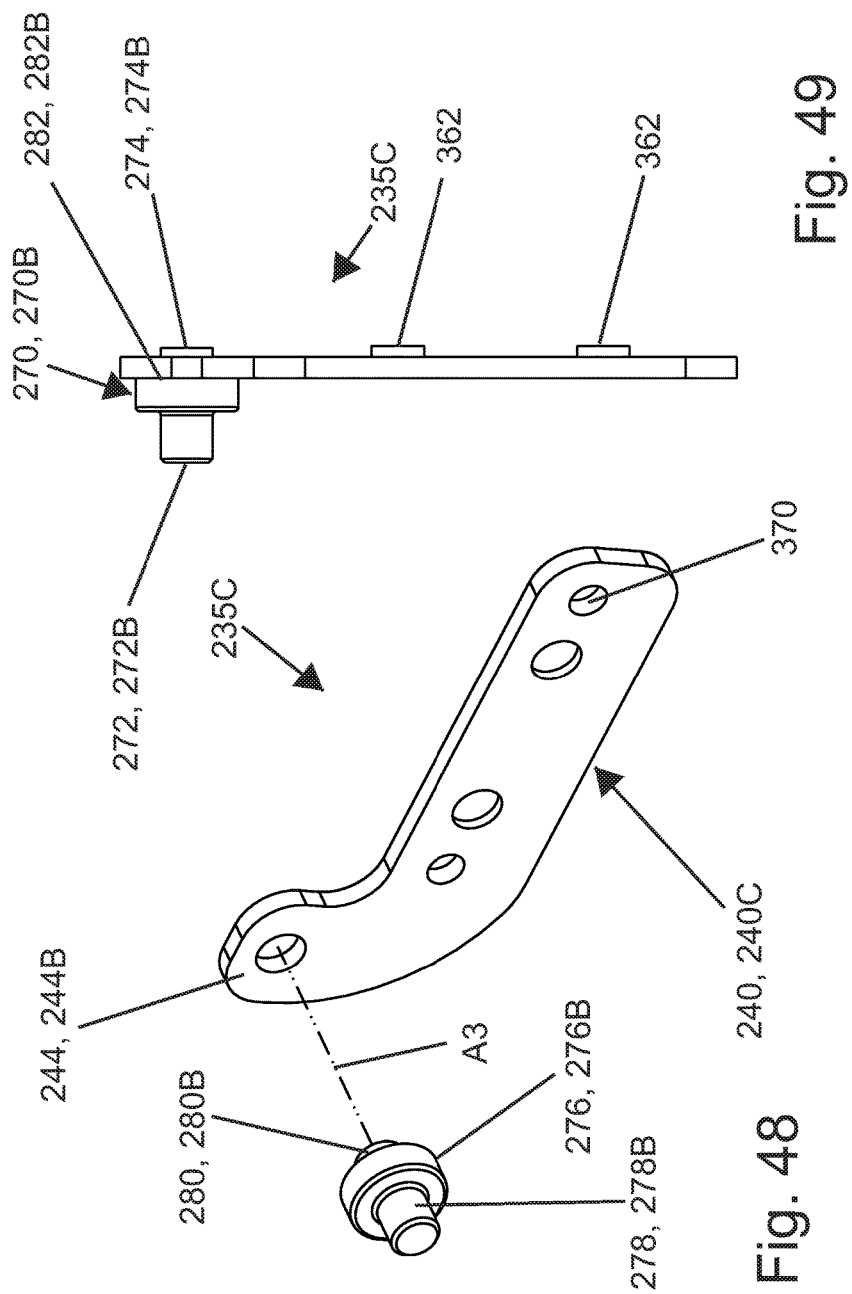

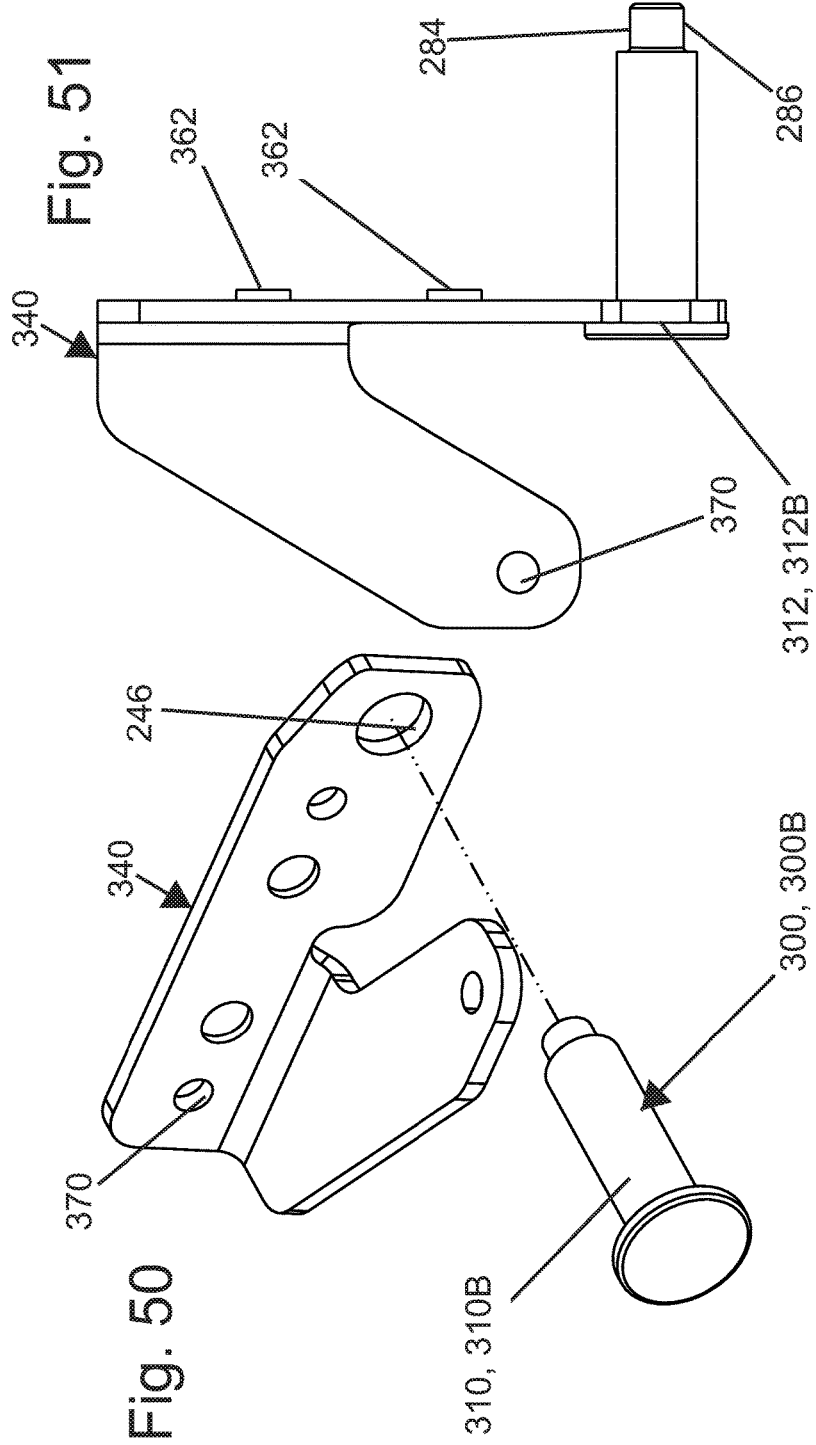

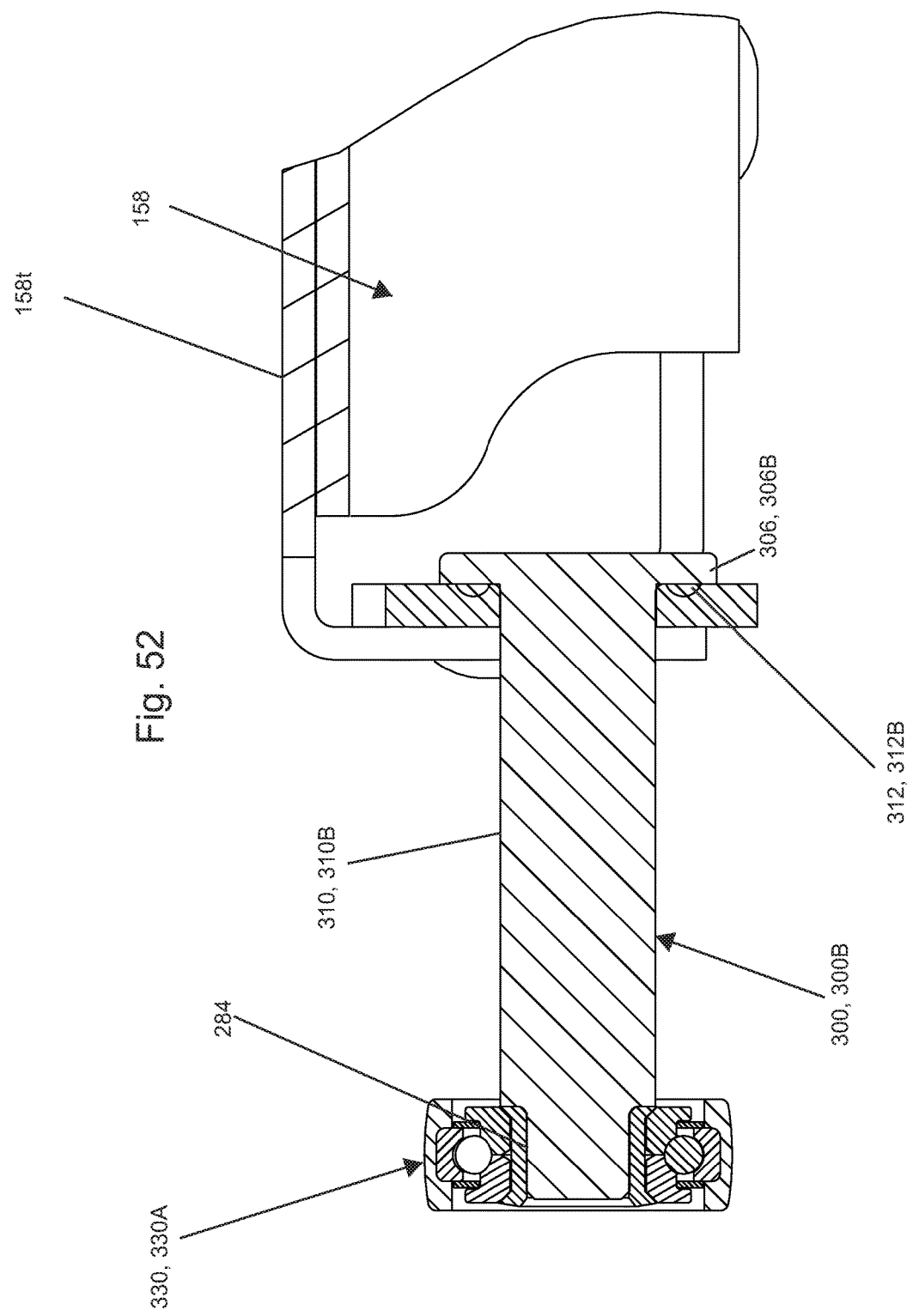

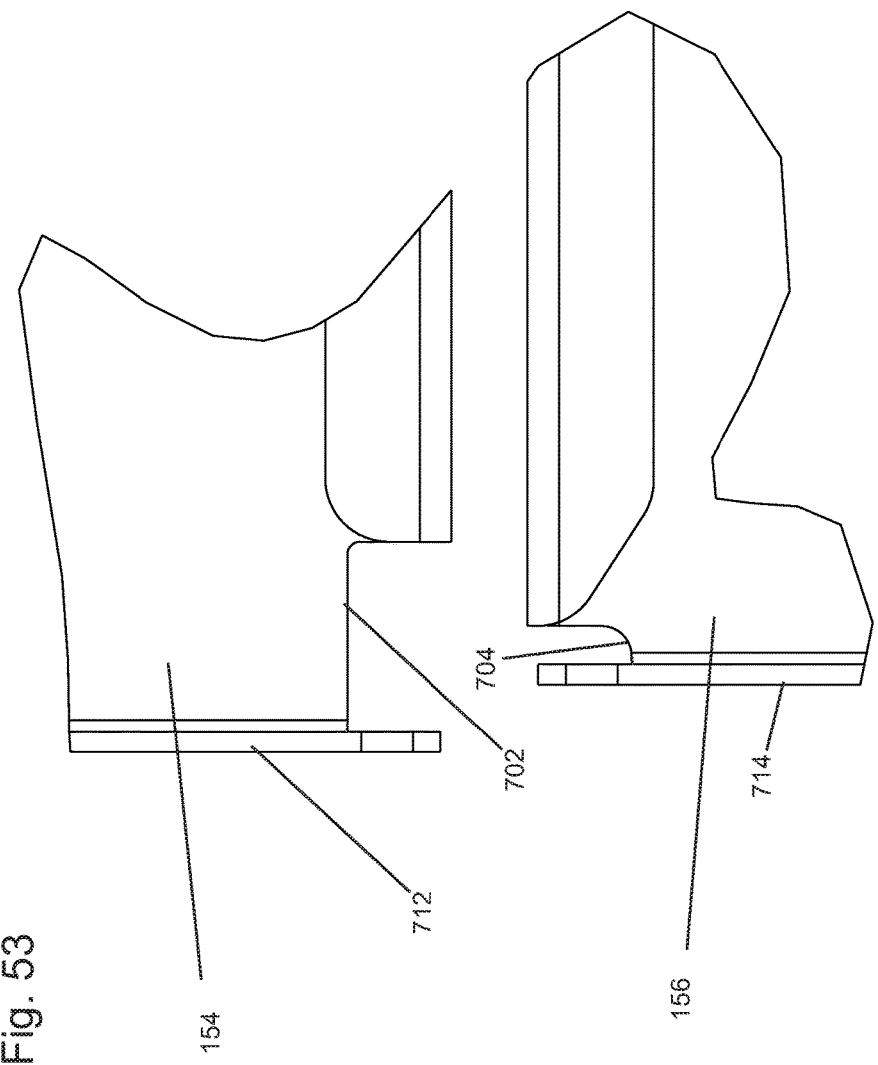

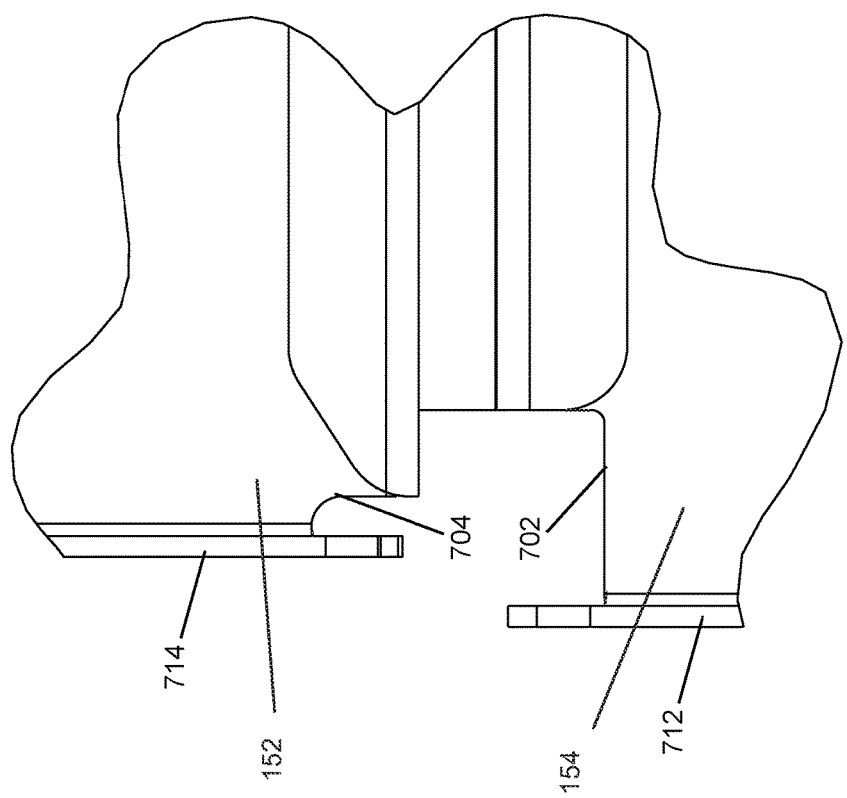

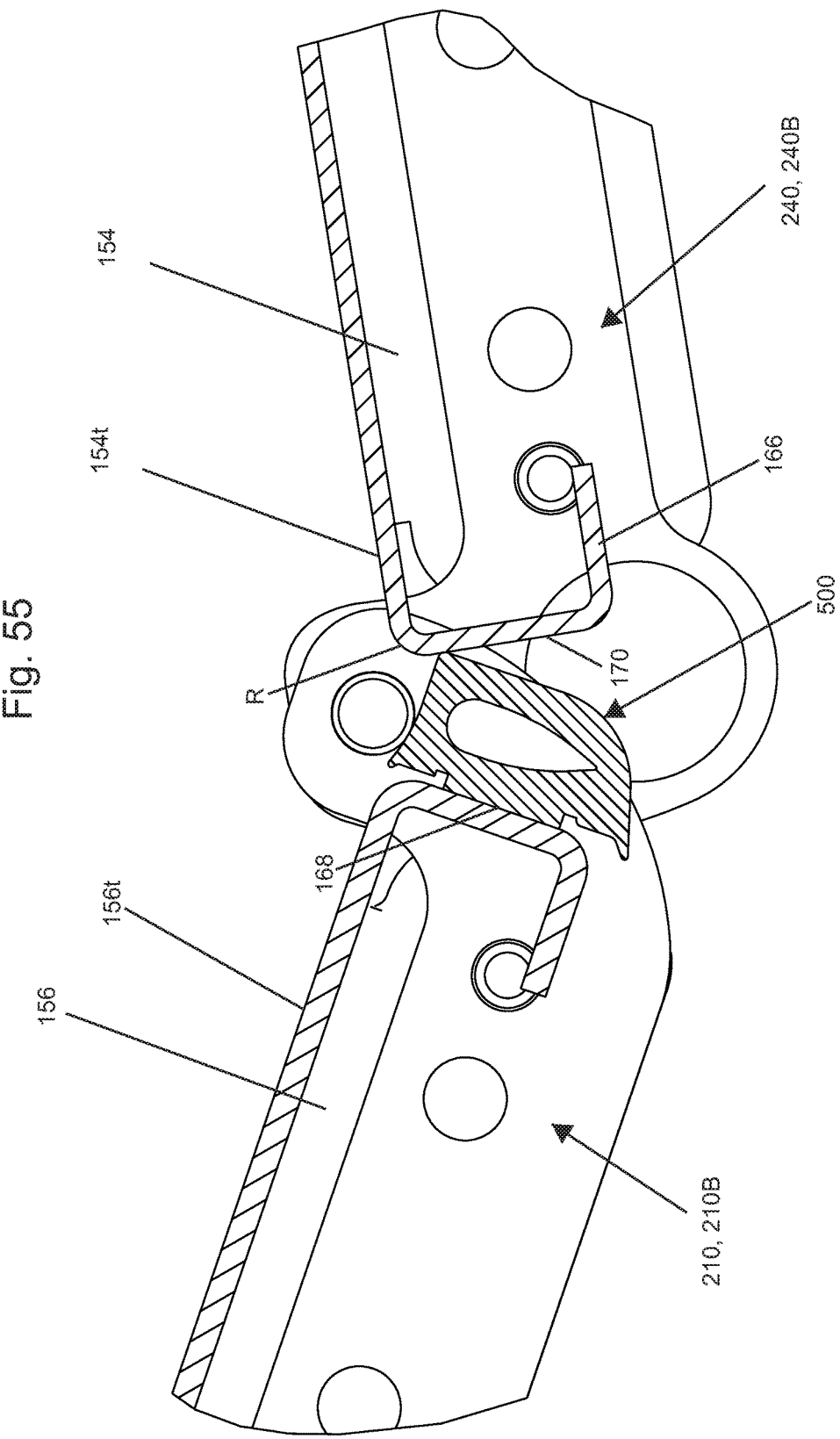

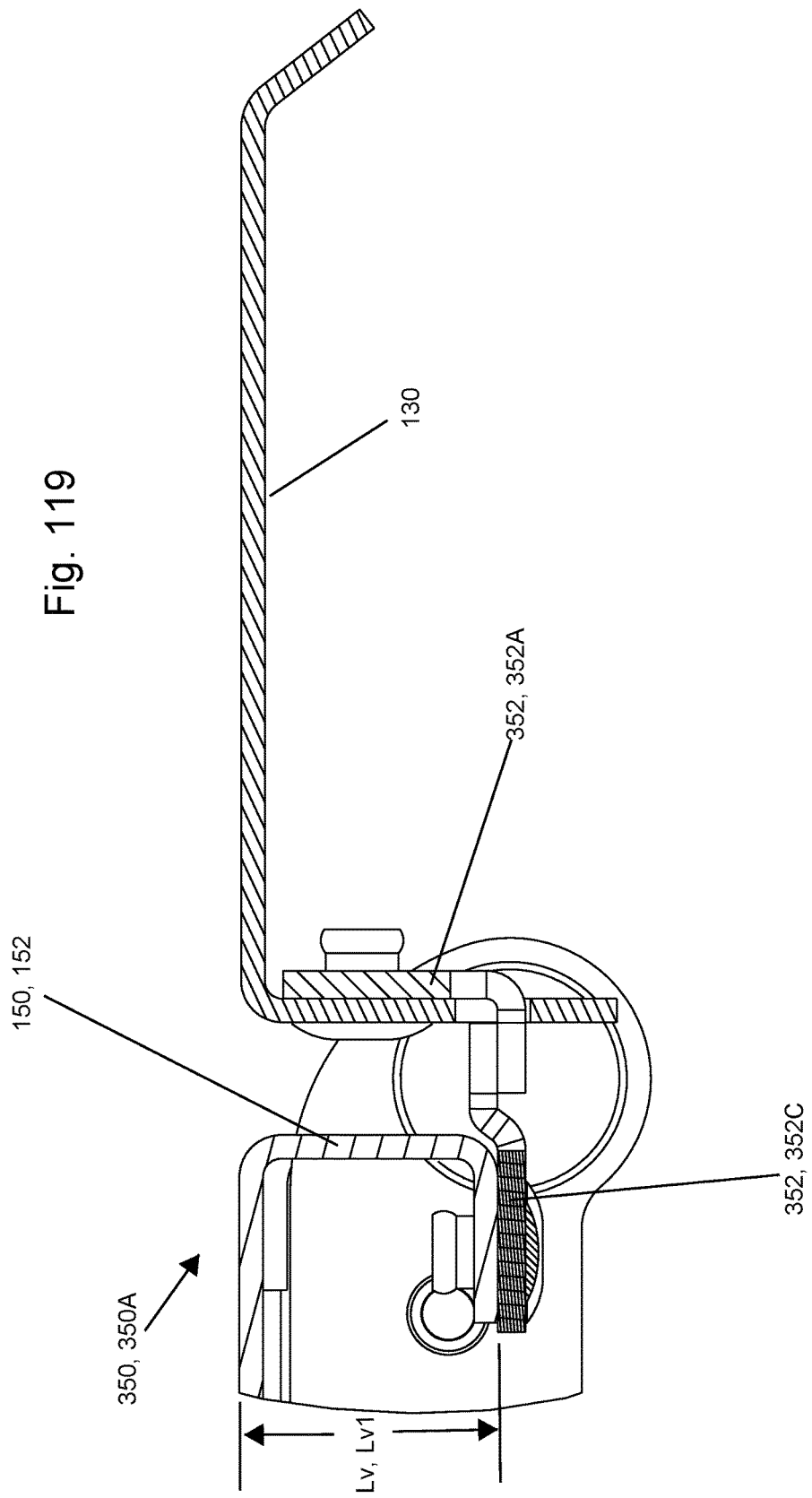

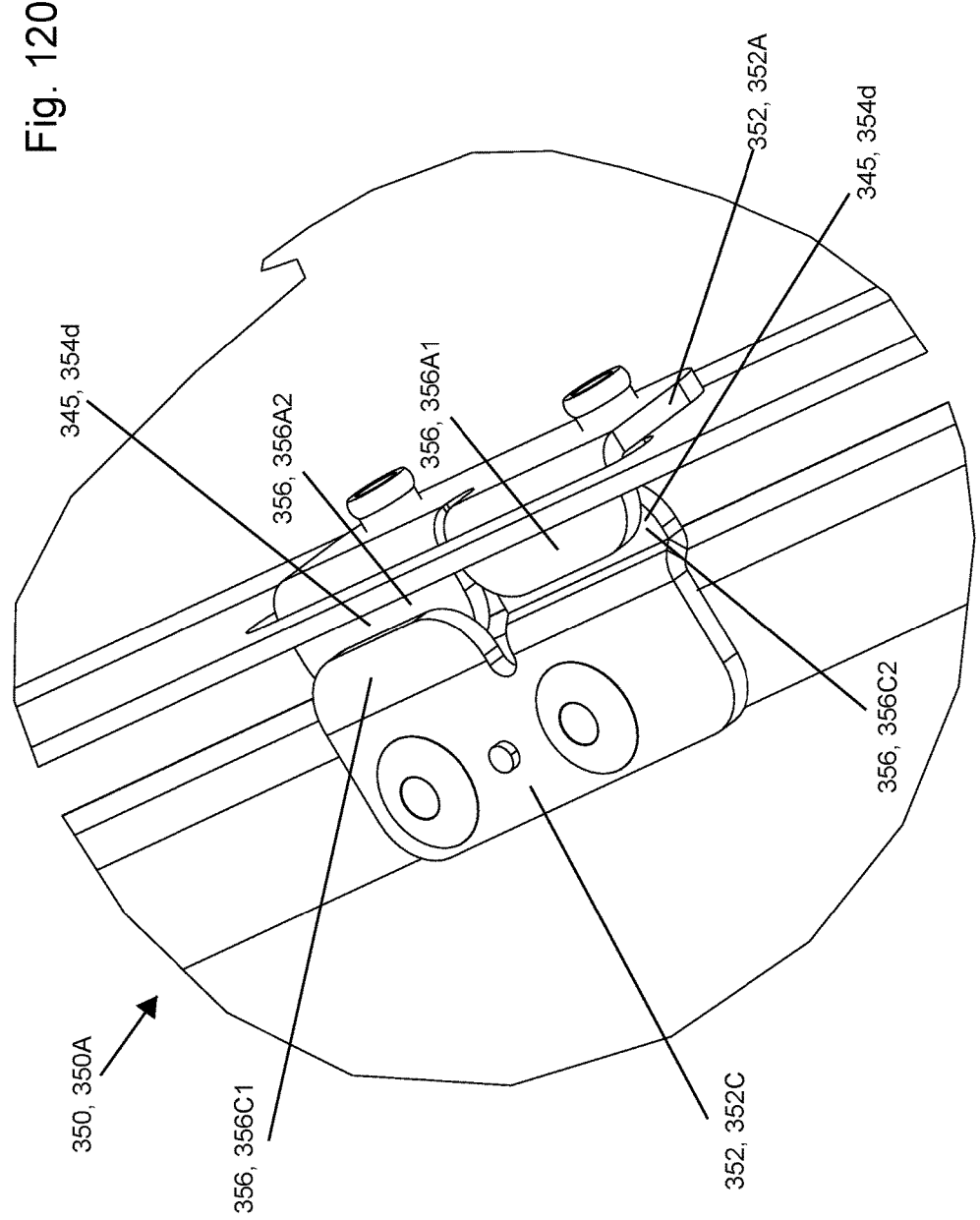

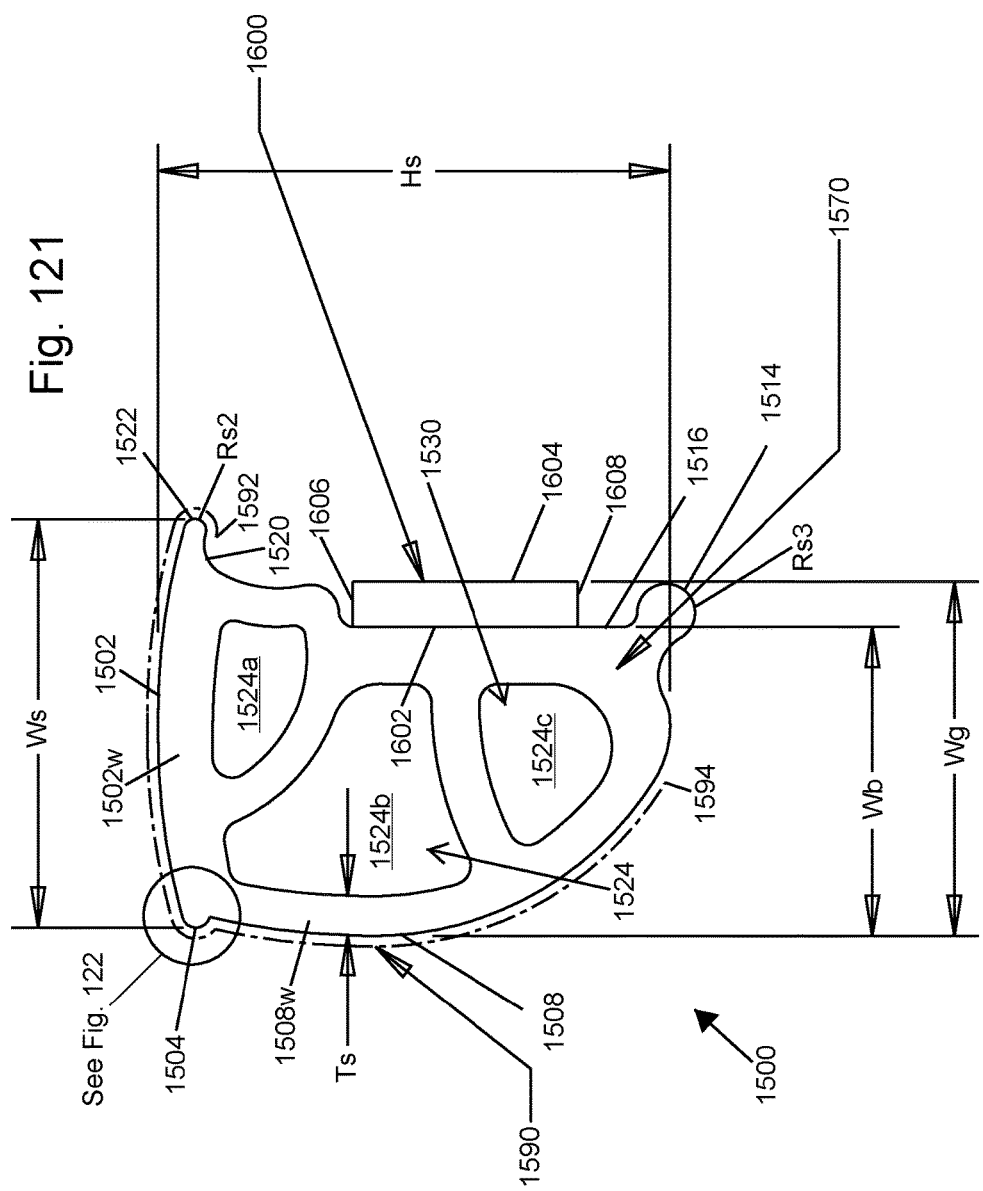

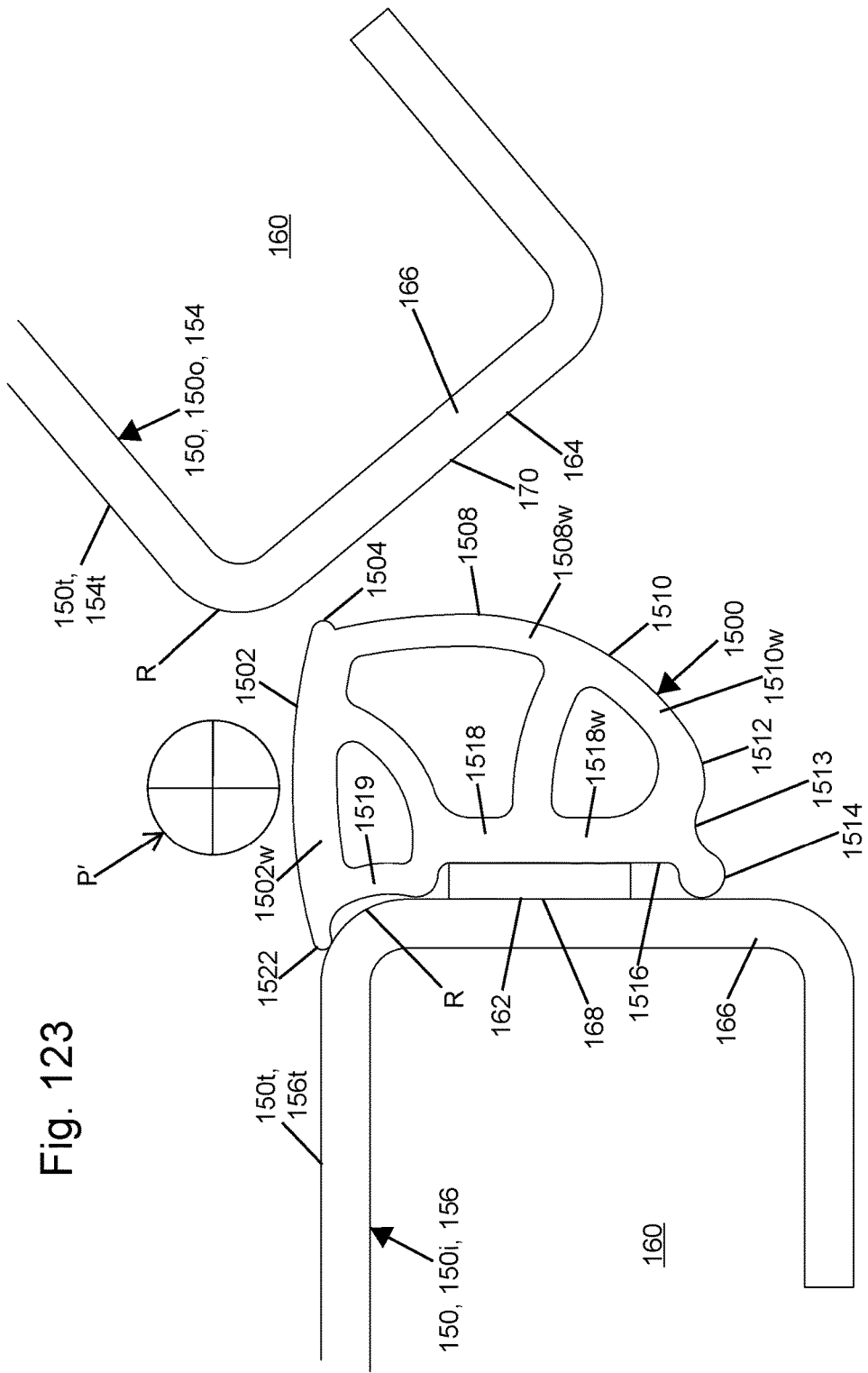

FOLDING/RETRACTABLE PICKUP TRUCK BOX COVER

CROSS-REFERENCE TO RELATED APPLICATIONS

This divisional patent application claims priority to U.S. Non-Provisional patent application Ser. No. 14/179,217, entitled "FOLDING/RETRACTABLE PICKUP TRUCK BOX COVER", and filed on Feb. 12, 2014, which claims priority to U.S. Provisional Patent Application Ser. No. 61/763,901, entitled "FOLDING/RETRACTABLE PICKUP TRUCK BOX COVER", and filed on Feb. 12, 2013. The above identified disclosures are hereby incorporated by reference in their entirety.

BACKGROUND

Pickup trucks typically include a pickup truck box positioned toward a rear end of the pickup truck and behind a cab of the pickup truck. The pickup truck box, as delivered from the factory, typically includes an opening behind a front wall of the pickup truck box and between a right and a left sidewall of the pickup truck box. At a rear end of the pickup truck box, an end gate is typically positioned between the right and the left sidewalls of the pickup truck box. The end gate is typically foldable to an open position that pivots about an axis that is positioned adjacent a bed of the pickup truck box. The front wall, the right and the left sidewalls, and the end gate of the pickup truck box typically extend upward from the bed of the pickup truck box. The opening of the pickup truck box typically extends around a perimeter of the pickup truck box that includes tops of the front wall, the right and left sidewalls, and the end gate. The opening of the pickup truck box allows the pickup truck box to haul irregularly shaped and/or large objects that may extend above the tops of the front wall, the right and the left sidewalls, and the end gate and further allows the objects to extend above the cab of the pickup. However, the opening of the pickup truck box does not provide enclosed storage that is often desired to keep various items in. The opening of the pickup truck box may further cause increased aerodynamic drag on the pickup truck that results in increased fuel usage and thereby cause increased cost and increased environmental pollution.

A variety of pickup truck box covers has been developed, and such covers are available in the marketplace. The pickup truck box covers, that are available in the marketplace, typically cover the opening of the pickup truck box and extend around the perimeter of the opening. The pickup truck box covers typically have a configuration that covers or substantially covers the opening and may further provide a lock to lock the pickup truck box cover in this extended configuration. The pickup truck box covers may also include a retracted configuration wherein the pickup truck box cover is folded or otherwise moved out of the way to substantially uncover the pickup truck box opening. The pickup truck box cover may further be removed from the pickup truck box and thereby free-up the entire pickup truck box or substantially the entire pickup truck box for use. U.S. Pat. No. 6,321,819, by Copp et al., issued on Nov. 27, 2001, discloses a retractable cover system for use in covering a pickup truck box and is hereby incorporated by reference in its entirety. Peragon Enterprises, Inc. of Spooner, Wis. 54801 sells retractable cover systems for covering the opening of a pickup truck box.

SUMMARY

An aspect of the present disclosure relates to a retractable cover system adapted to cover a pickup truck box when in a deployed configuration and adapted to retract to a stowed configuration. The retractable cover system includes a first rail, a second rail, a plurality of panels, and at least one connecting structure. The plurality of panels extends along a width between a first side and a second side. The first side is supported by the first rail and the second side is supported by the second rail. Each of the panels extends along a respective length between a respective front and a respective back. The panels of adjacent pairs of the panels are pivotally attached to one another at a corresponding pivot of a plurality of pivots. The at least one connecting structure structurally connects the panels of at least one of the adjacent pairs of the panels when the retractable cover system is in the deployed configuration and does not connect the panels of the at least one of the adjacent pairs of the panels when the retractable cover system is in the stowed configuration.

Still another aspect of the present disclosure relates to connecting structures that interconnect the panels of the adjacent pairs of the panels when the retractable cover system is in the deployed configuration and do not interconnect the panels of the adjacent pairs of the panels when the retractable cover system is in the stowed configuration.

Yet another aspect of the present disclosure relates to connecting structures that share load capacity between the panels of the adjacent pairs of the panels when the retractable cover system is in the deployed configuration and do not share the load capacity between the panels of the adjacent pairs of the panels when the retractable cover system is in the stowed configuration.

Still another aspect of the present disclosure relates to interconnecting structures that interconnect panels of a retractable cover system that is adapted to cover a pickup truck box when in a deployed configuration and is also adapted to retract to a stowed configuration. The retractable cover system includes a first rail, a second rail, a plurality of panels, and at least one connecting structure. The plurality of panels extends along a width between a first side and a second side. The first side is supported by the first rail and the second side is supported by the second rail. Each of the panels extends along a respective length between a respective front and a respective back. The panels of adjacent pairs of the panels are pivotally attached to one another at a corresponding pivot of a plurality of pivots. The at least one connecting structure structurally connects the panels of at least one of the adjacent pairs of the panels when the retractable cover system is in the deployed configuration and does not connect the panels of the at least one of the adjacent pairs of the panels when the retractable cover system is in the stowed configuration.

Yet another aspect of the present disclosure relates to an extruded seal for a retractable cover system. The retractable cover system includes a first panel and a second panel that are rotatably attached to each other along an axis. Movement of the retractable cover system between a covering configuration and a stowed configuration includes relative rotational movement between the first panel and the second panel about the axis. The extruded seal includes an extruded length, a mounting side, a sealing side, a top side, and an angled rib. The extruded length extends between a first end and a second end. The extruded seal is adapted for installation on the retractable cover system with the extruded length substantially parallel to the axis. The mounting side is adapted for mounting to the first panel. The sealing side is adapted to seal against the second panel when the retractable cover system is in the covering configuration and is adapted to separate from the second panel when the retractable cover system is moved from the covering configuration to the stowed configuration. The top side extends between the mounting side and the sealing side. The angled rib extends between the mounting side and the top side. The angled rib is adapted to support the top side, at least when the second panel pivotally scrubs against the extruded seal.

In certain embodiments, the retractable cover system is adapted to cover a pickup truck box, and the extruded seal is adapted to substantially extend between sides of the pickup truck box. The top side may extend beyond the mounting side to form a first radius covering portion. The top side may extend beyond the sealing side to form a second radius covering portion. The mounting side may include an adhesive strip that is adapted to adhesively mount the sealing side to the first panel. The adhesive strip may include an edge that is adjacent a ledge of the mounting side. A free portion of the mounting side may extend between the ledge and the top side. The angled rib may extend between the ledge of the mounting side and a medial position of the top side. The mounting side may include a free tip that is positioned opposite the ledge about the adhesive strip. The sealing side may extend from the top side and curve toward the free tip as the sealing side further extends to the mounting side. The extruded seal may further include a transverse rib that extends between a medial position of the mounting side and a medial position of the sealing side. The extruded seal may be adapted for use both with the axis positioned outside an exterior of the first panel and the second panel, when the first panel and the second panel are in the covering configuration, and with the axis positioned inside an interior of the first panel and the second panel, when the first panel and the second panel are in the covering configuration. The extruded seal may further include an extruded body that includes a first material and an extruded coating that includes a second material. The second material of the extruded coating may be harder than the first material of the extruded body. The extruded coating may be adapted to pivotally scrub against the second panel.

Still another aspect of the present disclosure relates to a seal for a retractable pickup truck box cover system. The retractable pickup truck box cover system includes a first panel and a second panel that are rotatably attached to each other along an axis. Movement of the retractable pickup truck box cover system between a covering configuration and a stowed configuration includes relative rotational movement between the first panel and the second panel about the axis. The seal includes a length and a hollow interior. The length extends between a first end and a second end. The hollow interior has a plurality of interior portions that extend substantially parallel to the length. A first interior portion of the plurality of interior portions is adapted to be compressed between the first panel and the second panel when in the covering configuration, and a second interior portion of the plurality of interior portions is adapted to bulge when the first panel and the second panel are in the covering configuration.

In certain embodiments, the second interior portion is adapted to expand between the first panel and the second panel when the first panel and the second panel are in the covering configuration. The second interior portion may be adapted to expand above a top of the first panel and a top of the second panel when the first panel and the second panel are in the covering configuration. The plurality of interior portions may further include a third interior portion that is adapted to bulge when the first panel and the second panel are in the covering configuration.

Yet another aspect of the present disclosure relates to an extruded seal for a cover system. The cover system includes a plurality of panels that are rotatably connected about substantially parallel axes that are defined by a plurality of joints of the cover system. The cover system is configurable to a covering configuration and a stowed configuration. The extruded seal includes an extruded body that extends between a first end and a second end. The extruded body includes a mounting portion, a sealing portion, a lower portion, a top portion, and a rib. The mounting portion is adapted for mounting to respective mounting areas of the plurality of panels. The sealing portion is adapted to seal against respective sealing areas of the plurality of panels, when the cover system is in the covering configuration, and is adapted to separate from the respective sealing areas when the cover system is moved from the covering configuration to the stowed configuration. The lower portion continues from the sealing portion to the mounting portion. The top portion extends between the sealing portion and the mounting portion. The rib extends between a medial position of the mounting portion and the sealing portion. The rib is adapted to support the sealing portion, at least when the cover system is at the covering configuration.

In certain embodiments, the rib extends to a medial position of the sealing portion. Alternatively, the rib may extend to an intersection of the sealing portion and the lower portion. The extruded seal may further include an angled rib that extends between the mounting portion and the top portion. The angled rib may be adapted to support the top portion, at least when the sealing area pivotally scrubs against the extruded seal. The angled rib may extend between a medial position of the mounting portion and a medial position of the top portion. The extruded seal may further include an extruded coating that is stiffer than the extruded body. The extruded coating may be adapted to stiffen the extruded body.

Still another aspect of the present disclosure relates to a mounting clamp for a cover system for covering an opening between a right side and an opposite left side of a pickup truck box. The right and left sides each define a top surface. The mounting clamp includes a mounting piece, a clamping piece, a pivot, and an actuator. The mounting piece including a transverse mounting surface, a first pivot joint portion, a first actuator receiver, a first jaw, and a locating member. The locating member is adapted to establish a predetermined offset between the top surface of one of the right and left sides of the pickup truck box and the transverse mounting surface. The clamping piece includes a second pivot joint portion, a second actuator receiver, and a second jaw. The pivot is formed by engagement of the first pivot joint portion and the second pivot joint portion. The actuator is engaged to the first actuator receiver and the second actuator receiver. The actuator is adapted to actuate the first and second jaws.

In certain embodiments, the actuator is a threaded fastener. The actuator may apply tension between the first actuator receiver of the mounting piece and the second actuator receiver of the clamping piece to actuate the first and second jaws. The actuator may be positioned between the pivot and the first and second jaws. The mounting piece may be formed of a single piece of sheet metal. The clamping piece may be formed of a single piece of sheet metal. The first jaw and the locating member may be formed on a same tab. The pivot may include a pair of tabs and a pair of tab receivers that receives the pair of tabs. A position of the pivot may be adjustable. The pivot may include a pair of tabs, a first pair of tab receivers, and a second pair of tab receivers. One of the pairs of tab receivers may selectively receive the pair of tabs. The position of the pivot may be adjusted by selecting another of the pairs of tab receivers to receive the pair of tabs. The mounting piece may include a single monolithic piece that includes the transverse mounting surface, the first jaw, and the locating member.

Yet another aspect of the present disclosure relates to a cover system for covering an opening between a right side and an opposite left side of a pickup truck box. The right and left sides each define a top surface. The cover system includes a right rail member, a left rail member, a right mounting clamp, and a left mounting clamp. The right rail member is adapted to mount at least partially above the top surface of the right side. The left rail member is adapted to mount at least partially above the top surface of the left side. The right mounting clamp includes a locating member that is adapted to establish a predetermined offset between the top surface of the right side and the right rail member. The left mounting clamp includes a locating member that is adapted to establish the predetermined offset between the top surface of the left side and the left rail member.

In certain embodiments, the right mounting clamp further includes a transverse mounting surface that mounts and vertically locates the right rail member. The left mounting clamp may further include a transverse mounting surface that mounts and vertically locates the left rail member. At least one of the transverse mounting surfaces may include a slot that accommodates lateral adjustment of a corresponding one of the rail members. Each of the mounting clamps may further include a clamping piece that pivots relative to the respective locating member about a pivot joint and thereby may be adapted to clamp the respective mounting clamp to the respective side of the pickup truck box. The pickup truck box may be a first pickup truck box, and the pivot joint may include multiple configurations that adapt the mounting clamps to interface with sides of a second pickup truck box that vary in style from the sides of the first pickup truck box. The pivot joint may include a pair of tabs, a first pair of tab receivers, and a second pair of tab receivers. A configuration of the multiple configurations of the pivot joint may be selected by selectively engaging the pair of tabs with one of the pairs of tab receivers. The cover system may further include a right seal that may be adapted to seal the right rail member to the top surface of the right side and a left seal that may be adapted to seal the left rail member to the top surface of the left side.

Still another aspect of the present disclosure relates to a method of installing a cover system for covering an opening between a right side and an opposite left side of a pickup truck box. The right and left sides each define a top surface. The method includes: 1) providing the cover system; 2) locating a right mounting clamp, that includes a first locating member, with respect to the top surface of the right side of the pickup truck box by setting a first locating surface of the first locating member flush with the top surface of the right side; 3) clamping the right mounting clamp to the right side of the pickup truck box; 4) locating a left mounting clamp, that includes a second locating member, with respect to the top surface of the left side of the pickup truck box by setting a second locating surface of the second locating member flush with the top surface of the left side; and 5) clamping the left mounting clamp to the left side of the pickup truck box.

In certain embodiments, the above method may further include: 1) mounting a right rail member of the cover system to the right mounting clamp; and/or 2) mounting a left rail member of the cover system to the left mounting clamp.

Yet another aspect of the present disclosure relates to a mounting clamp for a cover system for covering an opening between a right side and an opposite left side of a pickup truck box. The mounting clamp includes a mounting piece, a clamping piece, a pivot, and an actuator. The mounting piece includes a transverse mounting surface, a first pivot joint portion, a first actuator receiver, and a first jaw. The clamping piece includes a second pivot joint portion, a second actuator receiver, and a second jaw. The pivot is formed by engagement of the first pivot joint portion and the second pivot joint portion. The actuator is engaged to the first actuator receiver and the second actuator receiver. The actuator is adapted to actuate the first and second jaws.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 24 is also an enlarged portion of FIG. 11 and shows the seal of FIG. 23 overlaid, but in an uncompressed state;

FIG. 25 is a partial perspective view showing the underside of the panel assembly of FIG. 8 with the first member of FIG. 23 attached to the first panel by rivets;

FIG. 26 is the partial perspective view of FIG. 25, but with the subassembly of FIG. 24 assembled to the second panel by additional rivets thereby completing the first joint type of FIG. 18;

FIG. 28 is an exploded perspective view of the subassembly of FIG. 24;

FIG. 29 is a plan view of the subassembly of FIG. 24;

FIG. 35 is a partial side elevation view of the first panel and the second panel of FIG. 22 before they are connected by the second joint type of FIG. 31, the second joint type of FIG. 31 being connected to opposite ends of the first panel and the second panel of FIG. 22 as the first joint type of FIG. 18;

FIG. 37 is the partial side elevation view of FIG. 36, but with a subassembly including a second member and a shaft assembled to the second panel, thereby completing the assembly of the second joint type of FIG. 31 between and to the first and the second panels of FIG. 22; FIG. 37 is also an enlarged portion of FIG. 11;

FIG. 38 is a partial perspective view showing the underside of the panel assembly of FIG. 8 with the first member of FIG. 36 attached to the first panel by additional rivets;

FIG. 39 is the partial perspective view of FIG. 38, but with the subassembly of FIG. 37 assembled to the second panel by additional rivets thereby completing the second joint type of FIG. 31;

FIG. 41 is an exploded view of the subassembly of FIG. 37;

FIG. 42 is a plan view of the subassembly of FIG. 37;

FIG. 47 is an exploded perspective view similar to FIGS. 21 and 34, but illustrating the third joint type of FIG. 43;

FIG. 48 is an exploded perspective view of a subassembly of the third joint type of FIG. 43 that is similar to the subassembly of FIG. 37;

FIG. 49 is a plan view of the subassembly of FIG. 48;

FIG. 50 is an exploded perspective view of a reinforcement bracket and guide element mount assembly used at a rearmost position of the retractable cover system;

FIG. 51 is a plan view of the reinforcement bracket and guide element mount assembly of FIG. 50;

FIG. 52 is a partial cross-sectional elevation view of the reinforcement bracket and guide element mount assembly of FIG. 50 installed at the rearmost position;

FIG. 53 is a bottom plan view illustrating a notch arrangement in the first and the second panels of FIG. 22;

FIG. 54 is a bottom plan view illustrating another notch arrangement in the first and the second panels of FIG. 22;

FIG. 55 is a partial cross-sectional left side elevation view illustrating the seal of FIG. 23 positioned between the first and the second panels of FIG. 22 with the first and the second panels joined by the second joint type of FIG. 31 thereby positioning a joint pivot axis above top surfaces of the first and the second panels;

FIG. 119 is a cross-sectional side view of the interlocking structures of FIG. 112 shown in an engaged configuration;

FIG. 120 is a partial perspective view of the interlocking structures of FIG. 112 shown in the engaged configuration;

FIG. 121 is a side elevation view of another seal suitable for use as the seal of FIG. 23;

FIG. 122 is an enlarged portion of FIG. 121;

FIG. 123 is a partial cross-sectional left side elevation view illustrating the seal of FIG. 121 positioned between the first and the second panels of FIG. 22 with the first and the second panels joined by the second joint type of FIG. 31 thereby positioning the joint pivot axis of FIG. 55 above the top surfaces of the first and the second panels;

FIG. 129 is the partial cross-sectional left side elevation view of FIG. 127, but with the first and the second panels moved toward the extended configuration of FIG. 3;

FIG. 130 is a partial cross-sectional elevation view of a rail mounting system according to the principles of the present disclosure, with a mounting clamp illustrated in an unclamped position and a pivot of the mounting clamp illustrated in a first position;

FIG. 131 is a partial cut-away perspective view of the rail mounting system of FIG. 130, with the mounting clamp illustrated in a clamping position and the pivot of the mounting clamp illustrated in a second position;

FIG. 132 is the partial cross-sectional elevation view of FIG. 130, but with the mounting clamp illustrated in the clamping position of FIG. 131 and the pivot of the mounting clamp illustrated in the second position of FIG. 131;

FIG. 133 is the partial cut-away perspective view of FIG. 131, but with the pivot of the mounting clamp illustrated at the first position of FIG. 130 and with a rail mounted to the mounting clamp;

FIG. 134 is the partial cross-sectional elevation view of FIG. 132, but with the pivot of the mounting clamp illustrated in the first position of FIG. 130;

FIG. 135 is a perspective view of the mounting clamp of FIG. 130; and

FIG. 136 is another partial cut-away perspective view of the rail mounting system of FIG. 130.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

According to the principles of the present disclosure, a retractable cover system includes various improvements and refinements over retractable cover systems that are known in the prior art.

Figure 1:
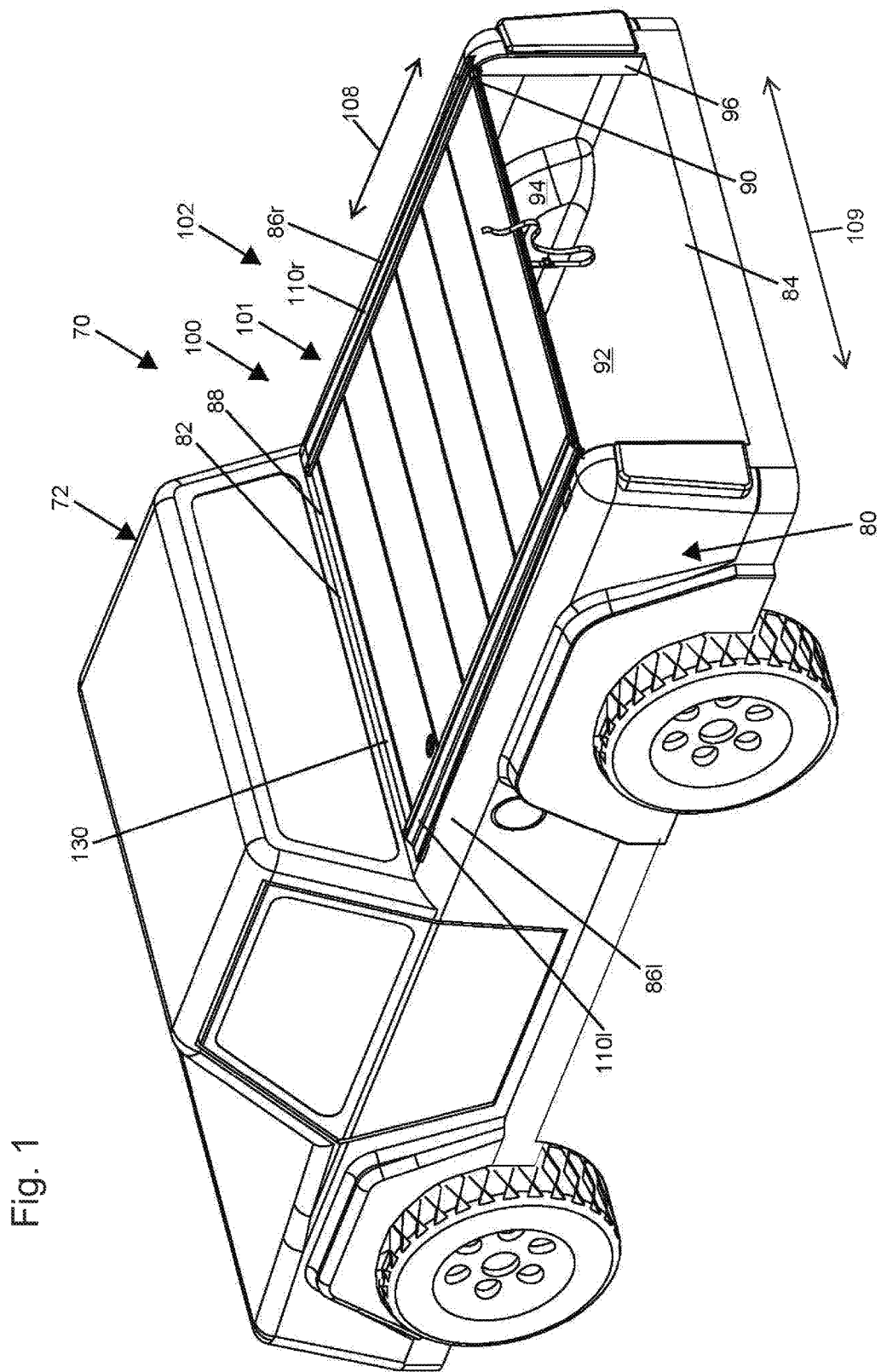
FIG. 1 is a left-rear perspective view of a retractable cover system for covering an opening of a pickup truck box according to the principles of the present disclosure.
Figure 2:
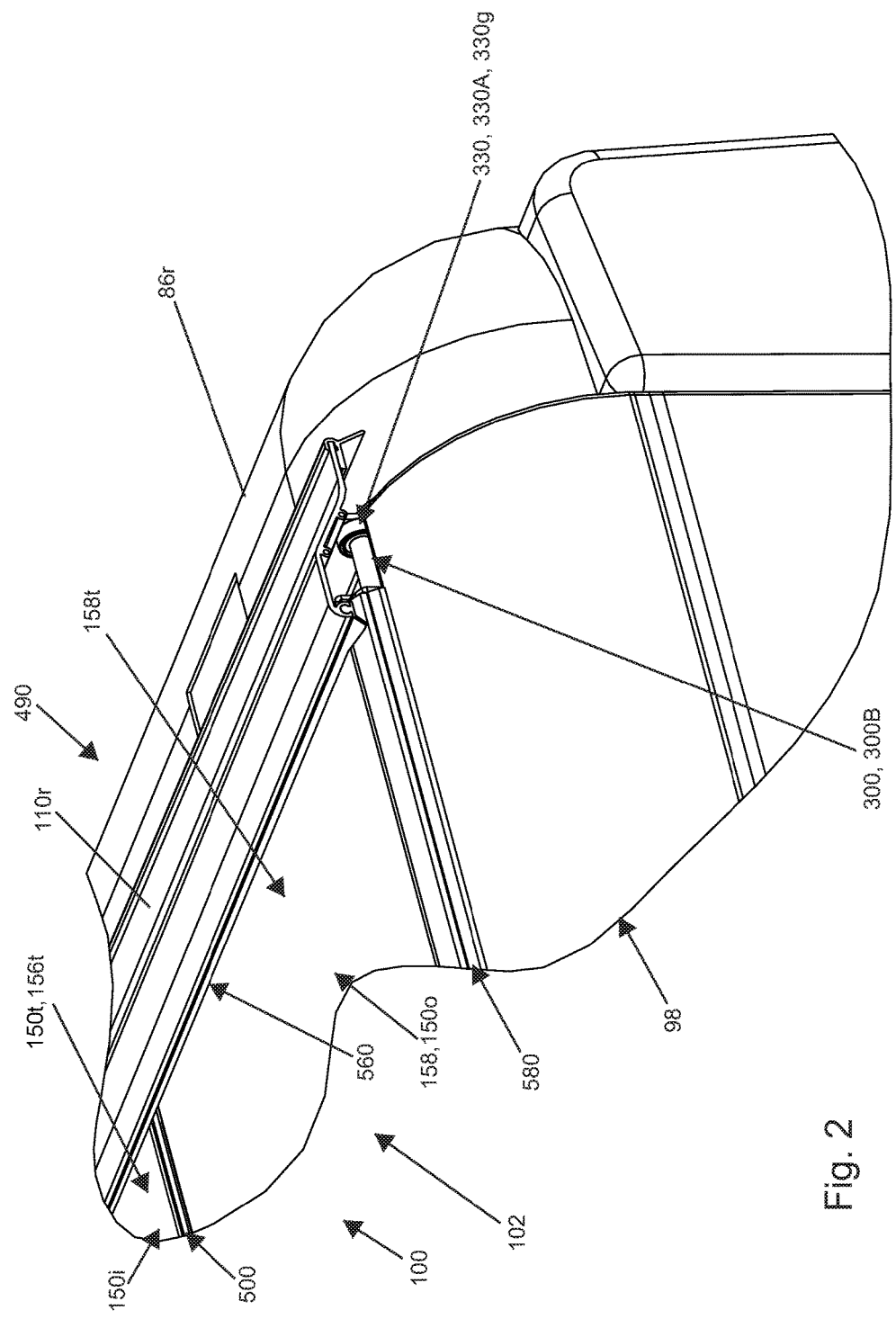
FIG. 2 is an enlarged partial left-rear perspective view of a portion of the retractable cover system of FIG. 1, an end gate of the pickup truck box is further shown in a closed position.

Turning now to FIG. 1, a pickup truck 70 is illustrated with a retractable cover system 100 according to the principles of the present disclosure. In particular, the pickup truck 70 includes a cab 72 and a pickup truck box 80 positioned behind the cab 72 and extending to a rear end of the pickup truck 70. The pickup truck box 80 extends between a forward end 82 and a rearward end 84 of the pickup truck box 80. The forward end 82 and the rearward end 84 are therefore spaced apart along a fore-aft direction 108. The rearward end 84 may be covered by an end gate 98, as illustrated at FIG. 2. The pickup truck box 80 includes a right side 86r and an opposite left side 86l. The right side 86r and the left side 86l may generically be sides 86 of the pickup truck box 80. The right side 86r and the left side 86l are spaced along a transverse direction 109. A front side 88 of the pickup truck box 80 may extend between the right side 86r and the left side 86l. Likewise, the end gate 98, when in a closed position, may extend between the right side 86r and the left side 86l.

The right side 86r, the left side 86l, the front side 88, and the end gate 98 may each form a wall that defines the pickup truck box 80. The walls may extend generally upwardly from a bed 92 of the pickup truck box 80 to a generally common top side of the walls. The top side of the walls may extend around a perimeter when the end gate 98 is in the closed position and thereby define an opening 90 of the pickup truck box 80. The end gate 98 may define a rear opening 96 when either opened or removed from the pickup truck box 80. The pickup truck box 80 may further include a pair of wheel wells 94 that are generally adjacent the bed 92 and extend upwardly over a portion of the left side 86l and the right side 86r.

The retractable cover system 100 includes a panel assembly 101 that is configurable in a deployed configuration 102 and a stowed configuration 104. The retractable cover system 100 includes an interface system 105 that generally interfaces with the pickup truck box 80 and provides a support structure for the panel assembly 101.

Figure 58:
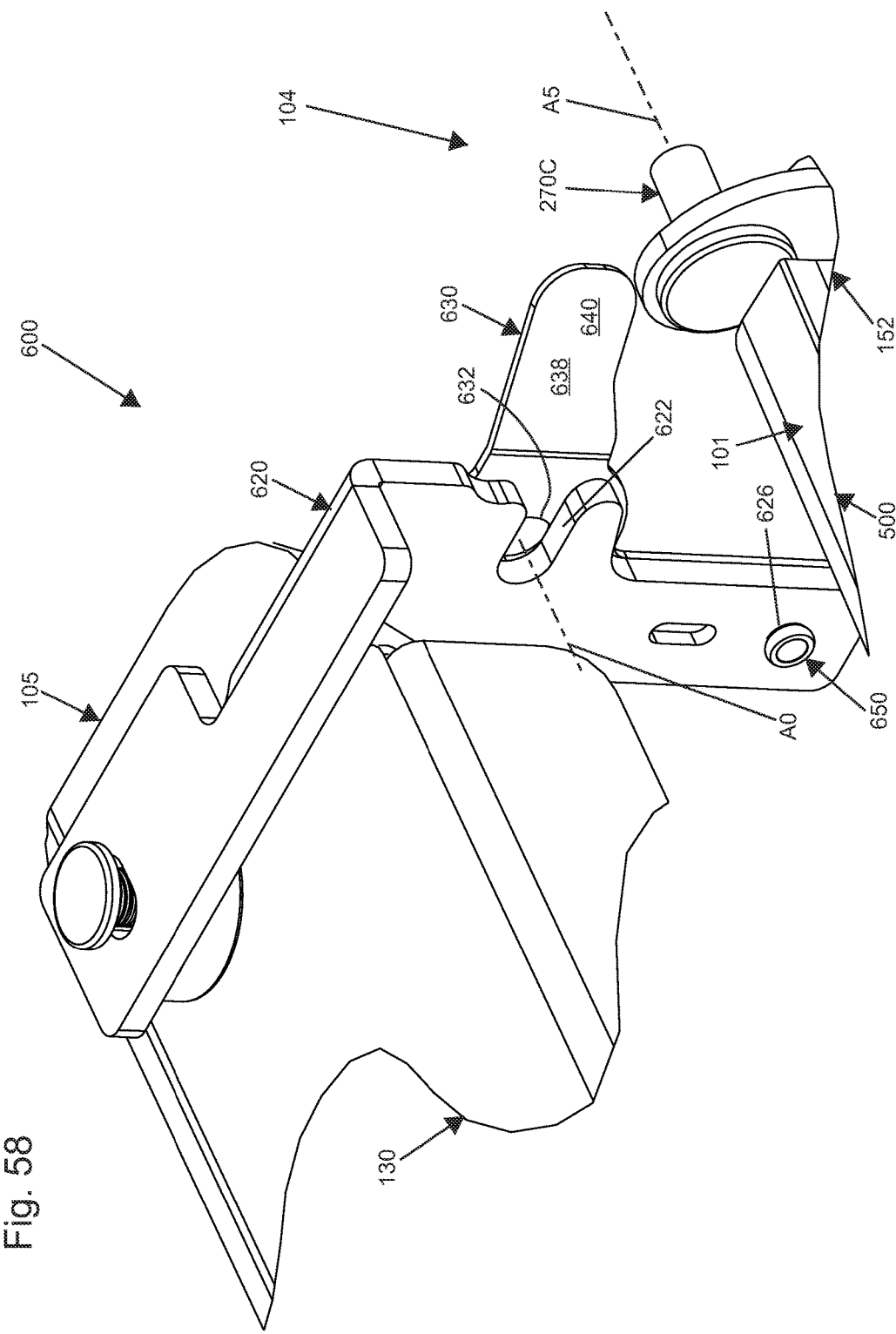
FIG. 58 is a partial perspective view illustrating a quick release system of the retractable cover system of FIG. 1 with the quick release system in a released configuration.
Figure 59:
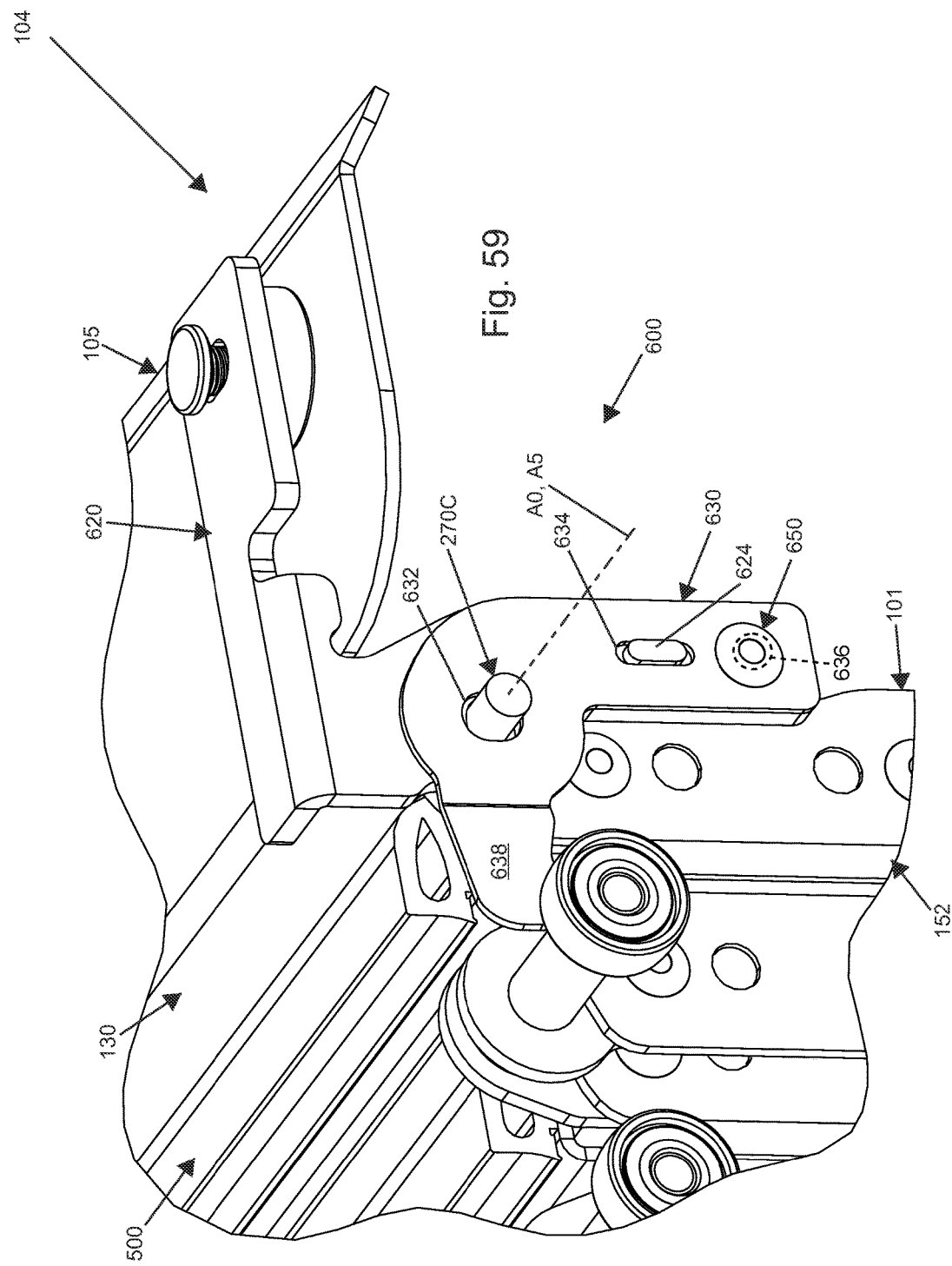
FIG. 59 is a partial perspective view of the quick released system of FIG. 58 with the quick release system in an attached configuration.
Figure 64:
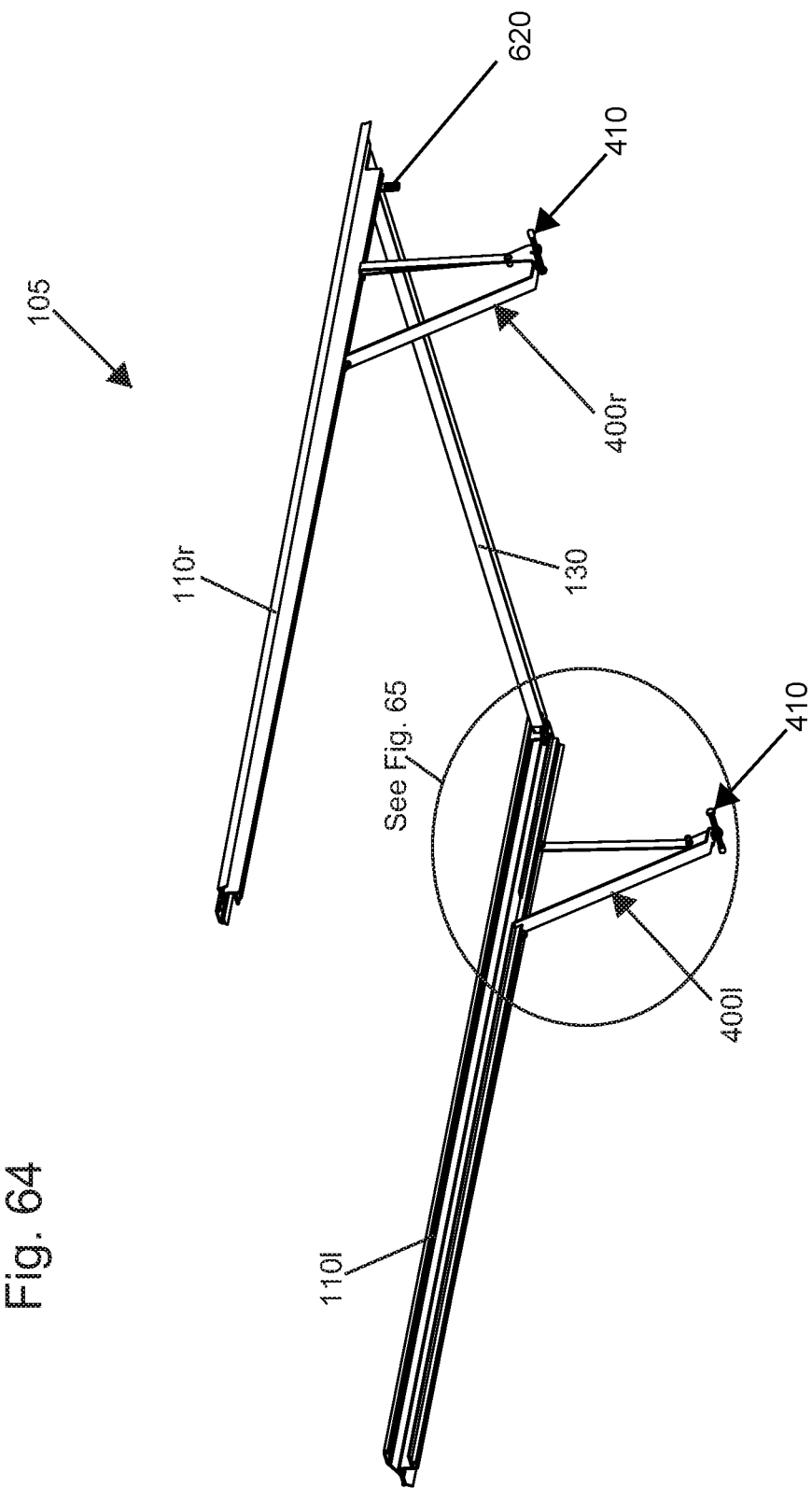
FIG. 64 is a right-rear-bottom perspective view illustrating a ramp system of the retractable cover system of FIG. 1.

As illustrated at FIG. 64, the interface system 105 includes a front cross-member 130, a right rail 110r, a left rail 110l, a right ramp structure 400r, and a left ramp structure 400l. The right rail 110r and the left rail 110l may generically be rails 110. The front cross-member 130 is generally positioned adjacent the front side 88 of the pickup truck box 80. The right rail 110r is generally positioned along a top of the right side 86r and extends from the front cross-member 130 to the end gate 98 when the end gate 98 is at the closed position. The left rail 110l is generally positioned along a top of the left side 86l and extends from the front cross-member 130 to the end gate 98 when the end gate 98 is at the closed position. The panel assembly 101 is pivotally attached to the interface system 105. In particular, a panel 152 is pivotally attached to the interface system 105 at a quick-attach system 600, as illustrated at FIGS. 58 and 59. The quick-attach system 600 defines an axis A0 about which the panel 152 is pivotally attached to the interface system 105 (see FIGS. 58 and 59).

Figure 6:
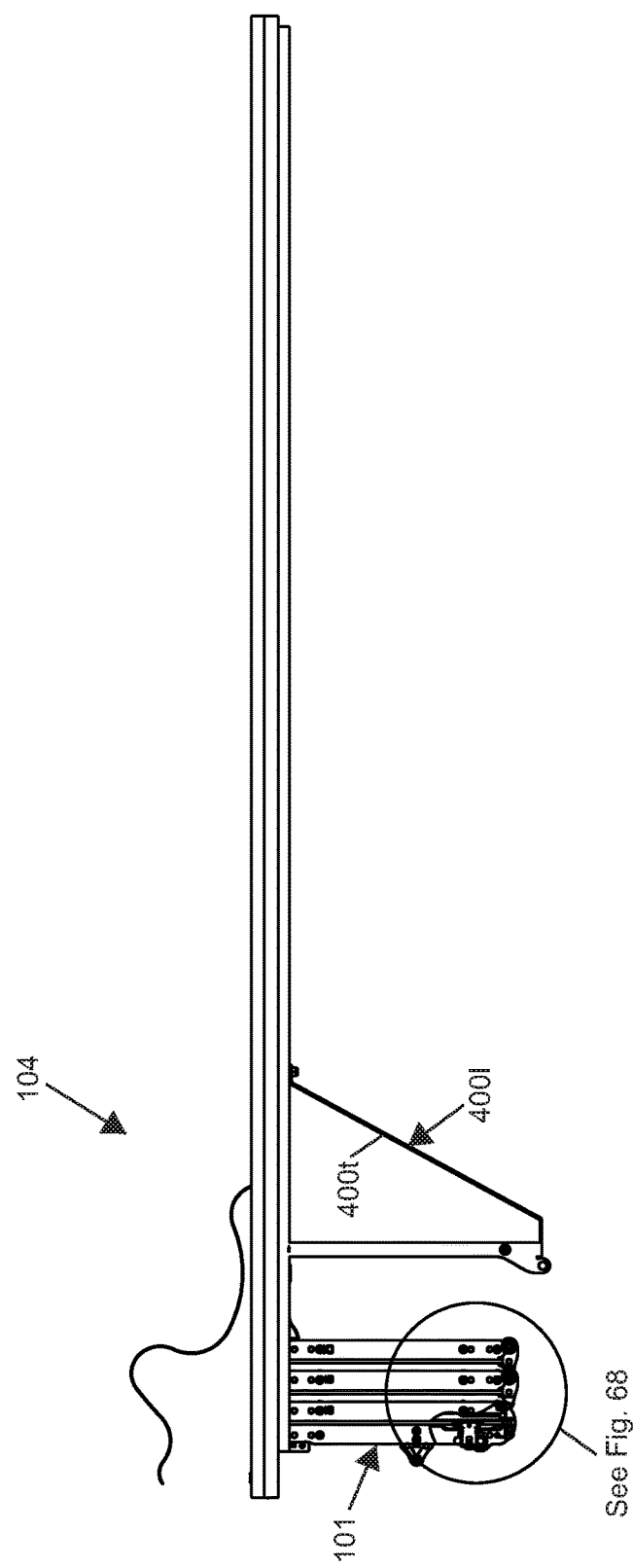
FIG. 6 is a left-side elevation view of the retractable cover system of FIG. 1 in the stowed configuration.
Figure 7:
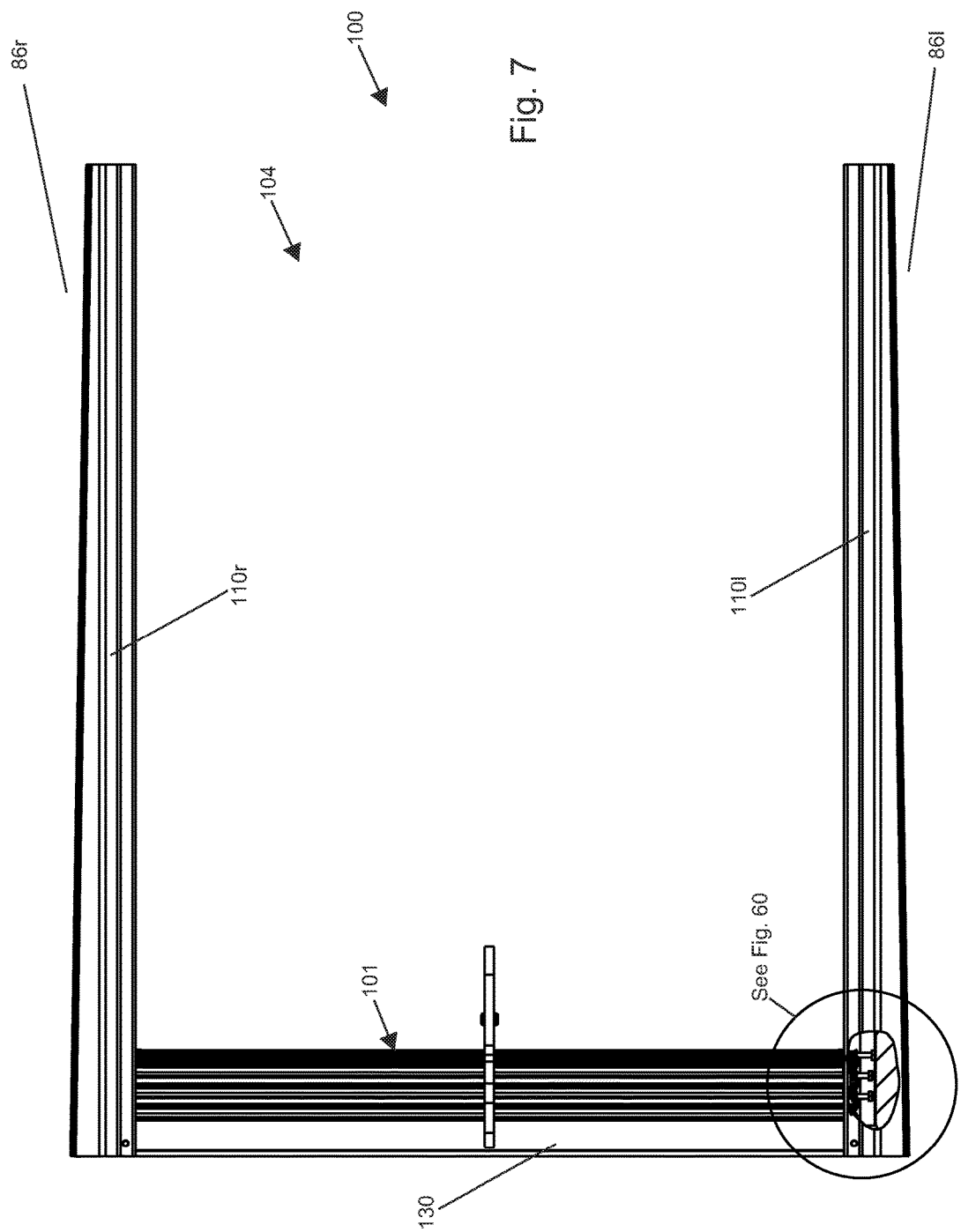
FIG. 7 is a top plan view of the retractable cover system of FIG. 1 in the stowed configuration.
Figure 16:
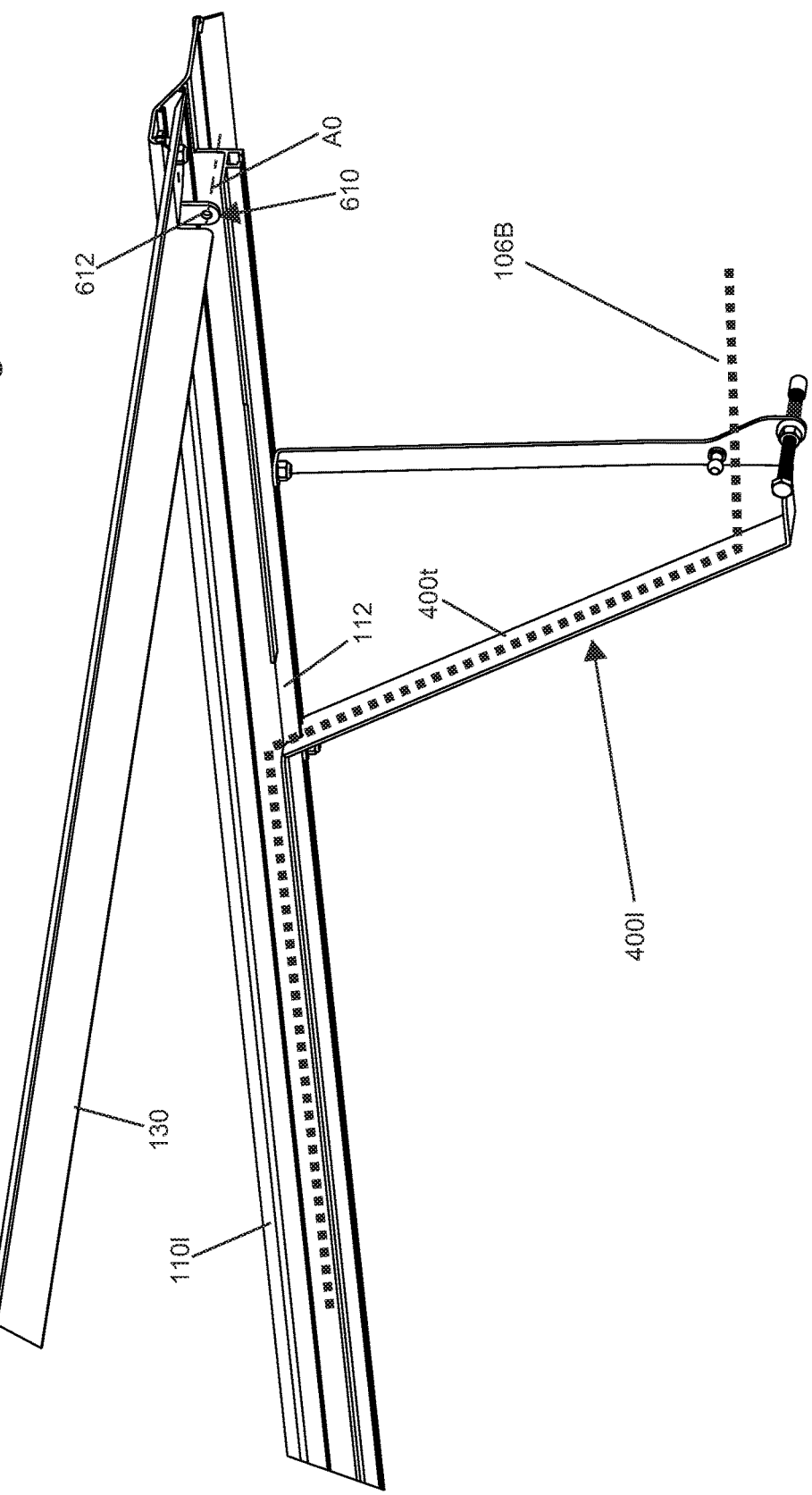
FIG. 16 is a partial right-front perspective view of a rail system of the retractable cover system of FIG. 1 and further illustrates a first path of the retractable cover system.
Figure 17:
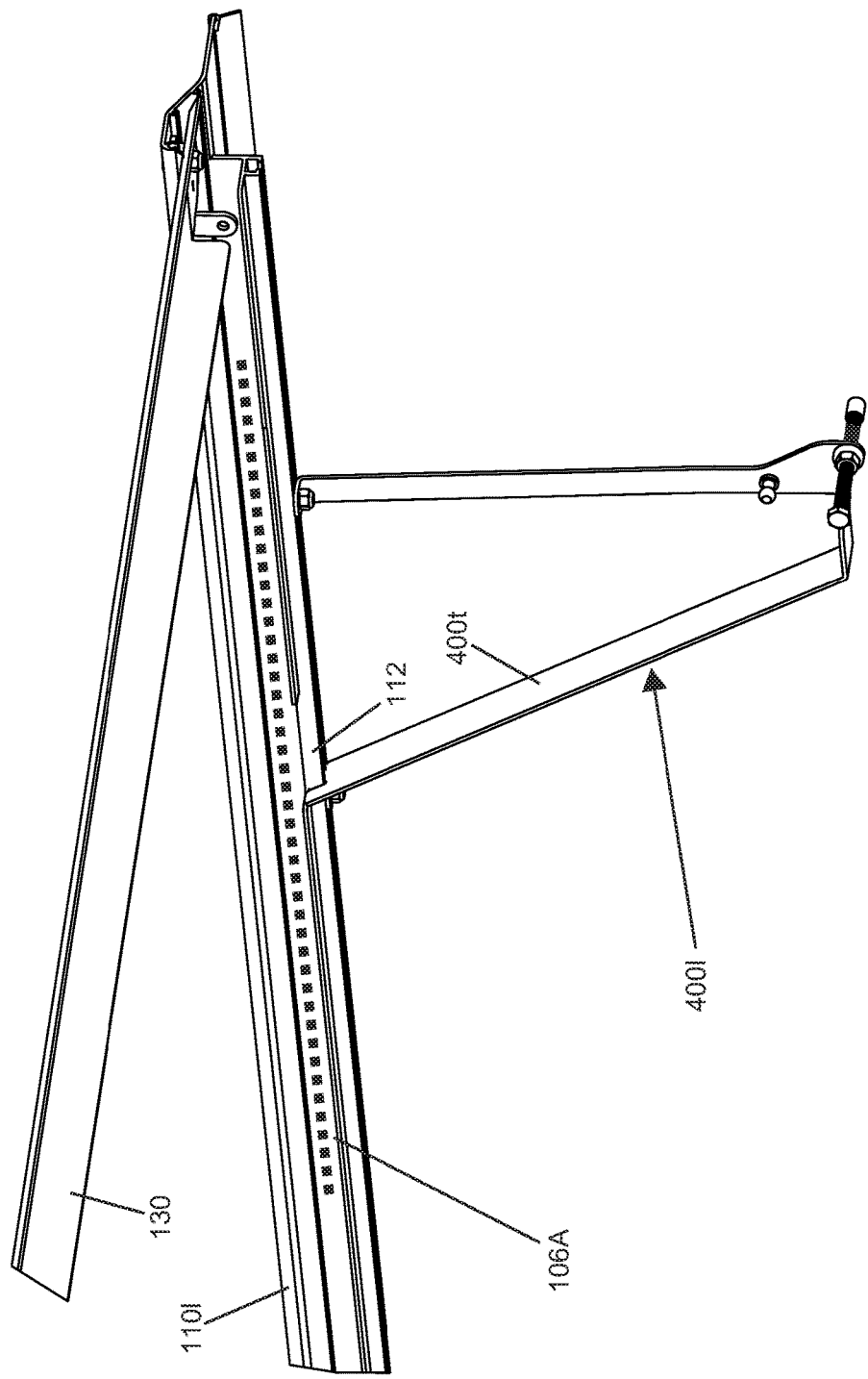
FIG. 17 is a partial right-front perspective view of the rail system of FIG. 16, but illustrating a second path of the retractable cover system of FIG. 1.

The panel assembly 101 is further supported by the right rail 110r and the left rail 110l. In particular, the panel assembly 101 includes a series of guide elements 330 that are supported by the right rail 110r and the left rail 110l. The guide elements 330 generally allow movement along the fore-aft direction 108 by the panel assembly 101. In particular, a set of inner guide elements 330i of the guide elements 330 follow a path 106B, as illustrated at FIG. 16. The path 106B extends along the right rail 110r and/or the left rail 110l along the fore-aft direction 108 until the right ramp structure 400r or the left ramp structure 400l is reached. Upon reaching the ramp structures 400r, 400l, the inner guide elements 330i follow the right ramp structure 400r or the left ramp structure 400l, as illustrated at FIG. 16. The panel assembly 101 further includes a set of outer guide elements 330o of the guide elements 330 that generally move along the right rail 110r and the left rail 110l along the fore-aft direction 108. In particular, as illustrated at FIG. 17, the outer guide elements 330o follow a path 106A along their length of travel along the right rail 110r or the left rail 110l. A gap 112 in each of the right rail 110r and the left rail 110l allows the path 106B to diverge from the path 106A, as illustrated at FIGS. 16 and 17. The outer guide elements 330o do not enter the gap 112 and thereby continue traveling along the right rail 110r and the left rail 110l along the fore-aft direction 108. The inner guide elements 330i fall within the gap 112 and thereby enter the right ramp structure 400r or the left ramp structure 400l. The guide elements 330 may run in a track 110t of the right rail 110r or the left rail 110l (see FIG. 61). The inner guide elements 330i may run in a track 400t of the right ramp structure 400r or the left ramp structure 400l, upon reaching the ramp structures 400r, 400l (see FIGS. 6, 16, and 17).

Figure 3:
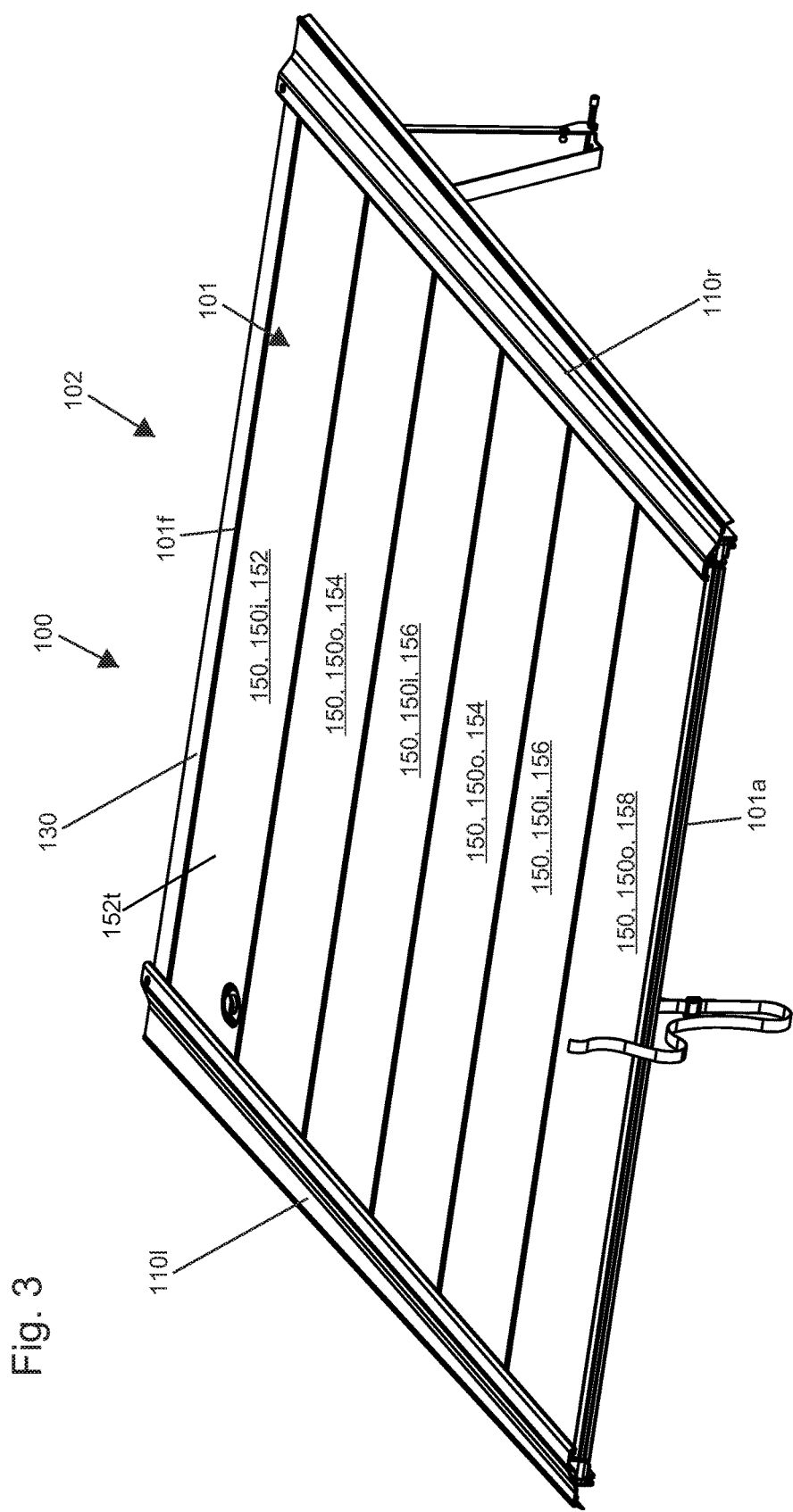
FIG. 3 is a right-rear perspective view of the retractable cover system of FIG. 1 in an extended configuration.
Figure 4:
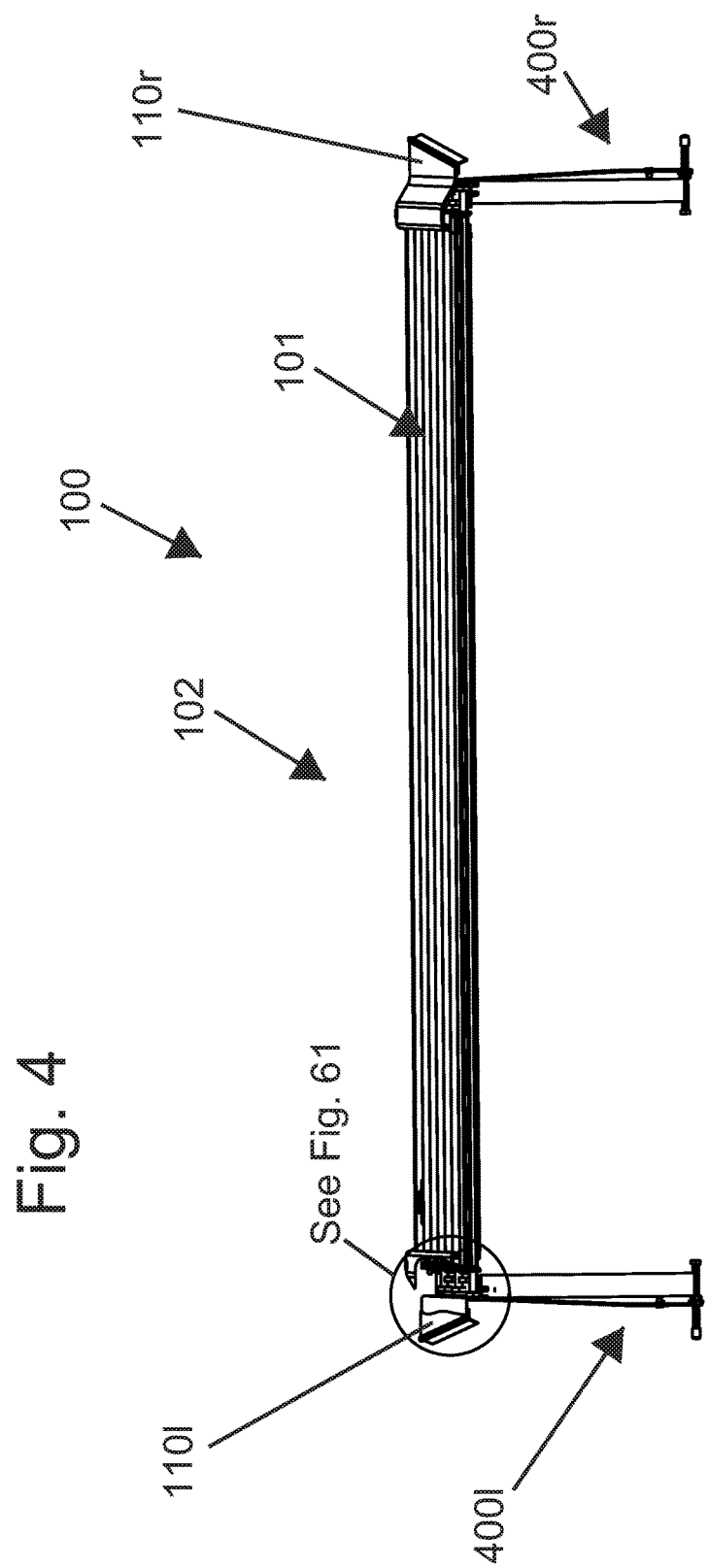
FIG. 4 is a mostly rear perspective view of the retractable cover system of FIG. 1 in the extended configuration.

According to the principles of the present disclosure, the panel assembly 101 includes the panel 152, one or more of a panel 154, one or more of a panel 156, and a panel 158 (see FIG. 3). The panel 158 is included at an aft end 101a of the panel assembly 101. In certain embodiments, as illustrated at FIG. 3, the panel assembly 101 may include six or more of the panels 152, 154, 156, 158. In these embodiments, the panel 152 is pivotally connected to the interface system 105 at a forward end 101f of the panel assembly 101. In turn, the panel 154 is pivotally connected to the panel 152. In turn, the panel 156 is pivotally connected to the panel 154. In turn, another of the panel 154 may be pivotally connected to the panel 156. In turn, another of the panel 156 may be pivotally connected to the preceding panel 154. Additional extensions to the panel assembly 101 may be made by adding pairs of the panel 154 and the panel 156. Upon the last pair of the panels 154 and 156 being added, the panel 158 is pivotally attached to the last of the panels 156. According to the principles of the present disclosure, the panels 154 may be substantially identical to each other, and the panels 156 may be substantially identical to each other.

In other embodiments, only four of the panels 152, 154, 156, 158 may be used in the panel assembly 101. In particular, the panel 152 may be pivotally connected to the interface system 105, the panel 154 may be pivotally connected to the panel 152, the panel 156 may be pivotally attached to the panel 154, and, finally, the panel 158 may be pivotally attached to the panel 156. As will be discussed and illustrated hereinafter, various features of the panels 152, 154, 156, 158 of the panel assembly 101 may be repeated to take advantage of common and/or similar parts, common spacings, common diameters, common sizes, common offsets, and other common features.

Figure 5:
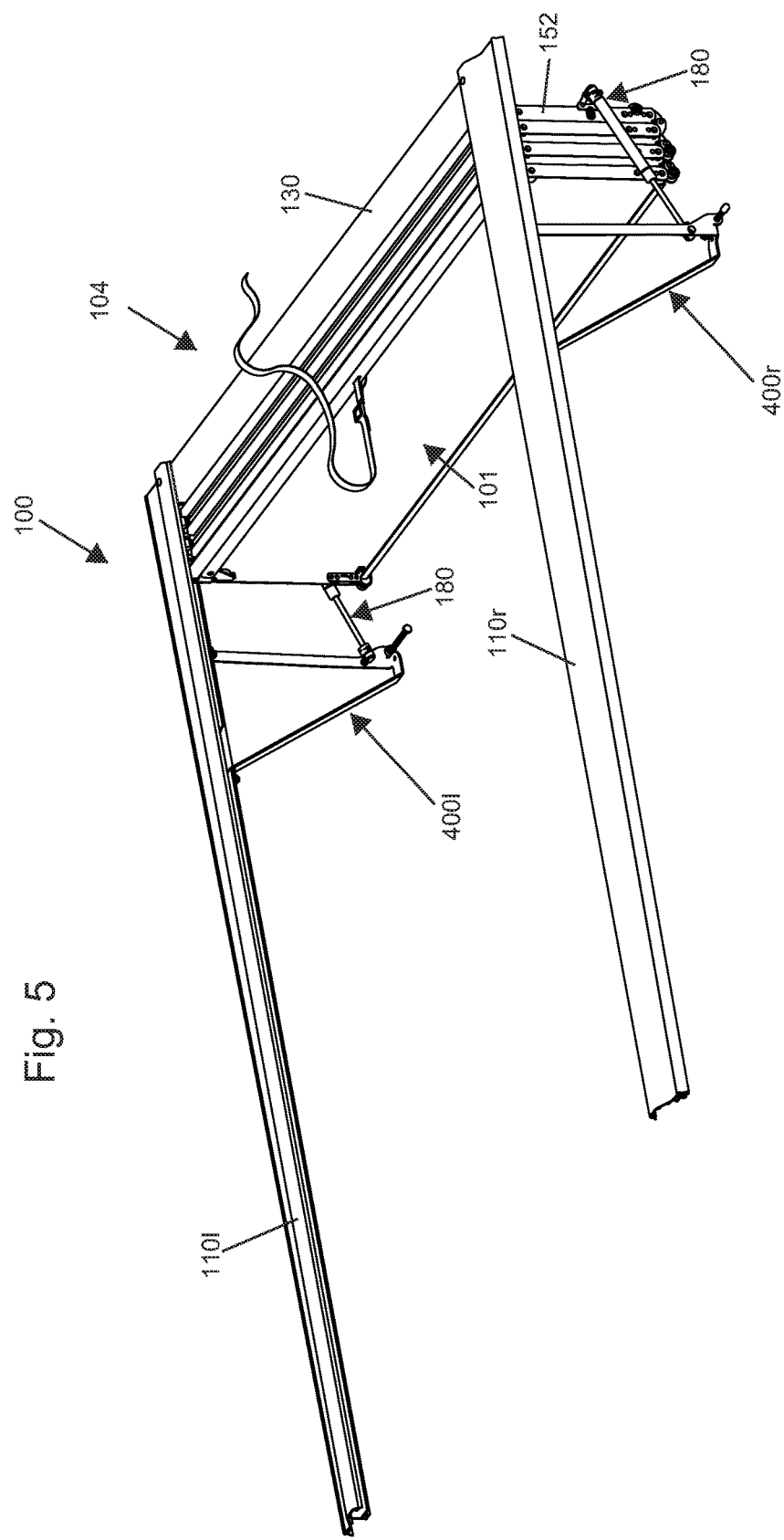
FIG. 5 is a right-rear perspective view of the retractable cover system of FIG. 1 in a stowed configuration.

In order to assist the panel 152 in reaching the extended configuration 102, a pair of actuators 180 may be positioned between the panel 152 and the right ramp structure 400r and the left ramp structure 400l, respectively, as illustrated at FIG. 5. As depicted, the actuators 180 each include a gas charged cylinder that is configured to extend. Thus, at the stowed configuration 104, the actuators 180 urge the panel assembly 101 to remain in the stowed configuration 104. As the panel assembly 101 is moved to the deployed configuration 102, the panel assembly 101 is held at the deployed configuration 102 by the actuators 180.

Figure 13:
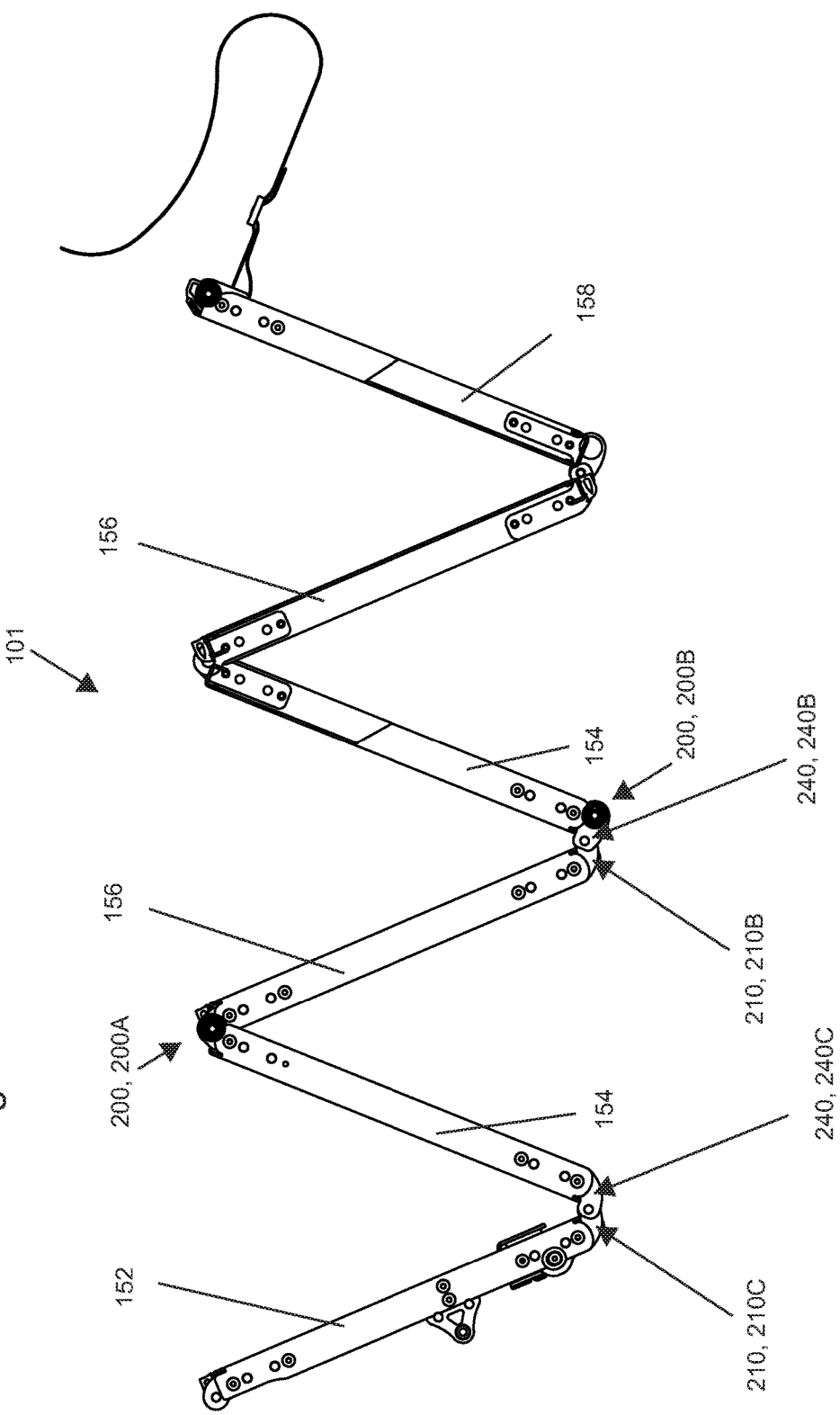
FIG. 13 is a left-side partially cross-sectioned elevation view of the panel assembly of FIG. 8 with the panels of FIG. 12 further hinged.
Figure 18:
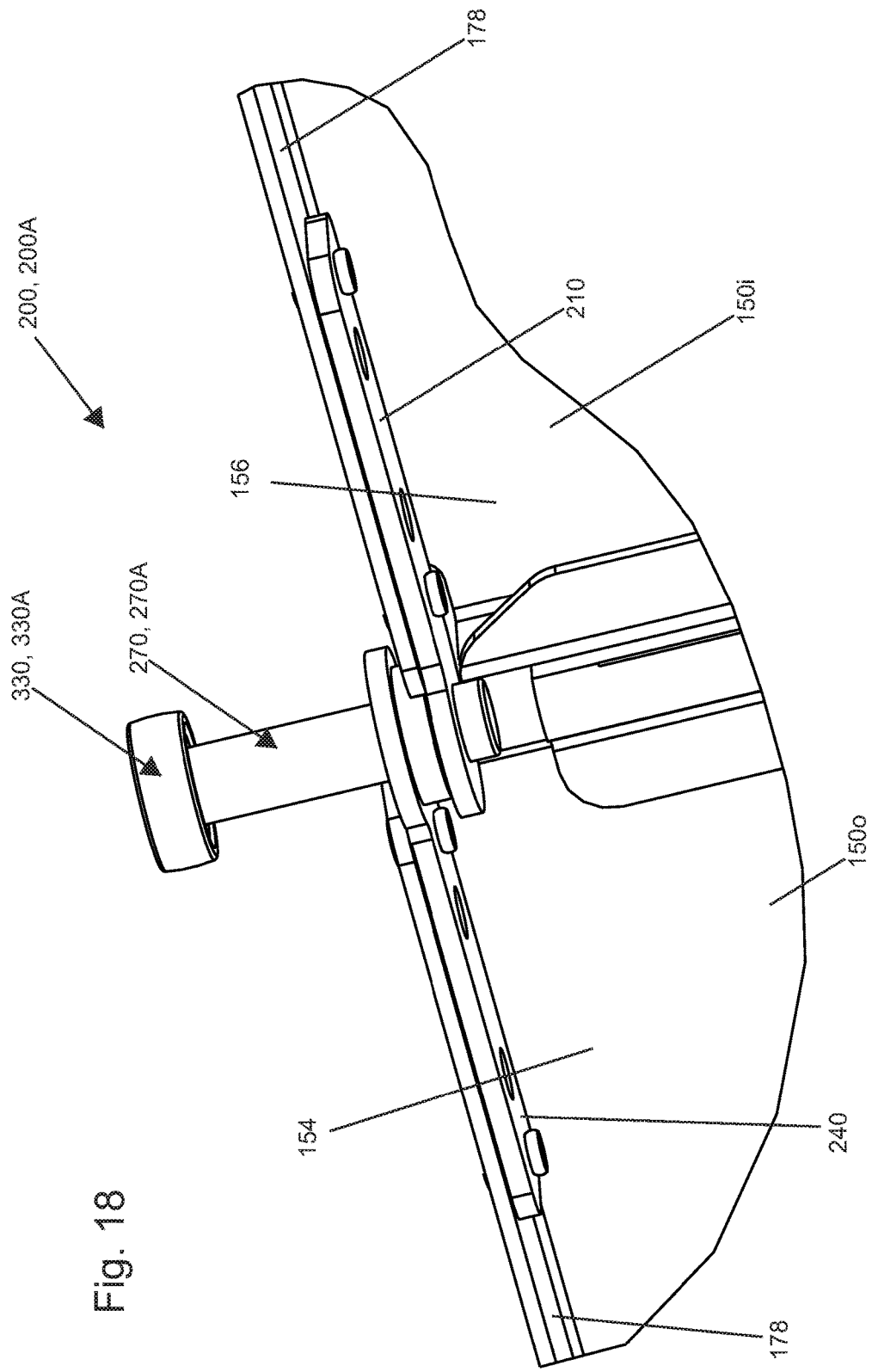
FIG. 18 is a partial perspective view of the underside of the panel assembly of FIG. 8 illustrating a first joint type of the retractable cover system of FIG. 1.
Figure 19:
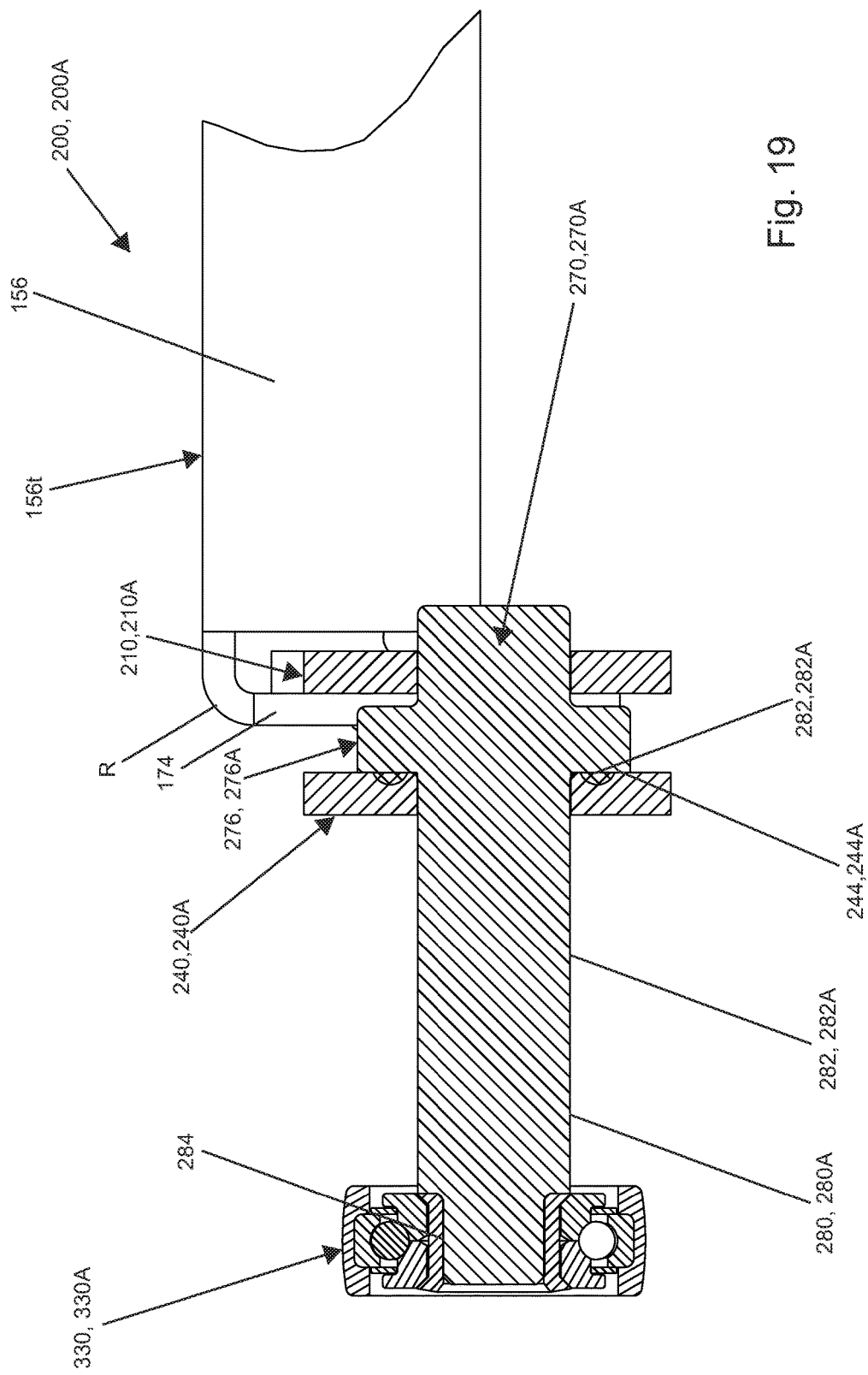
FIG. 19 is a partial cross-sectional elevation view of the first joint type of FIG. 18.
Figure 20:
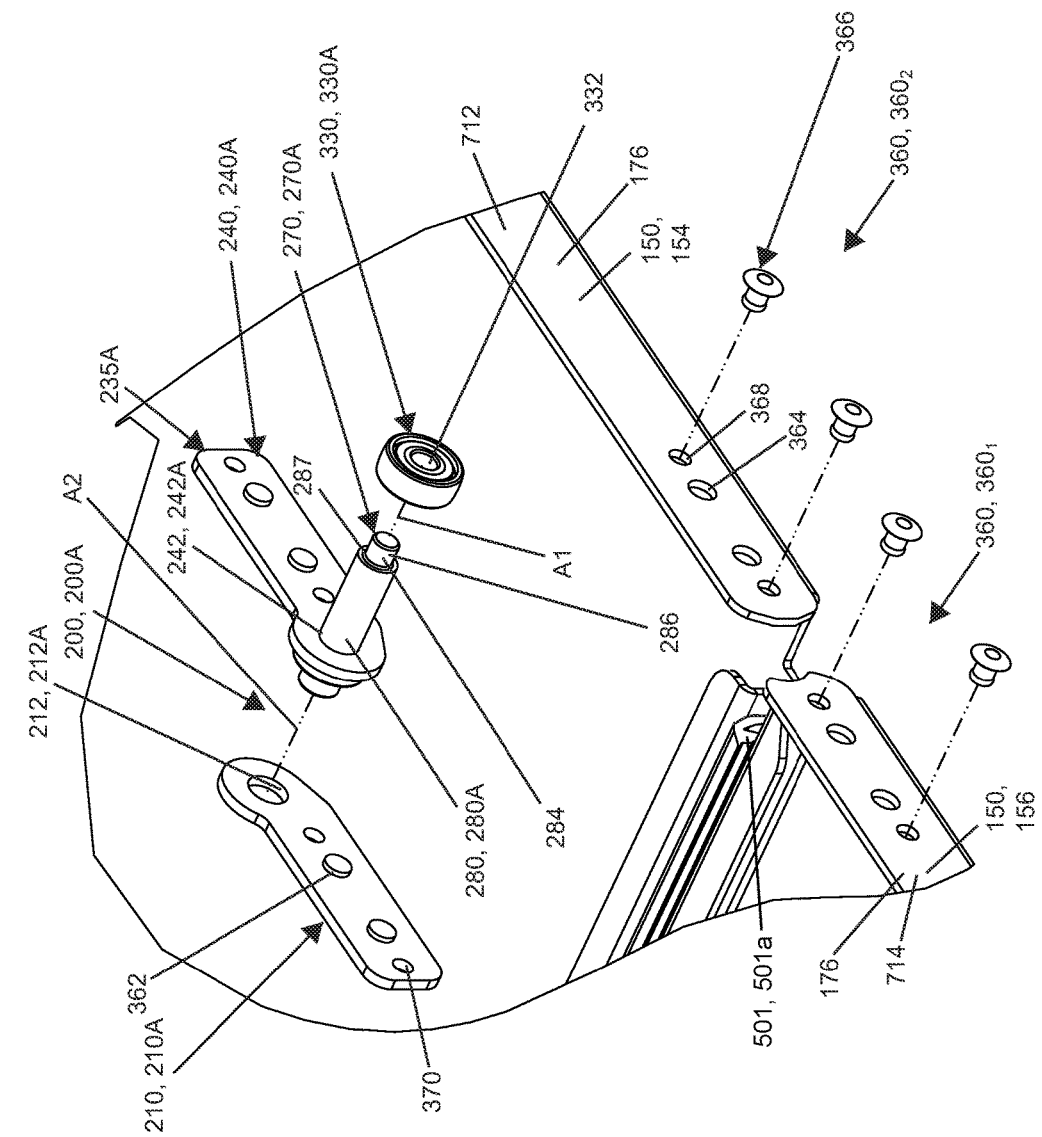
FIG. 20 is an enlarged portion of FIG. 9, further illustrating the first joint type of FIG. 18.
Figure 21:
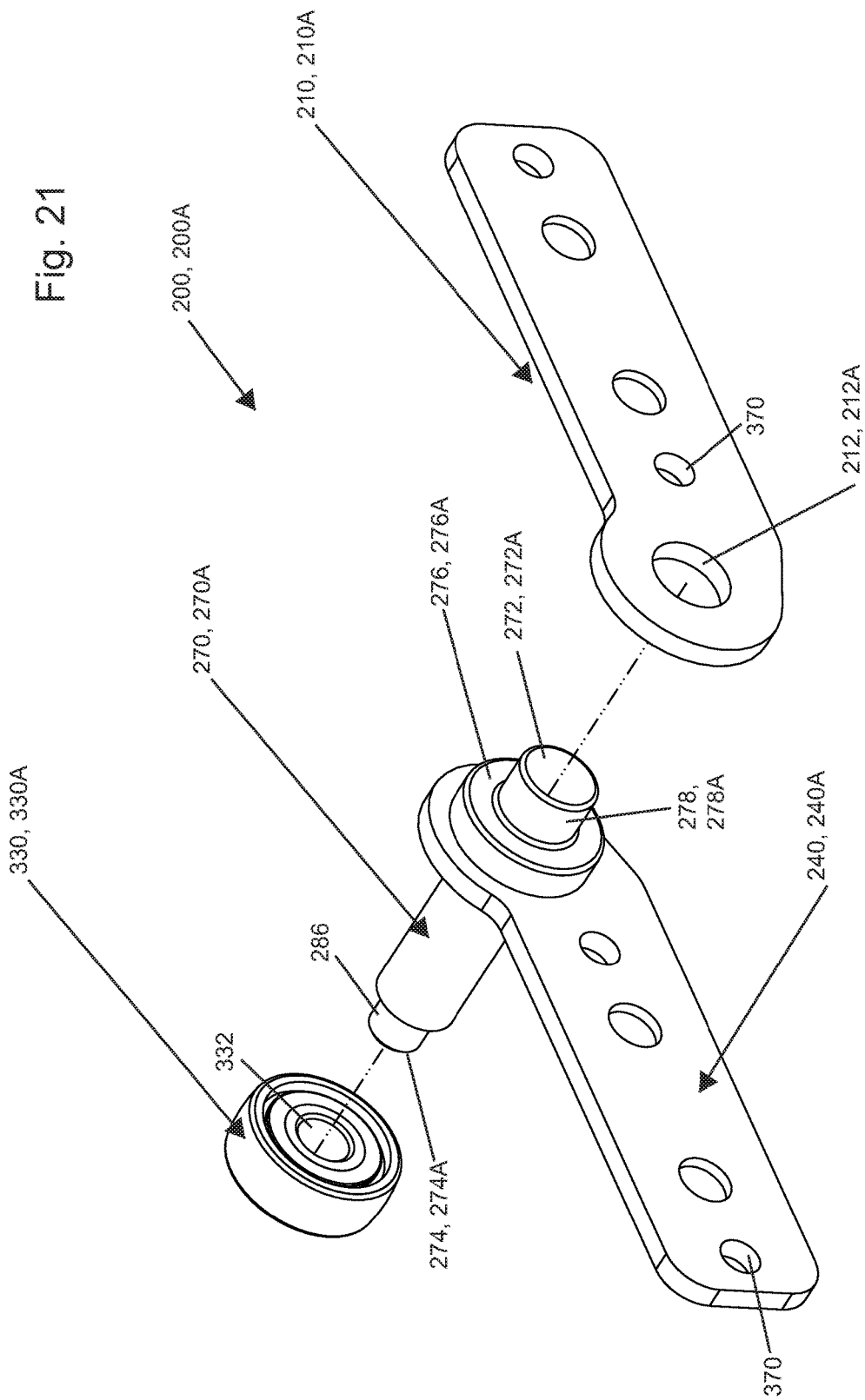
FIG. 21 is an enlarged portion of FIG. 8, further illustrating the first joint type of FIG. 18.

Turning now to FIGS. 18-29, a joint 200A, according to the principles of the present disclosure, is illustrated. The joint 200A is an embodiment of a pivoting joint 200. The joint 200A may be a first joint type of the panel assembly 101. As illustrated at FIGS. 13 and 18, the joint 200A is used to pivotally connect the panel 156 with the panel 154. As illustrated at FIG. 20, the joint 200A includes a first member 210A that is connected to a first panel 156 by a connecting arrangement 360, $360_1$. As the first member 210A is connected to the first panel 156, they are one kinematic body and move kinematically together. Likewise, the joint 200A includes a second member 240A that is attached to a second panel 154 by a connecting arrangement 360, $360_2$. As the second member 240A is connected to the second panel 154, they are one kinematic body and move kinematically together. As depicted at FIG. 21, the joint 200A includes a shaft 270A that extends between a first end 272A and a second end 274A. As depicted, one of the guide elements 330 is positioned at the second end 274A of the shaft 270A. The shaft 270A thereby positions the guide element 330 in the transverse direction 109 relative to the panel assembly 101. In particular, a mounting surface 286 positioned at the second end 274A presses into an inner race 332 of a guide element 330A. As illustrated at FIG. 20, a shoulder 287 of the shaft 270A abuts against the inner race 332 to position the guide element 330A on the shaft 270A. The guide element 330A is a roller with a rotational axis A1. The joint 200A, as depicted, results in an axis A2 being positioned below a top surface 154t of the panel 154 and below a top surface 156t of the panel 156. The axis A2 is a pivot axis of the joint 200A. As depicted, the joint 200A positions the pivot axis A2 coaxially with the rotational axis A1 of the guide element 330A.

Figure 30:
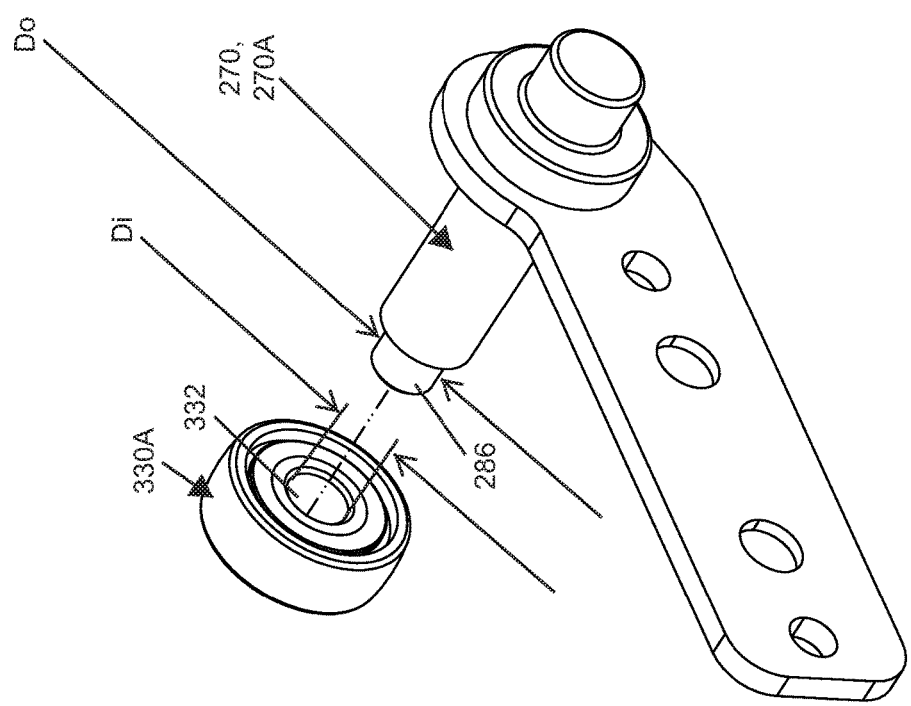
FIG. 30 is an exploded perspective view illustrating a guide element before being press fit onto the shaft of FIG. 24 in the context of the subassembly of FIG. 24.

As illustrated at FIG. 53, the panels 154 and 158 include a notch 702, and the panel 156 includes a notch 704. The notch 704 is adapted to receive the first member 210A and allow the first member 210A to be mounted at an inside of a flange 714 of the panel 156. Likewise, the notch 702 allows the second member 240A to be mounted at an inside of a flange 712 of the panel 154, 158. As illustrated at FIGS. 25 and 26, the notch 702 further allows assembly of the joint 200A in between the panel 154 or 158 and the panel 156. In the depicted embodiment, the shaft 270A is sub-assembled to the second member 240A and thereby forms a subassembly 235A, as illustrated at FIGS. 28 and 29. In embodiments without protrusions 362, the subassembly 235A may be assembled as a right-hand or a left-hand subassembly by reversing the direction that the shaft 270A is assembled, respectively. In embodiments with the protrusions 362, the second member 240A may be right-handed or left-handed (e.g., with the protrusions 362 positioned on opposite sides) and used in a corresponding right-hand or left-hand subassembly 235A. In addition, as illustrated at FIG. 30, the guide element 330A may be further sub-assembled to the subassembly 235A. The guide element 330A may be assembled before or after the first member 210A and/or the second member 240A are mounted to the flange 714 and/or 712. The guide element 330A may be disassembled and reassembled (e.g., for servicing and/or replacing the guide element 330A) without additional disassembly of the joint 200A. As illustrated at FIGS. 20, 25, and 26, the subassembly 235A may be inserted into the notch 702 and thereby tilted into position. In particular, the fastening arrangement 360 and the insertion of a pivoting portion 278A of the shaft 270A into a pivot surface 212A of the first member 210A may require the subassembly 235A to be tilted into position in the depicted embodiment.

Figure 31:
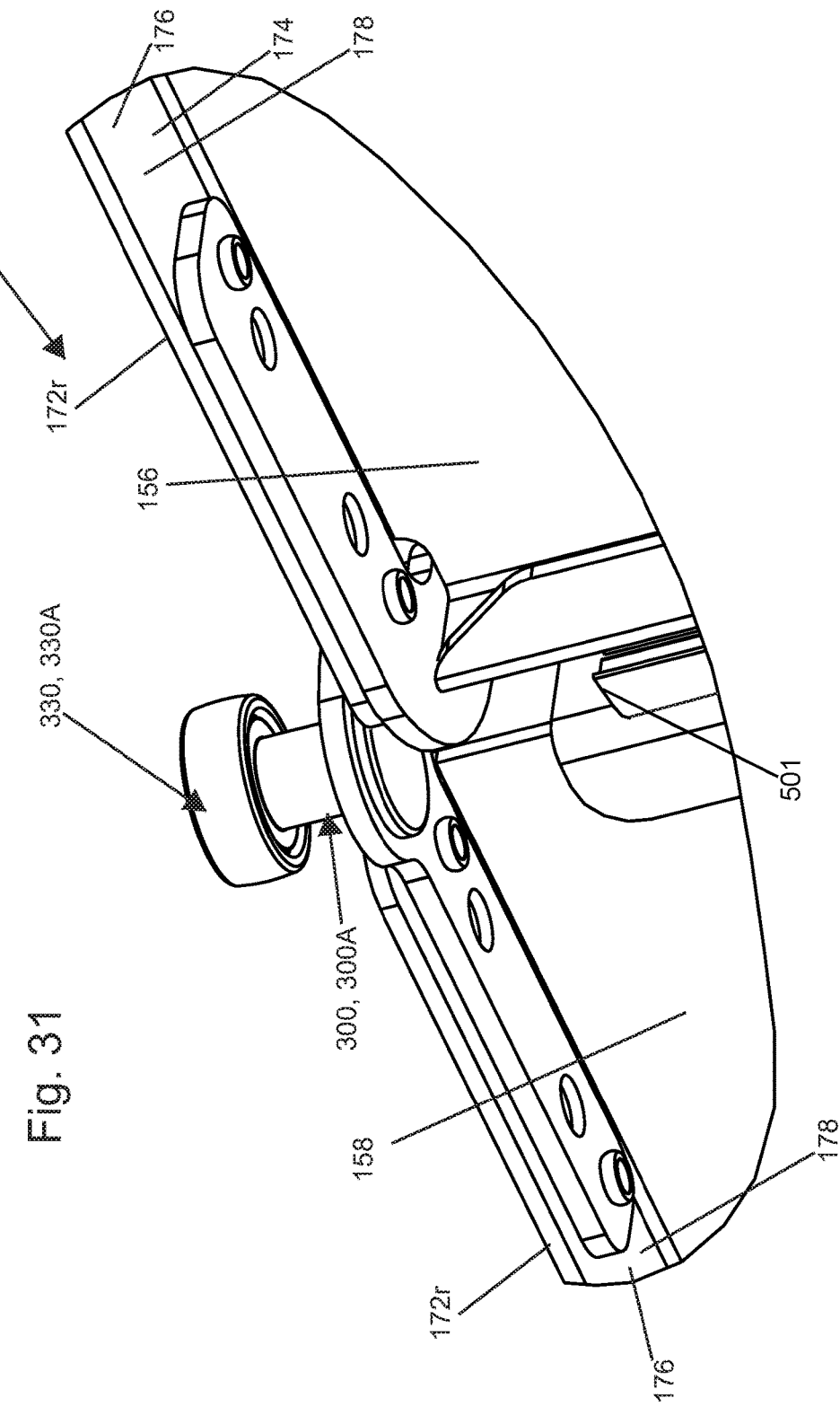
FIG. 31 is a partial perspective view of the underside of the panel assembly of FIG. 8 illustrating a second joint type of the retractable cover system of FIG. 1.
Figure 32:
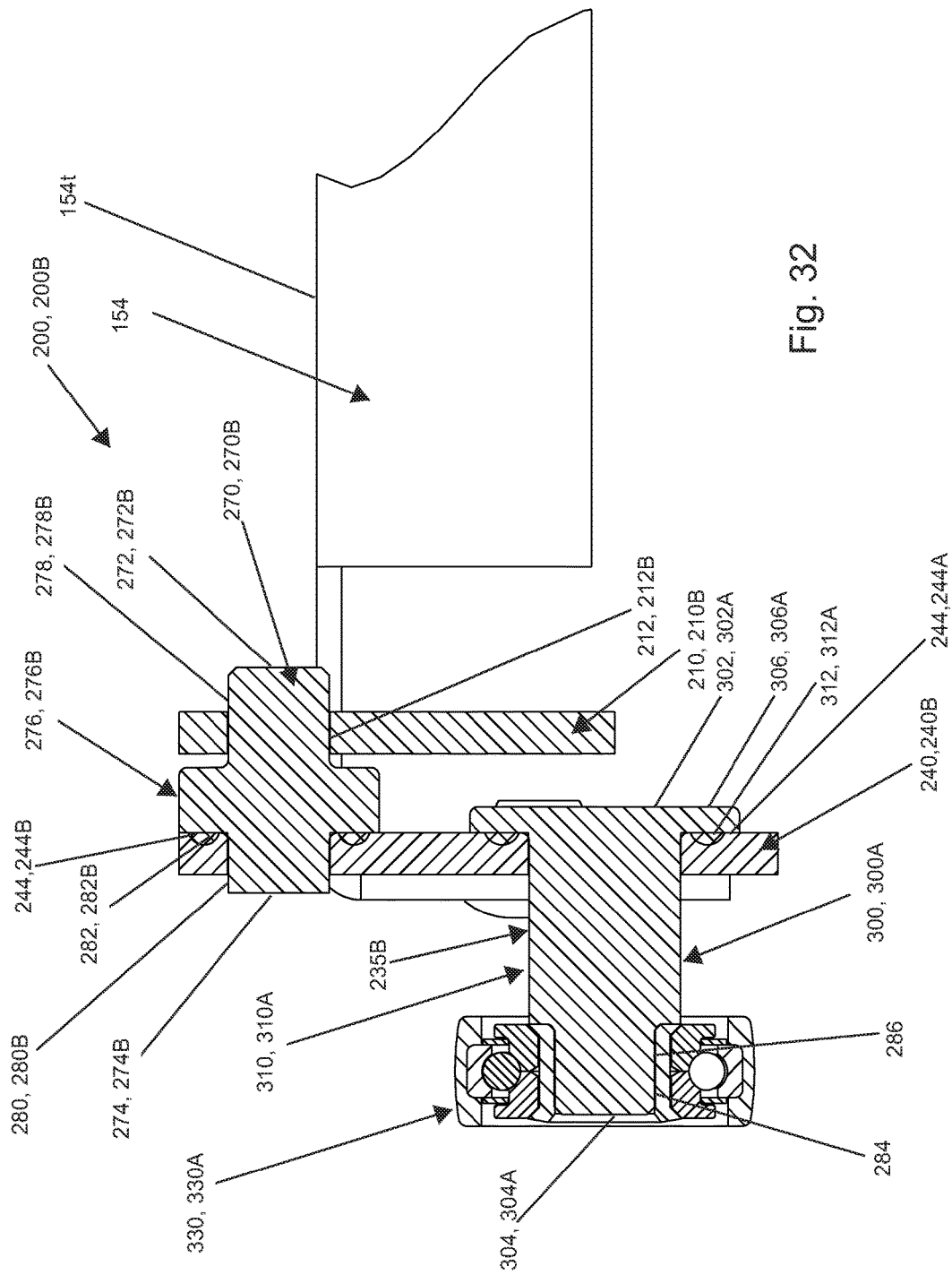
FIG. 32 is a partial cross-sectional elevation view of the second joint type of FIG. 31.
Figure 33:
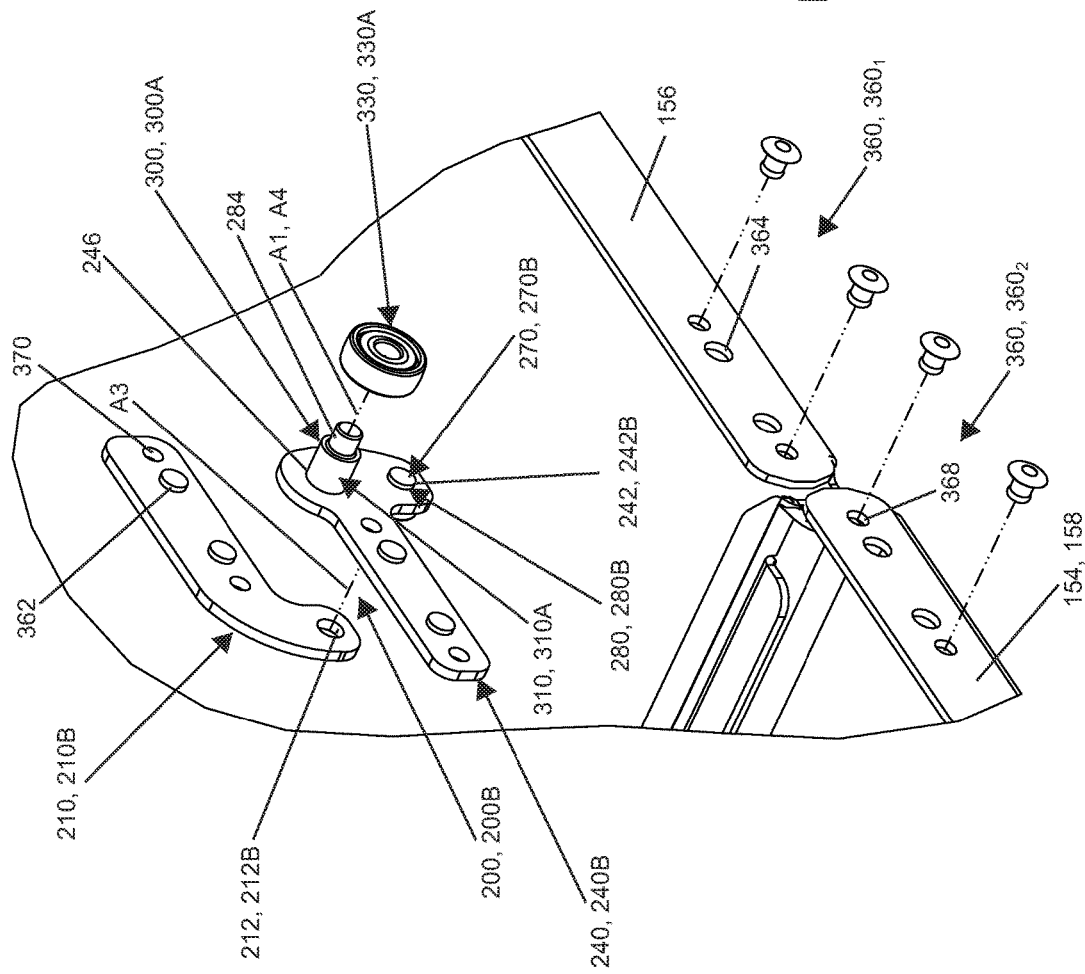
FIG. 33 is an enlarged portion of FIG. 9, further illustrating the second joint type of FIG. 31.
Figure 34:
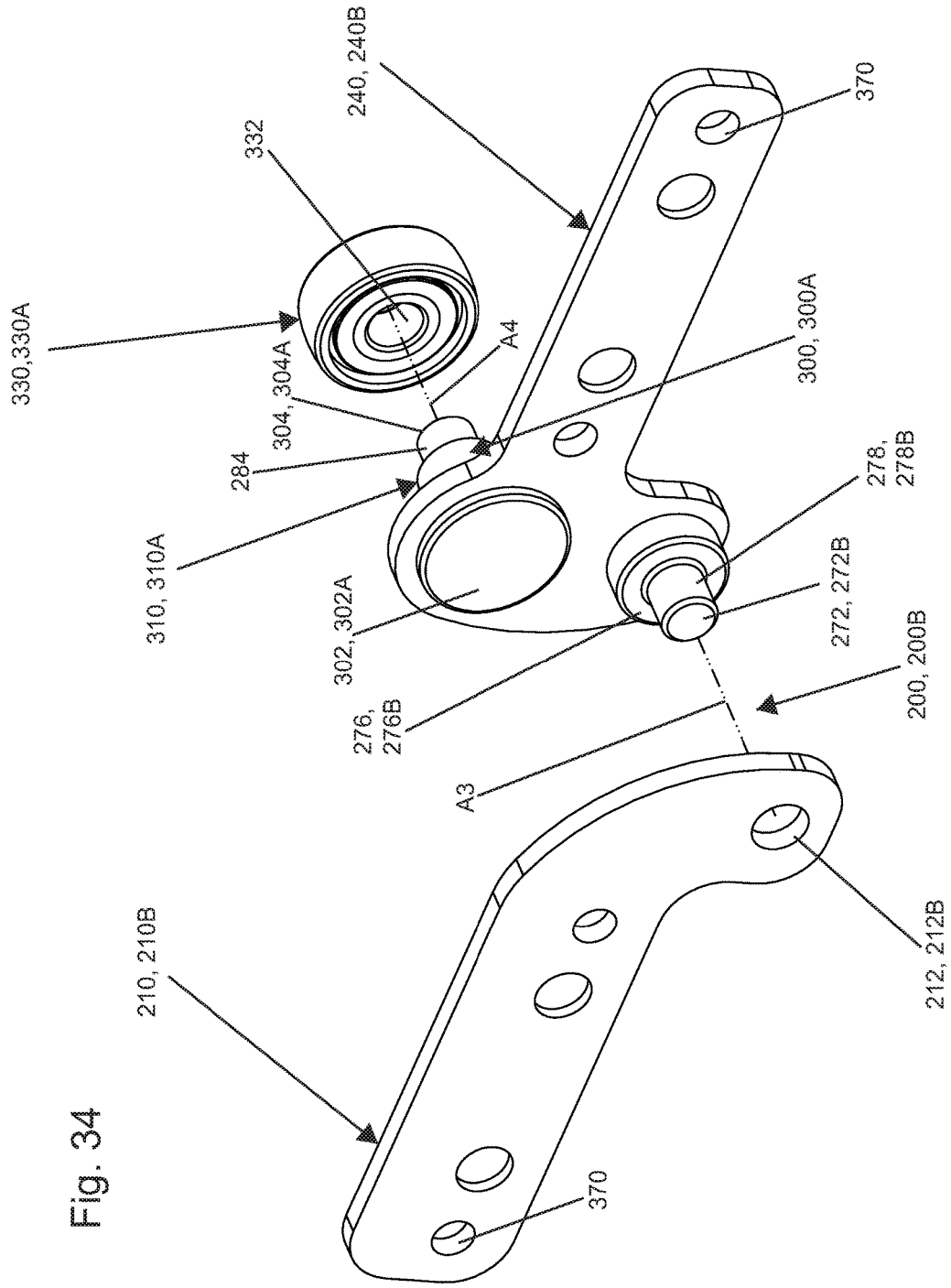
FIG. 34 is an exploded perspective view similar to FIG. 21, but illustrating the second joint type of FIG. 31.
Figure 36:
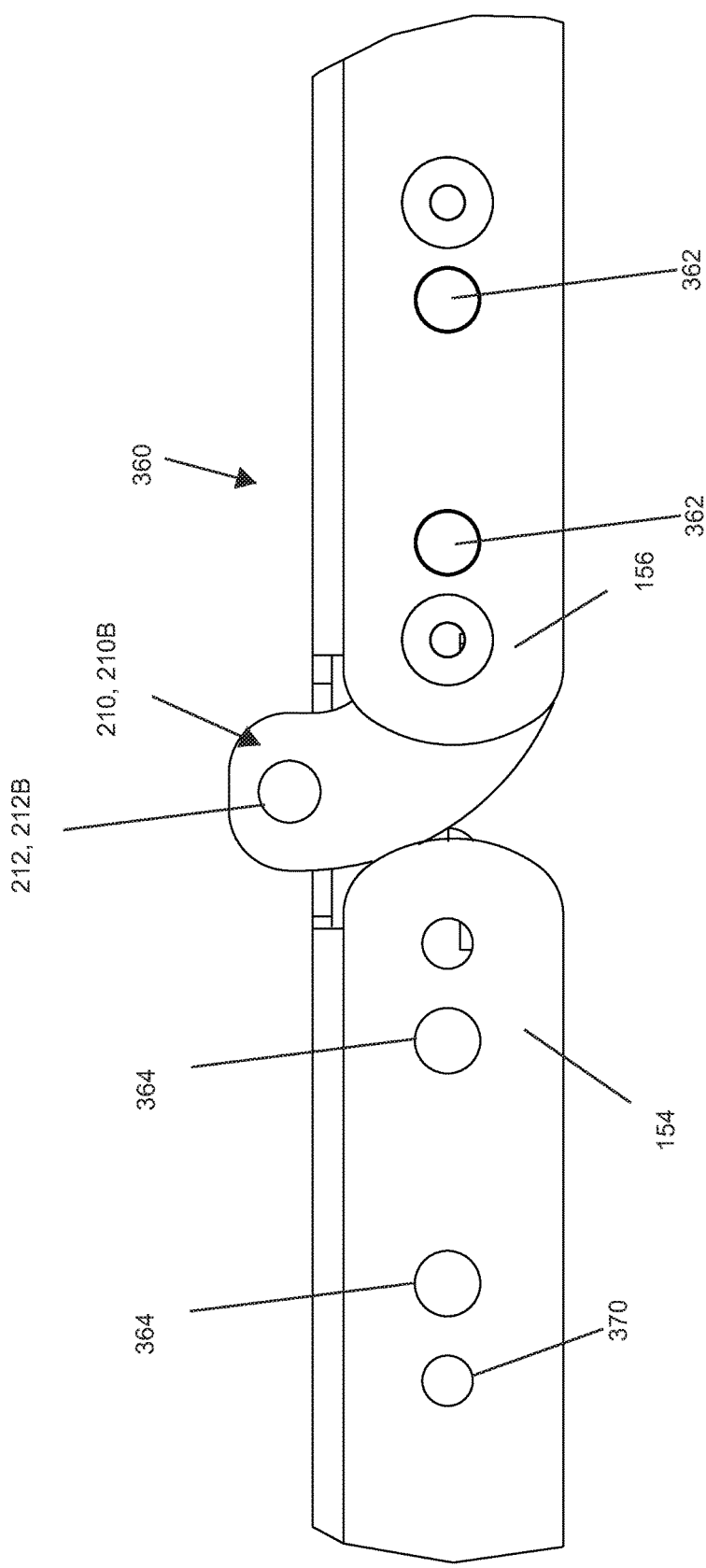
FIG. 36 is the partial side elevation view of FIG. 35, but with a first member assembled to the first panel.
Figure 40:
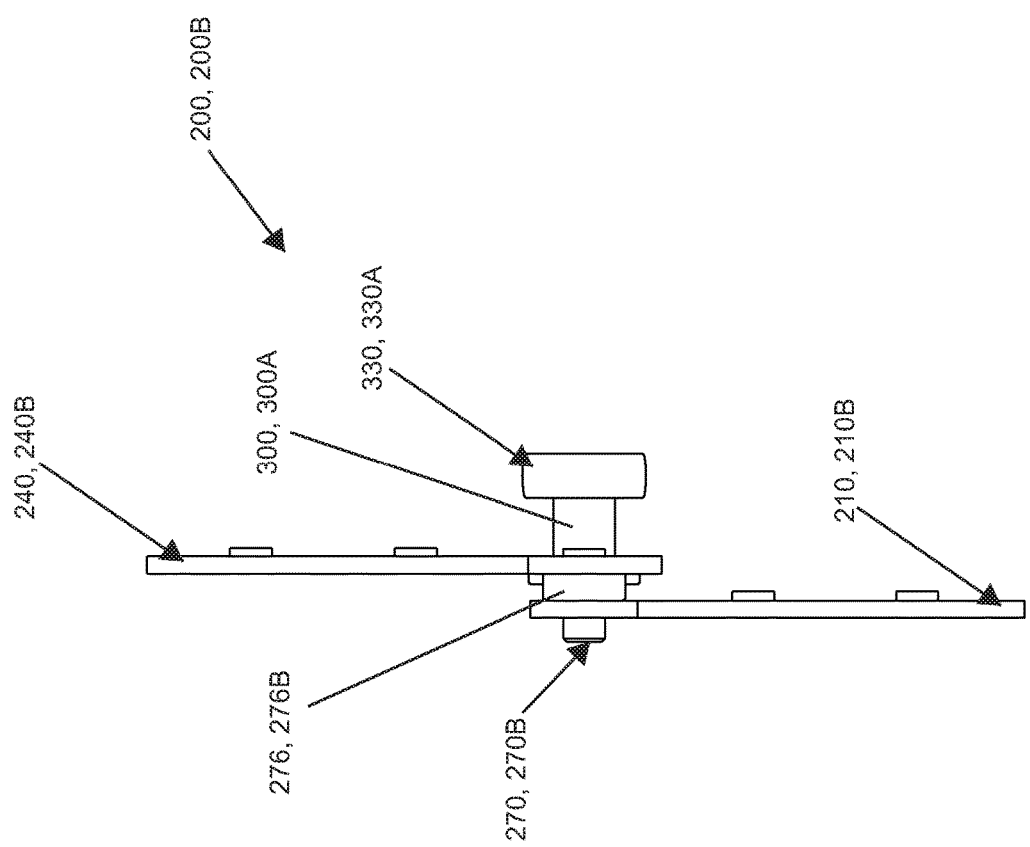
FIG. 40 is a plan view of the second joint type of FIG. 31.

Turning now to FIGS. 31-42, a joint 200B, according to the principles of the present disclosure, is illustrated. The joint 200B is an embodiment of the pivoting joint 200. The joint 200B may be a second joint type of the panel assembly 101. As illustrated at FIGS. 13, 31, and 33, the joint 200B is used to pivotally connect the panel 156 with the panel 154 or 158. As illustrated at FIG. 33, the joint 200B includes a first member 210B that is connected to a first panel 156 by a connecting arrangement 360, $360_1$. As the first member 210B is connected to the first panel 156, they are one kinematic body and move kinematically together. Likewise, the joint 200B includes a second member 240B that is attached to a second panel 154 or 158 by a connecting arrangement 360, $360_2$. As the second member 240B is connected to the second panel 154 or 158, they are one kinematic body and move kinematically together. As depicted at FIGS. 33 and 34, the joint 200B includes a shaft 270B that extends between a first end 272B and a second end 274B. As depicted, one of the guide elements 330 is positioned at a second end 304A of a shaft 300A. The shaft 300A thereby positions the guide element 330 in the transverse direction 109 relative to the panel assembly 101. In particular, a mounting surface 286 positioned at the second end 304A presses into the inner race 332 of the guide element 330A. As illustrated at FIGS. 20 and 33, a shoulder 287 of the shaft 300A abuts against the inner race 332 to position the guide element 330A on the shaft 300A. An axis A3 of the shaft 270B is offset from an axis A4 of the shaft 300A. The joint 200B, as depicted, results in the axis A3 being positioned above the top surface 154t of the panel 154, above the top surface 156t of the panel 156, and above a top surface 158t of the panel 158. The axis A3 is a pivot axis of the joint 200B. The axis A4 is coaxial with the rotational axis A1 of the guide element 330A.

As illustrated at FIG. 54, the panel 154 includes a notch 702, and the panels 152 and 156 include a notch 704. The notch 704 is adapted to receive the first member 210B and allow the first member 210B to be mounted at the inside of the flange 714 of the panel 152. Likewise, the notch 702 allows the second member 240B to be mounted at an inside of the flange 712 of the panel 154. As illustrated at FIGS. 38 and 39, the notch 702 further allows assembly of the joint 200B in between the panel 154 and the panel 156. In the depicted embodiment, the shafts 270B and 300A are subassembled to the second member 240B and thereby form a subassembly 235B, as illustrated at FIGS. 32, 41, and 42. In embodiments without protrusions 362, the subassembly 235B may be assembled as a right-hand or a left-hand subassembly by reversing the direction that the shafts 270B and 300A are assembled, respectively. In embodiments with the protrusions 362, the second member 240B may be right-handed or left-handed (e.g., with the protrusions 362 positioned on opposite sides) and used in a corresponding right-hand or left-hand subassembly 235B. The joining of the shaft 300A to the second member 240B may include a weld portion 312A on the shaft 300A being welded to a weld portion 244A of the second member 240B. The joining of the shaft 300A to the second member 240B may include a piloting portion 246 of the second member 240B receiving a pilot 310A of the shaft 300A. In addition, as illustrated at FIG. 32, the guide element 330A may be further subassembled to the subassembly 235B. The guide element 330A may be assembled before or after the first member 210B and/or the second member 240B are mounted to the flange 714 and/or 712. The guide element 330A may be disassembled and reassembled (e.g., for servicing and/or replacing the guide element 330A) without additional disassembly of the joint 200B. As illustrated at FIGS. 33, 38, and 39, the subassembly 235B may be inserted into the notch 702 and thereby tilted into position. In particular, the fastening arrangement 360 and the insertion of a pivoting portion 278B of the shaft 270B into a pivot surface 212B of the first member 210B may require the subassembly 235B to be tilted into position in the depicted embodiment.

Figure 43:
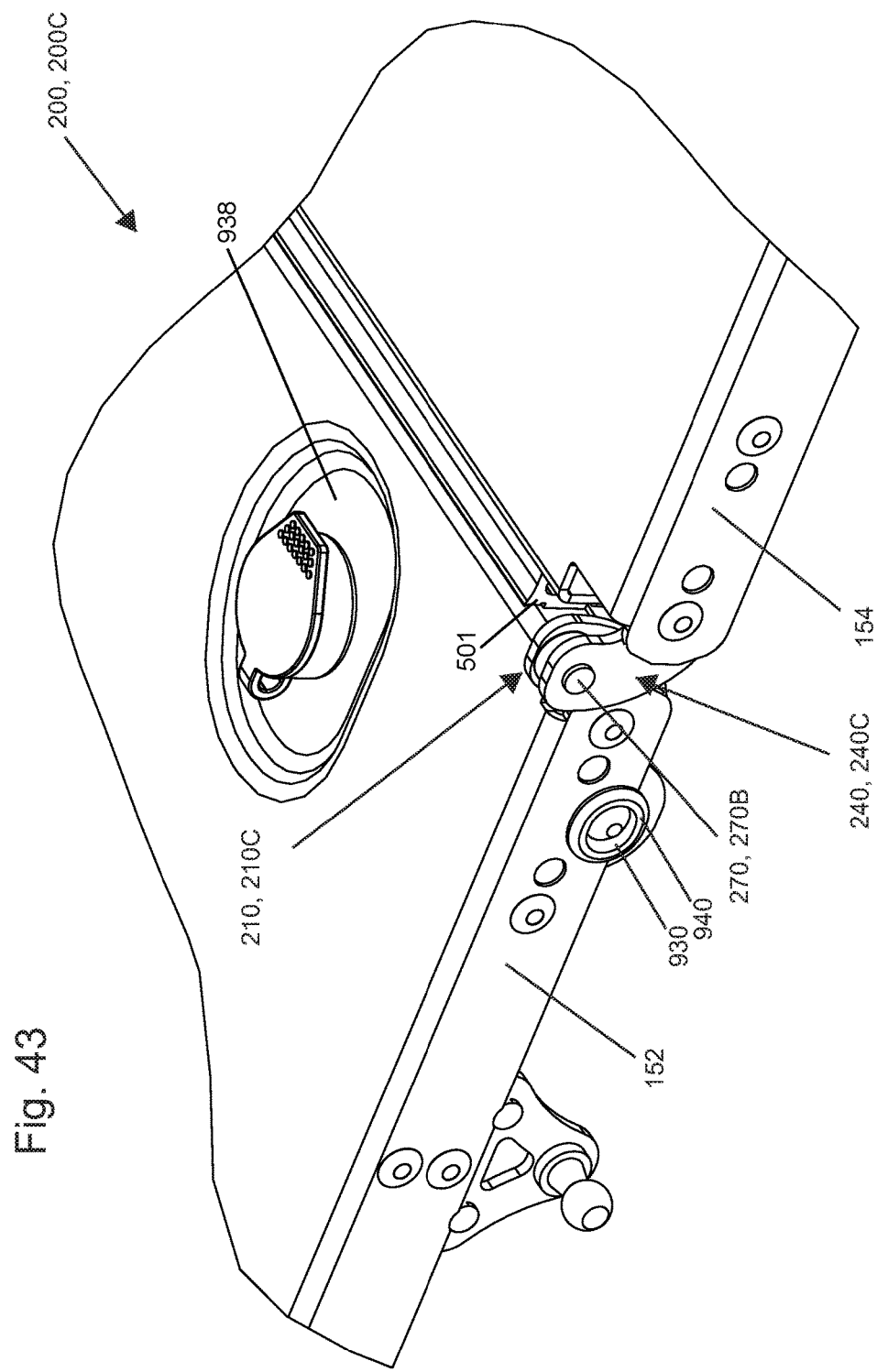
FIG. 43 is a partial left-rear perspective view of the panel assembly of FIG. 8 illustrating a third joint type that is similar to the second joint type of FIG. 31.
Figure 44:
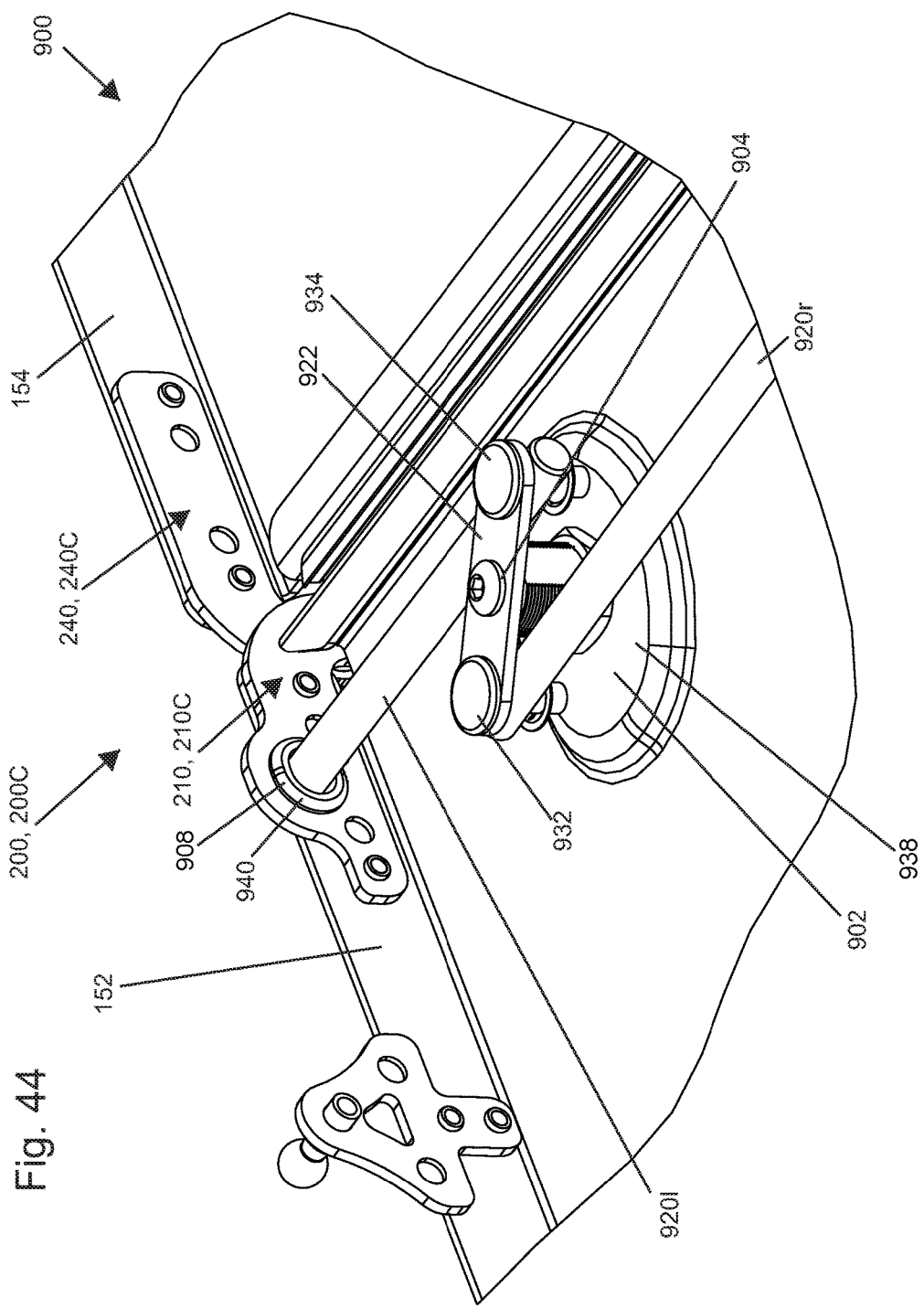
FIG. 44 is a partial right-front perspective view of the underside of the panel assembly of FIG. 8 further illustrating the third joint type of FIG. 43.
Figure 45:
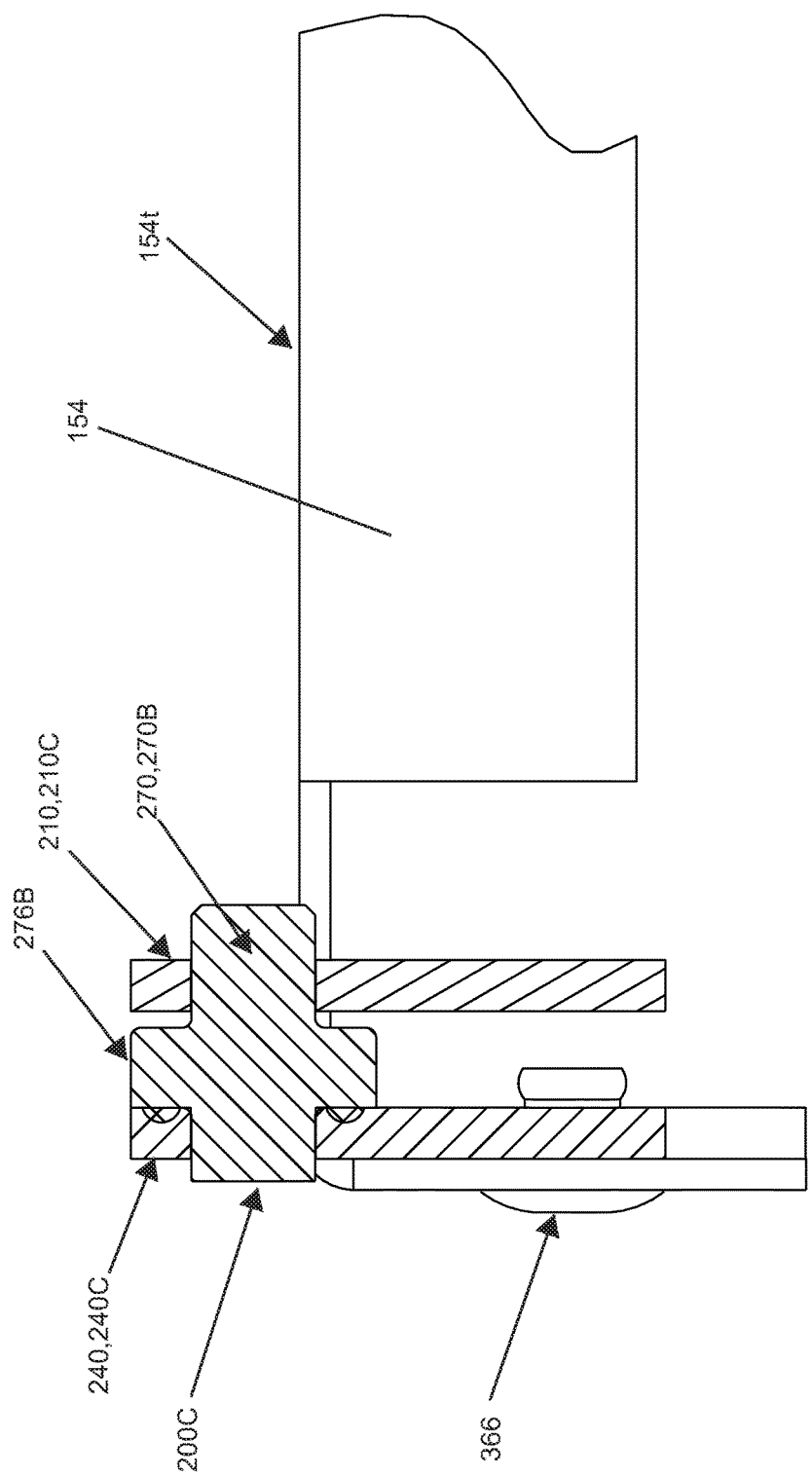
FIG. 45 is a cross-sectional elevation view of the third joint type of FIG. 43.
Figure 46:
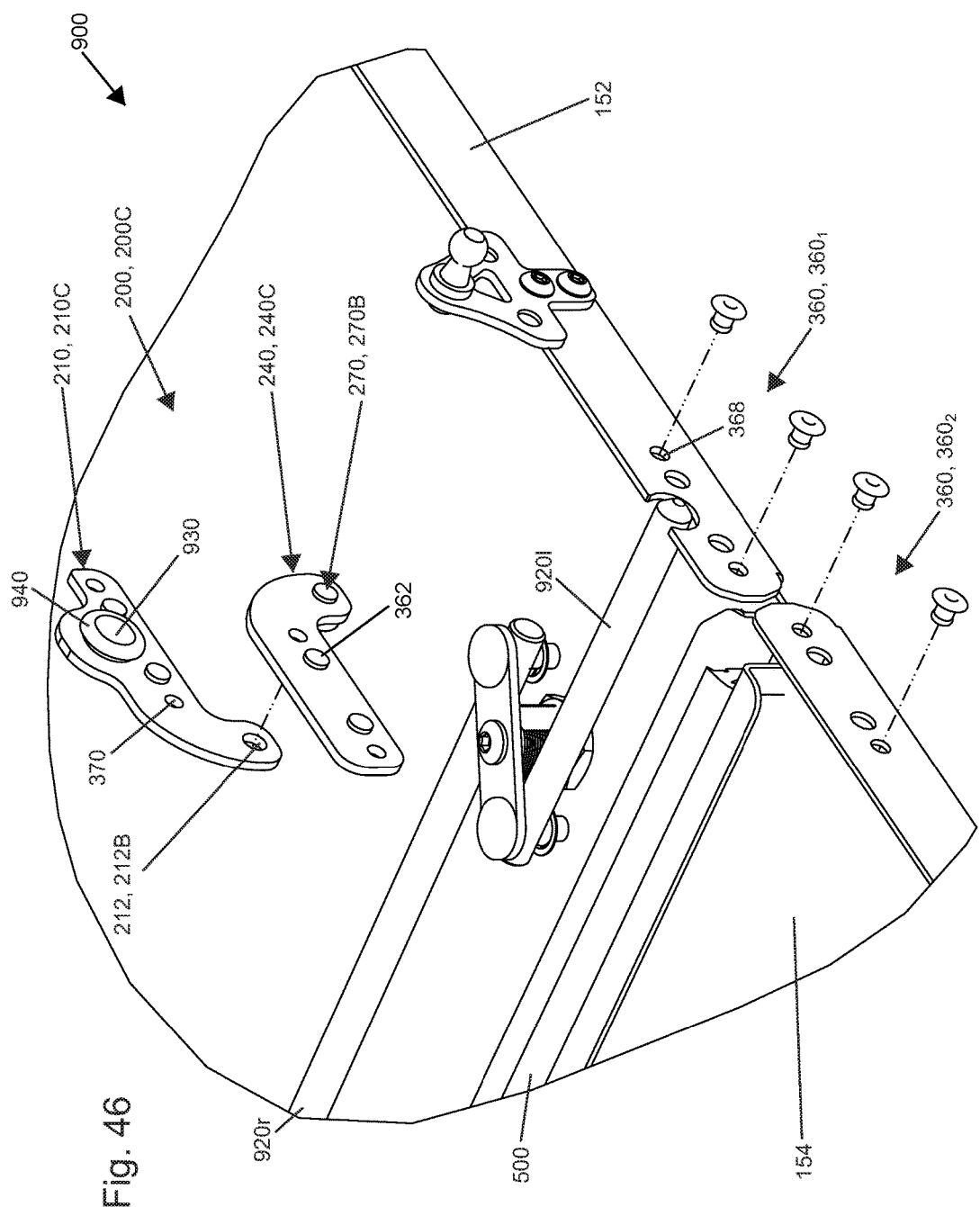
FIG. 46 is an exploded left-rear perspective view similar to FIG. 33, but illustrating the third joint type of FIG. 43.

Turning now to FIGS. 43-49, a joint 200C, according to the principles of the present disclosure, is illustrated. The joint 200C is an embodiment of the pivoting joint 200. The joint 200C may be a third joint type of the panel assembly 101. As illustrated at FIGS. 13 and 43, the joint 200C is used to pivotally connect the panel 152 with the panel 154. As illustrated at FIG. 46, the joint 200C includes a first member 210C that is connected to a first panel 152 by a connecting arrangement 360, $360_1$. As the first member 210C is connected to the first panel 152, they are one kinematic body and move kinematically together. Likewise, the joint 200C includes a second member 240C that is attached to a second panel 154 by a connecting arrangement 360, $360_2$. As the second member 240C is connected to the second panel 154, they are one kinematic body and move kinematically together. As depicted at FIG. 47, the joint 200C includes the shaft 270B (a shared part with the joint 200B) that extends between the first end 272B and the second end 274B. The joint 200C does not include any guide elements 330. The first member 210C of the joint 200C includes an opening 930 for a lock rod 920, 920r, 920l. The joint 200C may be similar to the joint 200B except for the addition of the opening 930 and the deletion of the guide element 330 and its mount. The joint 200C, as depicted, results in the axis A3 being positioned above the top surface 152t of the panel 152 and above the top surface 154t of the panel 154. The axis A3 is a pivot axis of the joint 200C.

As mentioned above and as illustrated at FIG. 54, the panel 154 includes a notch 702, and the panel 152 includes a notch 704. The notch 704 is adapted to receive the first member 210C and allow the first member 210C to be mounted at the inside of the flange 714 of the panel 152. Likewise, the notch 702 allows the second member 240C to be mounted at the inside of the flange 712 of the panel 154. As illustrated at FIGS. 45 and 46, the notch 702 further allows assembly of the joint 200C in between the panel 154 and the panel 152. In the depicted embodiment, the shaft 270B is sub-assembled to the second member 240C and thereby forms a subassembly 235C, as illustrated at FIGS. 48 and 49. In embodiments without protrusions 362, the subassembly 235C may be assembled as a right-hand or a left-hand subassembly by reversing the direction that the shaft 270B is assembled, respectively. In embodiments with the protrusions 362, the second member 240C may be right-handed or left-handed (e.g., with the protrusions 362 positioned on opposite sides) and used in a corresponding right-hand or left-hand subassembly 235C. As illustrated at FIGS. 33, 38, and 39 (with the joint 200B), the subassembly 235C may be inserted into the notch 702 and thereby tilted into position. In particular, the fastening arrangement 360 and the insertion of the pivoting portion 278B of the shaft 270B into a pivot surface 212B of the first member 210C may require the subassembly 235C to be tilted into position in the depicted embodiment.

The joint 200 will now be described in detail. The joint 200 includes the first member 210 that moves with the first panel. The first member 210 includes the pivot surface 212 that forms part of the joint 200. In certain embodiments, the first member 210 may be a separate part from the first panel. In other embodiments, the first member 210 may be part of the first panel. The joint 200 also includes the second member 240 that moves with the second panel. In certain embodiments, the second member 240 may be a separate part from the second panel, and, in other embodiments, the second member 240 may be part of the second panel.

The joint 200 also includes the shaft 270 that extends along the axis A2, A3 and includes a spacer portion 276, 276A, 276B that is positioned between the first member 210 and the second member 240. The shaft 270 extends from a first end 272 to a second end 274 and further defines a pivoting portion 278, 278A, 278B that engages the pivot surface 212, 212A, 212B of the first member 210. The pivot surface 212 and the pivoting portion 278 provide for a pivoting action of the pivoting joint 200. In preferred embodiments, the shaft is monolithic (i.e., one piece).

The shaft 270 may be mounted to the second member 240 and thereby form a subassembly 235, 235A, 235B, 235C. The second member 240 may include a piloting portion 242, 242A, 242B (i.e., a hole), and the shaft 270 may include a pilot 280, 280A, 280B (i.e., an outer diameter) that is mounted within the piloting portion 242. The shaft 270 and the second member 240 may be welded together. The shaft 270 thereby includes a weld portion 282, 282A, 282B that is welded to a weld portion 244, 244A, 244B of the second member 240. Any conventional means may be used to weld the shaft 270 to the second member 240. In certain embodiments, the shaft 270 includes a weld portion that resembles stud welded weld portions that are known in the art for stud welding studs (i.e., a threaded member) to another member. Thus, a stud welding type process may be used to weld the shaft 270 to the second member 240. The axis A2, A3 of the shaft 270 may form a pivoting axis of the joint 200.

As mentioned above, the joint 200 may be found in three configurations of the joints 200A, 200B, and 200C on the retractable cover system 100. In the configuration of the joint 200A, the pivoting axis A2 is positioned below the top surfaces 154t, 156t of the first and the second panels when the retractable cover system 100 is in the extended configuration 102. In the configuration of the joints 200B and 200C, the pivoting axis A3 is positioned above the top surfaces 152t, 154t, 156t, 158t of the first and the second panels when the retractable cover system 100 is in the extended configuration 102. As shown at FIG. 13, the joints 200 with the configuration of the joint 200A alternate with the joints 200 with the configuration of the joints 200B and 200C. The joints 200 with the configuration of the joint 200A include the outer guide elements 330o, and the joints 200 with the configuration of the joint 200B include the inner guide elements 330i. Thus, the joints 200A stay on the rails 110r, 110l, and the joints 200B engage the ramp structures 400r, 400l when the retractable cover system 100 is moved between the extended configuration 102 and the stowed configuration 104.

At various positions of the joints 200, the first member 210 may be positioned generally behind the second member 240, and, in other positions, the second member 240 may be generally positioned behind the first member 210 when the retractable cover system 100 is in the extended configuration 102. In the depicted embodiment, the first member 210 is an inner member, and the second member 240 is an outer member.

The pivot axes A2, A3 of the retractable cover system 100 may include a pair of the joints 200 and thereby include a pair of the outer members 240 that are each attached to the same second panel. Likewise, the pivot axes A2, A3 may include a pair of the inner members 210 that are each attached to the same first panel of the retractable cover system 100. The inner members 210 of the pair of the pivoting joints 200 are positioned within the outer members 240 along the pivoting axis A2, A3. The inner members 210 are thereby trapped between the outer members 240, and the first panel is thereby trapped between the outer members 240. The pivoting portions 278 of the pair of the joints 200 may extend inwardly toward each other and extend inwardly through the pivoting surfaces 212. Clearance may exist between the pair of the inner members 210 and the pair of the outer members 240 that allows for manufacturing tolerances, smooth operation of the retractable cover system 100 (i.e., resistance to binding), etc. However, the clearance between the pair of the inner members 210 and the pair of the outer members 240 is not sufficient to allow the first panel and the second panel to detach from each other at the pivoting joint. The clearance between the pair of the inner members 210 and the pair of the outer members 240 may allow the first and the second panels to move along the pivoting axis A2, A3 relative to each other by a predetermined amount.

Figure 10:
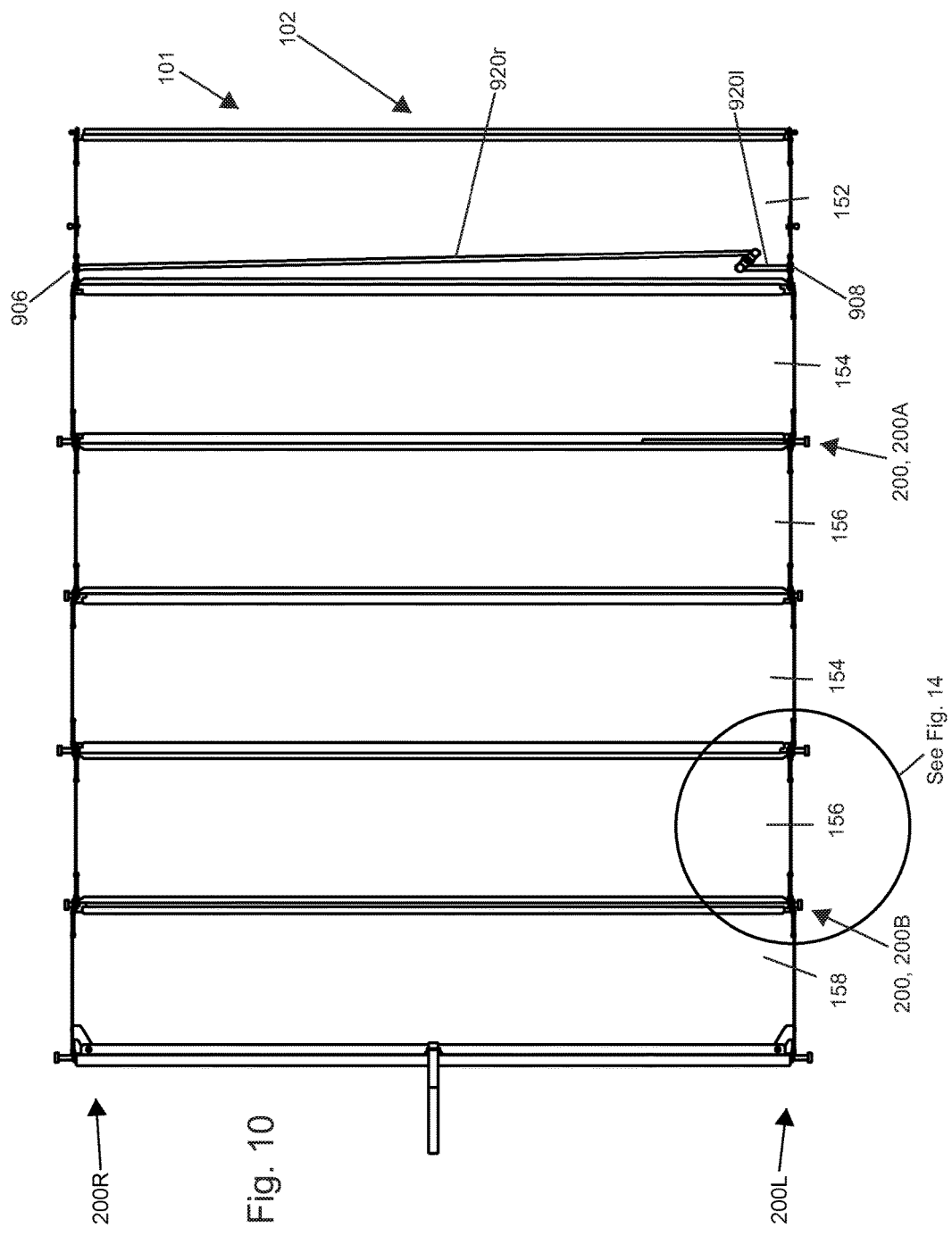
FIG. 10 is a bottom plan view of the panel assembly of FIG. 8 in the extended configuration.
Figure 11:
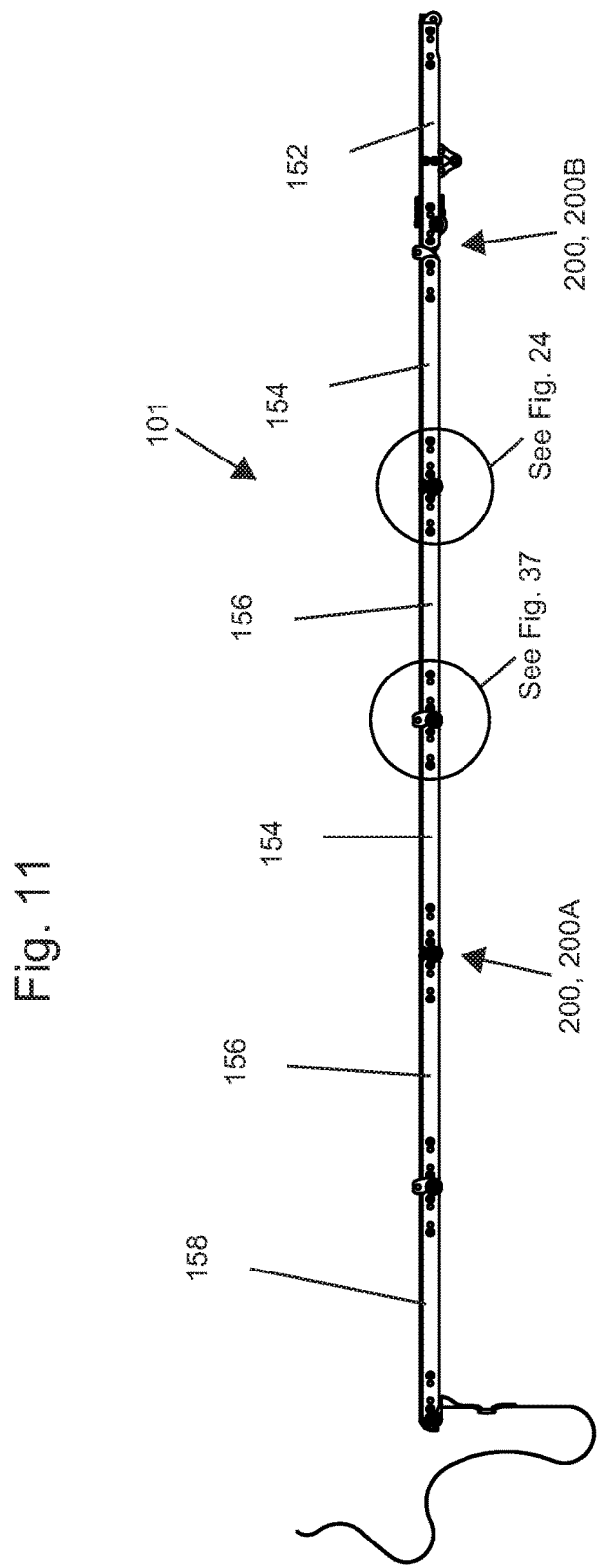
FIG. 11 is a right-side elevation view of the panel assembly of FIG. 8 in the extended configuration.

The pair of the joints 200 may include a right hand joint 200R and a left hand joint 200L (see FIG. 10). The right hand joint 200R and the left hand joint 200L may be mirror images of each other. The right hand joint 200R and the left hand joint 200L may substantially be mirror images of each other. The right hand joint 200R and the left hand joint 200L may include one or more features and/or components that are substantially mirror images of each other. In certain embodiments, some or all components of the joints 200R, 200L (e.g., the first member 210, the second member 240A, the shaft 270, the guide element 330, etc.) may be substantially identical from the right hand joint 200R and the left hand joint 200L. Achieving a right hand configuration for the right hand joint 200R and a left hand configuration for the left hand joint 200L may be accomplished when assembling the components (e.g., the first member 210, the second member 240A, the shaft 270, the guide element 330, etc.) together.

The retractable cover system 100 and various components (e.g., the panels 150, etc.) may be symmetrical about a vertical center-plane of the pickup truck 70. The retractable cover system 100 may be substantially symmetrical about the vertical center-plane of the pickup truck 70. The retractable cover system 100 may include one or more features and/or components that are substantially symmetrical about the vertical center-plane of the pickup truck 70. Certain components (e.g., a locking system 900, the panel 152, etc.) may be non-symmetrical or partially non-symmetrical about the vertical center-plane of the pickup truck 70 while the remaining components may be symmetrical about the vertical center-plane of the pickup truck 70.

The shaft 270A of the pivoting joint 200A may be used to mount the guide element 330 (i.e., the rolling element 330A). The guide element 330 may guide the axis A2 of the shaft 270A and thereby the plurality of the panels along the path 106A as the retractable cover system 100 is moved between the extended configuration 102 (i.e., a deployed configuration) and the stowed configuration 104 (i.e., a retracted configuration).

The guide elements 330 may be a separate piece that is mounted to the shaft 270A, 300. In preferred embodiments, the guide element 330 is a roller 330A and the shaft 270A, 300 includes a roller mount 284. The inner race 332 of the roller 330A may be pressed fit onto the roller mount 284. In order to avoid the expense of press fitting a hole of a close tolerance inner race to a close tolerance mounting surface, the inner race 332 of the roller 330A may be designed of a material that may yield upon press fitting the hole of the inner race 332 to the roller mount 284. In certain embodiments, the roller mount 284 may have a nominal diametral dimension Do of about one-quarter inch (see FIG. 30), and a diametral interference between the mounting surface 286 and the hole of the inner race 332 may be as large as 0.0065 inch. The 0.0065 inch diametral interference may represent a maximum material condition of the mounting surface 286 of the roller mount 284 and the hole of the inner race 332. The diametral interference between the mounting surface 286 and the hole of the inner race 332 may be as low as 0.0005 inch and yet maintain a sufficient press fit to keep the roller 330A mounted on the shaft 270A, 300 without additional fasteners, fastening elements, bonding agents, etc. In certain embodiments, a tolerance of an inside diameter of the hole of the inner race 332 may be a diameter Di that is sized between 0.2465 inch and 0.2495 inch. In certain embodiments, the tolerance of the hole of the inner race 332 of the roller 330A may be the diameter Di that is sized between 0.24975 inch and 0.25 inch. A tolerance of the mounting surface 286 of the shaft 270A, 300 may be the outside diameter Do that is sized between 0.250 inch to 0.253 inch. Pressing the inner race 332 onto the mounting surface 286 may not necessarily cause the inner race 332 to yield (e.g., in a minimum material condition of the inner race 332 and the roller mount 284).

According to the principles of the present disclosure, the guide element 330 is not limited to rollers 330A. For example, the guide element 330 may be a guide block 330B (see FIG. 15). The guide block 330B may not necessarily rotate as the guide block 330B travels along the path 106A, 106B.

The panels 152, 154, 156, and 158 will now be described in detail. As the panels 152, 154, 156, 158 have many features in common, a generic panel 150 will be described with such common features (see FIGS. 3 and 8). The top surfaces 152*t*, 154*t*, 156*t*, 158*t* are generically a top surface 150*t* of the panel 150 (see FIGS. 2, 3, 15, 19, 32, 45, 52, and 55-57). As the panels 152 and 156 have certain features in common as inside panels, a generic inside panel 150*i* will be described with such common features. As the panels 154 and 158 have certain features in common as outside panels, a generic outside panel 150*o* will be described with such common features.

The panel 150 is preferably made of sheet metal and cut from sheet metal stock into a pattern with sheet metal cutting tools. The pattern is then formed by bending with bending sheet metal tools. In other embodiments, the panel 150 may be formed by extruding. In still other embodiments, other fabrication methods may be used to form the panel 150 (e.g., molding, machining, welding, etc.). A combination of methods may be used to form the panel 150. The panel 150 is preferably made of aluminum sheet metal of a thickness Tp (see FIG. 108) and powder coated after forming. In certain embodiments, the thickness Tp may range from about 0.063 inch to about 0.08 inch. In certain embodiments, the thickness Tp is about 0.63 inch for the panels 152, 154, and 156. In certain embodiments, the thickness Tp is about 0.08 inch for the panel 158. In other embodiments, the panel 150 may be made from other materials including steel, fiberglass, plastic, other metals, etc. and/or at other thicknesses Tp.

Figure 8:
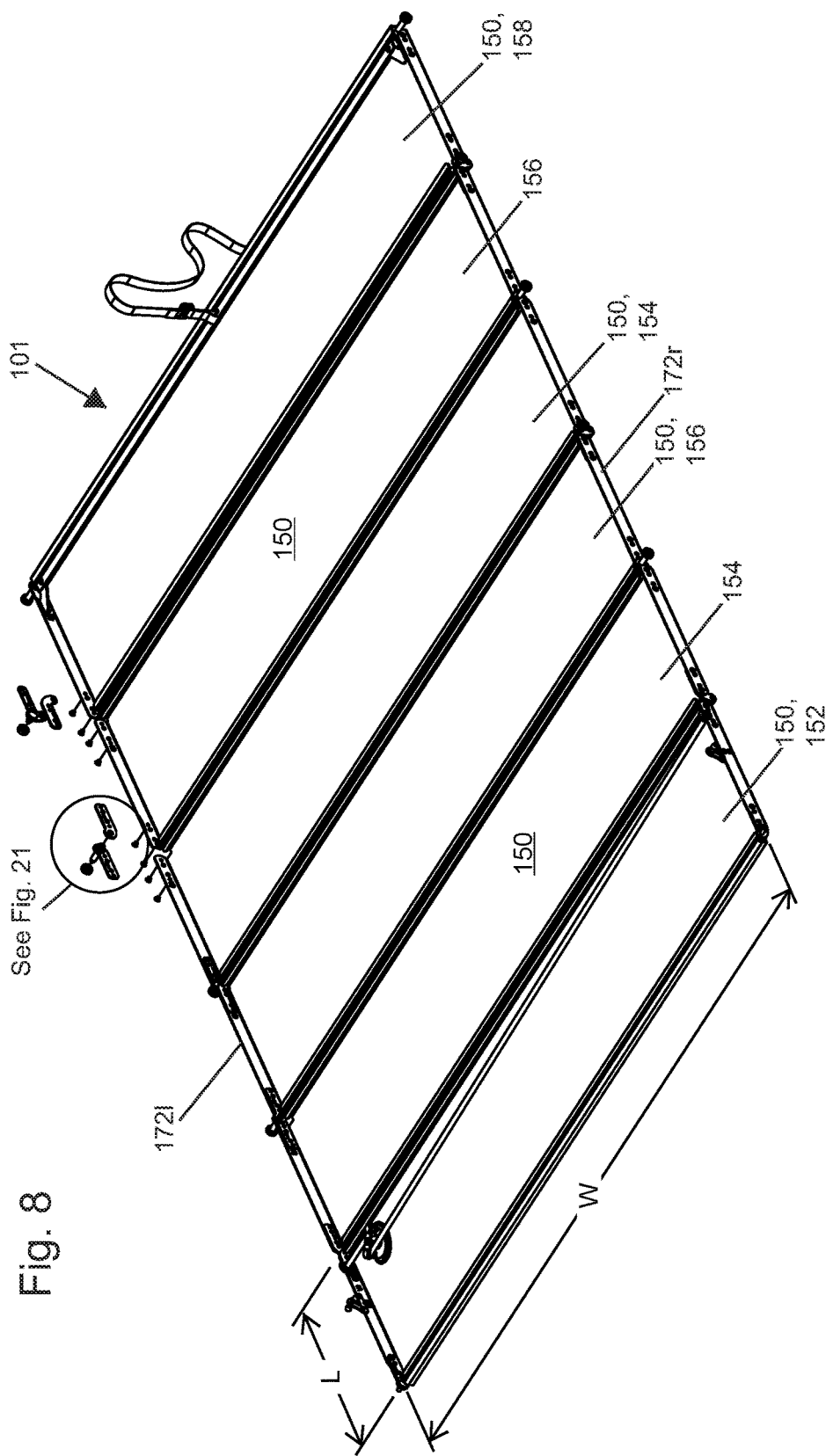
FIG. 8 is an exploded front-right perspective view of an underside of a panel assembly of the retractable cover system of FIG. 1 in the extended configuration.
Figure 22:
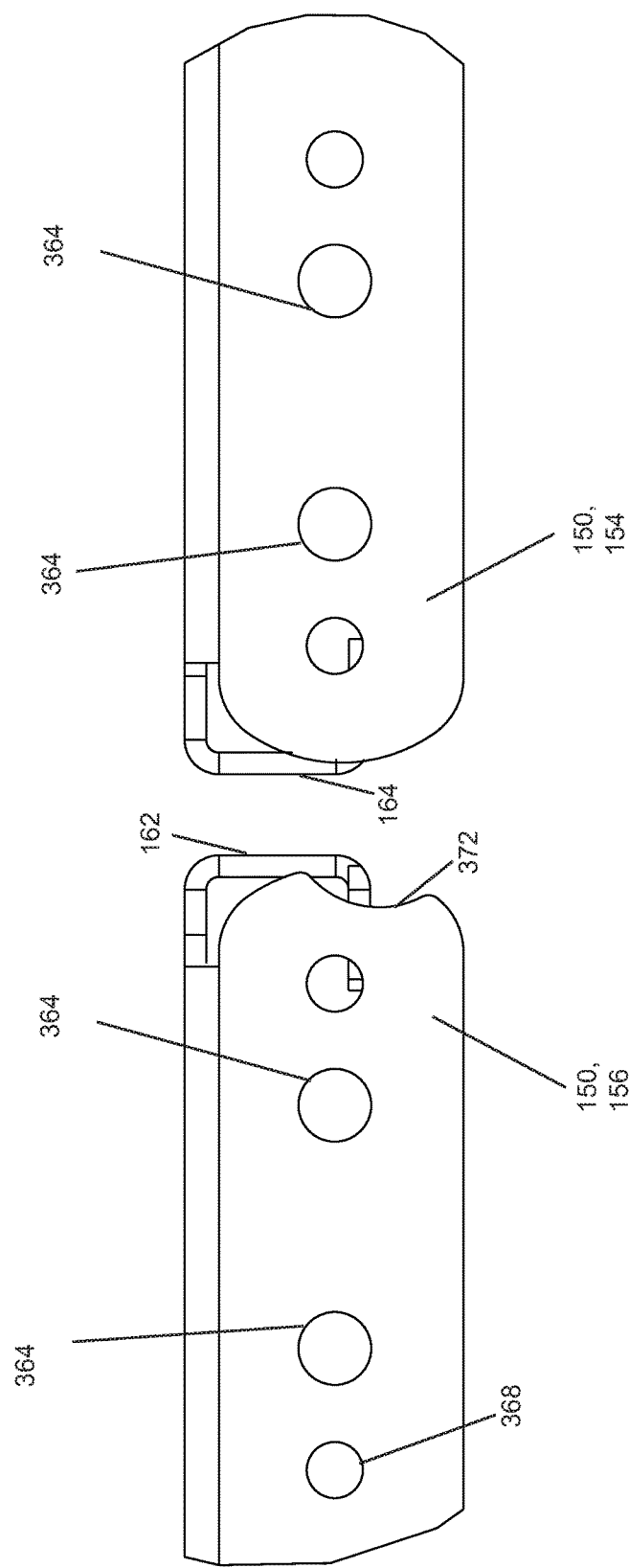
FIG. 22 is a partial side elevation view of a first panel and a second panel of the panels of FIG. 12 before they are connected by the first joint type of FIG. 18.
Figure 23:
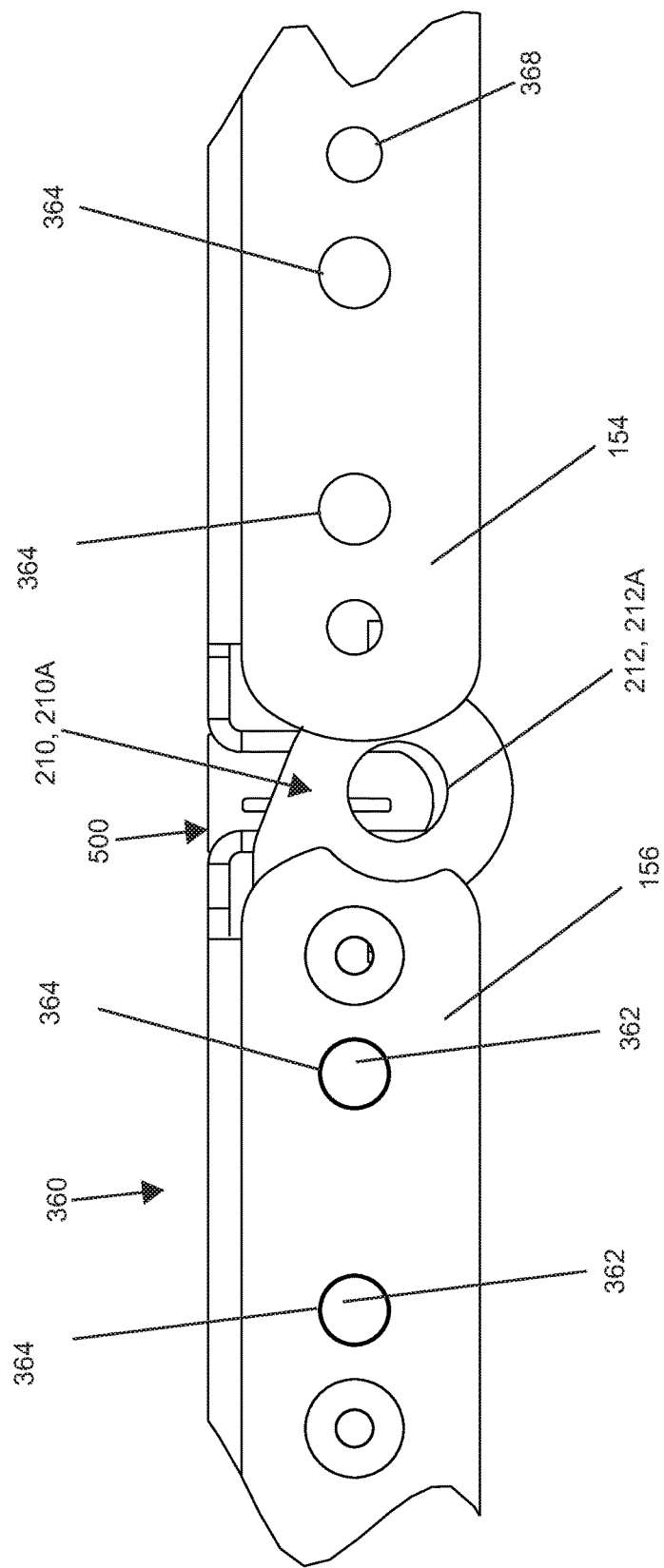
FIG. 23 is the partial side elevation view of FIG. 22, but with a first member assembled to the first panel and a seal assembled to the second panel and positioned between the first and the second panels in a compressed state.
Figure 24:
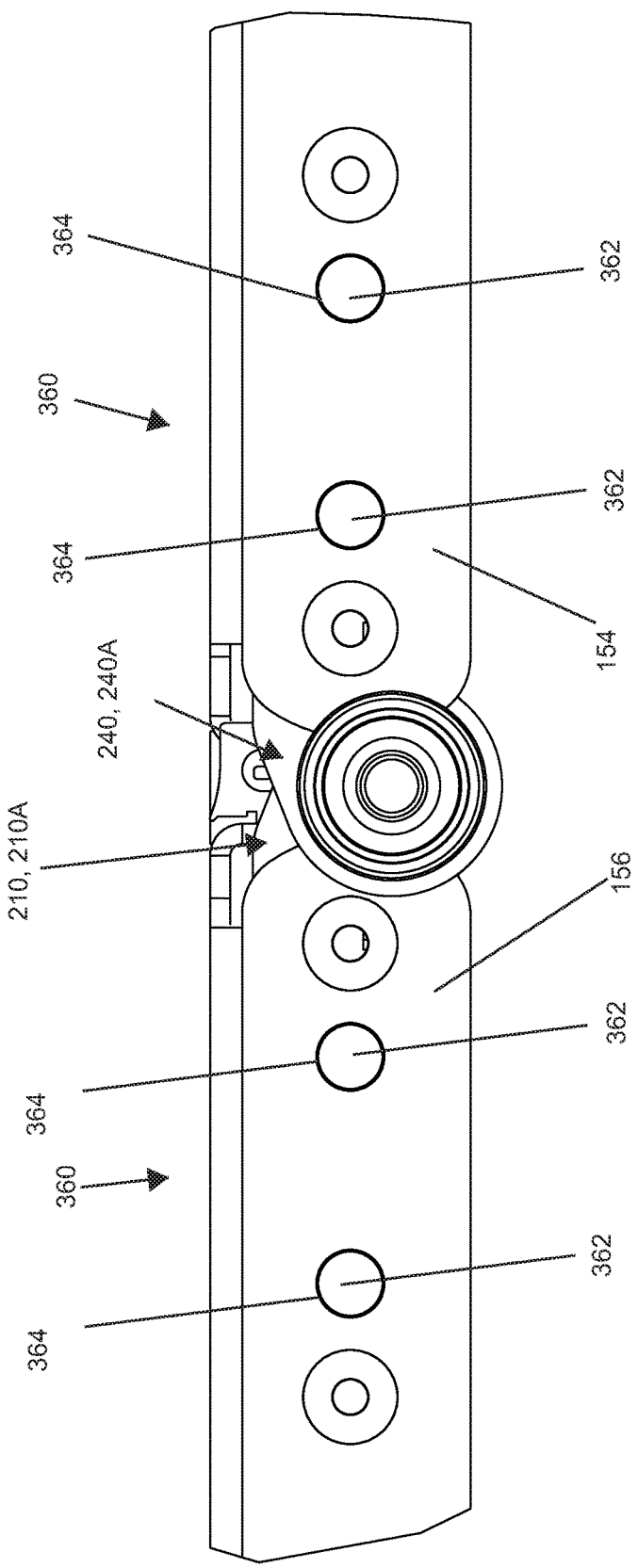
FIG. 24 is the partial side elevation view of FIG. 23, but with a subassembly including a second member and a shaft assembled to the second panel, thereby completing the assembly of the first joint type of FIG. 18 between and to the first and the second panels of FIG. 22.
Figure 27:
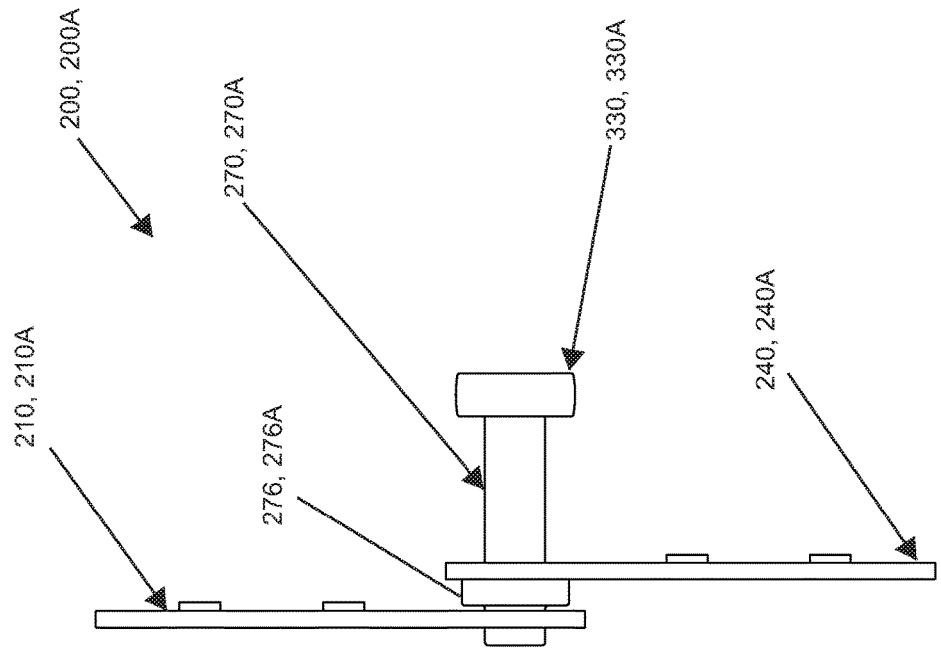
FIG. 27 is a plan view of the first joint type of FIG. 18.

As illustrated at FIGS. 8 and 22, the panel 150 extends a length L from a first end 162 (i.e., a front end) to a second end 164 (i.e., a rear end). In certain embodiments, the length L may range from about 6.985 inches to about 12.872 inches. In preferred embodiments, the lengths L of the panel assembly 101 are substantially the same across all of the panels 150 of the given panel assembly 101.

Figure 15:
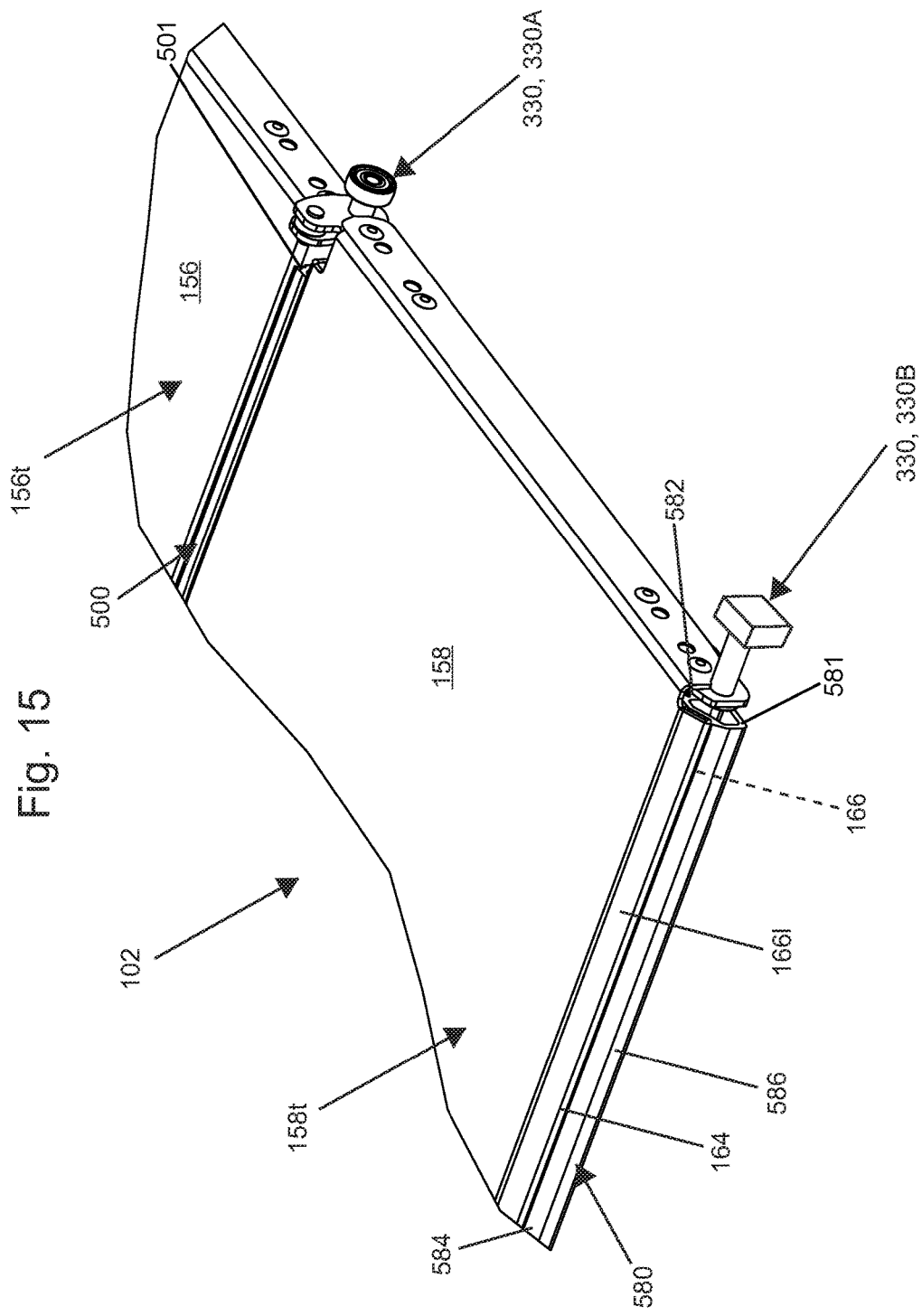
FIG. 15 is a partial right-rear perspective view of the panel assembly of FIG. 8 illustrating various guide elements.

As illustrated at FIGS. 57, 89, 99, 108, and 119, the ends 162, 164 may include a C-channel feature 166 that opens inwardly on the panel 150. The C-channel feature may extend a distance Lv from a top leg 166*t* to a bottom leg 166*b* along and connected by a vertical leg 166*v* (see FIG. 99). In certain embodiments, the length Lv may range from about 0.6875 inch to about 1 inch. In certain embodiments, the length Lv may range from about 0.6875 inch to about 1.112 inch. In certain embodiments, the length Lv is a length Lv1 of about 0.6875 inch for the panels 152, 154, and 156 (see FIG. 108). In certain embodiments, the length Lv is a length Lv2 of about 1 inch for the panel 158 (see FIG. 108). In certain embodiments, the length Lv2 is about 1 inch for a forward end of the panel 158, and the length Lv2 is about 1.112 inch for a rearward end of the panel 158. In preferred embodiments, the lengths Lv1 of the panel assembly 101 are substantially the same across all of the panels 152, 154, and 156 of the given panel assembly 101. In preferred embodiments, the lengths Lv2 of the panel assembly 101 are substantially the same at the front and the rear of the panel 158 of the given panel assembly 101. The C-channel feature 166 may substantially stiffen and strengthen the panel 150. The C-channel feature 166 may provide a mounting surface 168 for a seal 500 (see FIG. 55). The C-channel feature 166 may provide a sealing surface 170 for the seal 500 (see FIGS. 55 and 57). The C-channel feature 166 may include one or more bend radius R. As illustrated at FIG. 15, the second end 164 of the panel 158 may further include a protective lip structure 166*l* in addition to the C-channel feature 166. In other embodiments, other suitable structures may be substituted for the C-channel feature 166.

As illustrated at FIG. 8, the panel 150 extends a width W from a right side 172*r* (i.e., a first side) to a left side 172*l* (i.e., a second side). In certain embodiments, the width W may range from about 41.445 inches to about 58.263 inches. In certain embodiments, a width of the panel assembly 101 is substantially defined by the width W of the outside panels 150*o*, and the width W of the inside panels 150*i* is narrower than the width W of the outside panels 150*o* (see FIG. 3).

As illustrated at FIG. 31, the sides 172*r*, 172*l* may include an L-feature 174 with a leg 176 that extends downwardly on the panel 150. The L-feature 174 may substantially stiffen and strengthen the panel 150. In other embodiments, other suitable structures may be substituted for the L-feature 174. The flange 712, 714 may be included on the L-feature 174, and the L-feature 174 may thereby provide a mounting surface 178 for the first member 210 on the inside panels 150*i* and for the second member 240 on the outside panels 150*o* (see FIG. 18). The L-feature 174 may include one or more of the bend radius R (see FIG. 19).

Figure 14:
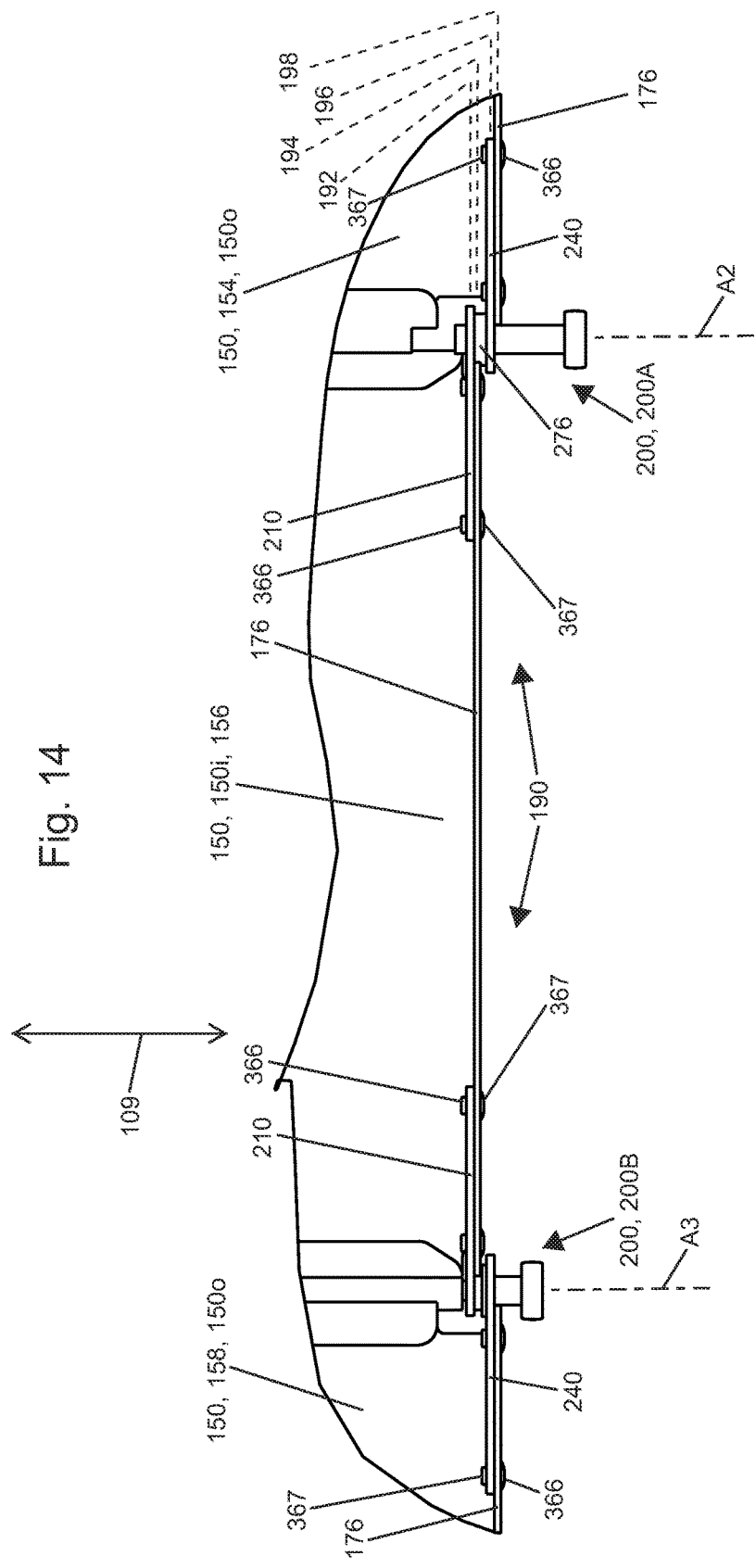
FIG. 14 is an enlarged portion of FIG. 10.
Figure 57:
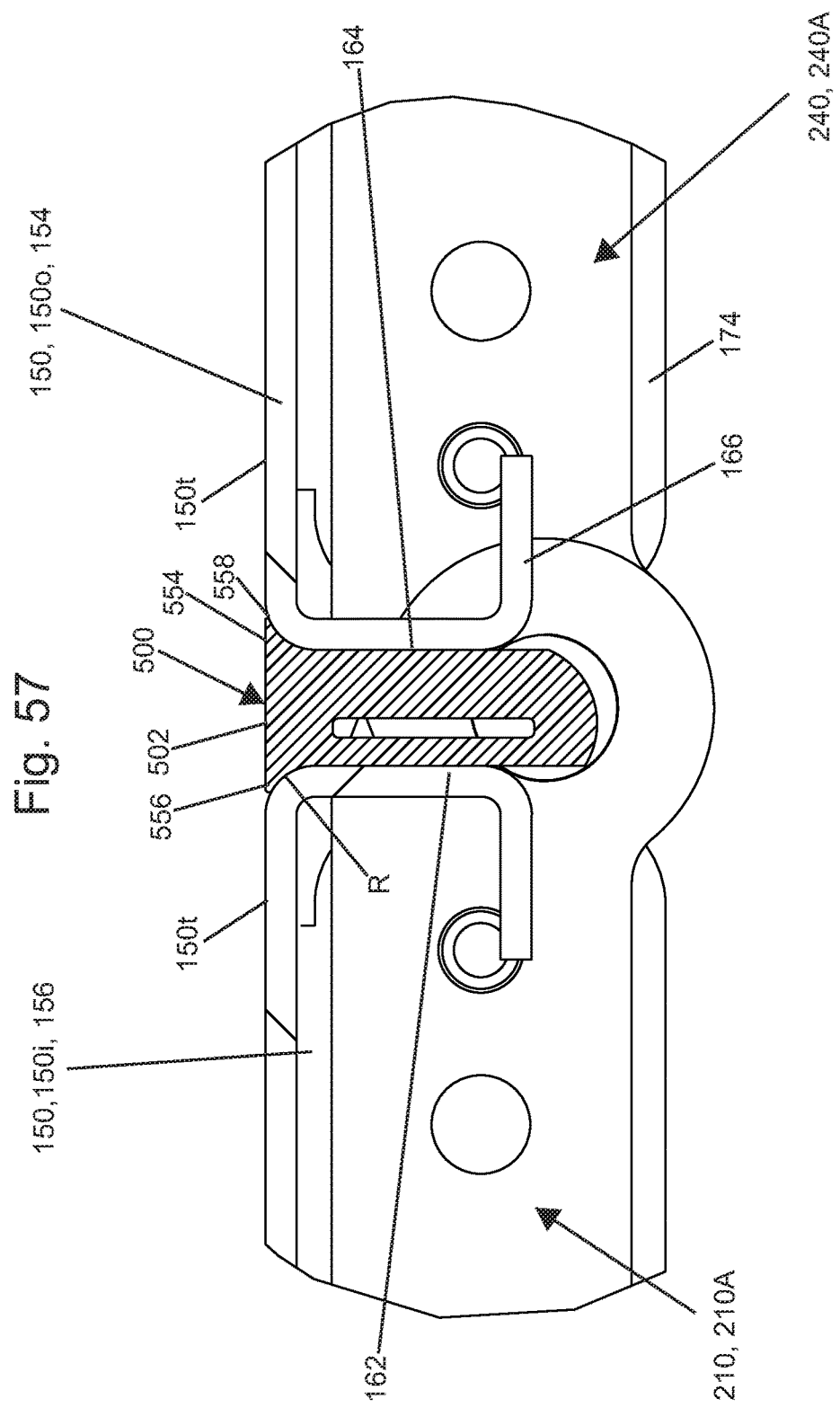
FIG. 57 is a partial cross-sectional side right elevation view illustrating the seal of FIG. 23 positioned between the first and the second panels of FIG. 22 with the panels in the extended configuration, the seal being compressed by the first and the second panels and the seal including a top surface that is substantially co-planar with the top surfaces of the first and the second panels.

As illustrated at FIG. 57, the L-feature 174 may extend downwardly farther than the C-channel feature 166 on the panel 150. As illustrated at FIGS. 14 and 31, the legs 176 of two adjacent panels 150 (i.e., an inside panel 150*i* and an outside panel 150o) overlap each other when the retractable cover system 100 is in the stowed configuration 104 thereby allowing the longer legs 176.

As illustrated at FIG. 20, the legs 176 are adapted to attach to the fastening arrangement 360. In particular, a pair of holes 364 is adapted to receive a pair of the protrusions 362 (e.g. upset protrusions) of the first member 210 or the second member 240. As depicted, the holes 364 are round holes and the protrusions 362 are round protrusions. In other embodiments, the holes 364 and the protrusions 362 may be non-round (e.g., slot shaped, obround, etc.) and/or may be a single hole, as illustrated by a protrusion 624 and a slot 634 at FIG. 59. A pair of holes 368 may be further included on the legs 176 that is adapted to receive a pair of fasteners 366. In the depicted embodiment, the pair of fasteners 366 is a pair of rivets. In other embodiments, other fasteners may be used and/or one or more of the fastener 366 may be used. As depicted, the fastening arrangement 360 includes the pair of the holes 364 engaging the pair of the protrusions 362, the pair of the holes 368 aligning with a pair of holes 370 on the first member 210 or the second member 240, and the pair of the fasteners 366 inserted through and fastening the pairs of the holes 368, 370. Any shear loads between the first member 210 or the second member 240 and the respective panel 150 are substantially carried by the pair of the protrusions 362 engaging the pair of the holes 364. The pair of the fasteners 366 compresses the first member 210 or the second member 240 and the respective panel 150 together and thereby keeps the pair of the protrusions 362 engaged with the pair of the holes 368.

As depicted, boundaries of the panel 150 are defined by the C-channel feature 166 at the ends 162, 164, by the legs 176 at the sides 172r, 172l, by the top surface 150t, and by bottoms of the legs 176 at a bottom of the panel 150. No tabs or other protruding features extend beyond these boundaries in the depicted embodiment. This provides advantages when shipping, storing, and handling the panel 150 as protruding tabs or other protruding features are vulnerable to damage and increase a size of volume that is stored, packaged, shipped, etc.

A layered arrangement of the pivoting joint 200 with respect to the transverse direction 109 will now be described in detail. As illustrated at FIG. 14, the pivoting joint 200 may be arranged in an ordered sequence 190. The first member 210 is located at a first position 192, the leg 176 of the first panel 150i is located at a second position 194, the second member 240 is located at a third position 196, and the leg 176 of the second panel 150o is located at a fourth position 198. The fourth position 198 is positioned outward on the retractable cover system 100 from the first position 192. The pivot surface 212 of the first member 210 is thereby positioned inward on the retractable cover system 100 from the spacer portion 276 of the shaft 270. As further illustrated at FIGS. 22, 25, and 26, the spacer portion 276 of the shaft 270 may be positioned partially within a relief portion 372 of the first panel 156, 150i. The spacer portion 276 spaces the second member 240 from the first panel 150i and thereby allows the first panel 150i and the second panel 150o to pivot about the axis A2, A3 of the shaft 270 without the first member 210 and/or the first panel 150i contacting the second member 240 and/or the second panel 150o. In the depicted embodiment, a fastener flange 367 of the fastener 366 is arranged in the ordered sequence 190 between the second position 194 and the third position 196. The spacer portion 276 spaces the second member 240 from the first panel 150i and thereby allows the first panel 150i and the second panel 150o to pivot about the axis A2, A3 of the shaft 270 without interference from the fastener flange 367. The fastener flange 367 may be included on the fastener 366 that joins the first member 210 to the first panel 150i. The fastener flange 367 may be included on the fastener 366 that joins the second member 240 to the second panel 150o. The first panel 150i may include the first notch 704 (see FIG. 53) to receive the first member 210 at the first position 192 and may further include the first leg 176 of the first panel 150i at the second position 194. The second panel 150o may include the second leg 176 at the fourth position 198 and may further include the second notch 702 (see FIG. 53) to receive the first member 210 at the first position 192, the spacer portion 276 of the shaft 270 at the second position 194, and the second member 240 at the third position 196. The second notch 702 may further receive a portion of the spacer portion 276 of the shaft 270 between the second position 194 and the third position 196. Rotating the sub-assembly 235 away from the second leg 176 of the second panel 150o may allow the protrusion 362 of the second member 240 to be inserted into the hole 364 of the second panel 150o. Rotating the sub-assembly 235 away from the second leg 176 of the second panel 150o may allow the pair of the protrusions 362 of the second member 240 to be inserted respectively into the pair of the holes 364 of the second panel 150o.

In certain embodiments, the pivoting joint 200 may not be disassembled after the connecting arrangements $360_1$ and $360_2$ have fastened the first member 210 and the second member 240 to the panels 150 without yielding at least one of the components (e.g., the panel 150, the first member 210, the second member 240, etc.). As mentioned above, the panels 150 are preferably made from aluminum and powder coated after forming. The remaining structural components (e.g., the first member 210, the second member 240, the rivets 366, etc.) are preferably made of steel with a corrosion resistant coating. The ordered sequence 190 structure of the pivoting joint 200 mirrored with an opposing ordered sequence 190 structure of the opposing pivoting joint 200 has been found to be robust and resistant to failure and unwanted disconnection.

Figure 9:
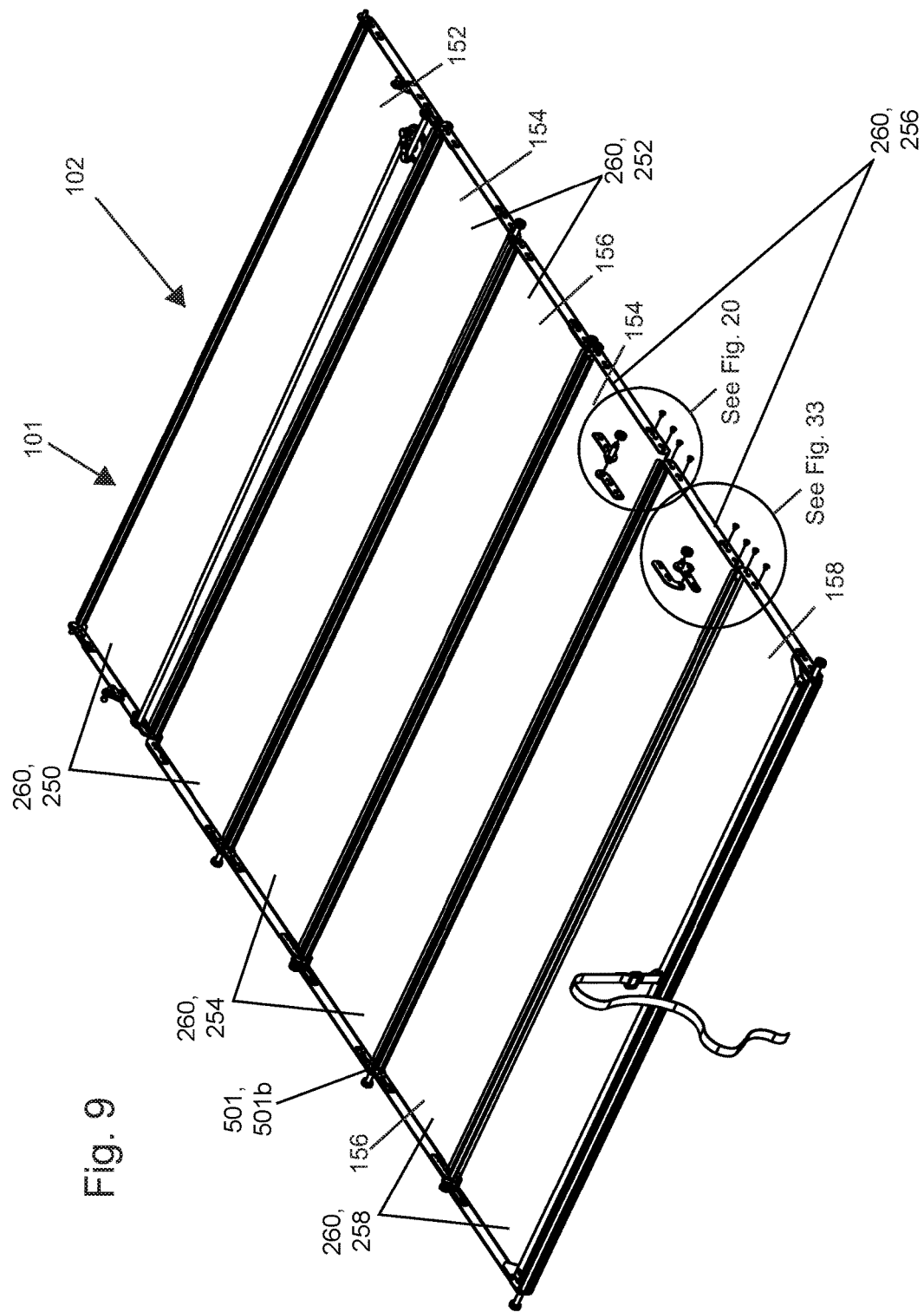
FIG. 9 is an exploded left-rear perspective view of the panel assembly of FIG. 8 in the extended configuration.

Turning now to FIGS. 2, 15, 55-57, 61-63, and 70-80, a sealing system 490 for the retractable cover system 100 is illustrated according to the principles of the present disclosure. The sealing system 490 includes the seal 500 and at least one longitudinal seal 560. The seal 500 is adapted to seal the first panel 150i and the second panel 150o at the joints 200A, 200B, 200C and a joint between the panel 152 and the front cross-member 130 when the retractable cover system 100 is in the extended configuration 102. The first panel 150i, the second panel 150o, and the seal 500 substantially extend between the sides 86r and 86l of the pickup truck box 80. The seal 500 extends between a pair of ends 501. In particular, the seal 500 extends between a first end 501a and a second end 501b (see FIGS. 9 and 20). The seal 500 includes a top 502 (see FIGS. 56 and 57) that extends between the C-channel feature 166 of the first and the second panels 150i, 150o. The top 502 is substantially co-planar with the top surfaces 152t, 154t, 156t, 158t of the first and the second panels 150i, 150o when the retractable cover system 100 is in the extended configuration 102. The at least one longitudinal seal 560 extends along the fore-aft direction 108. The longitudinal seal 560 is in sealing contact with the top surfaces 152t, 154t, 156t, 158t of the panels 150 and the top 502 of the seal 500 when the retractable cover system 100 is in the extended configuration 102. The sealing system 490 may further include a seal 580 for sealing the retractable cover system 100 to the end gate 98 of the pickup truck box 80 (see FIGS. 2 and 15). The seal 580 substantially extends between the sides 86r and 86l of the pickup truck box 80. The seal 580 extends between a pair of ends 581. The seal 580 includes a first side 582 that is attached to the end panel 158 of the retractable cover system 100, a top side 584 that is adjacent the guard lip 166l of the end panel 158, and a second side 586 that is adapted for sealing contact with the end gate 98 when the retractable cover system 100 is in the extended configuration 102 and the end gate 98 is in the closed position.

As the sealing system 490 includes the longitudinal seal 560 being in sealing contact with the top 502 of the seal 500 when the retractable cover system 100 is in the extended configuration 102, the top 502 of the seal 500 should be sufficiently flat and co-planar with the top surfaces 152t, 154t, 156t, 158t of the first and the second panels 150i, 150o when the retractable cover system 100 is in the extended configuration 102. Therefore, the seal 500 is specially designed to achieve a sufficient degree of flatness and co-planarness, as will be described in detail below. To achieve the flatness of the top surfaces 152t, 154t, 156t, 158t of the panels 150 and the top 502 of the seal 500 when the retractable cover system 100 is in the extended configuration 102, the bend radius R of the C-channel feature 166 is preferably covered by a radius covering portion 554, 556 of the seal 500 (see FIG. 57). A certain deviation 558 from the flatness and the co-planarness may be accommodated by the longitudinal seal 560. The seal 500 may achieve the sufficient degree of the flatness and the co-planarness even though the panels 150 rotate with respect to each other about the axes A2, A3 which are close to the seal. In the depicted embodiment, the axis A2 is positioned within about 0.72 inch below the top 502 of the seal 500 and the top surfaces 150t of the panels 150 when the retractable cover system 100 is in the extended configuration 102. In the depicted embodiment, the axis A3 is positioned within about 0.094 inch above the top 502 of the seal 500 and the top surfaces 150t of the panels 150 when the retractable cover system 100 is in the extended configuration 102.

In other embodiments, the axis A2 may be positioned within about 1.25 inch below the top 502 of the seal 500 and the top surfaces 150t of the panels 150 when the retractable cover system 100 is in the extended configuration 102. In other embodiments, the axis A3 is positioned within about 0.2 inch above the top 502 of the seal 500 and the top surfaces 150t of the panels 150 when the retractable cover system 100 is in the extended configuration 102.

According to the principles of the present disclosure, the positions of the axes A2 and A3 may be standardized throughout the panel assembly 101. Thus, in preferred embodiments, all of the axes A2 are positioned below the top 502 of the seal 500 and/or the top surfaces 150t of the panels 150 by substantially a same distance when the retractable cover system 100 is in the extended configuration 102. Thus, in preferred embodiments, all of the axes A3 are positioned above the top 502 of the seal 500 and/or the top surfaces 150t of the panels 150 by substantially a same distance when the retractable cover system 100 is in the extended configuration 102. Thus, in preferred embodiments, all of the axes A2 are positioned at a same elevation when the retractable cover system 100 is in the extended configuration 102. Thus, in preferred embodiments, all of the axes A3 are positioned at a same elevation when the retractable cover system 100 is in the extended configuration 102.

As depicted, the seal 500 includes a first side 518 that is attached to the C-channel feature 166 of the first panel 150i, a second side 508 that is in sealing contact with the C-channel feature 166 of the second panel 150o when the retractable cover system 100 is in the extended configuration 102, and the top 502. The top 502 extends between the first side 518 and the second side 508 and is substantially co-planar with the top surfaces 150t of the first panel 150i and the second panel 150o when the retractable cover system 100 is in the extended configuration 102. The second side 508 pivots away from the second panel 150o about the pivot axis A2, A3 when the retractable cover system 100 is moved from the extended configuration 102 toward the stowed configuration 104. The second side 508 pivots toward the second panel 150o about the pivot axis A2, A3 when the retractable cover system 100 is moved from the stowed configuration 104 toward the extended configuration 102. As depicted, the seal 500 is a bulb seal and includes a hollow interior 524. As depicted, the seal 500 is a compression seal.

In certain embodiments, the top 502 of the seal 500 is co-planar with the top surfaces 150t of the first and the second panels 150i, 150o within 0.025 inch when the retractable cover system 100 is in the extended configuration 102. In other embodiments, the top 502 of the seal 500 is co-planar with the top surfaces 150t of the first and the second panels 150i, 150o within 0.04 inch when the retractable cover system 100 is in the extended configuration 102. In certain preferred embodiments, cross-sectional voids (e.g., the deviations 558) that may result from non-perfect co-planarness are within about 0.0008 square inch. In certain embodiments, cross-sectional voids that may result from non-perfect co-planarness are within about 0.0035 square inch.

Figure 56:
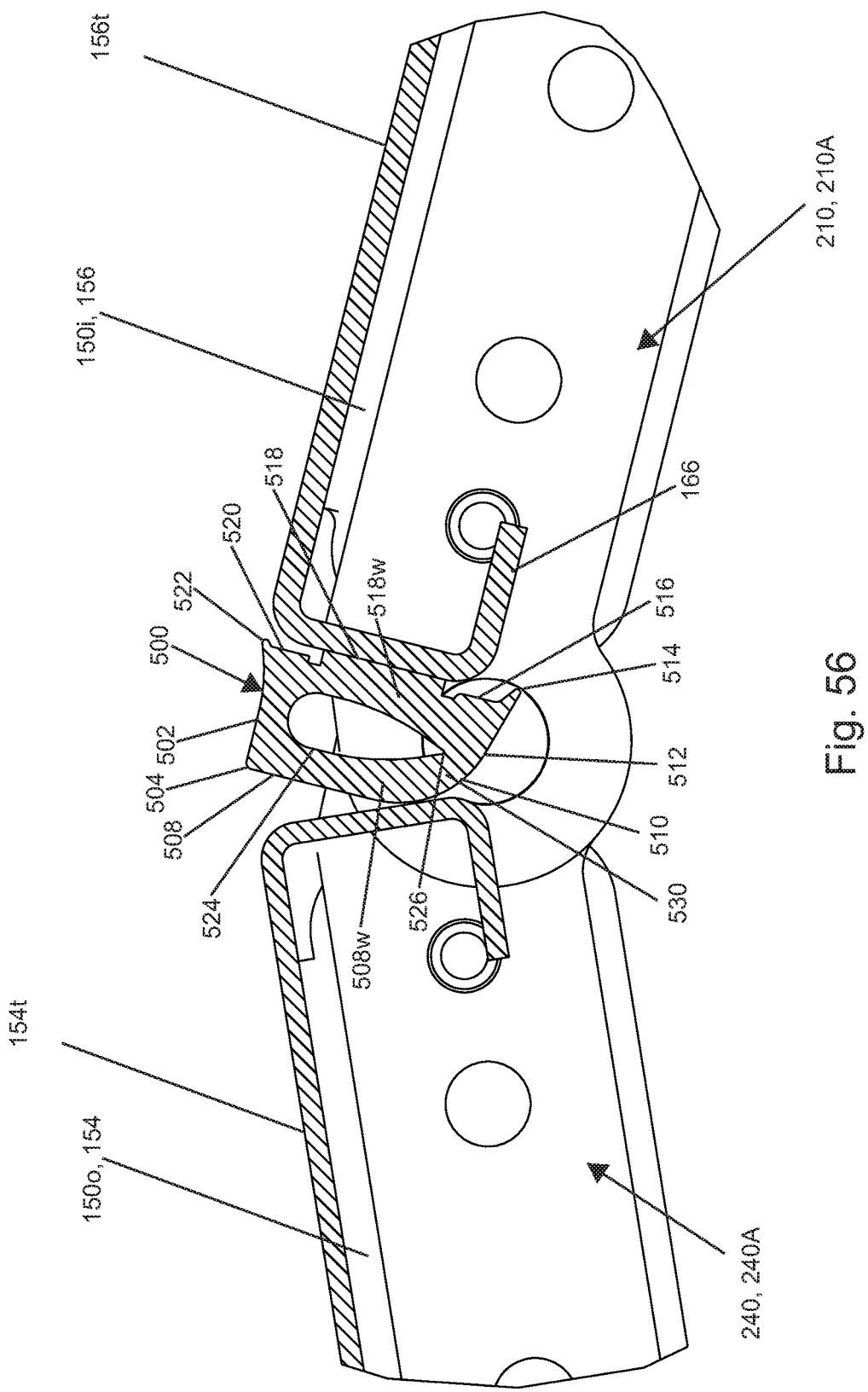
FIG. 56 is a partial cross-sectional left side elevation view illustrating the seal of FIG. 23 positioned between the first and the second panels of FIG. 22 with the first and the second panels joined by the first joint type of FIG. 18 thereby positioning a joint pivot axis below the top surfaces of the first and the second panels.

As illustrated at FIG. 56, the seal 500 includes a support structure 530 for supporting the second side 508 of the seal 500 when the second side 508 pivotally scrubs against the second panel 150o. The support structure 530 thereby holds the top 502 of the seal 500 substantially co-planar with the top surfaces 150t of the first and the second panels 150i, 150o when the retractable cover system 100 is in the extended configuration 102. The support structure 530 may include a thickening of a wall 518w of the first side 518 as the first side 518 extends toward a bottom 512 of the seal 500. The first side 518 and the second side 508 may be connected via the bottom 512. The support structure 530 may include a thickening of a wall 508w of the second side 508 as the second side 508 extends toward the bottom of the seal 500. The bottom 512 of the seal 500 may extend between the first side 518 and the second side 508. A curved portion 510 may transition the bottom 512 and the second side 508 of the seal 500.

The curved portion 510 may be adapted to interface with the second panel 150o when the second side 508 pivotally scrubs against the second panel 150o thereby positioning the top 502 of the seal 500 substantially co-planar with the top surfaces 150t of the first and the second panels 150i, 150o when the retractable cover system 100 is in the extended configuration 102.

Figure 70:
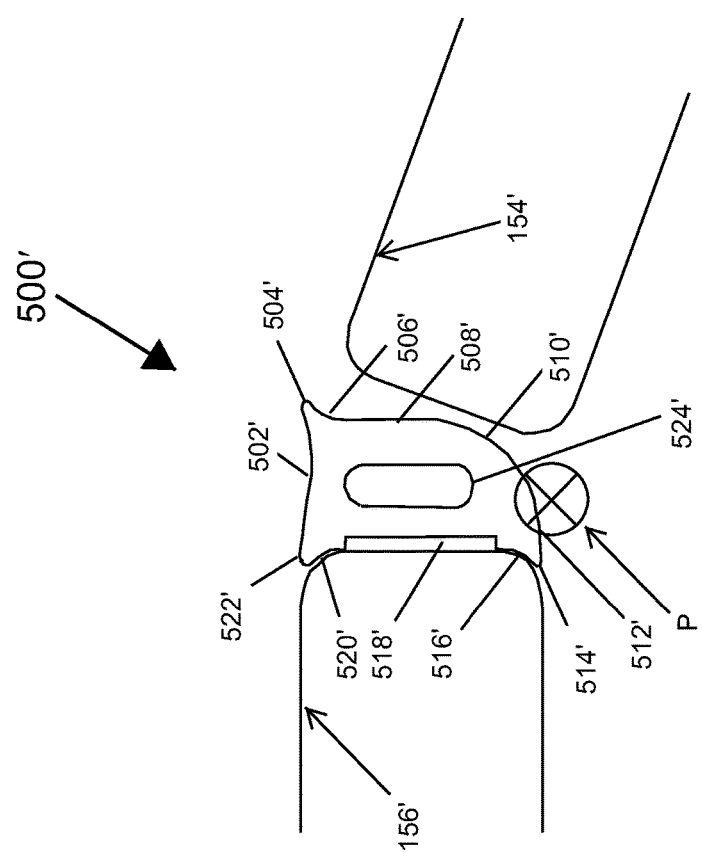
FIGS. 70-73 are a series of cross-sectional images of a seal deforming between two folding panels as the two folding panels fold into one another about a hinge-line positioned below top surfaces of the two folding panels, according to the principles of the present disclosure.
Figure 71:
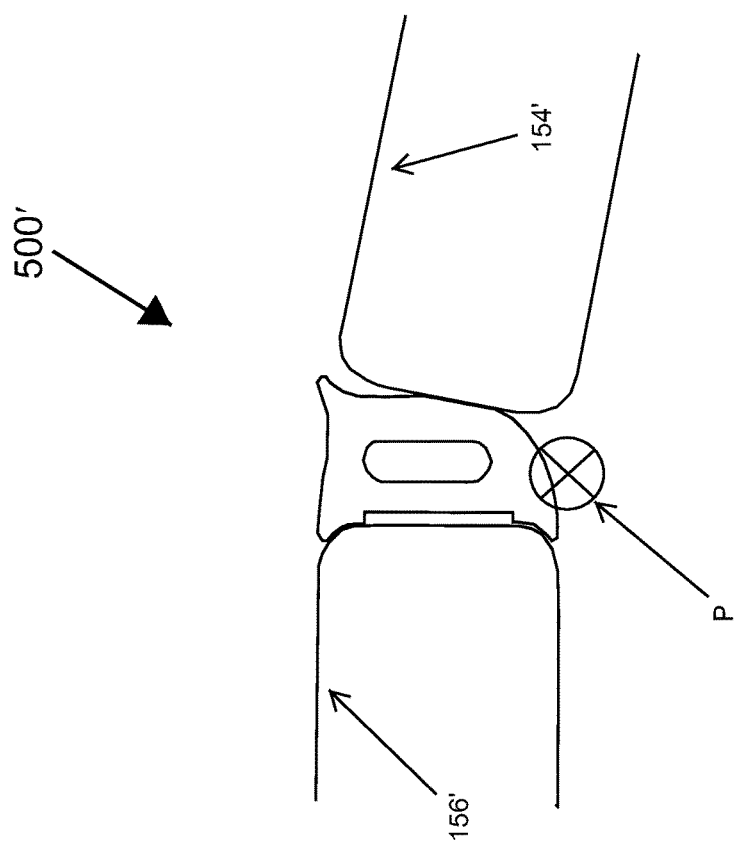
Figure 72:
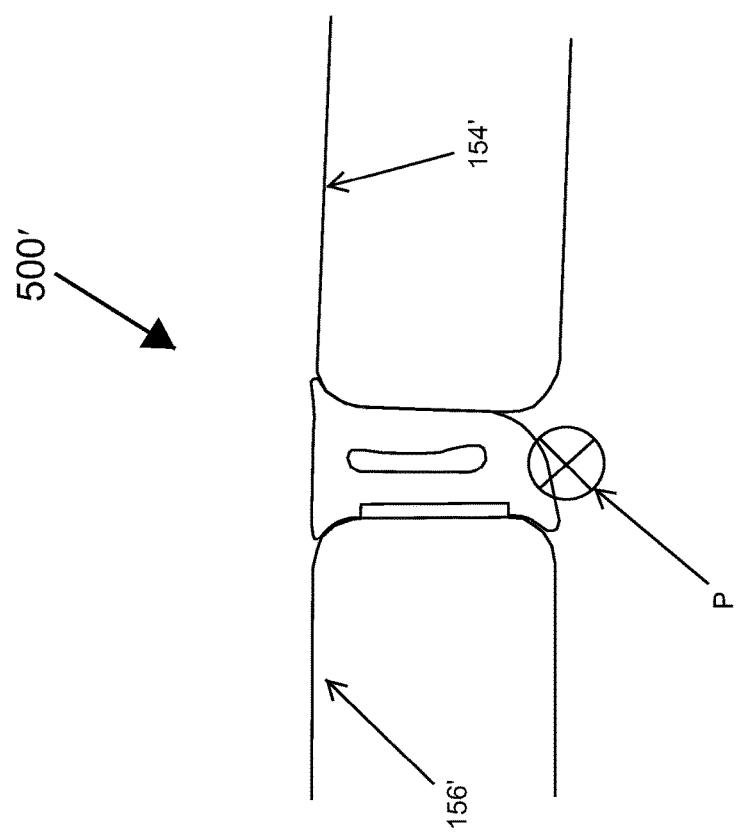
Figure 73:
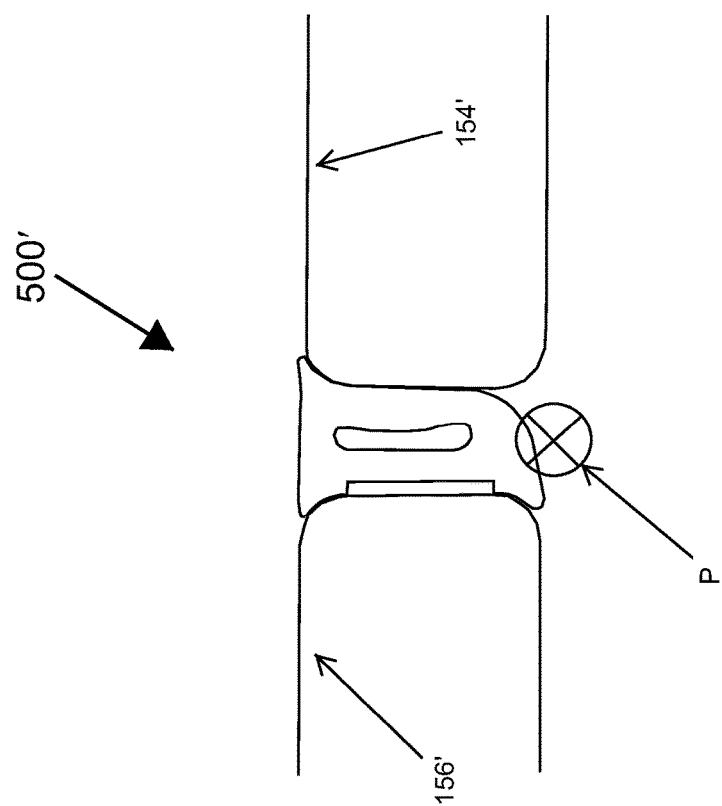
Figure 74:
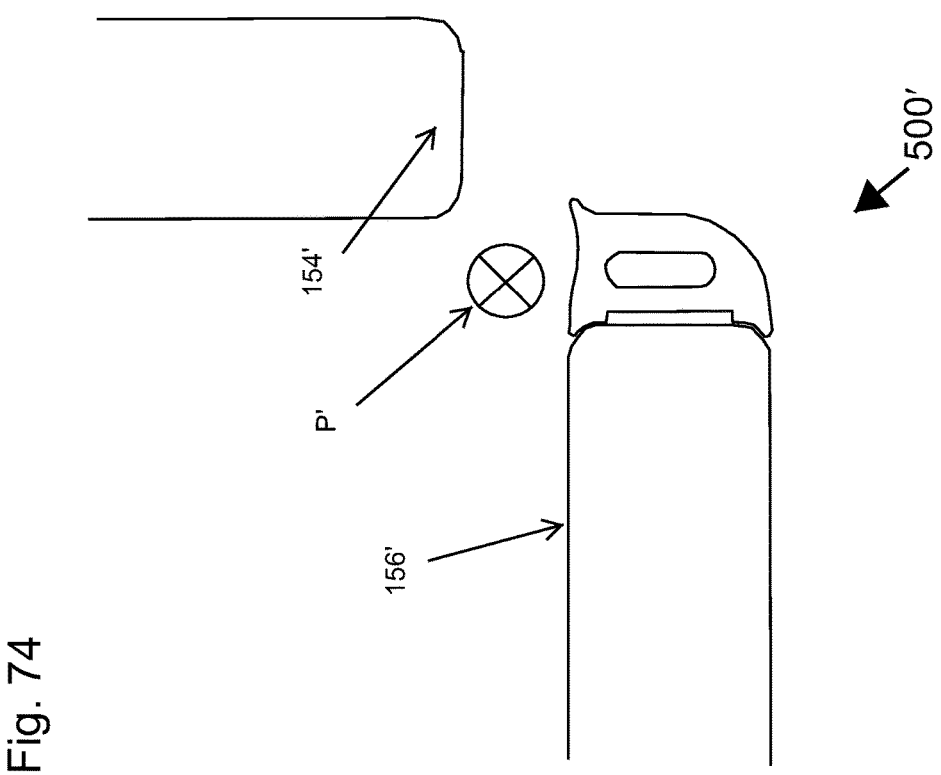
FIGS. 74-80 are a series of cross-sectional images of the seal of FIGS. 70-73 deforming between two folding panels as the two folding panels fold into one another about a hinge-line positioned above top surfaces of the two folding panels, according to the principles of the present disclosure.
Figure 75:
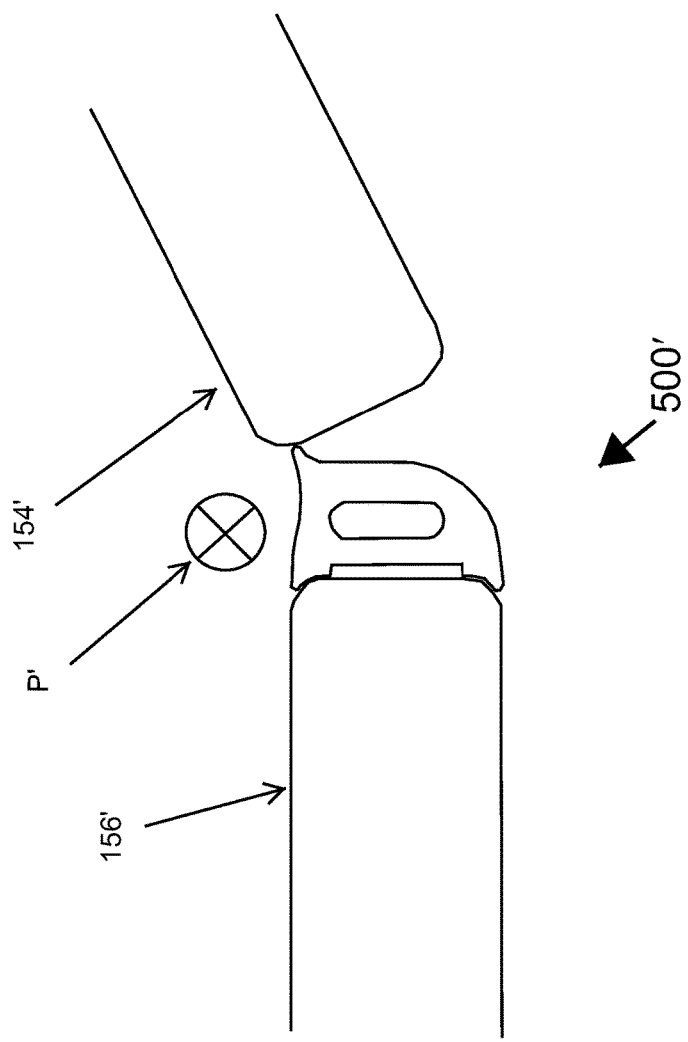
Figure 76:
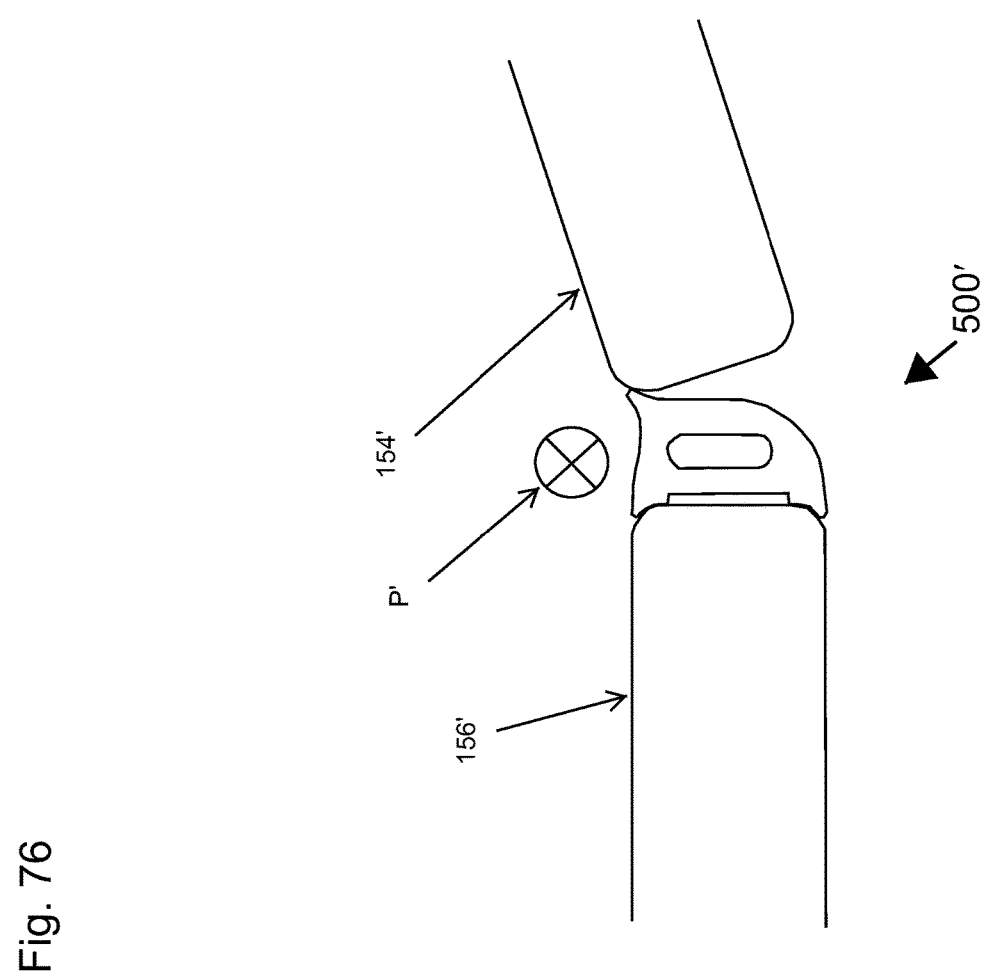
Figure 77:
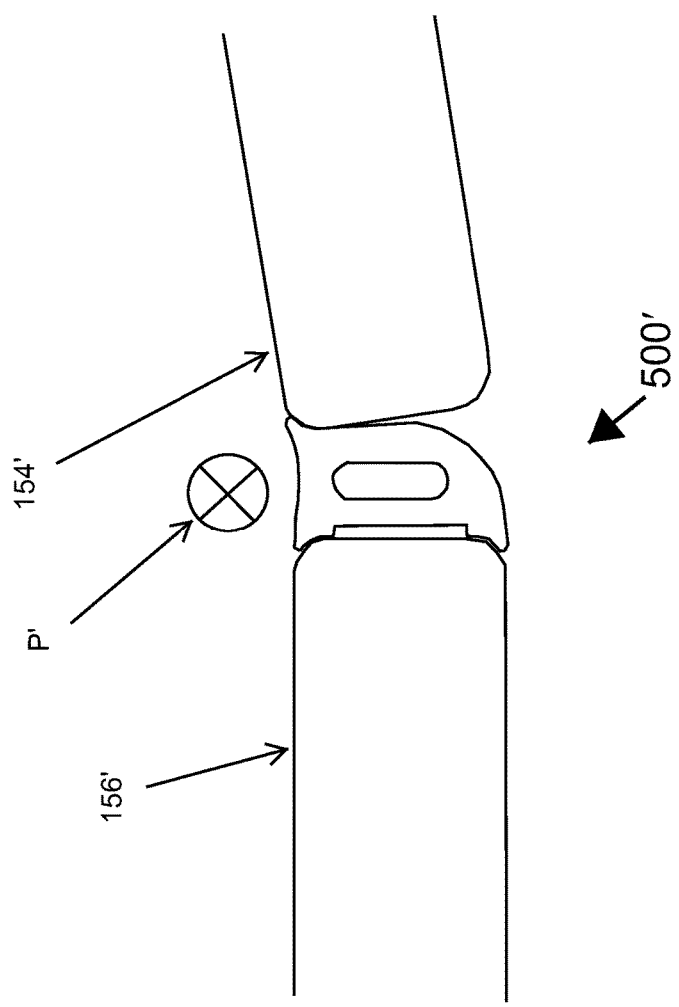
Figure 78:
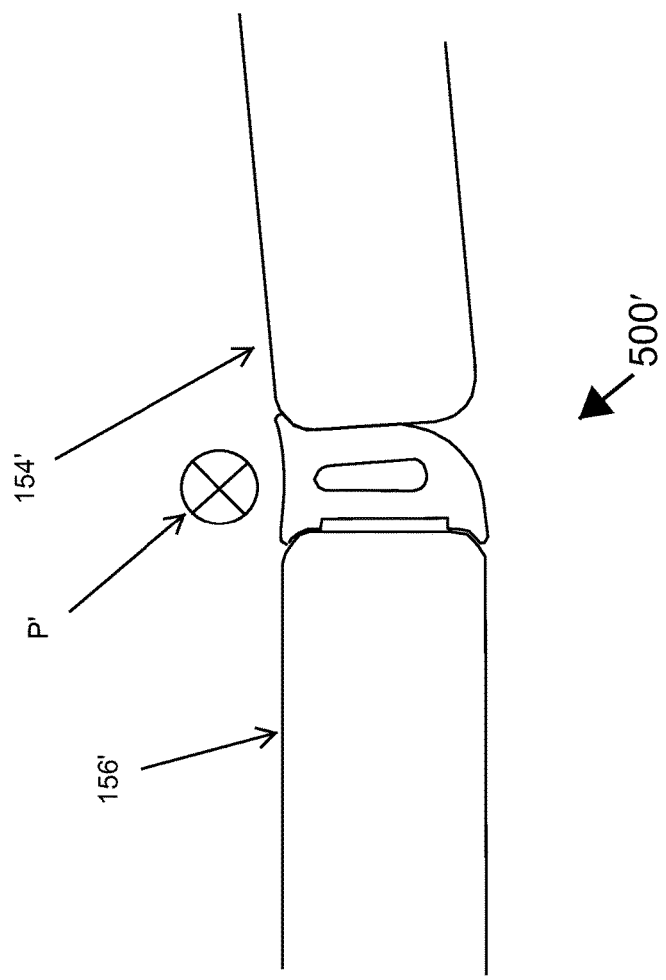
Figure 79:
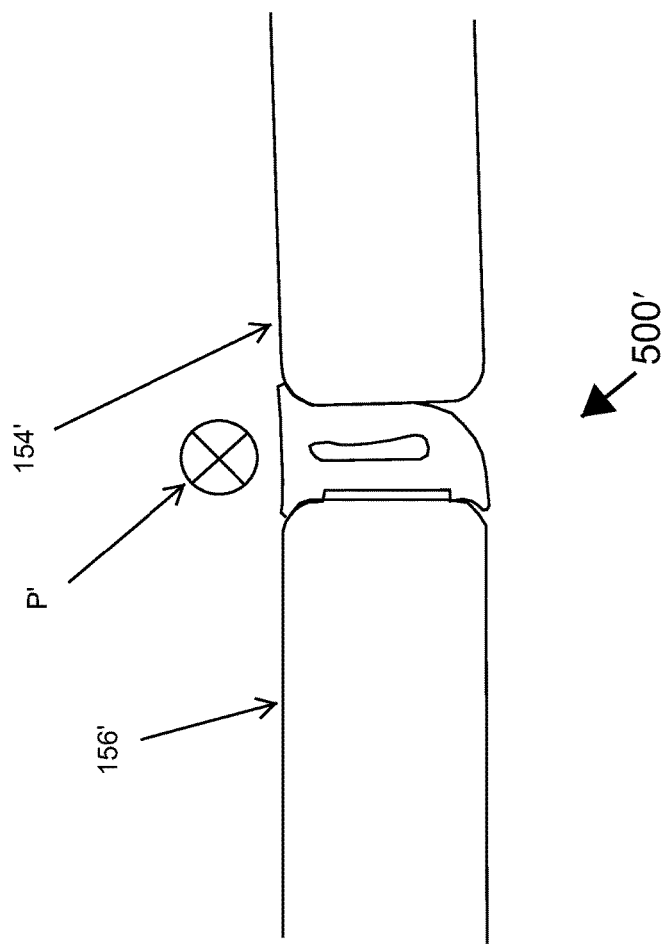
Figure 80:
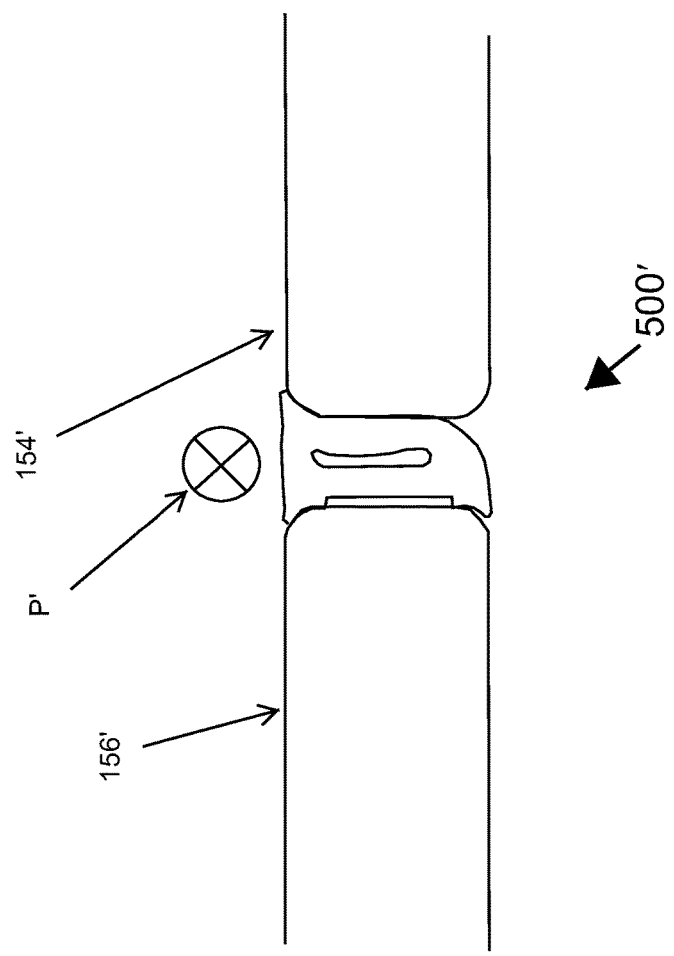
Figure 81:
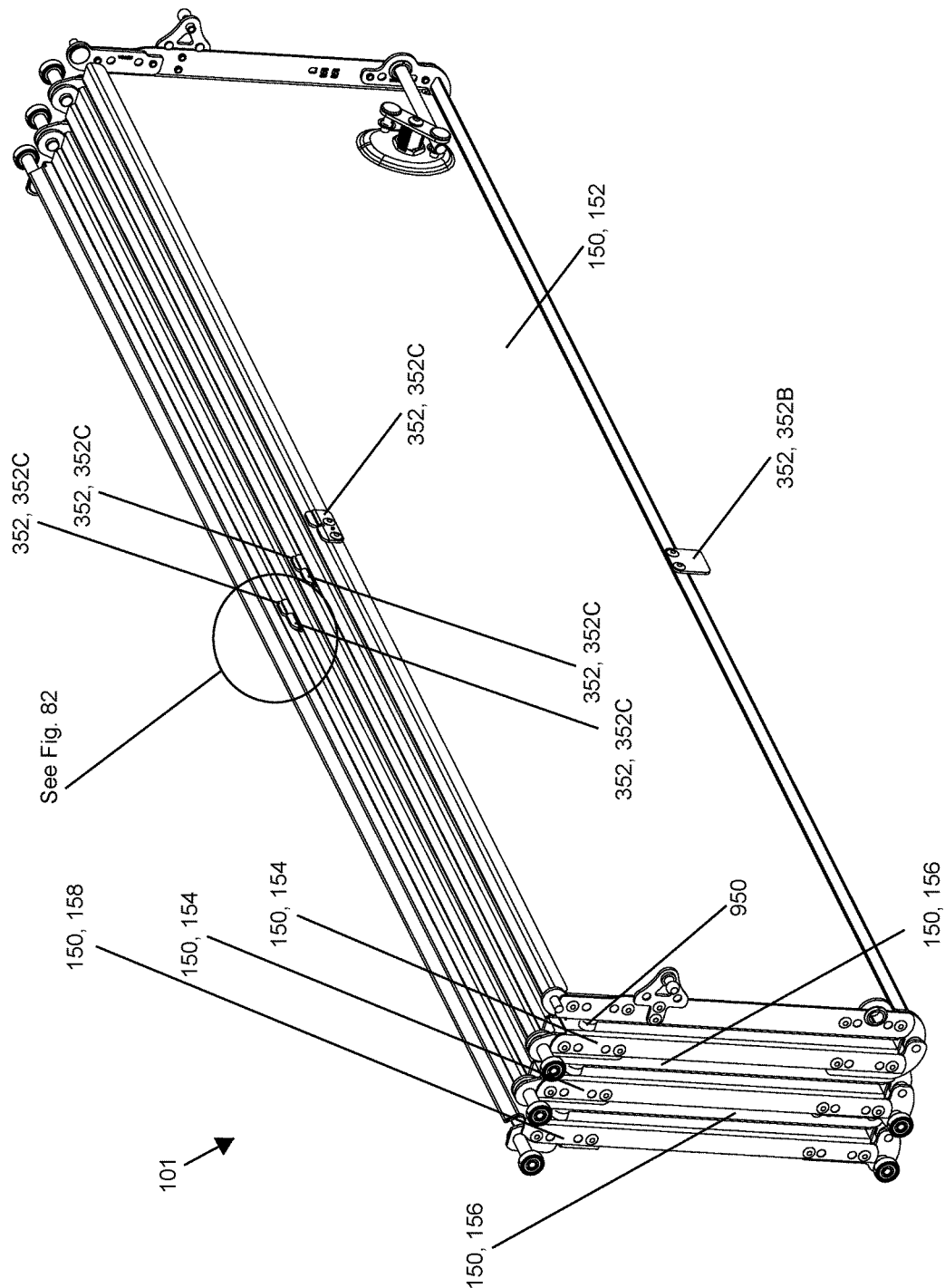
FIG. 81 is a perspective view of the panel assembly of FIG. 8 further illustrating interlocking structures for interlocking panel pairs of the panel assembly according to the principles of the present disclosure, the interlocking structures shown in a decoupled configuration.

As illustrated at FIG. 56, the seal 500 includes a variety of other features that will now be described. A corner 504 between the top 502 and the second side 508 is adapted to cover at least a portion of the bend radius R as it transforms to the radius covering portion 554, as illustrated at FIG. 57. A similar corner 504' is illustrated at FIG. 70 that includes a protrusion. The corner An undercut 506' (see FIG. 70) may be included adjacent the corner 504 on the second side 508 to adapt the corner 504 to cover the bend radius R. A corner 514 is included between the bottom 512 and the first side 518. The corner 514 may include a protrusion. An undercut 516 may be included adjacent the corner 514 on the first side 518. A corner 522 between the top 502 and the first side 518 is adapted to cover at least a portion of the bend radius R as it transforms to the radius covering portion 556, as illustrated at FIG. 57. As depicted, the corner 522 includes a protrusion. An undercut 520 may be included adjacent the corner 522 on the first side 518. As depicted, the hollow interior 524 may include a vertex 526 near the bottom 512. The vertex 526 may form a portion of the support structure 530. The top 502 may be initially curved (e.g. concave) and transform (e.g. deform) into a planar or near-planar surface as illustrated at FIG. 57.

Turning now to FIGS. 70-80, a seal 500', similar to the seal 500, is illustrated. The features of the seal 500 are generally similar to features of the seal 500' and are renumbered by adding a prime ('). FIGS. 70-80 are derived from a finite element analysis of the seal 500' as it is progressively compressed between a first panel 156' and a second panel 154' as the panels 154', 156' pivot toward each other about a pivot P, P'. In particular, FIGS. 70-73 illustrate the seal 500' with the pivot P below top surfaces of the panels 154', 156', and FIGS. 74-80 illustrate the seal 500' with the pivot P' above the top surfaces of the panels 154', 156'. As illustrated, the seal 500' deforms such that the top 502' becomes substantially flat and co-planar with the top surfaces of the panels 154', 156' when compressed (see FIGS. 73 and 80). Images of the seal 500' are included in an appendix that is hereby incorporated by reference in its entirety. The seal 500 is designed to form the flat top 502 when compressed under both configurations of the joint 200A, 200B-C. Likewise, the seal 500' is designed to form the flat top 502' when compressed under both configurations of the pivot P, P'.

Turning now to FIGS. 58 and 59, the quick-attach system 600 will be described in detail. As mentioned above, the panel 152 is pivotally attached to the interface system 105 at the quick-attach system 600. The quick-attach system 600 defines the axis A0 about which the panel 152 is pivotally attached to the interface system 105. The panel assembly 101 is also thereby attached to the interface system 105 at the quick-attach system 600. By releasing the panel assembly 101 from the quick-attach system 600, the panel assembly 101 can be removed from the pickup truck box 80 and thereby free up space in the pickup truck box 80 occupied by the panel assembly 101. As depicted, the panel assembly 101 is preferably moved to the stowed configuration 104 before removing the panel assembly 101 by releasing the quick-attach system 600. Likewise, the panel assembly 101 is preferably in the stowed configuration 104 before reattaching or initially attaching it to the quick-attach system 600.

Figure 65:
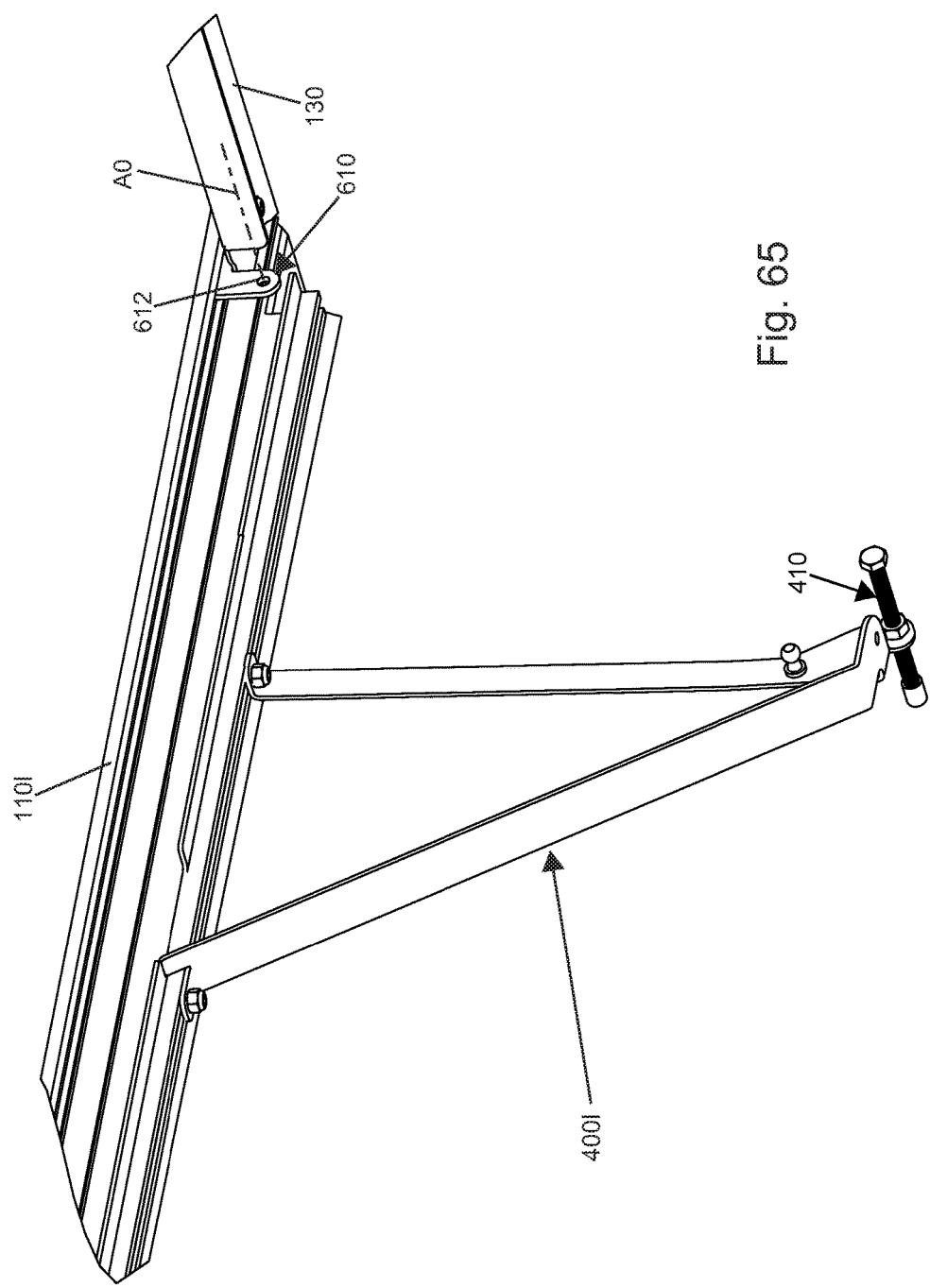
FIG. 65 is an enlarged portion of FIG. 64.
Figure 66:
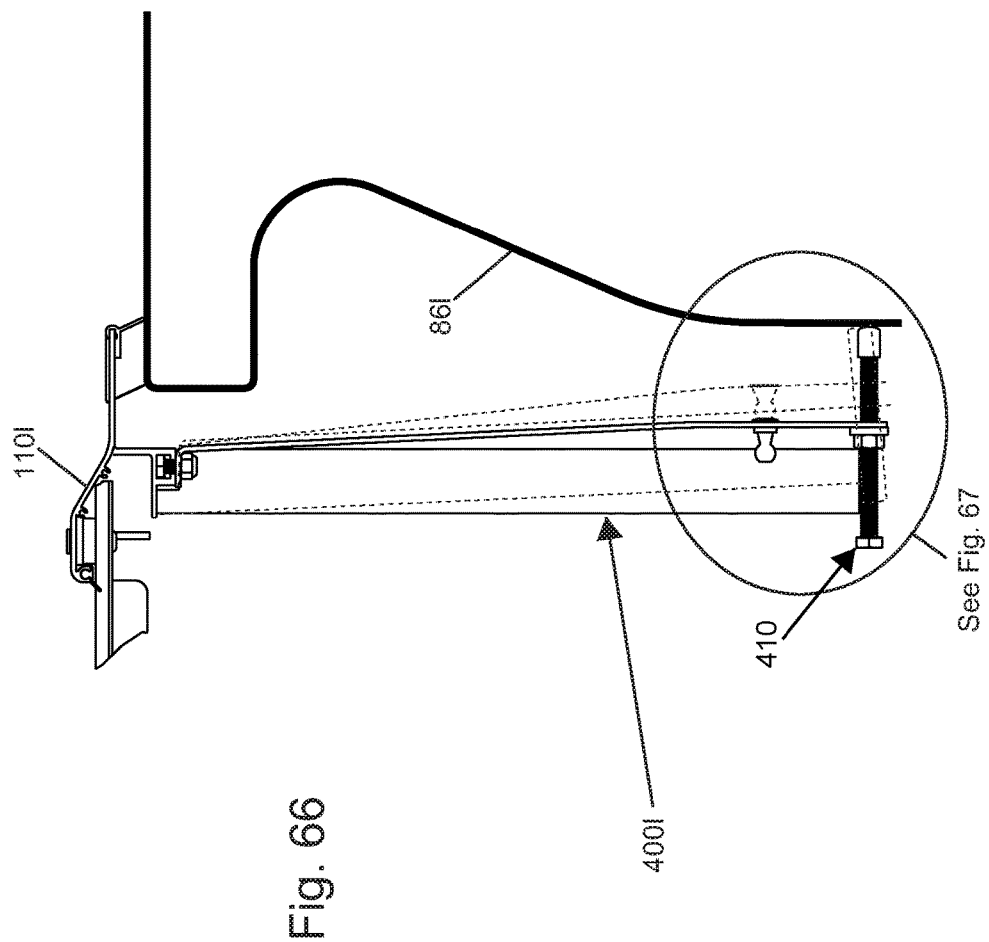
FIG. 66 is a front elevation view of the ramp assembly of FIG. 64 in an adjusted position.
Figure 67:
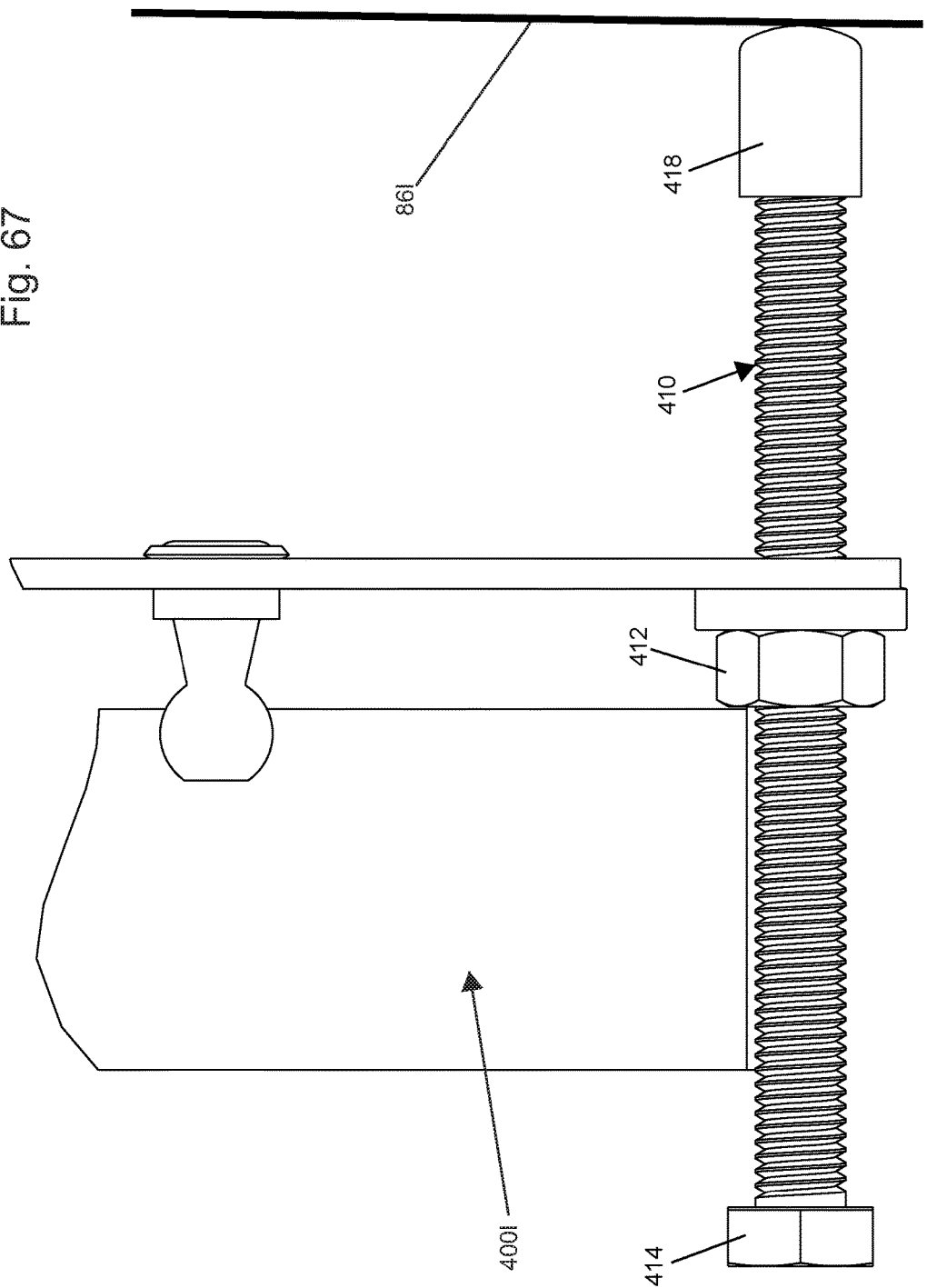
FIG. 67 is an enlarged portion of FIG. 66.

The quick-attach system 600 includes a mounting bracket 610 with a pivot hole 612 (see FIGS. 16 and 65), a mounting bracket 620 with a pivot slot 622 (see FIG. 58), and a release member 630 with a pivot slot 632 (see FIG. 59). The mounting brackets 610, 620 are attached to and part of the interface system 105. The mounting bracket 620 further includes the protrusion 624 and a fastener hole 626. In the depicted embodiment, the protrusion 624 is an obround protrusion and is a single protrusion. In other embodiments, a circular protrusion and/or multiple protrusions may be used. In the depicted embodiment, the release member 630 includes the slot 634 adapted to fit on the protrusion 624 and a fastener hole 636 adapted to be fastened to the fastener hole 626 by a fastener 650. In the depicted embodiment, a single fastener 650 is used. In other embodiments, multiple fasteners 650 may be used. In the depicted embodiment, the fastener 650 is a rivet. The protrusion 624 may be an upset protrusion. The obround protrusion 624, engaged with the slot 634, may transmit shear forces and moments between the mounting bracket 620 and the release member 630.

The release member 630 is preferably made of a spring material and thereby is flexible and can be moved to a release position without yielding the spring material. Upon releasing the release member 630 from the release position, the release member 630 automatically returns to a holding position. A tab 638 may be provided for manually moving the release member 630 to the release position. The tab 638 may further provide a ramp surface 640 for automatically latching the quick-attach system 600 with a shaft 270C of the panel assembly 101 when installing the panel assembly 101 in the pickup truck box 80. When the release member 630 is flexed between the release position and the holding position, the release member 630 may be peeled away from the mounting bracket 620 and the protrusion 624 may slide within the slot 634. The joint between the protrusion 624 and the slot 634, including the rivet 650, thereby provides a compact latch and release mechanism.

To install the panel assembly 101 in the pickup truck box 80 with the quick-attach system 600, a first one of two of the shafts 270C of the panel 152 is inserted into the pivot hole 612 of the mounting bracket 610 at a first side (e.g., a left side) of the panel assembly 101. The first side of the panel assembly 101 is thereby supported by the mounting bracket 610 and is thereby supported by the interface system 105. A second one of the two of the shafts 270C of the panel 152 is then engaged with the ramp surface 640 and thereby moves the release member 630 to the release position. The pivot slot 622 includes lead-in features that facilitate aligning the second one of the two of the shafts 270C into the pivot slot 622 at a second side (e.g., a right side) of the panel assembly 101. The pivot slot 622 may further taper and become tighter as the shaft 270C reaches a bottom of the pivot slot 622. Upon reaching or shortly before reaching the bottom of the pivot slot 622, the pivot slot 632 becomes positioned over the shaft 270C and thereby allows the release member 630 to spring back to the holding position.

The pivot slot 632 is obround and thereby may slide on and off the shaft 270C as it flexes. The pivot slot 622 is open at one end and thereby allows the shaft 270C to enter the pivot slot 622. The pivot slot 632 fits snuggly on the shaft 270C in the fore-aft direction 108, and the pivot slot 622 fits snuggly on the shaft 270C in a vertical direction. By holding the shaft 270C snuggly in the fore-aft direction 108 and in the vertical direction, the quick-attach system 600 aligns an axis A5 of the panel assembly 101 with the axis A0 of the interface system 105 with a desired precision.

To release the panel assembly 101 from the interface system 105, the tab 638 (i.e., a release tab) may be manually moved to the release position and thereby moves the pivot slot off of the shaft 270C. The shaft 270C can thereafter be removed from the pivot slot 622. After the second one of the two of the shafts 270C is freed from the mounting bracket 620, the first one of the two of the shafts 270C may be pulled from the pivot hole 612 of the mounting bracket 610. The panel assembly 101 is thereby free from the interface system 105.

Figure 60:
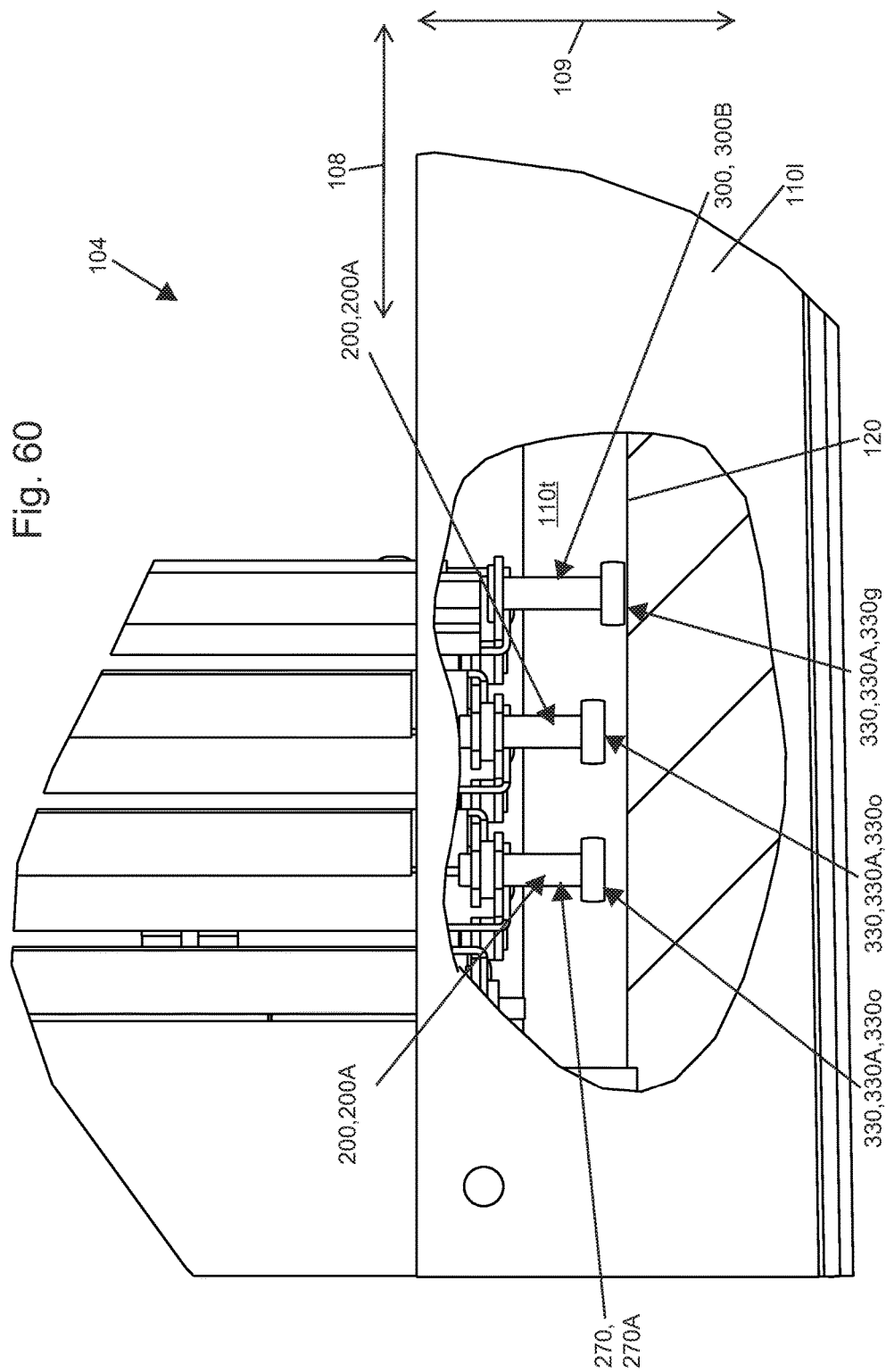
FIG. 60 is an enlarged portion of FIG. 7 illustrating a lateral guide system for the retractable cover system of FIG. 1.
Figure 61:
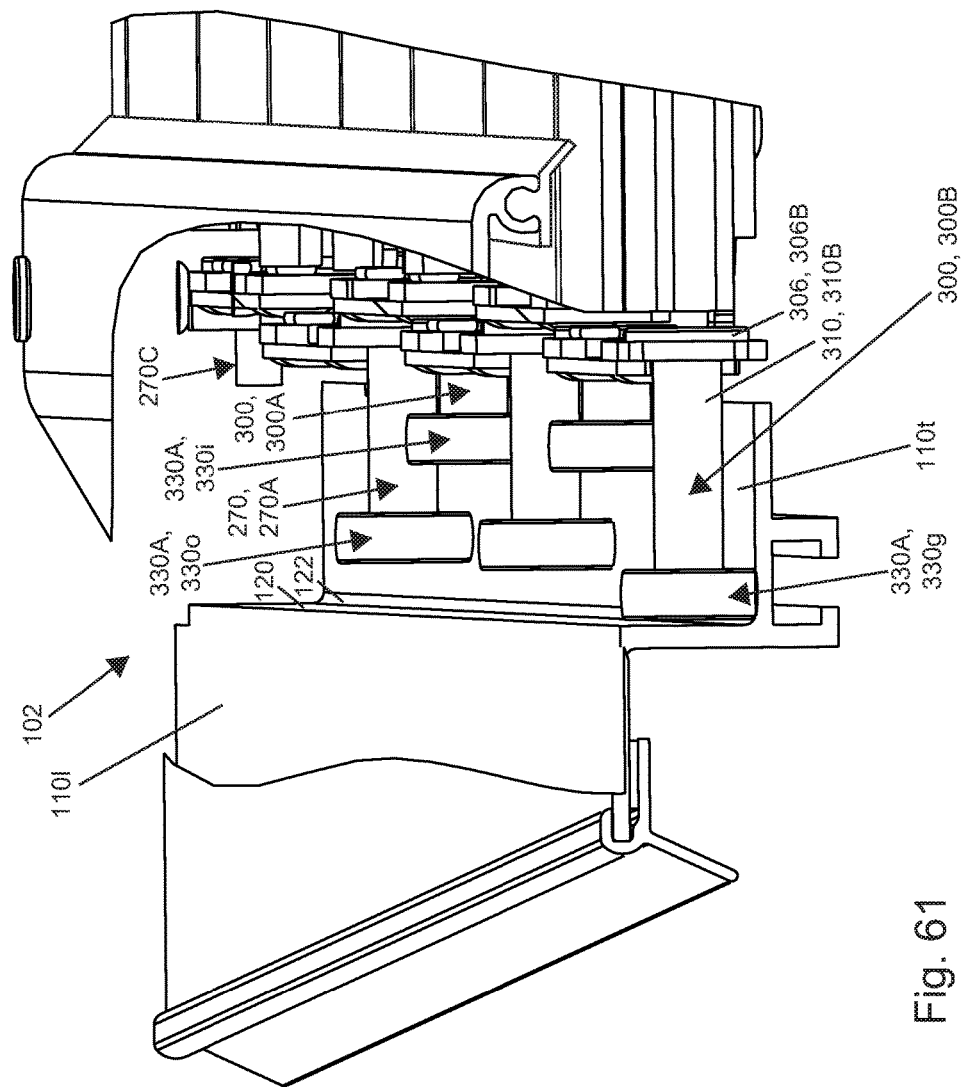
FIG. 61 is an enlarged portion of FIG. 4 further illustrating the lateral guide system of FIG. 60.

Turning now to FIGS. 60-63, a later guide arrangement according to the principles of the present disclosure will be described in detail. As illustrated at FIGS. 60 and 61, the guide elements 330 ride along the track 110t as the panel assembly 101 is moved between the deployed configuration 102 and the stowed configuration 104 in generally the fore-aft direction 108. Clearance may be provided between the guide elements 330 and a wall 120 of the rails 110r, 110l adjacent to the track 110t. A corner 122 may be positioned between the wall 120 and the track 110*t*. The corner 122 may take a form of a radius. The clearance may accommodate manufacturing tolerances of the panel assembly 101.

The clearance, if present at all of the guide elements 330 would leave the guide elements 330 unsupported against force loads with a component in the transverse direction 109. In addition, force loads with a component in the fore-aft direction 108 (e.g., opening and closing loads) that are off-set from a center of the panel assembly 101 may result in a moment load in a horizontal plane being applied to the panel assembly 101 that is reacted by the axis A0. Such force and moment loads may result in binding in the panel assembly 101. Such binding may result in the panel assembly 101 being difficult to open and close (i.e., being moved between the deployed configuration 102 and the stowed configuration 104). As illustrated at FIGS. 60 and 61, one of the guide elements 330, 330*g* is placed in lateral contact with the wall 120, the corner 122, or both. This may be done on the right rail 110*r*, the left rail 110*l*, or both rails 110*r*, 110*l*. The guide element 330*g* thereby receives lateral support from the wall 120, the corner 122, or both. This lateral support may also react moment loads that would otherwise be reacted at the axis A0. Thus, the guide element 330*g*, together with the corner 122 and/or the wall 120 acts as a lateral guide that is positioned on at least one of the first and the second rails 110*r*, 110*l*. The guide element 330*g* also serves as a vertical guide along the track 110*t*.

As the moment loads in the horizontal plane may be reacted by a force couple at the axis A0 and the guide element 330*g*, the guide element 330*g* is preferably a rear-most guide element 330 and thereby has a long moment arm to the axis A0.

In preferred embodiments, a pair of the guide elements 330*g* is positioned opposite each other along the opposite rails 110*r*, 110*l*. As the lateral support is received as a compressive contact load between the guide element 330*g* and the wall 120 or the corner 122, positioning the pair of the guide elements 330*g* accommodates loads along the transverse direction 109 in either direction. In other embodiments, a single guide element may accommodate loads along the transverse direction 109 in either direction (e.g. a V-groove wheel). In embodiments with the single guide element that accommodates such bi-directional loads, the single guide element may be used for lateral support by the panel assembly 101.

In the depicted embodiment, the pair of the guide elements 330A, 330*g* is mounted to the rear-most panel 158 adjacent the rear end 164 of the panel 158 on a pair of shafts 300B. The shaft 300B is similar to, but longer than, the shaft 300A. The shaft 300B is held by a bracket 340 and may be sub-assembled to the bracket 340, as illustrated at FIGS. 50-52. The bracket 340 may exist as a right-hand or a left-hand bracket. The joining of the shaft 300B to the bracket 340 may include a weld portion 312B on the shaft 300B being welded to a weld portion of the bracket 340. The weld portion 312, 312B may be included on a flange 306, 306B of the shaft 300, 300B. The joining of the shaft 300B to the bracket 340 may include a piloting portion of the bracket 340 receiving a pilot 310B of the shaft 300B. As the rear end 164 of the rear-most panel 158 does not pivotally connect to another of the panels 150, no pivot joint 200 is defined. Instead, a right hand and a left hand pair of the brackets 340 are attached to the panel 158 by the fastening arrangement 360 at the right hand and the left hand legs 176 of the panel 158, respectively. The bracket 340 further connects to the C-channel feature 166 at the rear end 164 of the panel 158. The rear end 164 of the panel 158 is thereby reinforced. The guide element 330A may be assembled before or after the bracket 340 is mounted to the panel 158. The guide element 330A may be disassembled and reassembled (e.g., for servicing and/or replacing the guide element 330A) without additional disassembly of the bracket 340 and the panel 158.

Figure 62:
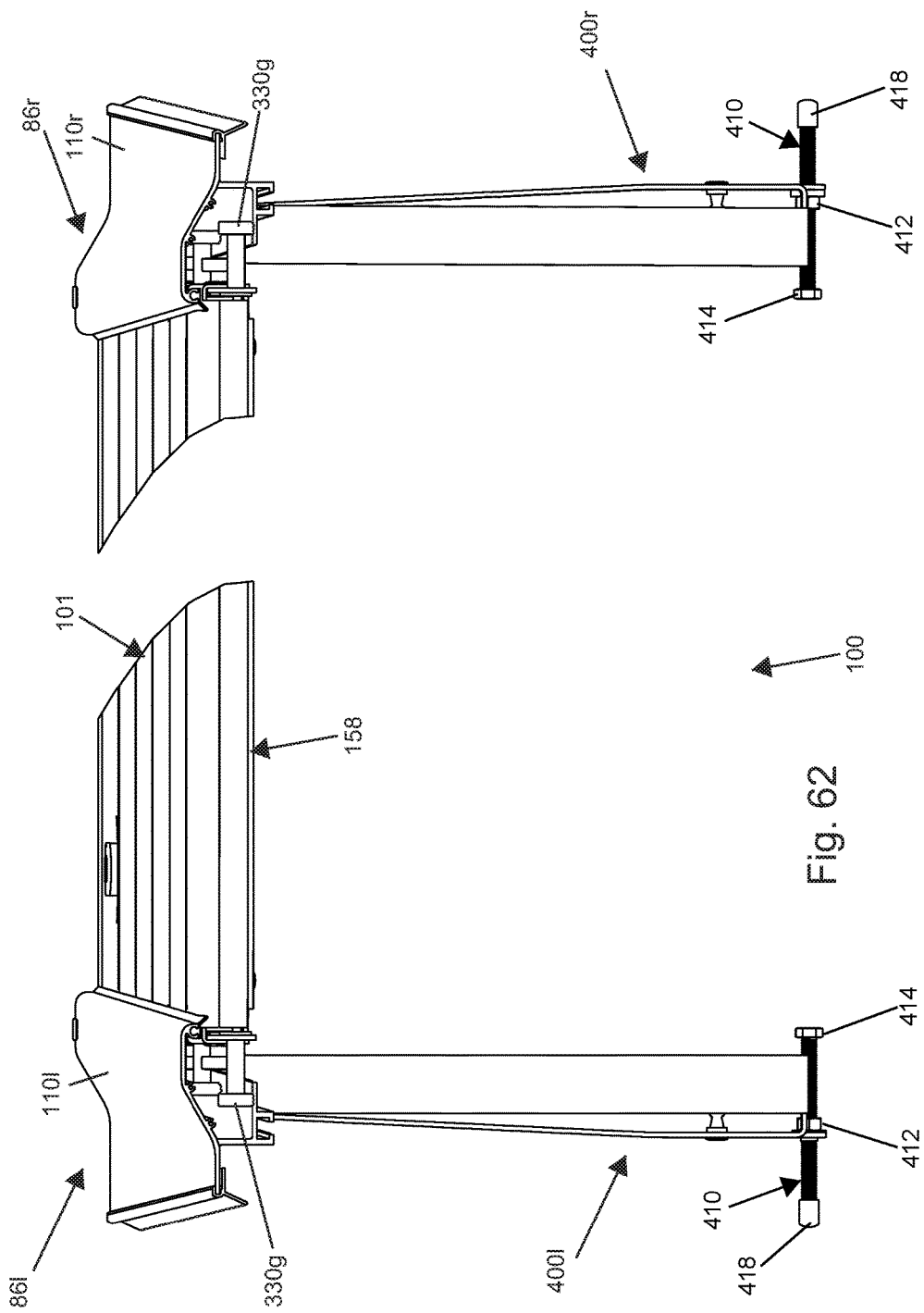
FIG. 62 is a broken rear perspective view of the retractable cover system of FIG. 1 illustrating an initial installation of rails of the retractable cover system before a final adjustment.
Figure 63:
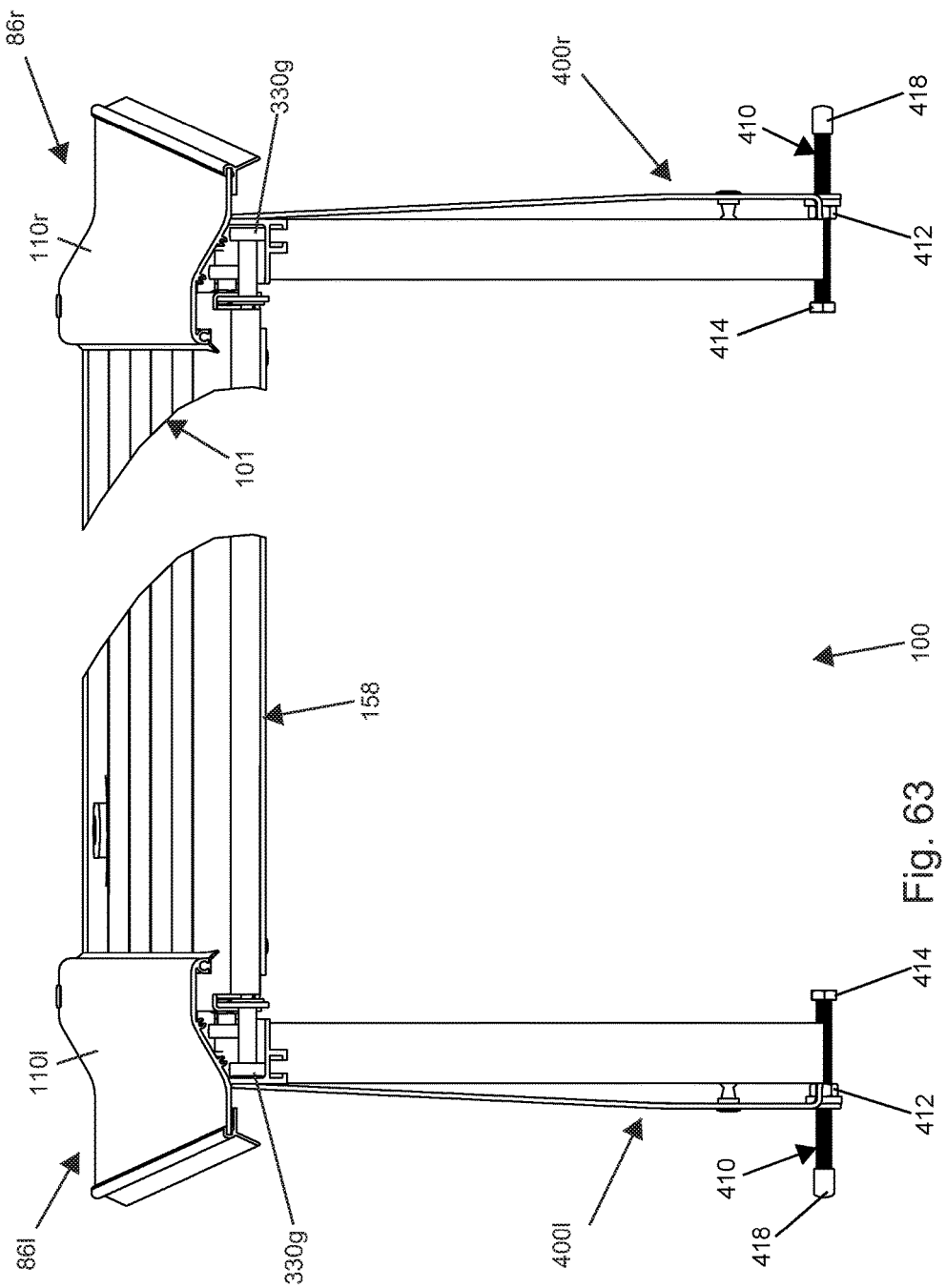
FIG. 63 is similar to the broken rear perspective view of FIG. 62 but with the rails now positioned at a final position.

FIGS. 62 and 63 illustrate a method for adjusting the rails 110*r* and 110*l* according to the principles of the present disclosure. As depicted, the rails 110*r* and 110*l* are a pair of opposing rails 110*r*, 110*l*. The method includes: 1) installing the pair of the opposing rails 110*r*, 110*l*; 2) assembling the folding panel assembly 101 to the pair of the opposing rails 110*r*, 110*l*; and 3) moving each of the opposing rails 110*r*, 110*l* inwardly. The pair of the opposing rails 110*r*, 110*l* is installed over a pair of the opposing side walls 86*r*, 86*l* of the pickup truck box 80. In particular, the right rail 110*r* is installed over the right side 86*r*, and the left rail 110*l* is installed over the left side 86*l*. This installation may be part of the installation of the interface system 105. The folding panel assembly 101 is assembled to the pair of the opposing rails 110*r*, 110*l* by respectively engaging a pair of opposing sets of the guide elements 330 with a pair of the tracks 110*t* of the opposing rails 110*r*, 110*l*. Each of the opposing sets of the guide elements 330 includes one of the lateral guide elements 330*g* that extends outwardly beyond the other guide elements 330. As illustrated at FIG. 63, each of the opposing rails 110*r*, 110*l* is moved inwardly until the wall 120, the corner 122, or both contacts the respective extended guide element 330*g*. As depicted, the extended guide element 330*g* is a rearmost guide element 330*g*.

As depicted, the rail 110*l* may pivot about an axis A6*l*, and the rail 110*r* may pivot about an axis A6*r*. The moving of the rails 110*l*, 110*r* inwardly may be accomplished by rotationally moving the rails 110*l*, 110*r* inwardly about the axes A6*l*, A6*r*, respectively. The axes A6*l*, A6*r* are located on a forward end of the rails 110*l*, 110*r*. The front cross-member 130 may accurately establish positions of the axes A6*l*, A6*r*. The rails 110*l*, 110*r* are thereby rotatable about the front cross-member 130 of the retractable cover system 100. The front cross-member 130 may be attached to the pickup truck box 80. The extended guide element 330*g* and the front cross-member 130 may thereby function together as a jig to locate the rails 110*r*, 110*l* on the pickup truck box 80.

FIGS. 63-67 illustrate the ramps 400*r*, 400*l* as adjustable ramps 400*r*, 400*l* according to the principles of the present disclosure. Upon adjusting the rails 110*r*, 110*l*, as described above, the ramps 400*r*, 400*l* are preferably adjusted to align with the inner guide elements 330*i*. The ramps 400*r*, 400*l* are mounted to a respective one of the rails 110*r*, 110*l* such that an inner portion of the tracks 110*t* aligns with a corresponding one of the tracks 400*t* of the ramps 400*r*, 400*l* (see FIGS. 6, 16, and 17).

Alignment at an adjacent upper portion 402 of the ramps 400*r*, 400*l* adjacent the tracks 110*t* may occur by virtue of the fastening arrangement. However, lower portions 404 of the ramps 400*r*, 400*l* may need adjustment to align with the inner guide elements 330*i* along the path 106B. Jacking screws 410 may be provided for the purpose of adjusting the ramps 400*r*, 400*l*. The jacking screws 410 may also provide support for the ramps 400*r*, 400*l*. The ramps 400*r*, 400*l* may be adjusted by bending the ramps 400*r*, 400*l* with the jacking screws 410. The ramps 400*r*, 400*l* may be initially positioned (e.g., biased) outwardly and out of alignment with the guide elements 330*i*. The jacking screws 410 may jack against the sides 86*r*, 86*l* of the pickup truck box 80 and thereby bend the ramps 400*r*, 400*l* inwardly until they are aligned with the inner guide elements 330*i*. The ramps 400*r*, 400*l* may be formed with an outward bias. The ramps 400*r*, 400*l* may be formed of one piece of sheet metal. The jacking screws 410 may threadingly engage the ramps 400*r*, 400*l*. A locknut 412 may be provided to secure the threaded connection between the ramps 400*r*, 400*l* and the jacking screws 410. A head 414 (i.e., a hex head) may be provided on the jacking screw 410 to adapt the jacking screw 410 to be turned by a wrench and/or a socket. A foot 418 (e.g., a rubber cap) may be placed on the jacking screw 410 to protect the sides 86*r*, 86*l* of the pickup truck box 80 from scratches, etc.

No cross-member is needed to directly link the lower portion 404 of the ramp 400*r* with the lower portion 404 of the ramp 400*l*. The retractable cover system 100 does not need structure between the lower portion 404 of the ramp 400*r* and the lower portion 404 of the ramp 400*l*.

FIGS. 10, 43, 44, 46, and 47 illustrate the locking system 900 for the retractable cover system 100. The locking system 900 includes a locked configuration that locks the retractable cover system 100 in the extended configuration 102 and an unlocked configuration that allows the retractable cover system to be moved between the extended configuration 102 and the stowed configuration 104.

The locking system includes a lock mount 902, a rotatable portion 904, a right guide 906, a left guide 908, the right lock rod 920*r*, and the left lock rod 920*l* (see FIG. 10). The lock mount 902 is positioned on the panel 152. The rotatable portion 904 is rotatably mounted to the lock mount 902 about an axis. The rotatable portion 904 includes an arm 922 with a first connection 932 and a second connection 934. The rotatable portion 904 is moveable between a locked position and an unlocked position. The right guide 906 is positioned on a right side of the panel 152. The right guide 906 may include a bushing 940 mounted in the opening 930 of the first member 210C of the joint 200C. The left guide 908 is positioned on a left side of the panel 152. The left guide 908 may include another bushing 940 mounted in the opening 930 of the first member 210C of the joint 200C. The right lock rod 920*r* is pivotally connected to the first connection 932 and is slidingly connected to the right guide 906. The left lock rod 920*l* is pivotally connected to the second connection 934 and slidingly connected to the left guide 908. When the rotatable portion 904 is moved to the locked position from the unlocked position, the arm 922 urges a right end of the right lock rod 920*r* to extend beyond the right guide 906 and enter the right rail 110*r*. When the rotatable portion 904 is moved to the locked position from the unlocked position, the arm 922 urges a left end of the left lock rod 920*l* to extend beyond the left guide 908 and enter the left rail 110*l*.

When the rotatable portion 904 is moved to the unlocked position from the locked position the arm 922 urges the right end of the right lock rod 920*r* to retract from the right rail 110*r* and urges the left end of the left lock rod 920*l* to retract from the left rail 110*l*. When the right end enters the right rail 110*r* the right end is positioned over the right track 110*t* and when the left end enters the left rail 110*l* the left end is positioned over the left track 110*t*.

Figure 68:
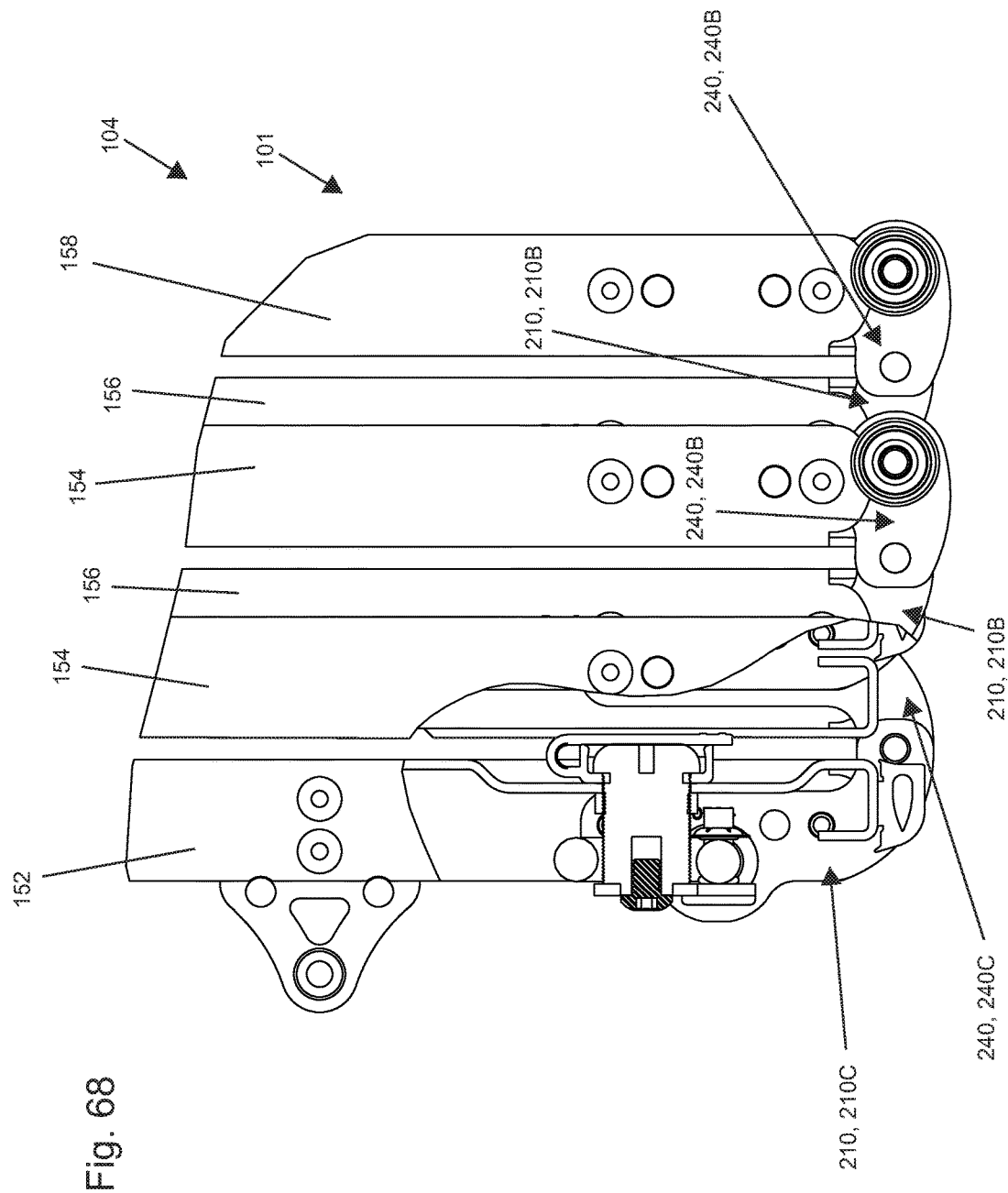
FIG. 68 is an enlarged portion of FIG. 6 illustrating a lock assembly positioned partially into a recess of a panel and further illustrating the panel assembly of FIG. 8 compactly arranged in the stowed configuration of FIG. 5.
Figure 69:
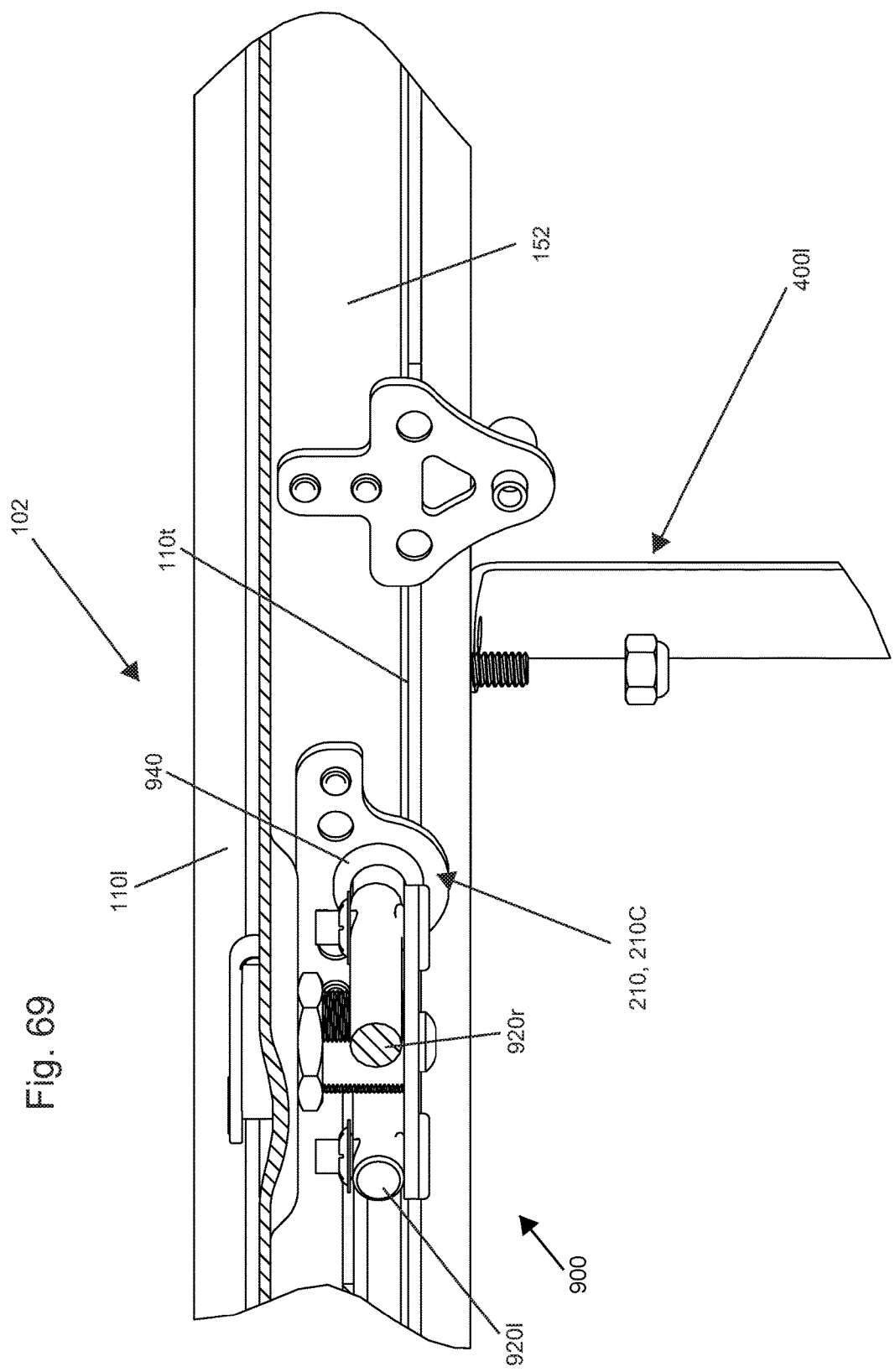
FIG. 69 is a partial cross-sectional perspective view illustrating lock rods of the lock assembly of FIG. 68 and their position with respect to the rails of FIG. 62.

The lock mount 902 may be positioned within a recess 938 of the panel 152, and the rotatable portion 904 may be at least partially positioned with the recess 938 of the panel 152. The right and the left lock rods 920*r*, 920*l* are substantially contained within a side panel profile of the panel 152 (see FIG. 68).

Figure 112:
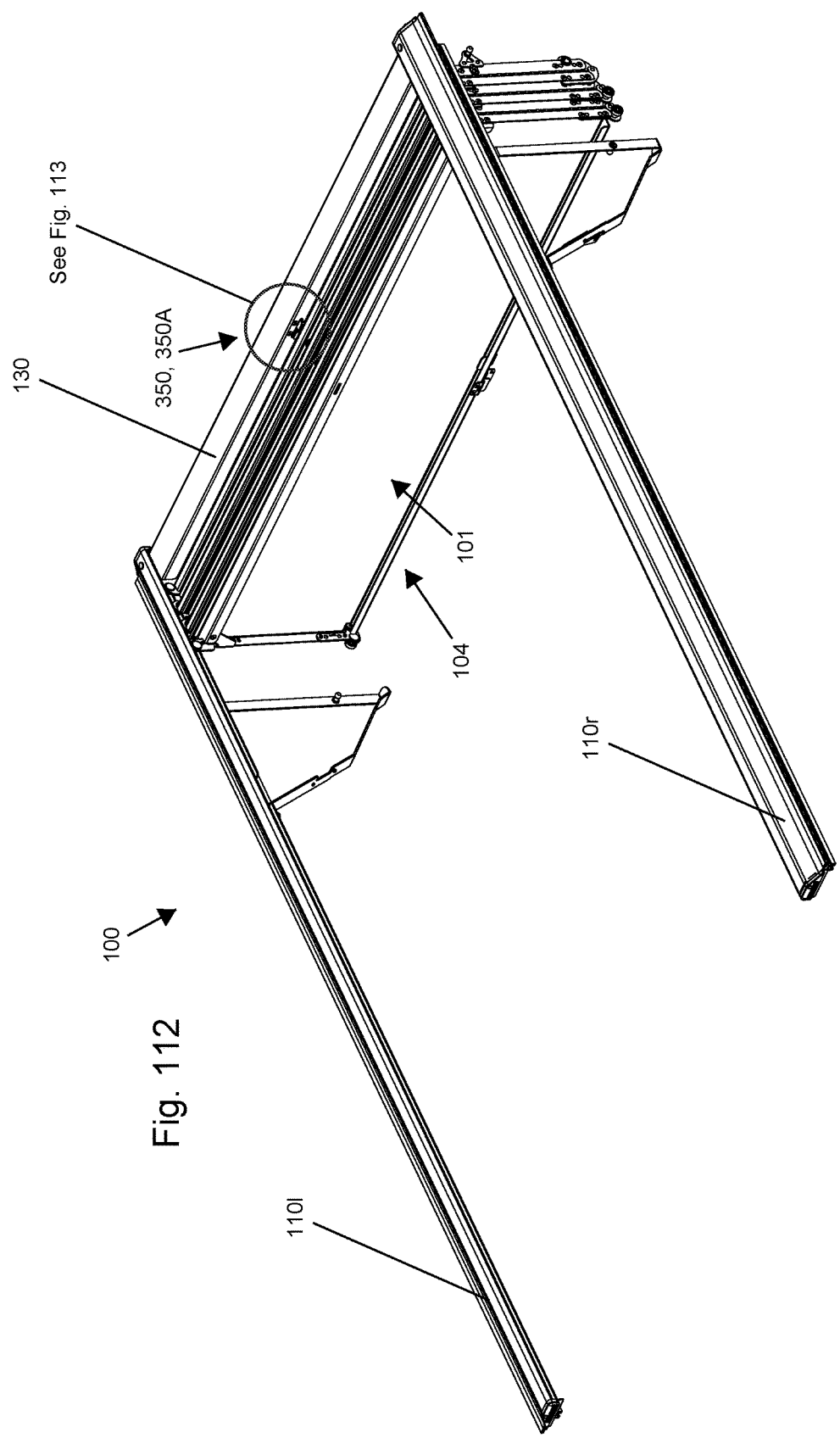
FIG. 112 is a perspective view of the retractable cover system of FIG. 1 further illustrating yet other interlocking structures for interlocking a panel of the panel assembly of FIG. 8 to a front cross-member of the retractable cover system according to the principles of the present disclosure, the interlocking structures shown in a decoupled configuration.
Figure 113:
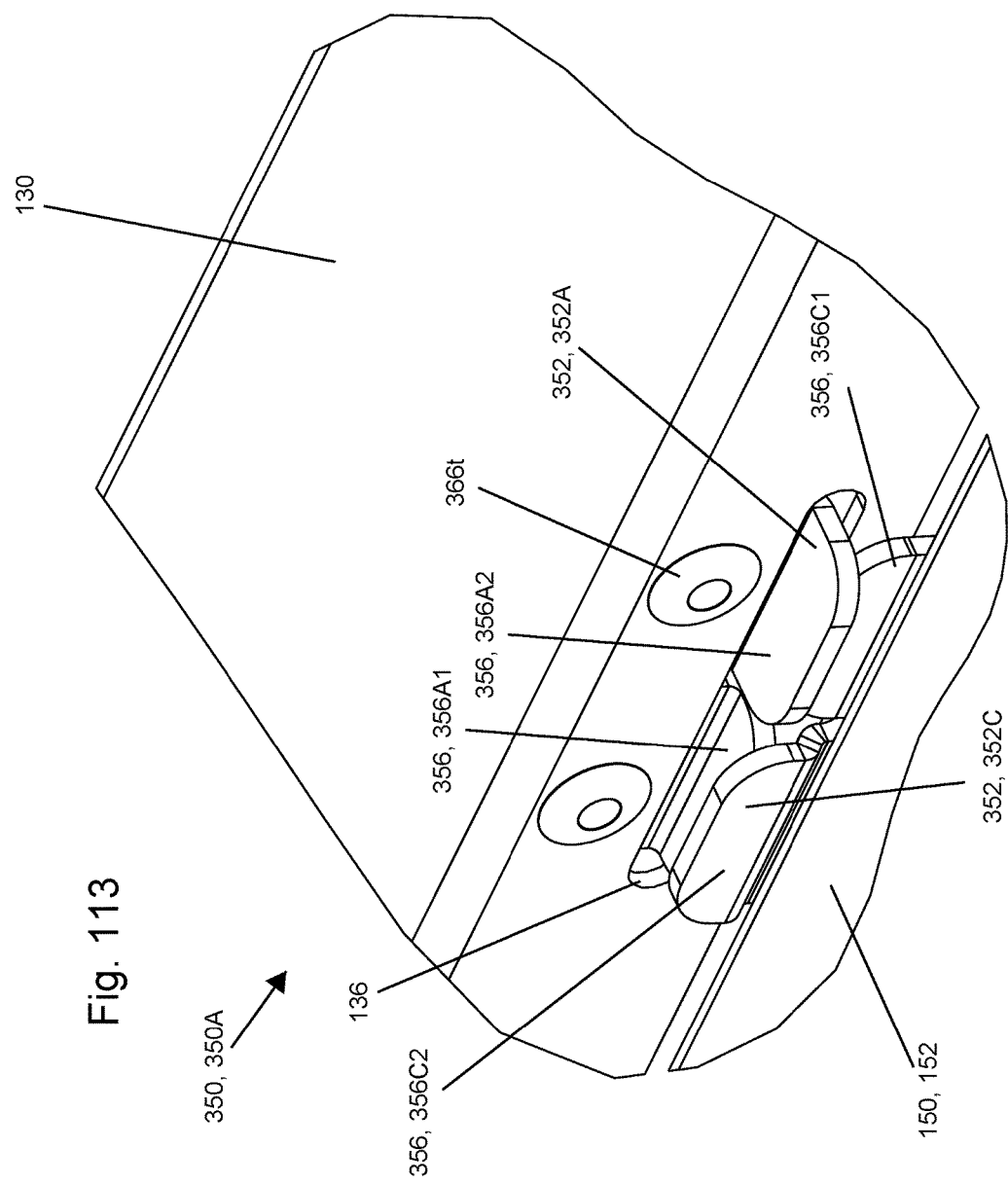
FIG. 113 is a partial perspective view of the interlocking structures of FIG. 112 shown in the decoupled configuration.
Figure 114:
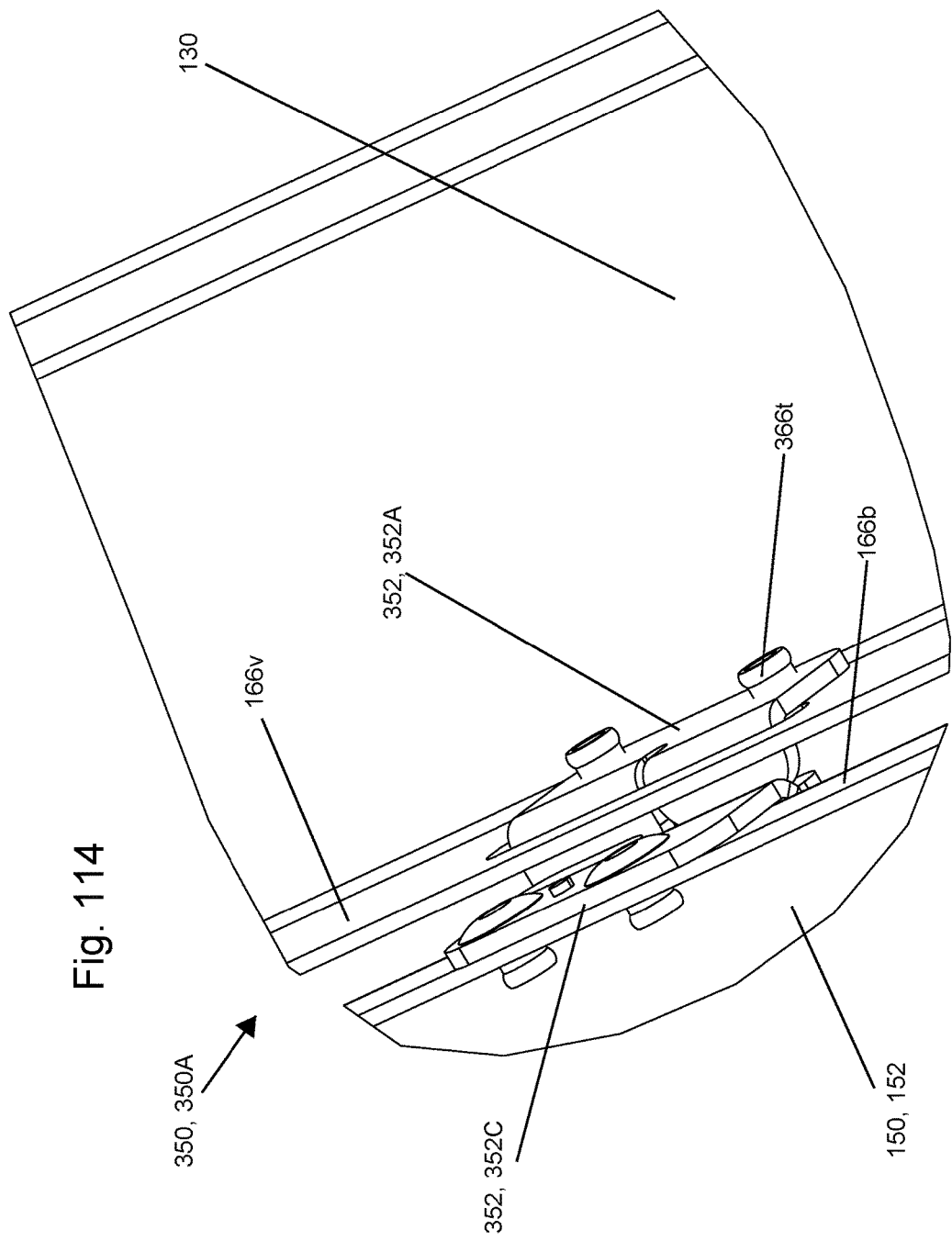
FIG. 114 is another partial perspective view of the interlocking structures of FIG. 112 shown in the decoupled configuration.

Turning now to FIGS. 81-120, connecting structures 350 for the retractable cover system 100 are illustrated according to the principles of the present disclosure. In particular, a connecting structure 350A of the connecting structures 350 is illustrated at FIGS. 112-120. As illustrated at FIGS. 112 and 113, the connecting structure 350A interconnects the panel 152 to the front cross-member 130. FIGS. 93-101 illustrate a connecting structure 350B of the connecting structures 350. As illustrated at FIG. 96, the connecting structure 350B interconnects a panel pair 250 that includes the panel 152 and the panel 154. The connecting structure 350B also interconnects a panel pair 254 that includes the panel 156 and the panel 154. The connecting structure 350B may be used between the panel pair 250 and the panel pair 254 in substantially the same way. FIGS. 82-91 illustrate a connecting structure 350C of the connecting structures 350. As illustrated at FIG. 85, the connecting structure 350C interconnects a panel pair 252 including the panel 154 and the panel 156. The connecting structure 350C also interconnects a panel pair 256 including the panel 154 and the panel 156. The connecting structure 350C may be used between the panel pair 252 and the panel pair 256 in substantially the same way. FIGS. 104-111 illustrate a connecting structure 350D of the connecting structures 350. As illustrated at FIG. 106, the connecting structure 350D interconnects a panel pair 258 including the panel 156 and the panel 158. The panel pairs 250, 252, 254, 256, and 258 are each generically a panel pair 260.

Thus, the connecting structures 350 are arranged from a front to a rear of the panel assembly 101 as follows: the connecting structure 350A interconnects a first joint between the panel assembly 152 and the front cross-member 130; a second joint between the panels 152 and 154 is interconnected by a first of the connecting structure 350B; a third joint between the panels 154 and 156 is interconnected by a first of the connecting structure 350C; a fourth joint between the panels 156 and 154 is interconnected by a second of the connecting structure 350B; a fifth joint between the panels 154 and 156 is interconnected by a second of the connecting structure 350C; and a sixth joint between the panels 156 and 158 is interconnected by the connecting structure 350D. In the depicted embodiments, the panel assembly 101 includes six of the panels (1) 152, (2) 154, (2) 156, (1) 158. In other embodiments, the panel assembly 101 may include eight of the panels (1) 152, (3) 154, (3) 156, (1) 158, similarly connected in this sequence—152, 154, 156, 154, 156, 154, 156, and 158. In embodiments with eight of the panels 150, an additional copy of the pair 254 of the panels 156, 154 may thus be added along with one of the connecting structures 350B and one of the connecting structures 350C.

In certain embodiments, all of the joints of the preceding paragraph include connecting structures 350. In other embodiments, one or more of the joints may include the connecting structures 350 while other of the joints may not include the connecting structures 350. As depicted, a single one of the connecting structures 350 is positioned substantially centered along the width W of each of the panels 150 (see FIG. 8). In other embodiments, a plurality of the connecting structures may be used between each of the pairs 260 of the panels 150. In other embodiments, the single one of the connecting structures 350 is not necessarily positioned substantially centered along the width W of each of the panels 150.

As depicted, the connecting structures 350 each include a first bearing surface 354 and a second bearing surface 354 that work together to structurally connect the panels 150 of the panel pairs 260. The first bearing surface 354 is kinematically part of a first panel of one of the adjacent pairs 260 of panels 150. The second bearing surface 354 is kinematically part of a second panel of the adjacent pairs 260. Likewise, the connecting structure 350A includes a first bearing surface 354 that is kinematically part of the front cross-member 130 and a second bearing surface 354 that is kinematically part of the panel 152. The first and the second bearing surfaces 354 bear against each other and thereby structurally connect the corresponding panels 150 of the panel pairs 260 when the retractable cover system 100 is in the deployed configuration. When the retractable cover system 100 is moved toward the retracted configuration 104, the first and the second bearing surfaces 354 disengage from each other and thereby disconnect the connecting structure 350 from the corresponding adjacent pair 260.

As depicted, when in a connected configuration, one of the first and the second bearing surfaces 354 is an up-facing bearing surface 354u, and another is a down-facing bearing surface 354d. The up-facing bearing surface 354u and the down-facing bearing surface 354d bear against each other when in the connected configuration. When the up-facing surface 354u and the down-facing surface 354d engage each other, the panel 150 including the down-facing surface 354d cannot move downward with respect to the opposite panel 150 including the up-facing surface 354u. Likewise, the panel 150 including the up-facing surface 354u cannot move upward with respect to the opposite panel 150 including the down-facing surface 354d. As depicted, the up-facing bearing surfaces 354u are substantially parallel to a top surface 150t of the corresponding panel 150 on which it is mounted. Likewise, the down-facing bearing surfaces 354d are substantially opposite of parallel to the top surface 150t of the corresponding panel 150 on which it is mounted or a part of.

However, a single pair of the bearing surfaces 354u and 354d do not prevent the panel 150 including the down-facing surface 354d from moving upward with respect to the opposite panel 150 including the up-facing surface 354u. Likewise, the panel 150 including the up-facing surface 354u can move downward with respect to the opposite panel 150 including the down-facing surface 354d. Therefore, to provide both an upward and downward structural connection between the adjacent pairs 260 of the panels 150 a third bearing surface 354 and a fourth bearing surface 354 are provided. The third bearing surface 354 is kinematically part of the first panel 150, and the fourth bearing surface 354 is kinematically part of the second panel 150. As with the first and the second bearing surfaces 354 that are paired and mated, the third and the fourth bearing surfaces 354 engage each other when the retractable cover system 100 is in the deployed configuration and disengage from each other when the retractable cover system 100 is in the retracted configuration 104. The third and the fourth bearing surfaces 354 are arranged oppositely from the first and the second bearing surfaces 354. As will be further described below, the bearing surfaces 354, 354u, 354d may be provided on connecting pieces 352 (e.g., on a tab 356). As will be further described below, the bearing surfaces 354, 354d may be provided on the connecting pieces 352 (e.g., on the tab 356) and/or on portions of the bottom leg 166b of the C-channel feature 166.

Together, the first and the second bearing surfaces 354 and the third and the fourth bearing surfaces 354 restrain all vertical movement between the adjacent pairs 260 of the panels 150. This structural connection allows the panels 150 to reinforce each other when the retractable cover system 100 is in the deployed configuration. For example, when a vertical load is applied to the panel 154 and no load is applied to the adjacent panel 156, the panel 156 may help the panel 154 carry the load. In addition to directly carrying and sharing loads, the connecting structure 350 may increase the overall stiffness of the retractable cover system 100. The connecting structure 350 may further reduce aerodynamic flutter and other vibrations and noise of the retractable cover system 100 when deployed.

Figure 115:
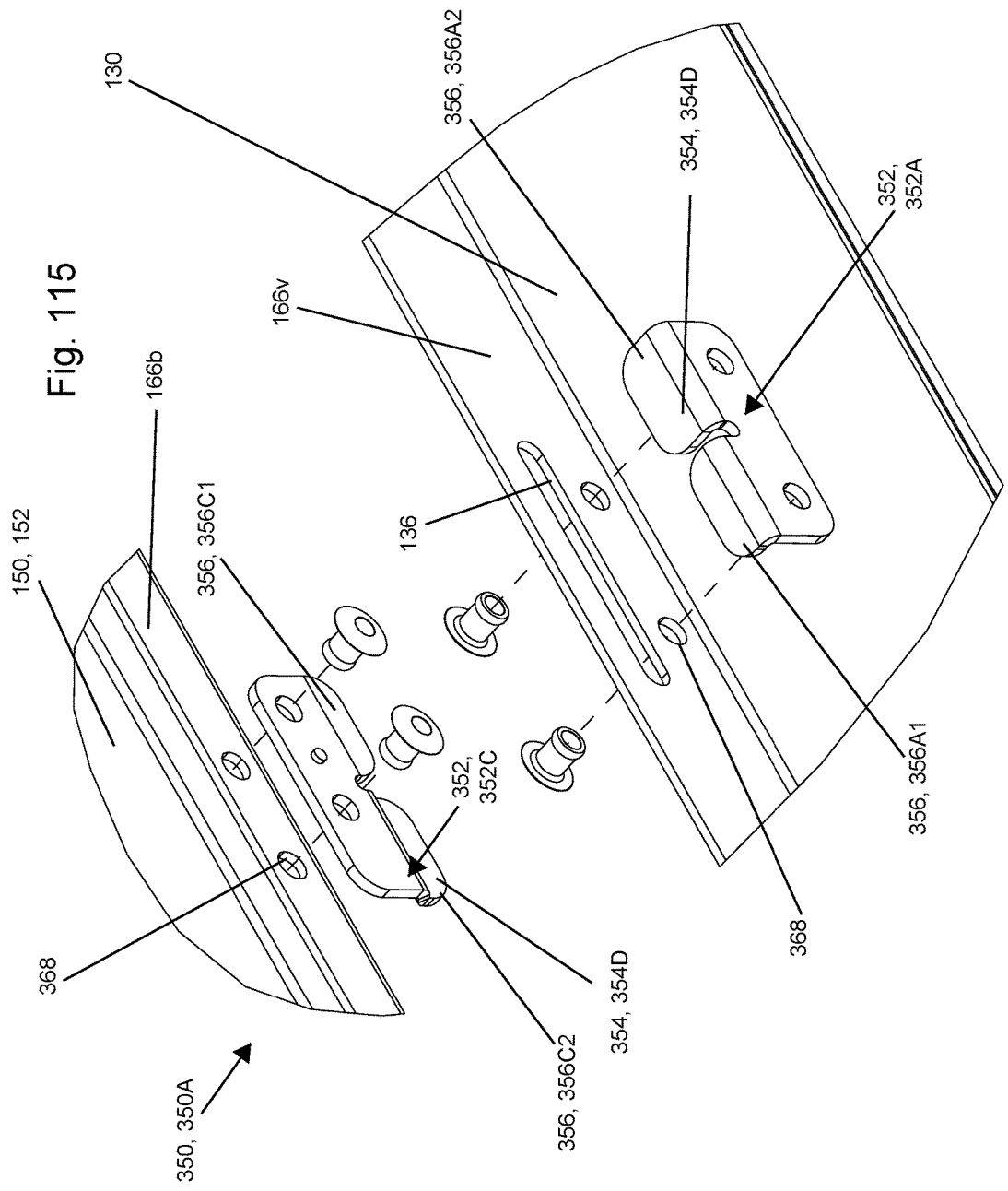
FIG. 115 is a partial exploded perspective view of the interlocking structures of FIG. 112 shown in the decoupled configuration.
Figure 116:
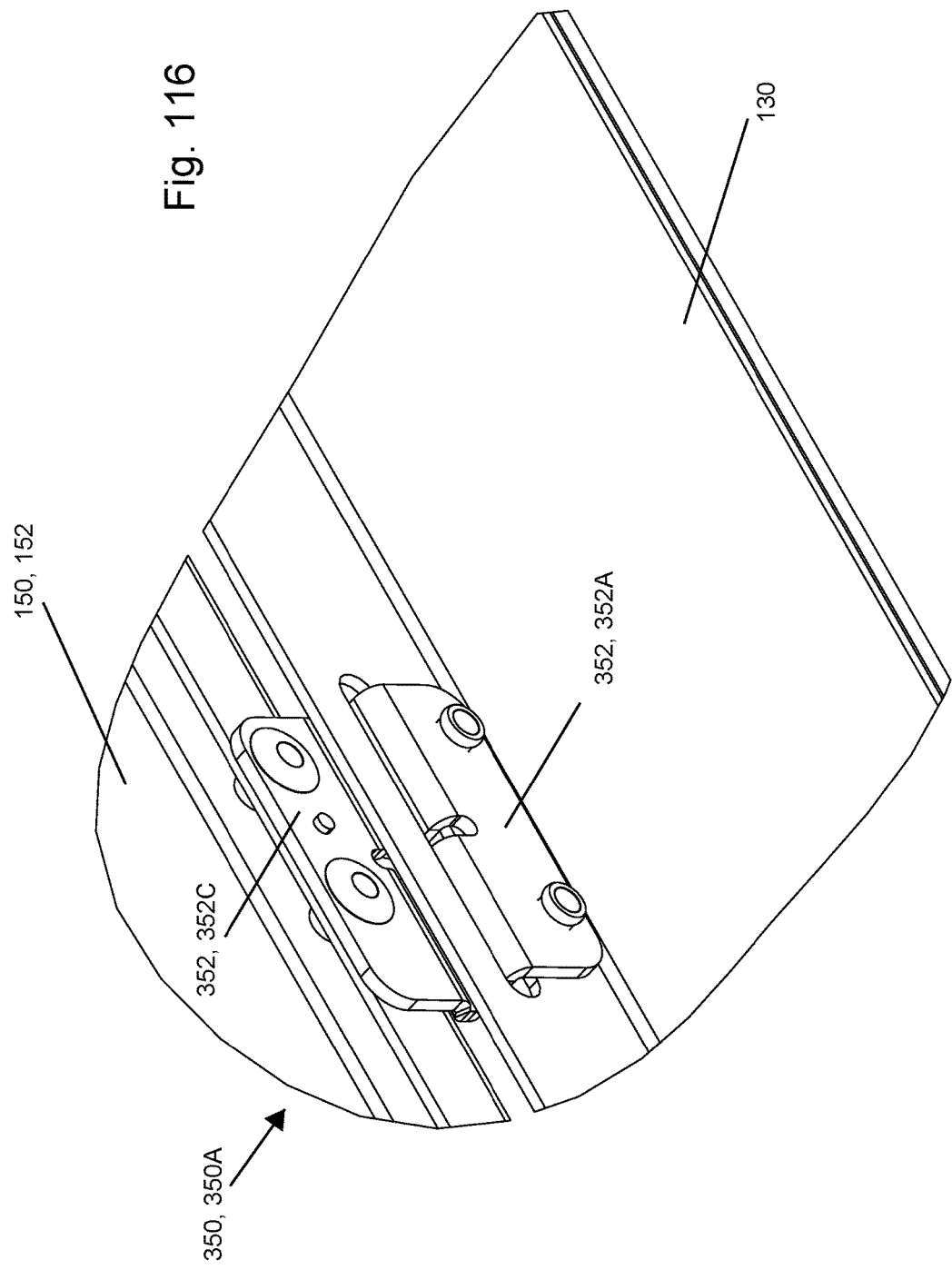
FIG. 116 is still another partial perspective view of the interlocking structures of FIG. 112 shown in the decoupled configuration.

Turning now to FIGS. 112-120, the connecting structure 350A will be described in detail. The connecting structure 350A includes a connecting piece 352A of the connecting pieces 352 and a connecting piece 352C of the connecting pieces 352. The connecting piece 352A is mounted to the front cross-member 130. In particular, the connecting piece 352A is fastened to the front cross-member 130 with a pair of fasteners 366t (e.g., rivets) through fastening holes 368. The connecting piece 352A includes a first tab 356A1 and a second tab 356A2, as illustrated at FIGS. 113 and 115. The tabs 356A1 and 356A2 extend through a slot 136 of the front cross-member 130. The front cross-member 130 further includes a pair of the fastening holes 368 for the pair of the fasteners 366t. The connecting piece 352C is mounted to the bottom leg 166b of the C-channel feature 166 of the panel 152. In particular, the connecting piece 352C is fastened to the bottom leg 166b with a pair of fasteners 366t (e.g., rivets) through fastening holes 368. The connecting piece 352C includes a first tab 356C1 and a second tab 356C2, as illustrated at FIGS. 113 and 115. The tabs 356C1 and 356C2 extend beyond a forward side of the panel 152.

Figure 117:
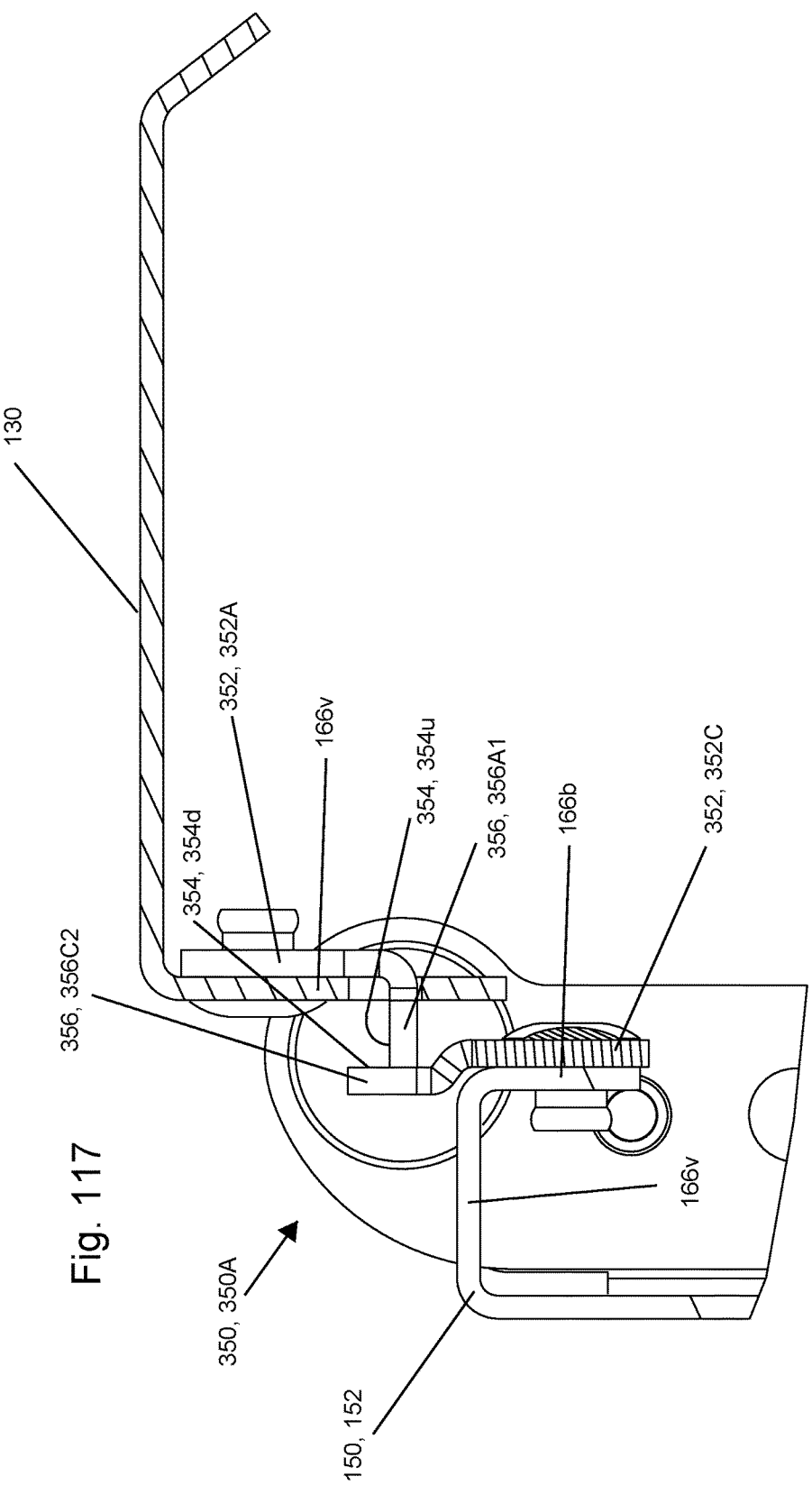
FIG. 117 is a cross-sectional side view of the interlocking structures of FIG. 112 shown in the decoupled configuration.
Figure 118:
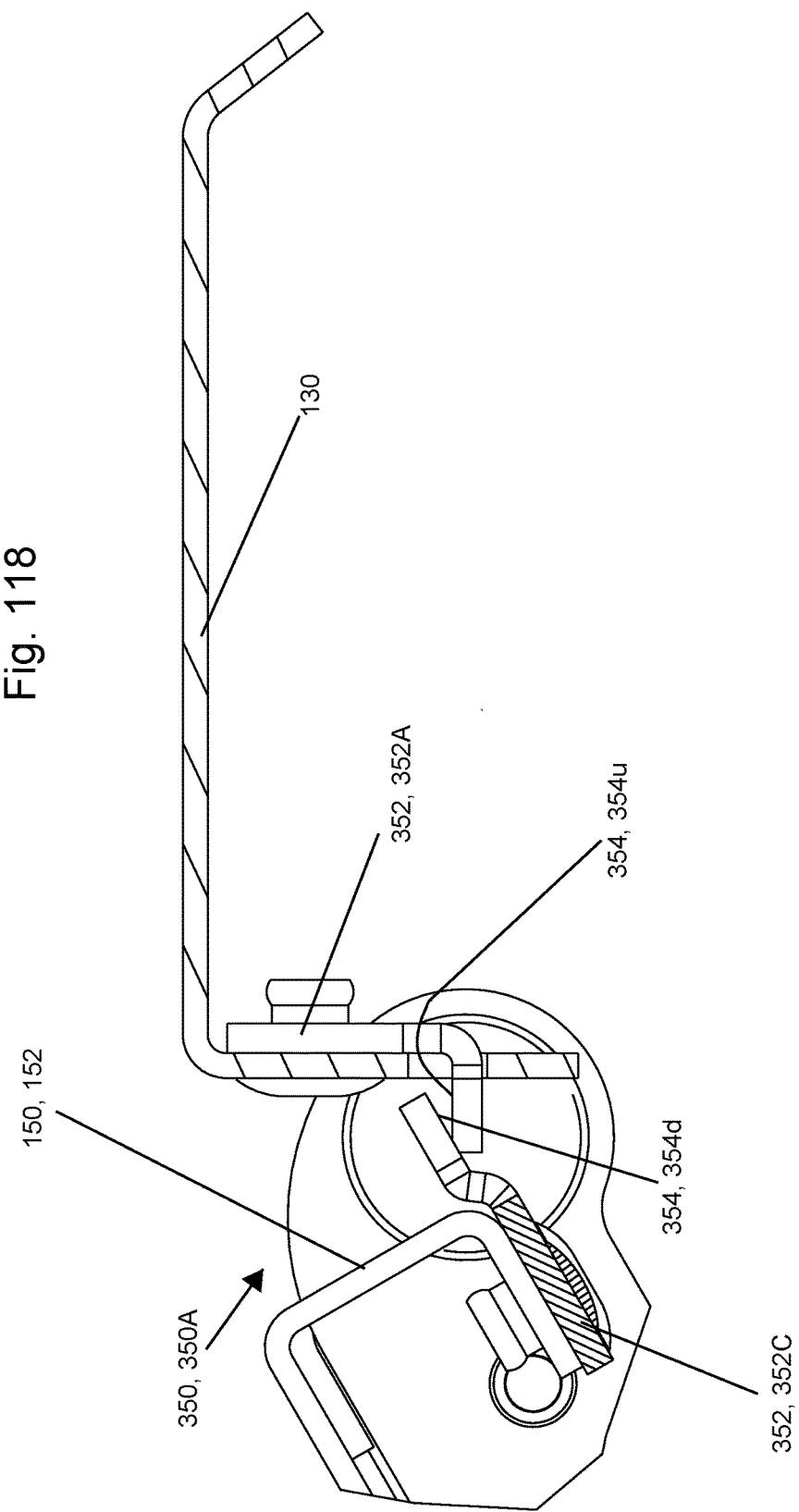
FIG. 118 is a cross-sectional side view of the interlocking structures of FIG. 112 shown in a transitioning configuration.

Turning now to FIGS. 117-119, an engagement/disengagement sequence of the connecting structure 350A is illustrated. FIG. 117 illustrates the panel 152 in the retracted configuration 104. In the retracted configuration 104, the up-facing bearing surface 354u of the tab 356A1 faces upwardly, and the down-facing bearing surface 354d of the tab 356C2 of the connecting piece 352C faces forward. FIG. 118 illustrates the panel 152 transitioning between the retracted configuration 104 and the deployed configuration. The up-facing surface 354u continues to face in the upward direction while the down-facing surface 354d rotates and increasingly faces in a downward direction as the panel 152 moves toward the extended configuration 102. At FIG. 119, the panel 152 is in the deployed (i.e., extended) configuration and the up-facing surface 354u is in contact with the down-facing surface 354d. A similar but opposite action occurs between the tab 356A2 and the tab 356C1.

Thus, when the panel 152 is in the extended configuration 102, the connecting structure 350A prevents upward and downward relative movement between the front cross-member 130 and the panel 152. It is noted that the joint hingedly connecting the front cross-member 130 with the panel 152 is similar to the joint 200A in that a pivot axis of the joint, defined by the mounting brackets 610 and 620, is below the top surfaces 150t of the panels 150, when deployed.

Figure 93:
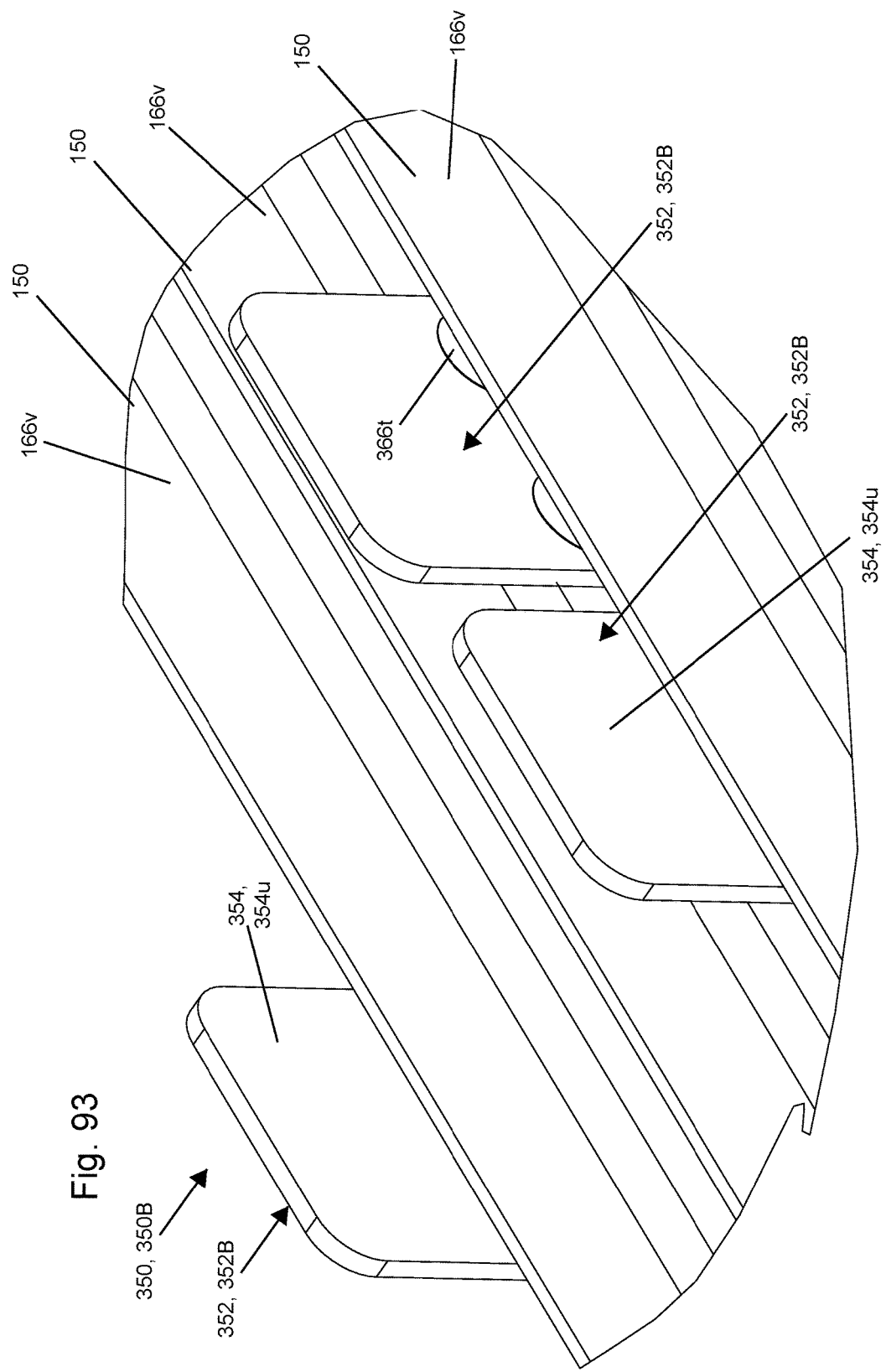
FIG. 93 is a partial perspective view of the interlocking structures of FIG. 92 shown in the decoupled configuration.
Figure 94:
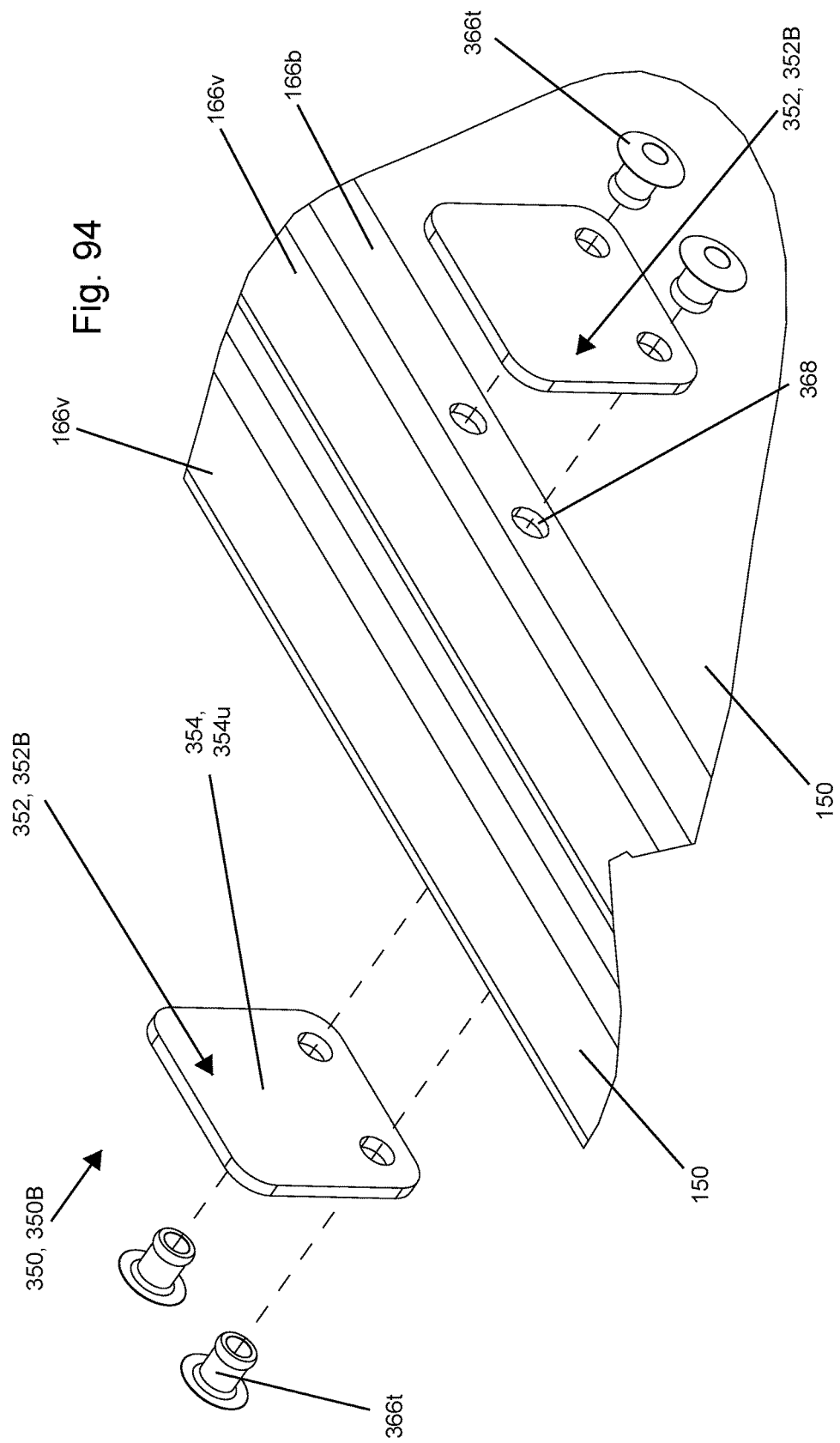
FIG. 94 is a partial exploded perspective view of the interlocking structures of FIG. 92 shown in the decoupled configuration.
Figure 95:
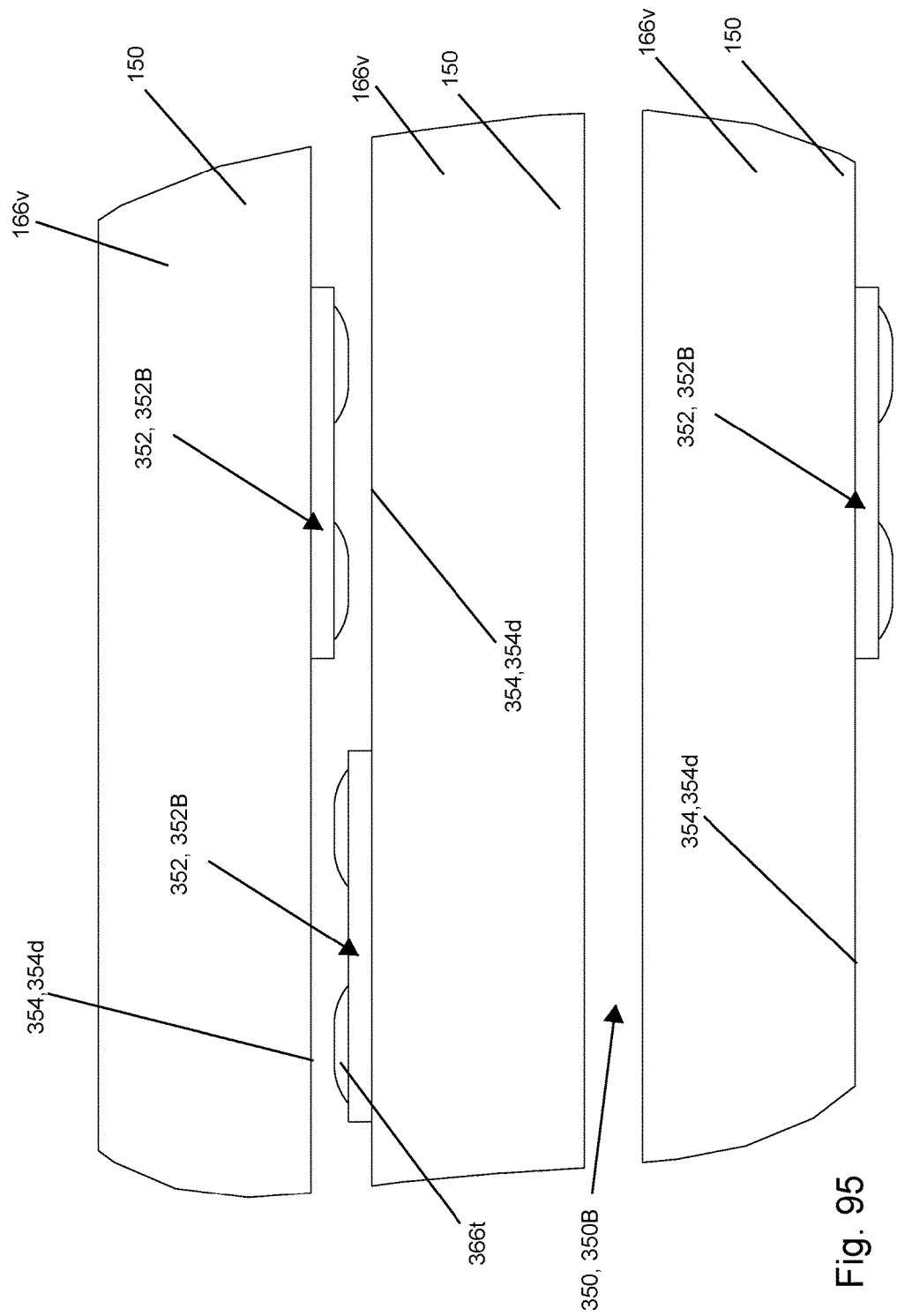
FIG. 95 is a plan view of the interlocking structures of FIG. 92 shown in the decoupled configuration.
Figure 96:
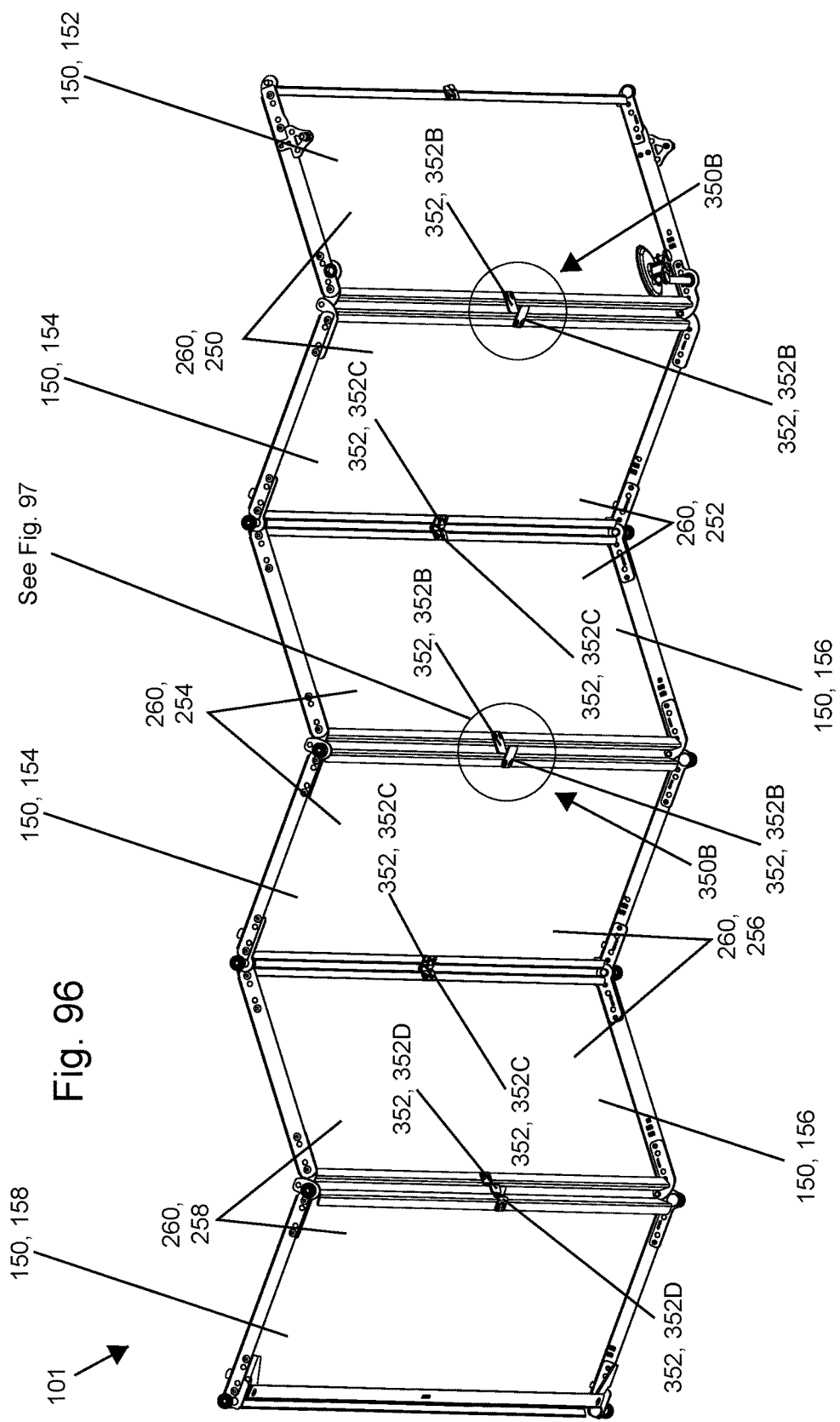
FIG. 96 is a perspective view of the panel assembly of FIG. 8 further illustrating the interlocking structures of FIG. 92.
Figure 97:
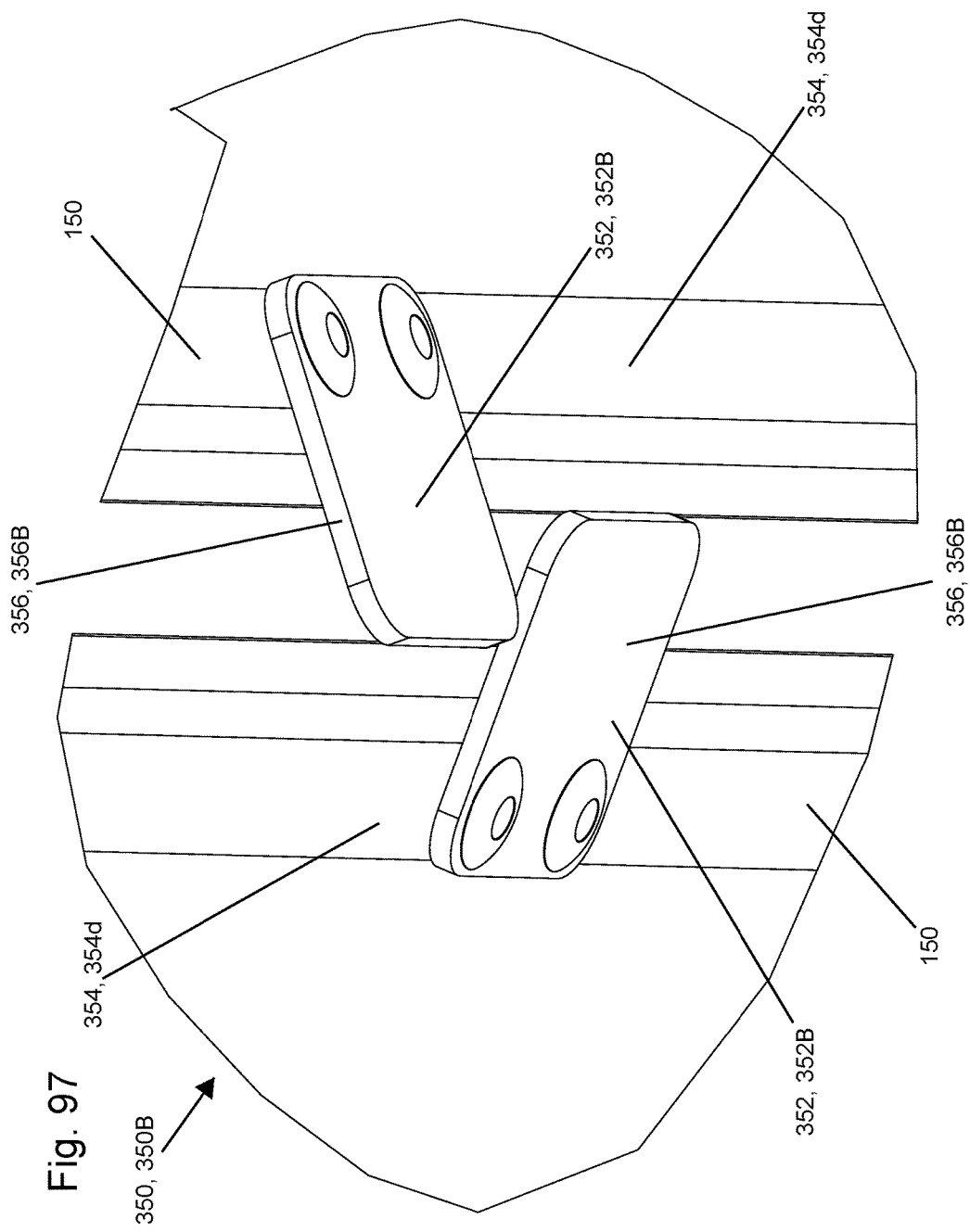
FIG. 97 is a partial perspective view of the interlocking structures of FIG. 92 shown in a transitioning configuration.
Figure 98:
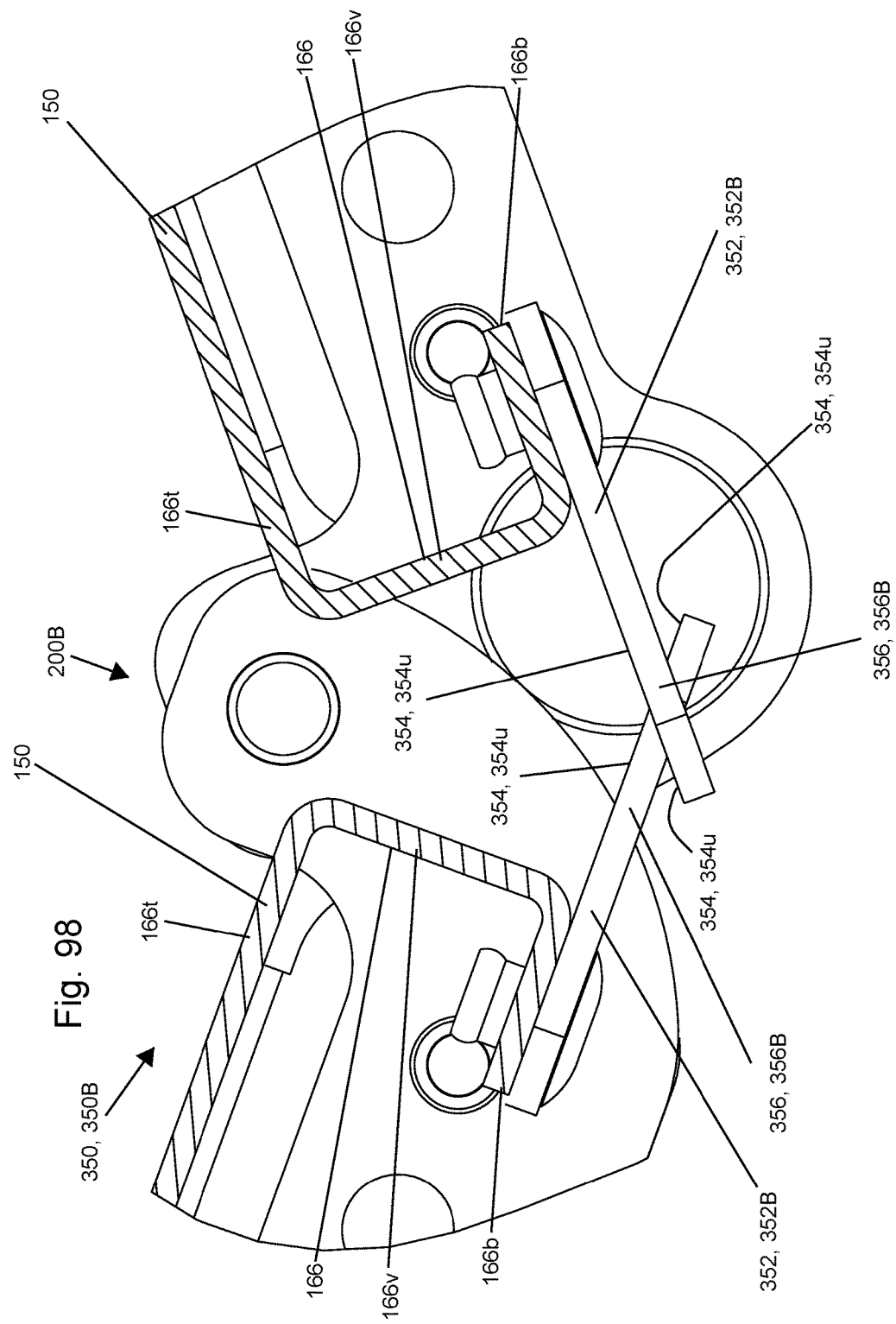
FIG. 98 is a cross-sectional side view of the interlocking structures of FIG. 92 shown in a transitioning configuration.

Turning now to FIGS. 93-101, the connecting structure 350B will be described in detail. The connecting structure 350B includes a pair of connecting pieces 352B of the connecting pieces 352 and portions of the bottom leg 166b of the C-channel feature 166 of the adjoining panels 150. As illustrated at FIG. 94, the connecting pieces 352B are fastened to the bottom leg 166b of the C-channel feature 166. As depicted, the connecting pieces 352B are connected with a pair of the fasteners 366t through a pair of holes 368. As illustrated at FIG. 95, the connecting pieces 352B, and therefore the fasteners 366t, are staggered. By including a staggered pattern, the connecting structure 350B can be made more compact. By staggering the connecting pieces 352B, the connecting pieces 352B avoid interfering with each other. In addition, the fasteners 366t and the heads of the fasteners 366t also avoid interfering with the fasteners 366t of the opposite connecting piece 352B. As illustrated at FIG. 97, the down-facing bearing surfaces 354d are included on a portion of the bottom leg 166b of the C-channel feature 166. As illustrated at FIG. 98, the up-facing bearing surfaces 354u are included on a tab 356B of the connecting piece 352B. A first of the connecting pieces 352B is on a first panel of an adjacent pair 260 of the panels 150, and a second of the connecting pieces 352B is connected to the opposite panel 150. As depicted, the connecting pieces 352B can be identical parts.

Figure 99:
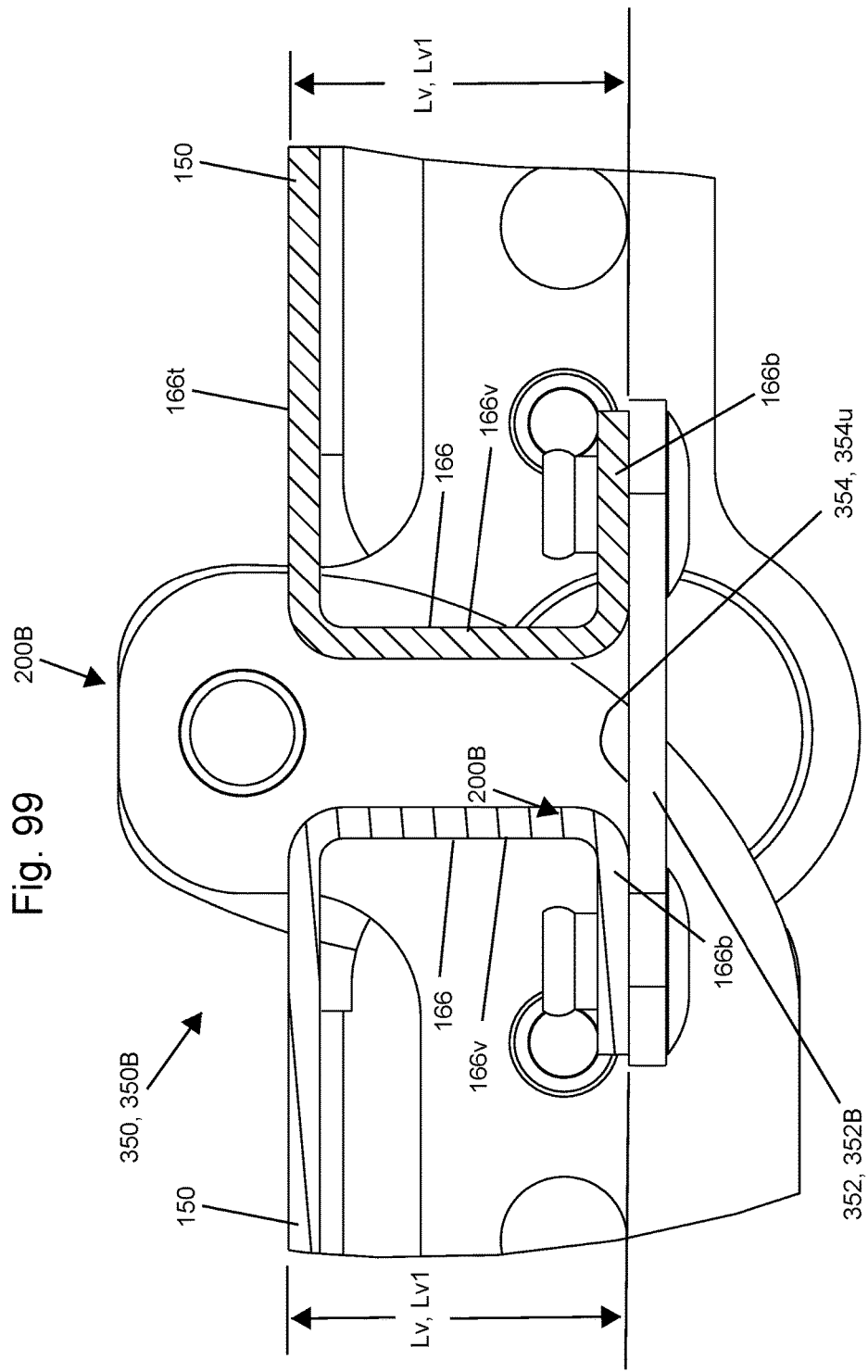
FIG. 99 is a cross-sectional side view of the interlocking structures of FIG. 92 shown in an engaged configuration.
Figure 100:
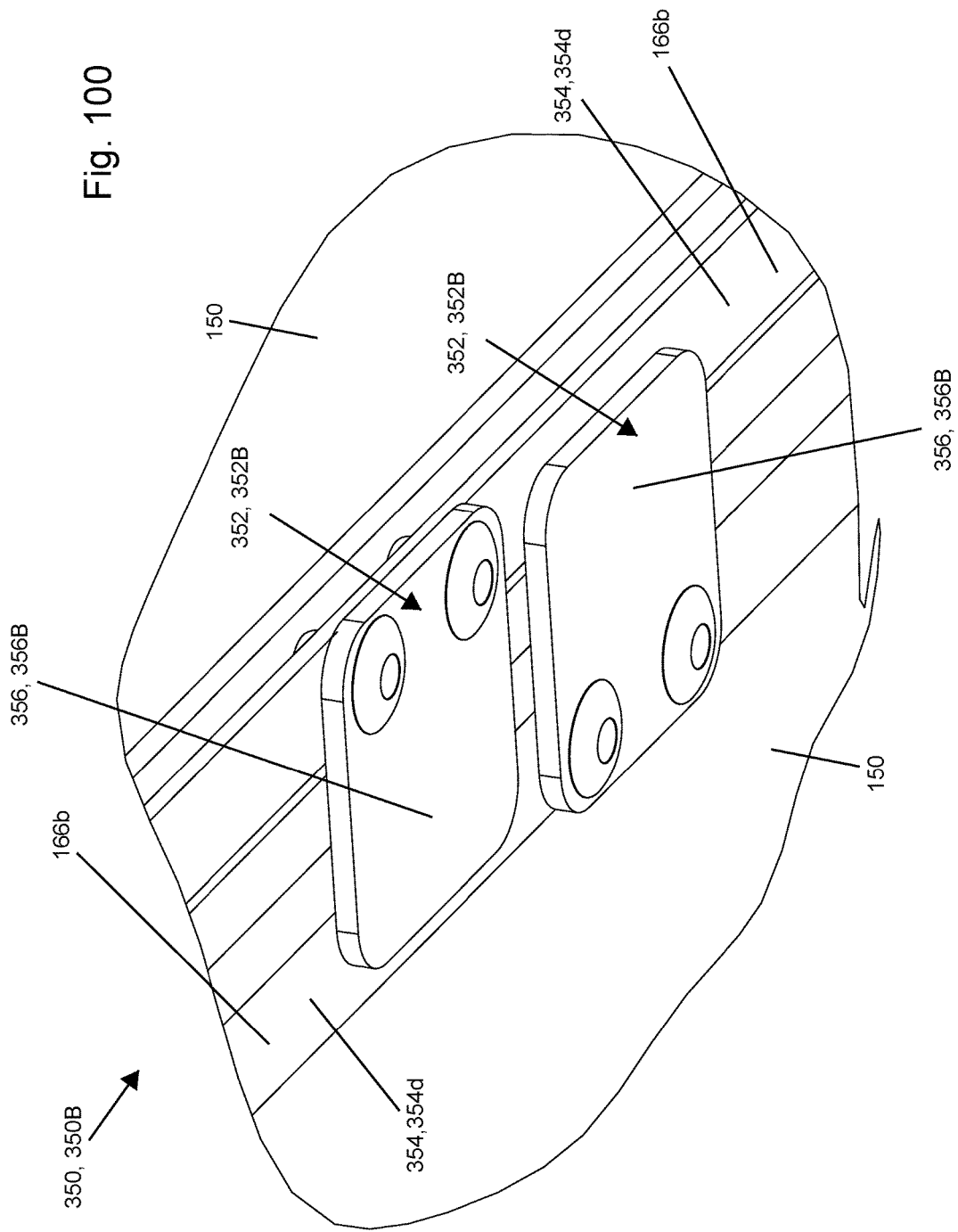
FIG. 100 is a partial perspective view of the interlocking structures of FIG. 92 shown in the engaged configuration.
Figure 101:
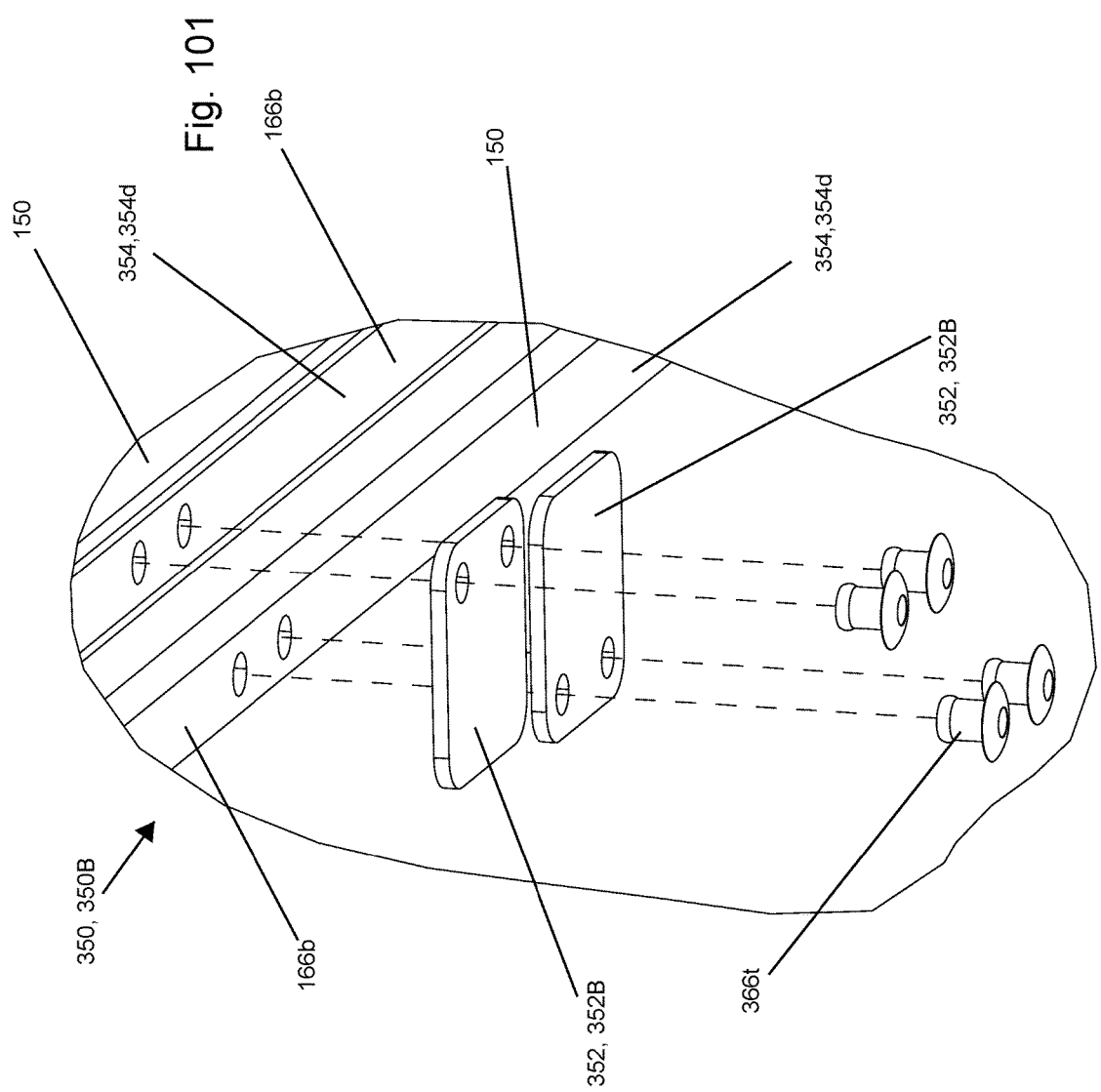
FIG. 101 is a partial exploded perspective view of the interlocking structures of FIG. 92 shown in the engaged configuration.
Figure 102:
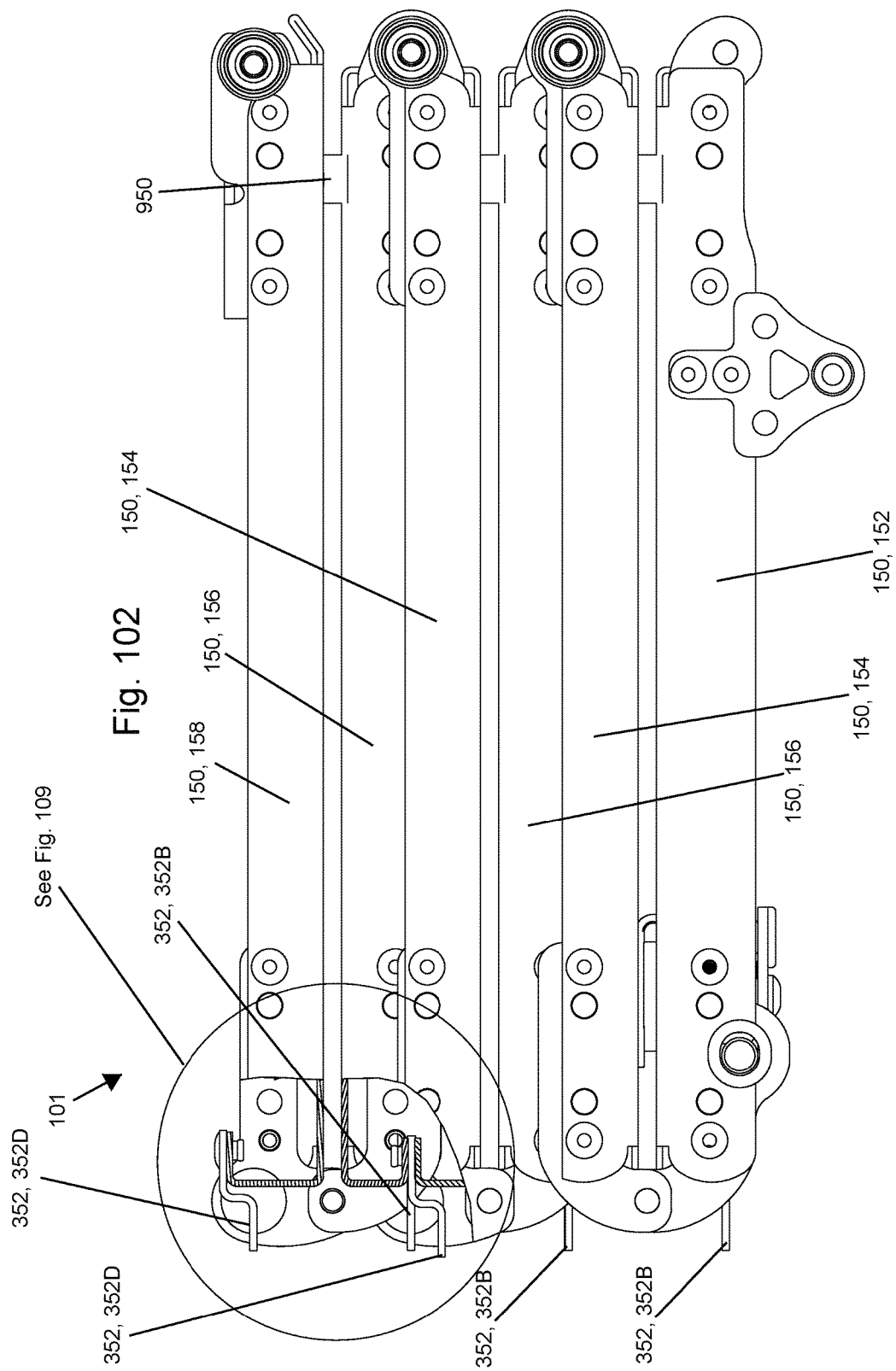
FIG. 102 is a cross-sectional side view of the panel assembly of FIG. 8 further illustrating still other interlocking structures for interlocking a panel pair of the panel assembly according to the principles of the present disclosure, the interlocking structures shown in a decoupled configuration.

Turning now to FIGS. 93, 98, and 99, an engagement/disengagement sequence of the connecting structure 350B is illustrated. FIG. 93 illustrates the connecting structure 350B when the retractable cover system 100 is in the fully retracted configuration 104. In this configuration, the up-facing surfaces 354u and the down-facing surfaces 354d face in a forward/rearward direction that is generally horizontal. FIG. 98 illustrates the adjacent pair 260 of panels 150 between the extended 102 and the retracted configurations 104. As illustrated at FIG. 98, as the retractable cover system 100 moves toward the extended (i.e., deployed) configuration, the up-facing surfaces 354u increasingly face in an upward direction and the down-facing surfaces 354d increasingly face in a downward direction. FIG. 99 illustrates the connecting structure 350B in an engaged configuration with the retractable cover system 100 fully deployed. In the fully deployed configuration, the up-facing surfaces 354u engage the down-facing surface 354d of the opposite panel. Likewise, the up-facing surface 354u of the opposite tab 356B engages the down-facing surface 354d of the opposite panel 150.

Therefore, as illustrated at FIG. 99, the pair of the tabs 356B of the connecting pieces 352B engage with opposite portions of the bottom leg 166b of the C-channel features 166 and thereby prevent upward and downward movement across the adjacent pairs 260 of the panels 150. FIGS. 98 and 99 generally illustrate the joint 200B as the axis of the joint 200B is above the top surfaces 150t of the panels 150 when the retractable cover system 100 is in the deployed configuration.

Figure 82:
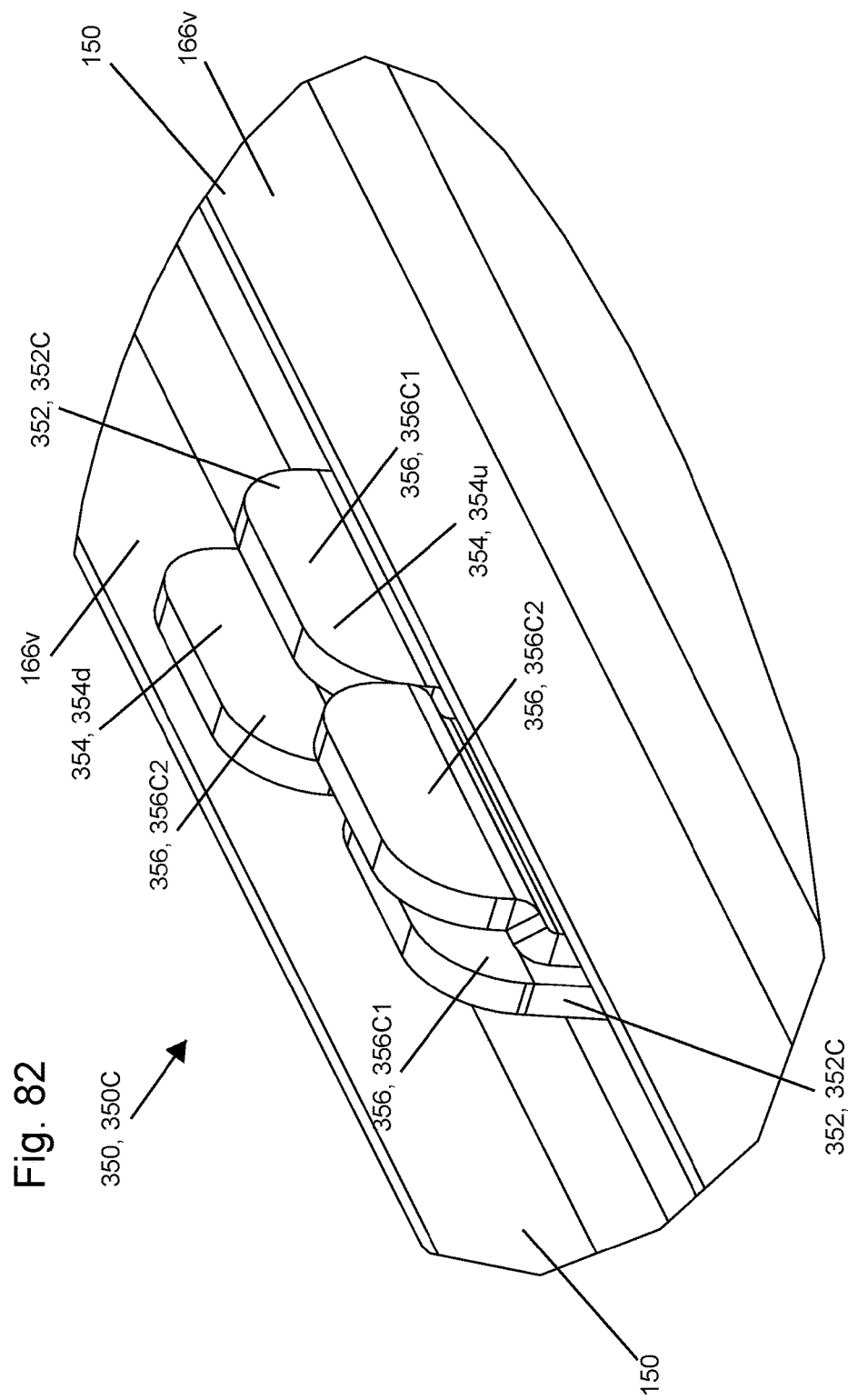
FIG. 82 is an enlarged portion of FIG. 81.
Figure 83:
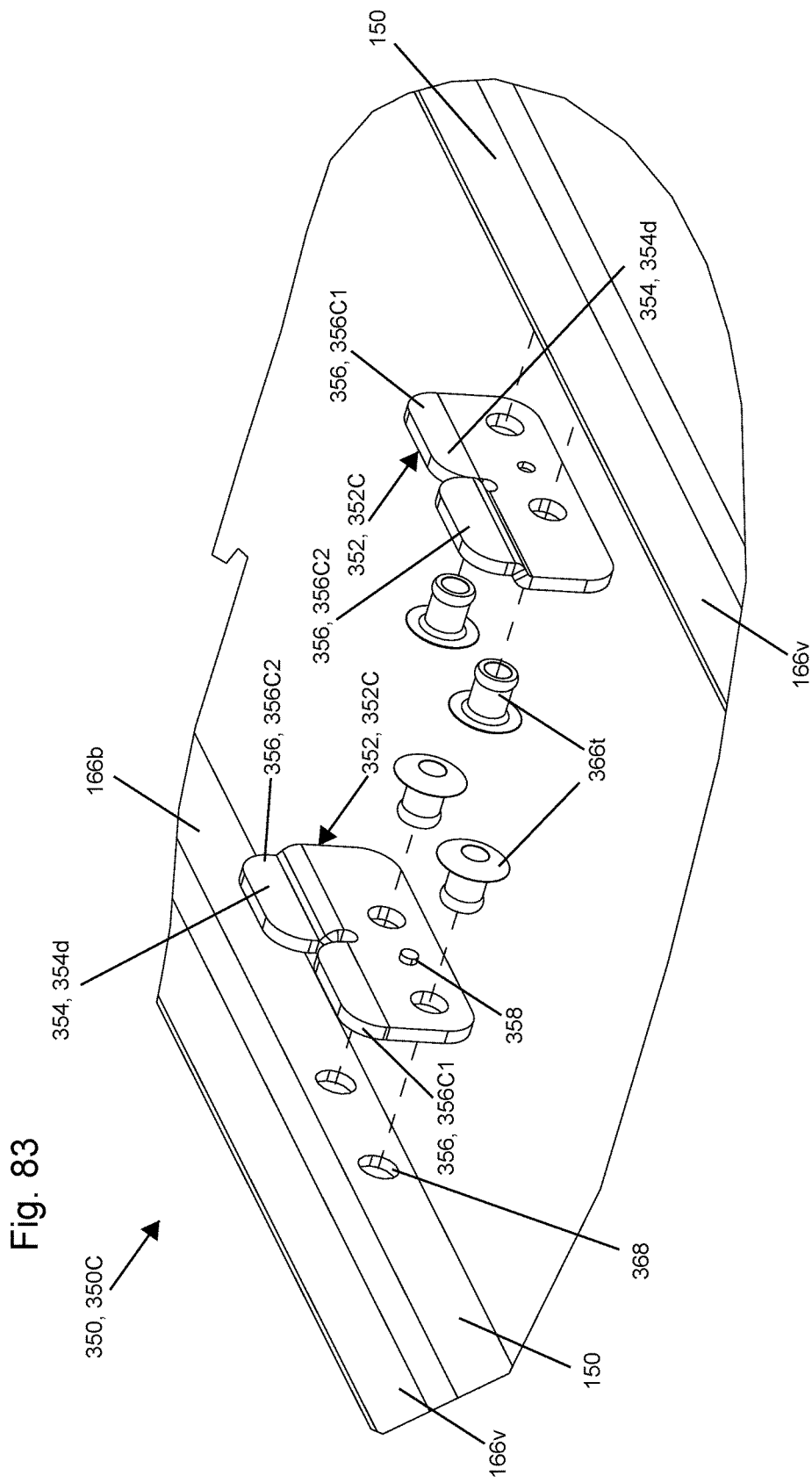
FIG. 83 is an exploded portion of FIG. 82.
Figure 84:
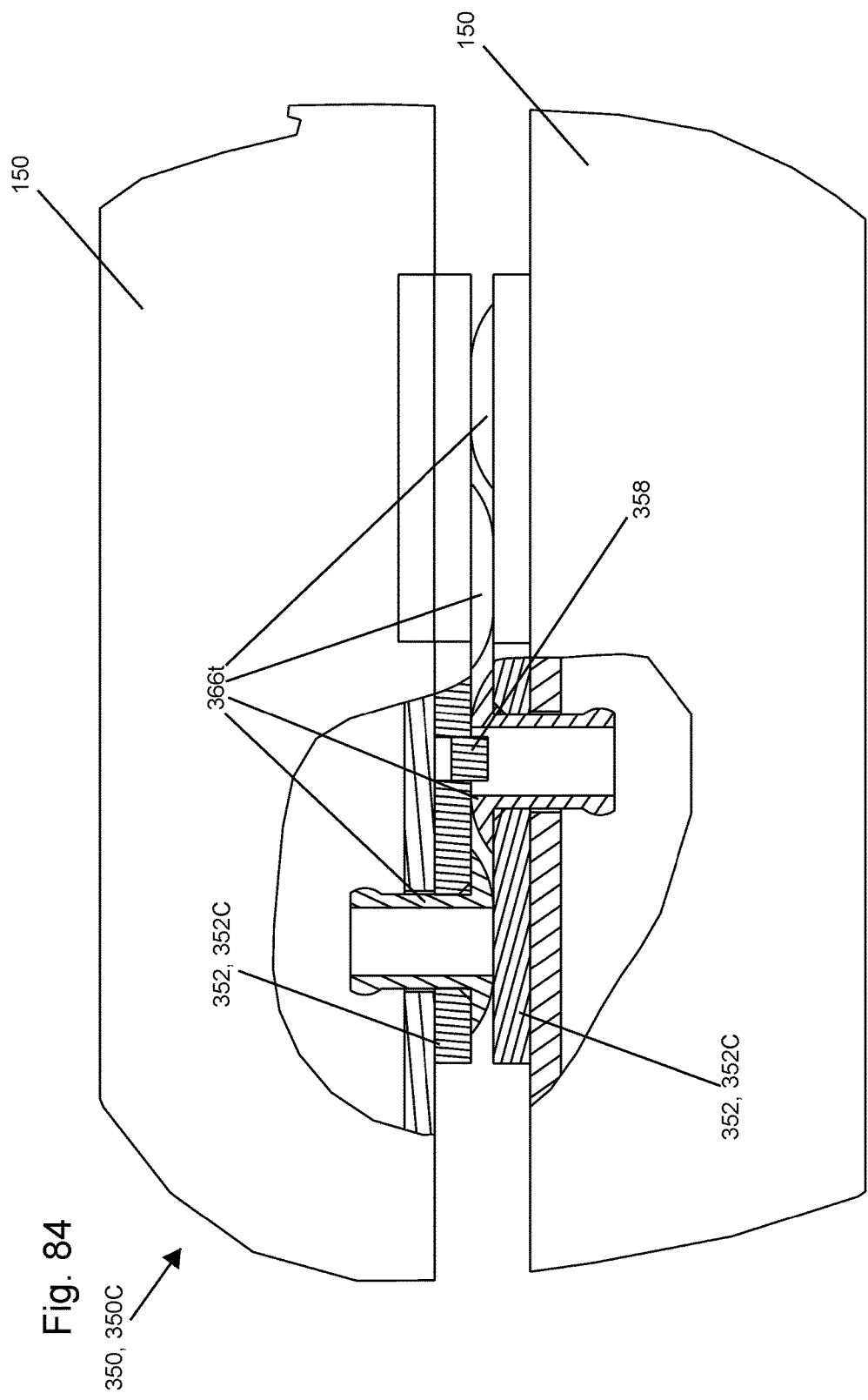
FIG. 84 is a partial top plan partial cross-sectional view of the interlocking structures of FIG. 81 shown in the decoupled configuration.
Figure 85:
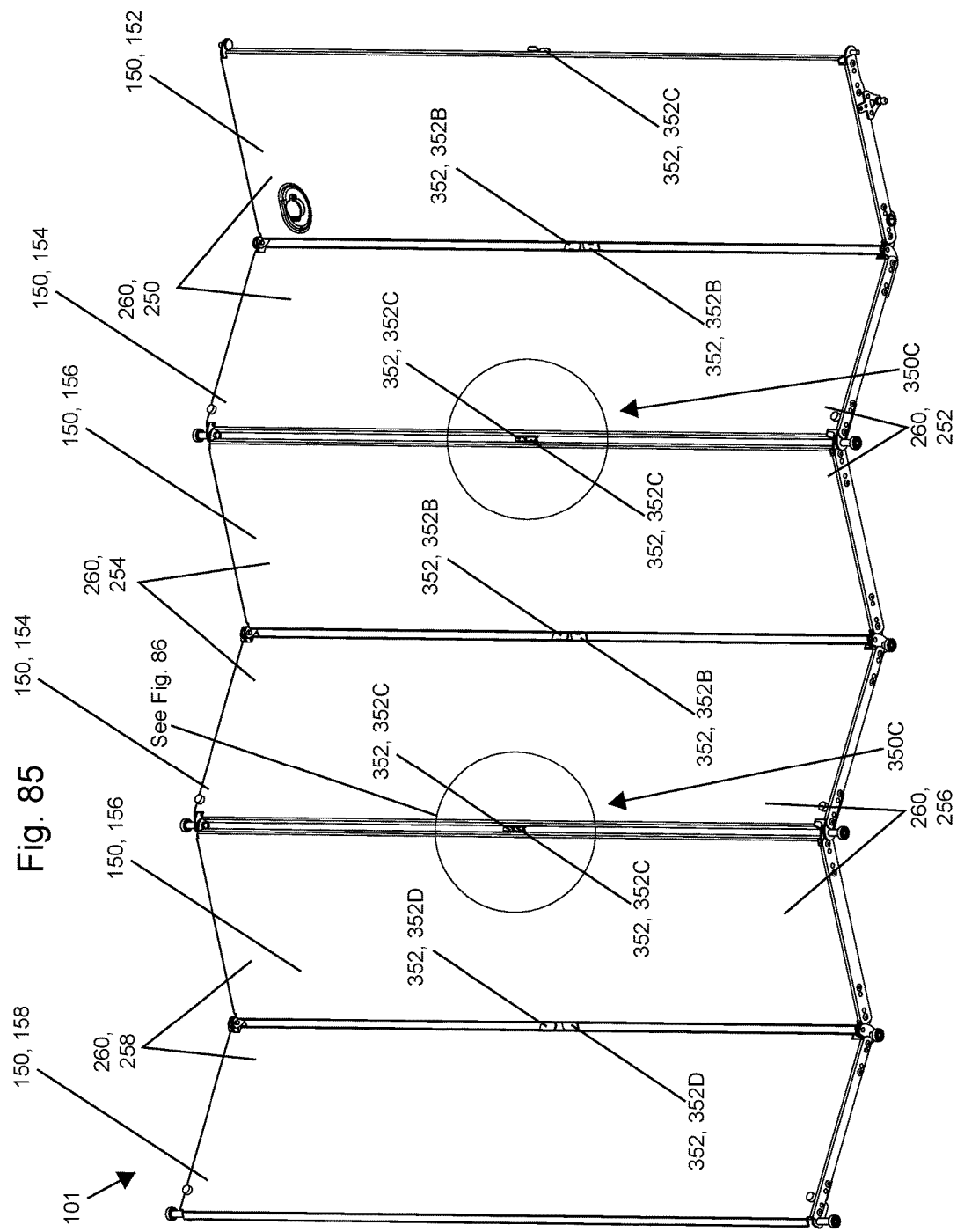
FIG. 85 is a perspective view of the panel assembly of FIG. 8 further illustrating the interlocking structures of FIG. 81.

Turning now to FIGS. 82-91, the connecting structure 350C will be described in detail. The connecting structure 350C includes a pair of connecting pieces 352C of the connecting pieces 352. As illustrated at FIG. 83, the connecting pieces 352C are fastened to the bottom leg 166b of the C-channel feature 166. As depicted, the connecting pieces 352C are connected with a pair of the fasteners 366t through a pair of holes 368. As illustrated at FIG. 84, the fasteners 366t of the connecting pieces 352C are staggered. By including a staggered pattern, the connecting structure 350C can be made more compact. By staggering the fasteners 366t of the connecting pieces 352C, the fasteners 366t avoid interfering with each other. In particular, the heads of the fasteners 366t avoid interfering with the heads of the fasteners 366t of the opposite connecting piece 352C.

Figure 86:
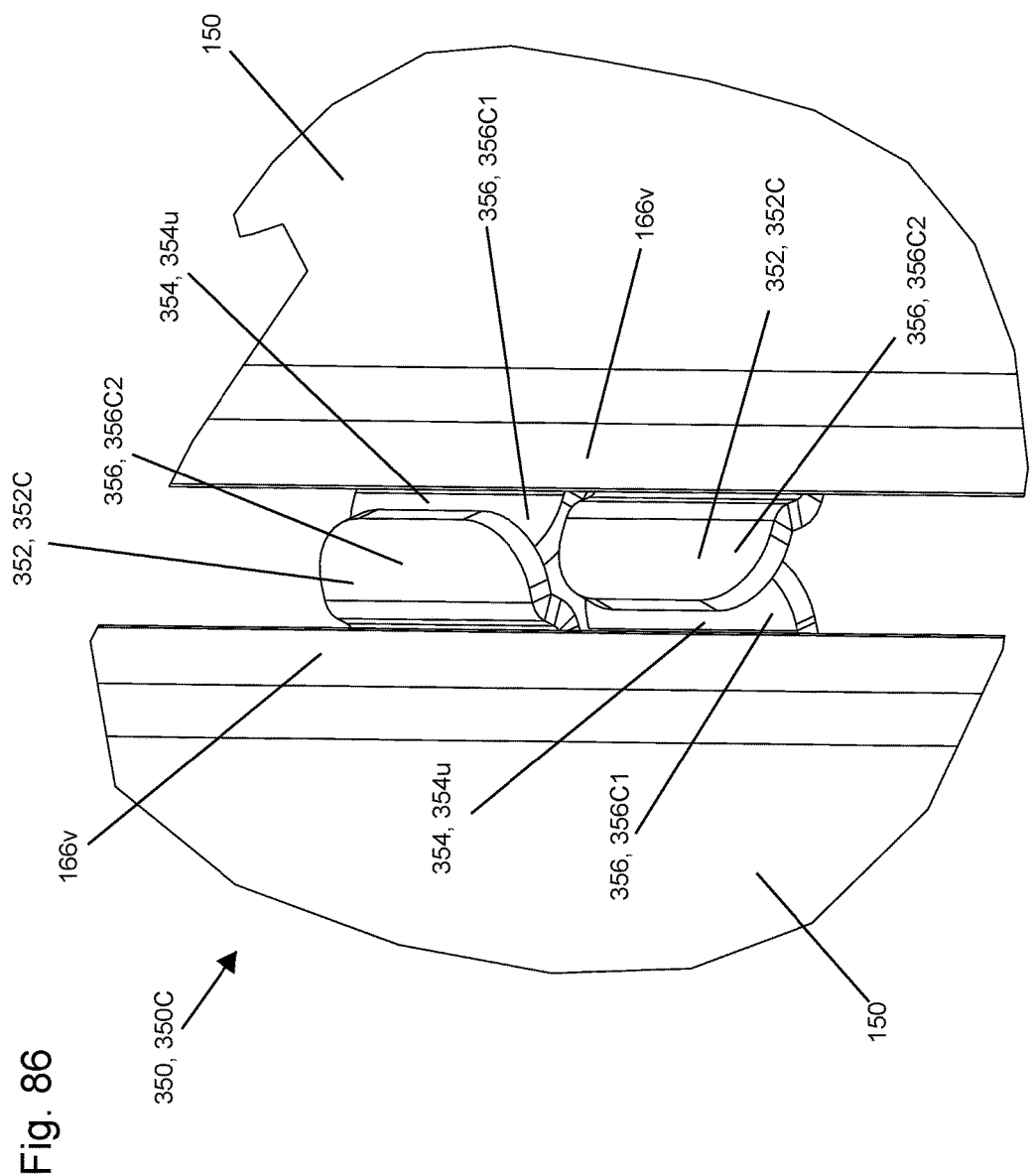
FIG. 86 is an enlarged portion of FIG. 85 illustrating the interlocking structures of FIG. 81 shown in a transitioning configuration.
Figure 87:
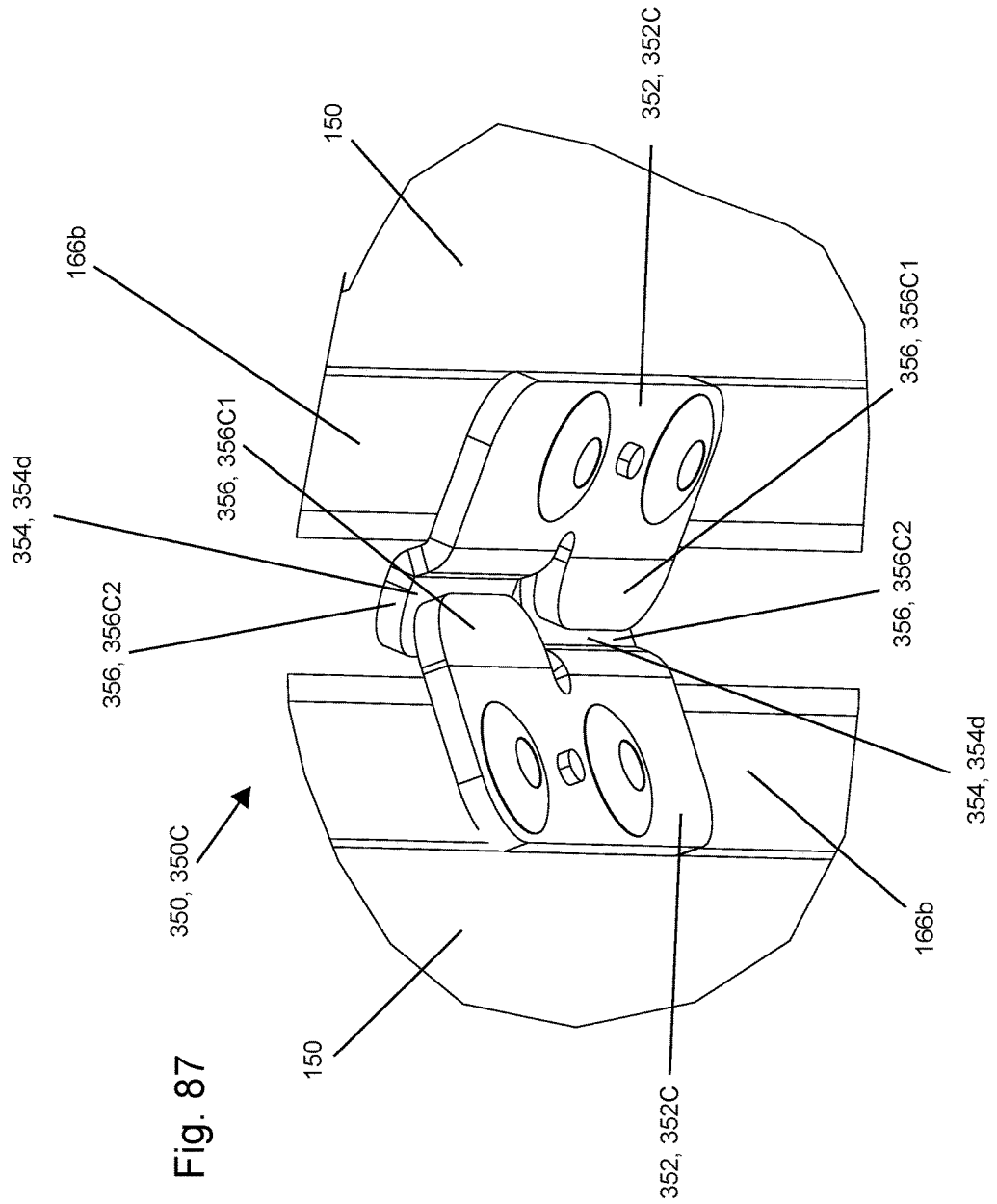
FIG. 87 is a partial perspective view of the interlocking structures of FIG. 81 shown in a transitioning configuration.

As illustrated at FIG. 87, the down-facing bearing surfaces 354d are included on a tab 356C2 of the connecting piece 352C. As illustrated at FIG. 86, the up-facing bearing surfaces 354u are included on a tab 356C1 of the connecting piece 352C. The first and the second tabs 356C1, 356C2 may be included on the same connecting piece 352C (e.g., in a split-finger arrangement). A first of the connecting pieces 352C is on a first panel of an adjacent pair 260 of the panels 150, and a second of the connecting pieces 352C is connected to the opposite panel 150. As depicted, the connecting pieces 352C of the connecting structure 350C can be identical parts and also be identical to the connecting piece 352C of the connecting structure 350A. As illustrated at FIGS. 86 and 87, the connecting pieces 352C of the connecting structure 350C may be identical as they are oriented relative to each other about a vertical axis and rotationally spaced away from each other by 180 degrees. As illustrated, the first tab 356C1 is a straight tab and substantially extends parallel to the bottom leg 166b. In contrast, the second tab 356C2 is an offset tab that jogs upwardly when the panel assembly 101 is in the extended configuration 102. The connecting piece 352C may include an orientation feature 358 to prevent incorrect assembly of the connecting pieces 352C to their respective panel 150. As illustrated at FIG. 84, the orientation feature 358 may fit within a hollow portion of the fastener 366t when the retractable cover system 100 is in the retracted configuration 104 and thereby not occupy space that would increase a size of the panel assembly 101 when in the retracted configuration 104.

Figure 88:
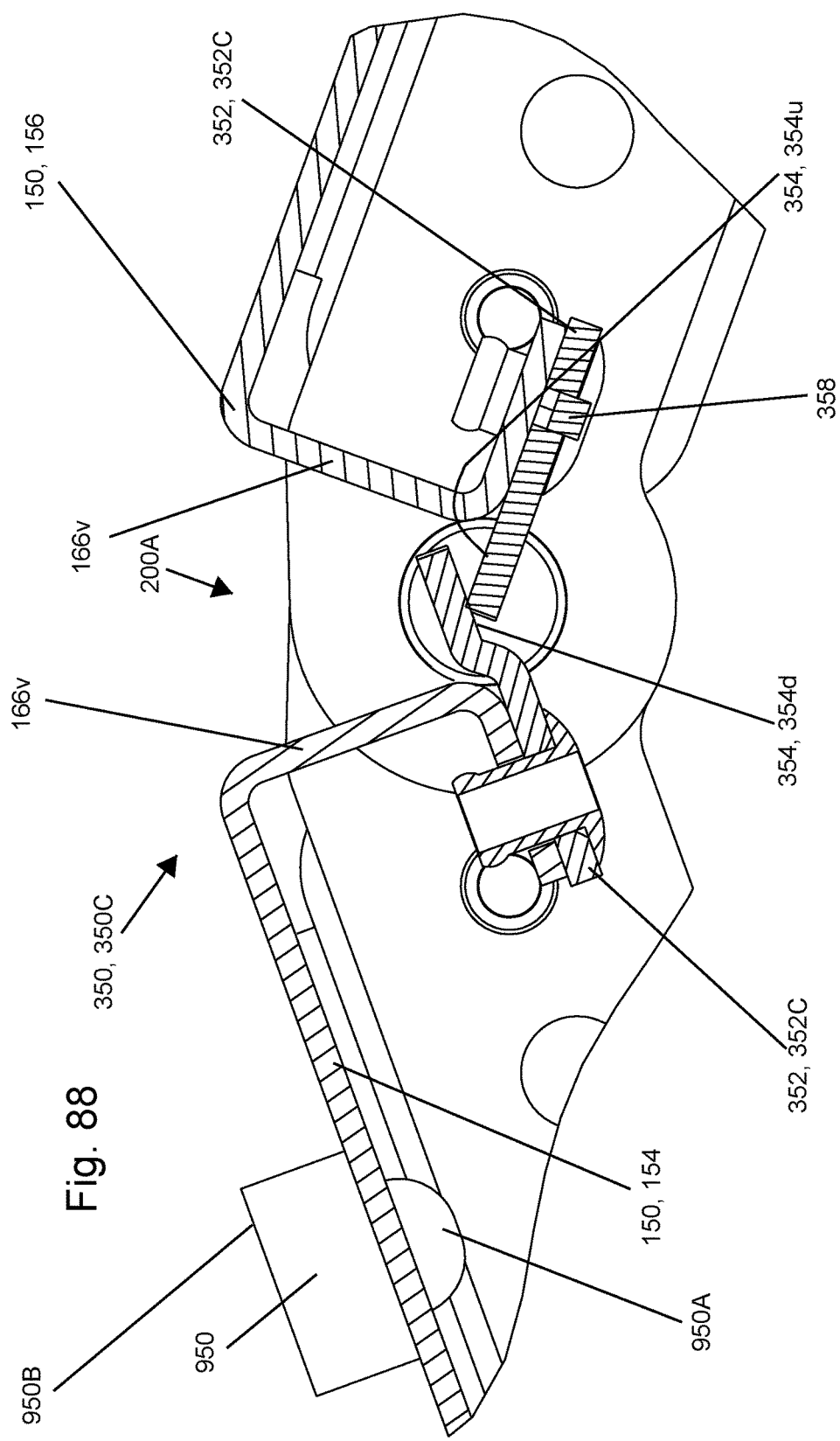
FIG. 88 is a cross-sectional side view of the interlocking structures of FIG. 81 shown in a transitioning configuration.
Figure 89:
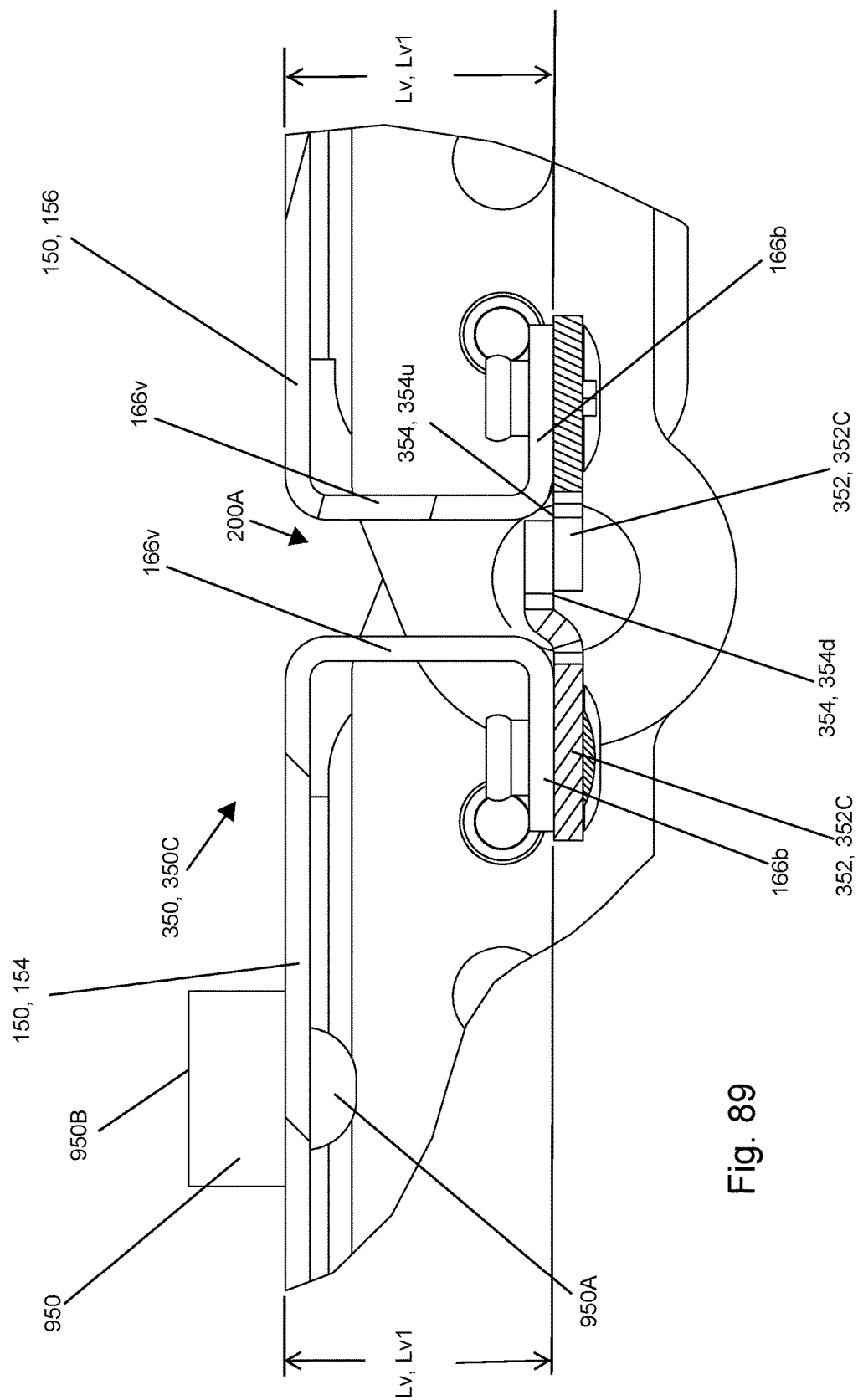
FIG. 89 is a cross-sectional side view of the interlocking structures of FIG. 81 shown in an engaged configuration.
Figure 90:
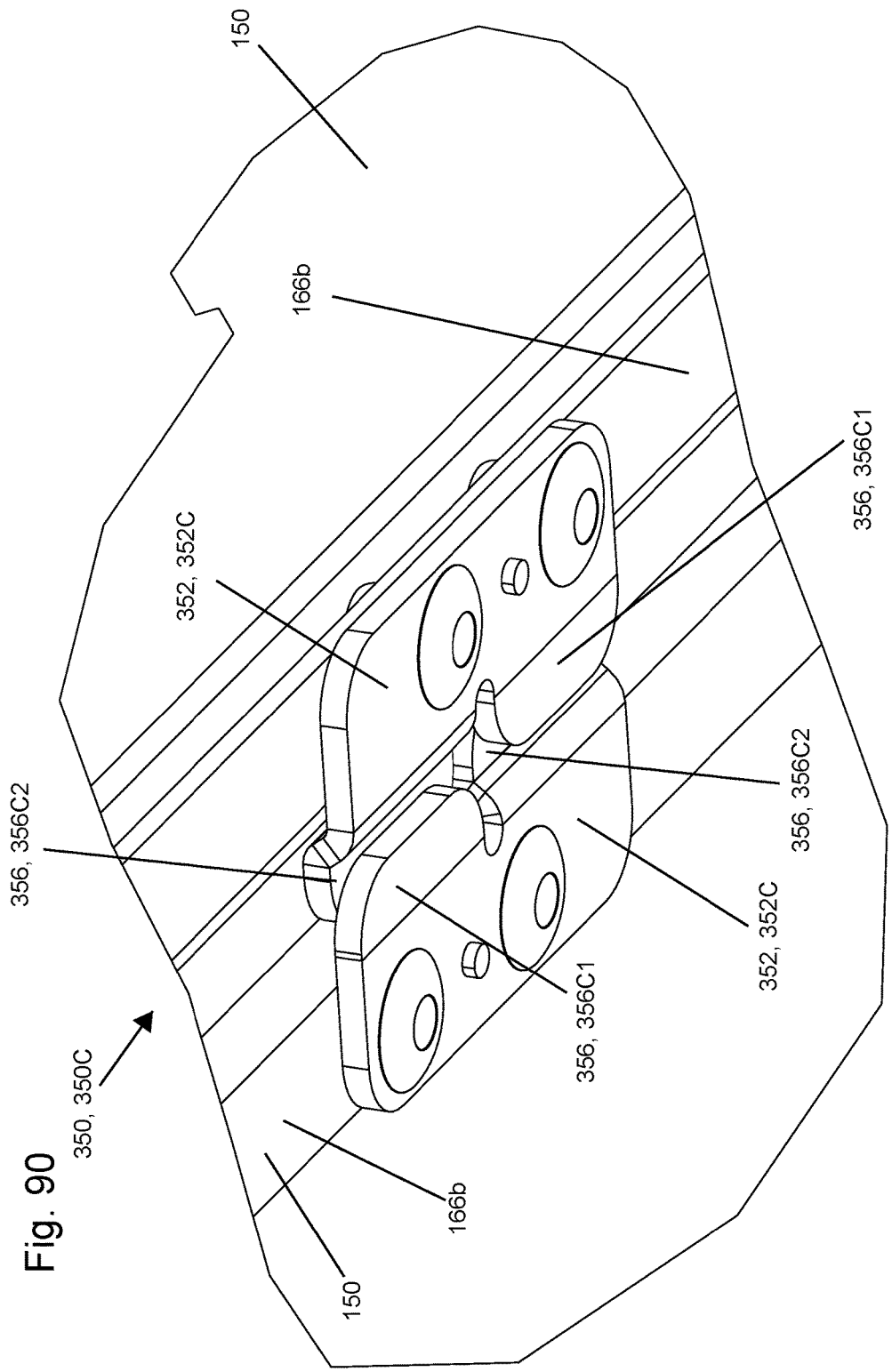
FIG. 90 is a partial perspective view of the interlocking structures of FIG. 81 shown in the engaged configuration.
Figure 91:
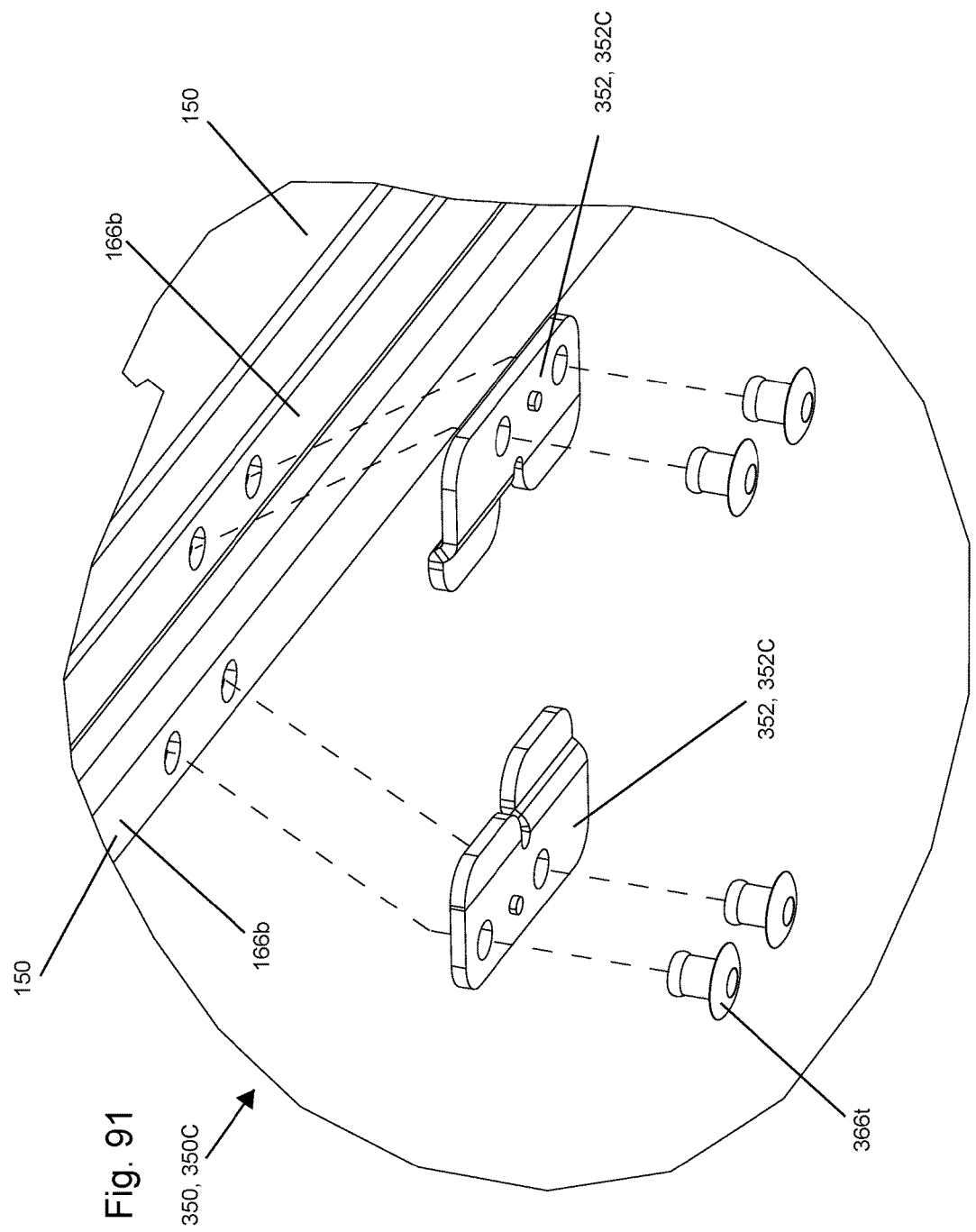
FIG. 91 is a partial exploded perspective view of the interlocking structures of FIG. 81 shown in the engaged configuration.
Figure 92:
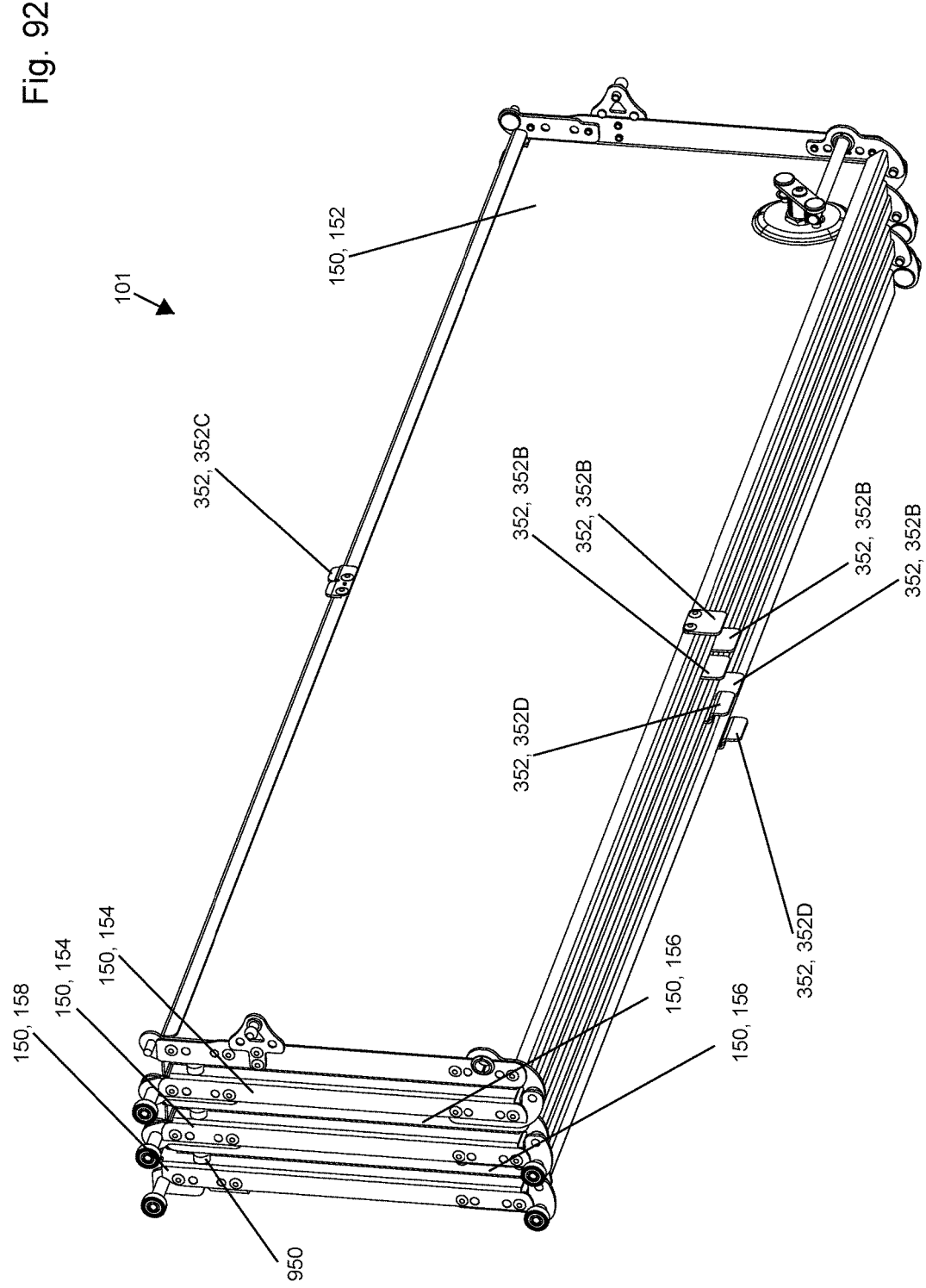
FIG. 92 is a perspective view of the panel assembly of FIG. 8 further illustrating other interlocking structures for interlocking panel pairs of the panel assembly according to the principles of the present disclosure, the interlocking structures shown in a decoupled configuration.

Turning now to FIGS. 82, 88, and 89, an engagement/disengagement sequence of the connecting structure 350C is illustrated. FIG. 82 illustrates the connecting structure 350C when the retractable cover system 100 is in the fully retracted configuration 104. In this configuration, the up-facing surfaces 354u and the down-facing surfaces 354d face in the forward/rearward direction that is generally horizontal. FIG. 88 illustrates the adjacent pair 260 of panels 150 between the extended 102 and the retracted configurations 104. As illustrated at FIG. 88, as the retractable cover system 100 moves toward the extended (i.e., deployed) configuration, the up-facing surfaces 354u increasingly face in an upward direction and the down-facing surfaces 354d increasingly face in a downward direction. FIG. 89 illustrates the connecting structure 350C in an engaged configuration with the retractable cover system 100 fully deployed. In the fully deployed configuration, the up-facing surfaces 354u of the tab 356C1 of the connecting piece 352C engages the down-facing surface 354d of the tab 356C2 of the opposite connecting piece 352C. Likewise, the up-facing surface 354u of the opposite tab 356C1 engages the down-facing surface 354d of the opposite tab 356C2.

Therefore, as illustrated at FIG. 89, the pair of the tabs 356C1, 356C2 of the connecting piece 352C engages with the opposite pair of the tabs 356C1, 356C2 of the opposite connecting piece 352C and thereby prevents upward and downward movement across the adjacent pairs 260 of the panels 150. As there are one upward 354u and one downward 354d facing bearing surface on the first connecting piece 352C and also one up-facing bearing surface 354u and one down-facing bearing surface 354d on the second connecting piece 352C, both upward and downward relative movement between the adjacent pairs 260 of the adjacent panels 150 is prevented. As illustrated at FIGS. 88 and 89, the connecting structure 350C may be used between adjacent pairs 260 of panels 150 connected by the joint 200A. The joint 200A includes an axis of rotation that is below the top surfaces 150t of the panels 150 when the retractable cover system 100 is in the extended configuration 102.

Figure 103:
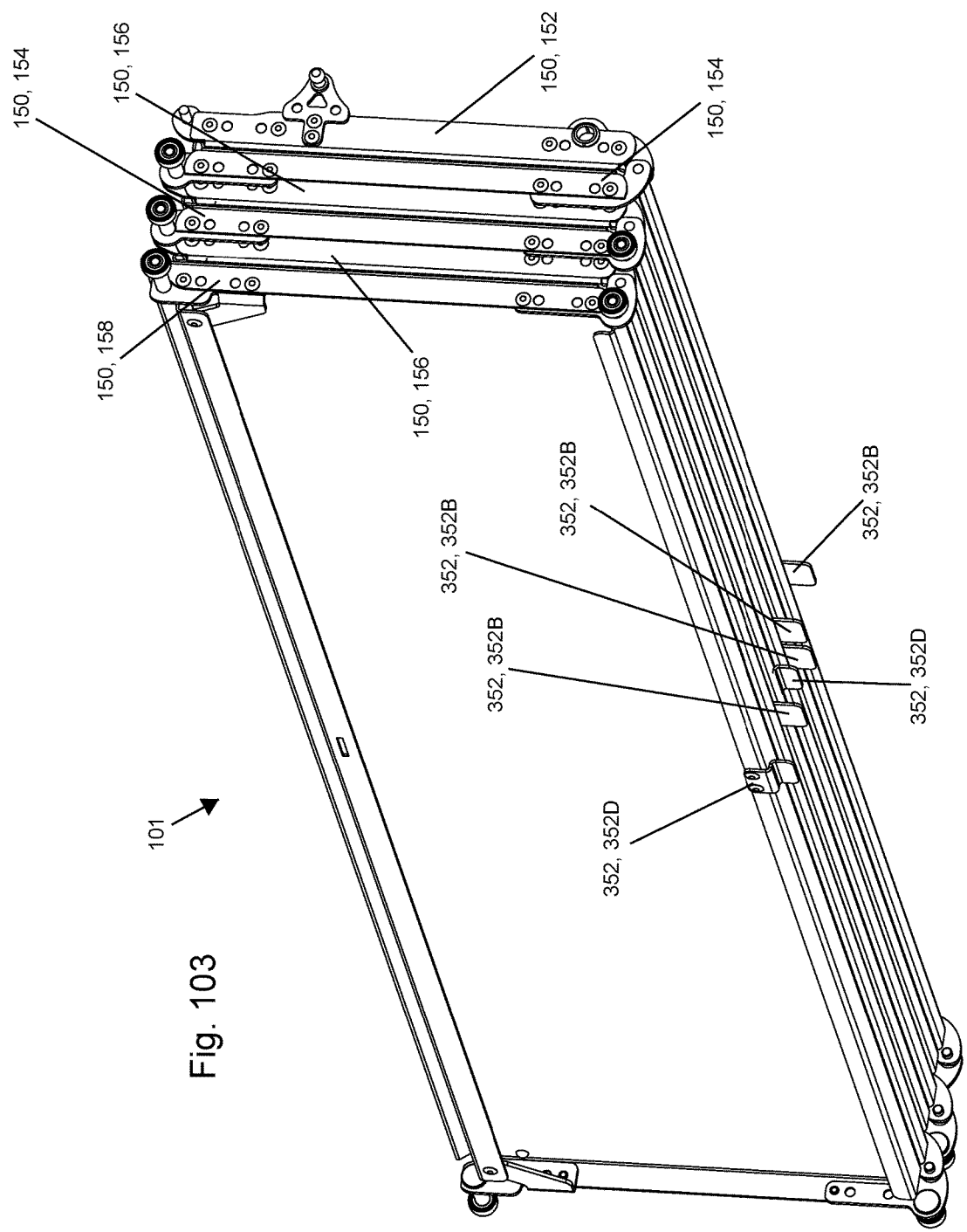
FIG. 103 is a perspective view of the panel assembly of FIG. 8 further illustrating the interlocking structures of FIG. 102 shown in the decoupled configuration.
Figure 104:
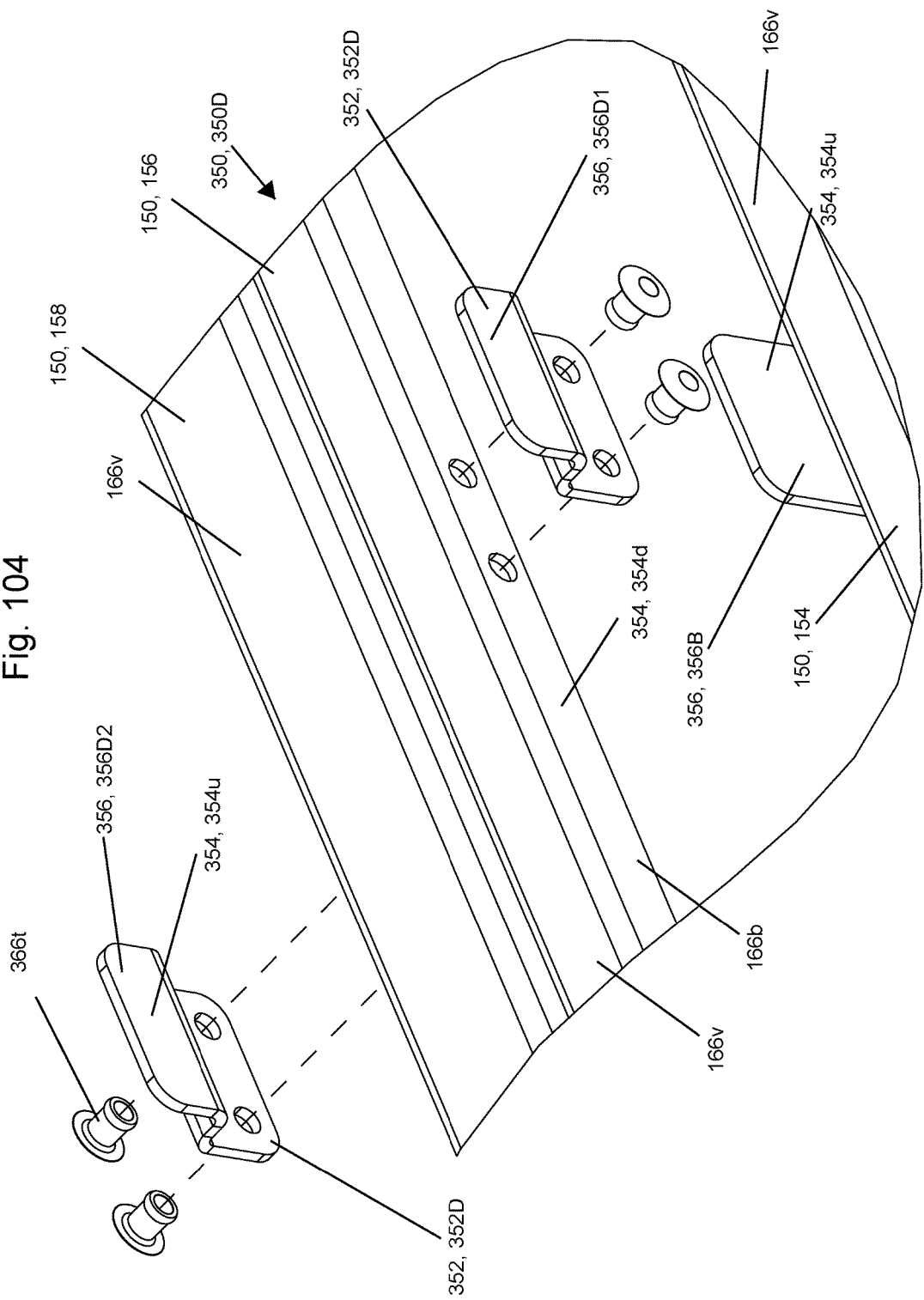
FIG. 104 is a partial exploded perspective view of the interlocking structures of FIG. 102 shown in the decoupled configuration.
Figure 105:
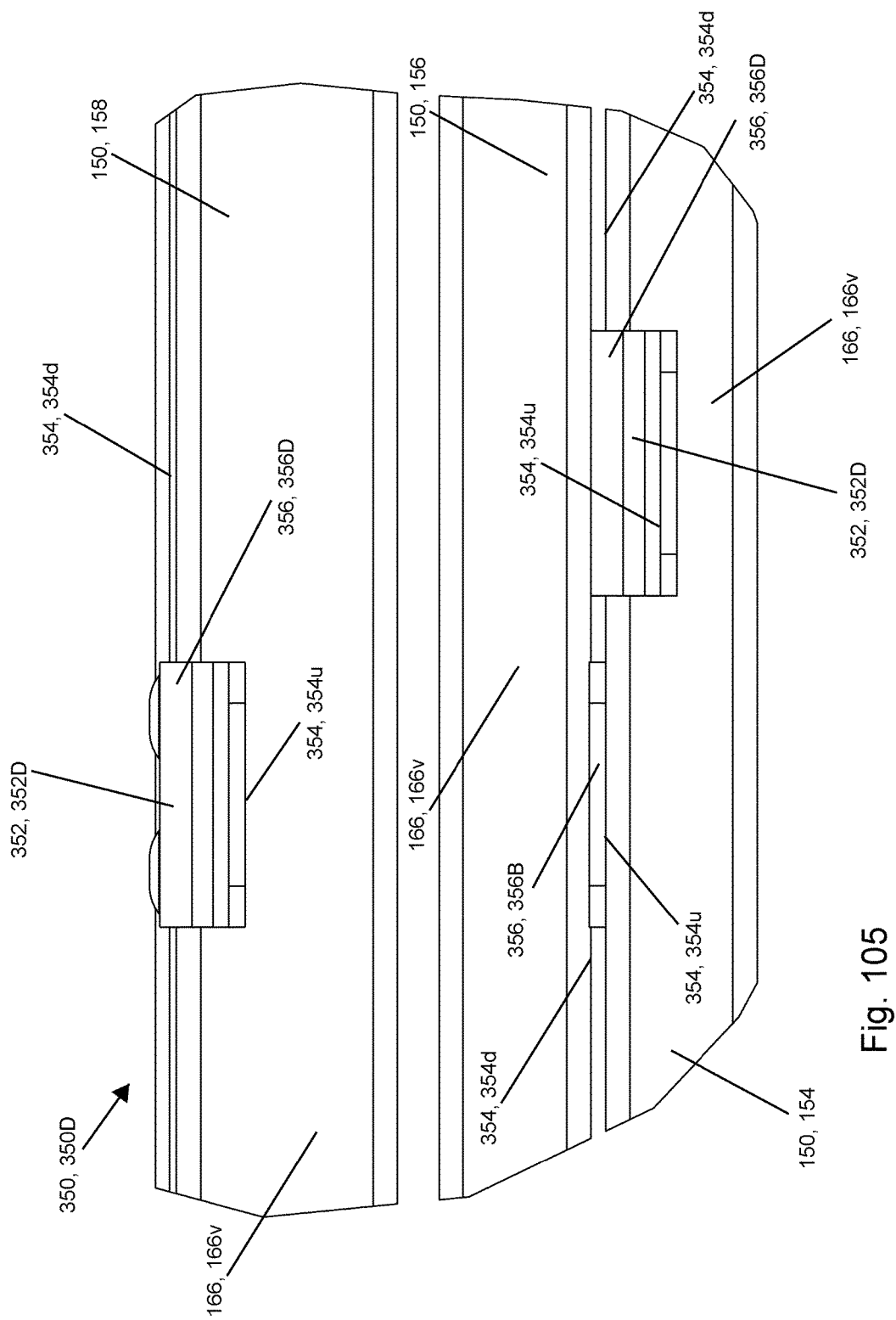
FIG. 105 is a plan view of the interlocking structures of FIG. 102 shown in the decoupled configuration.
Figure 106:
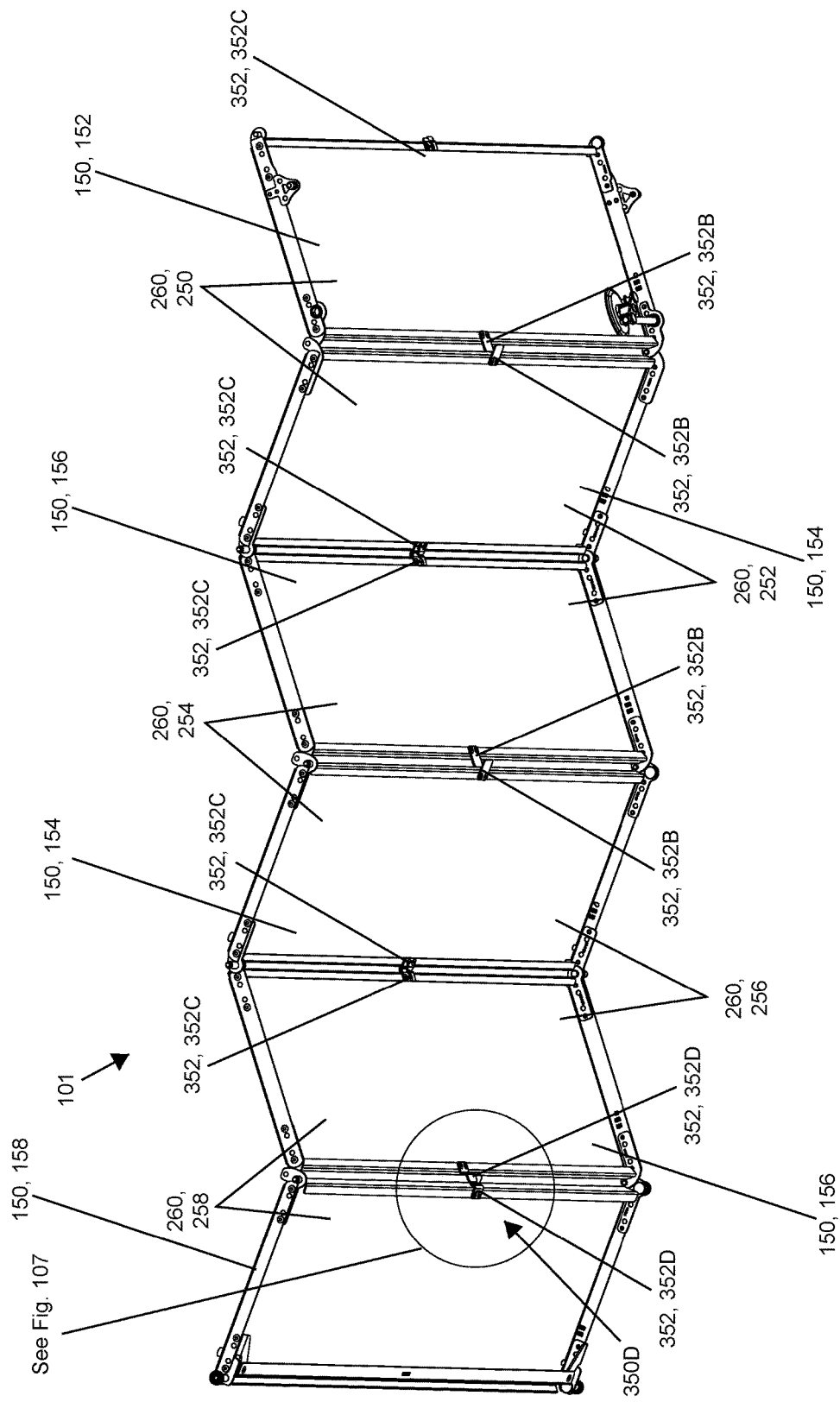
FIG. 106 is a perspective view of the panel assembly of FIG. 8 further illustrating the interlocking structures of FIG. 102.
Figure 107:
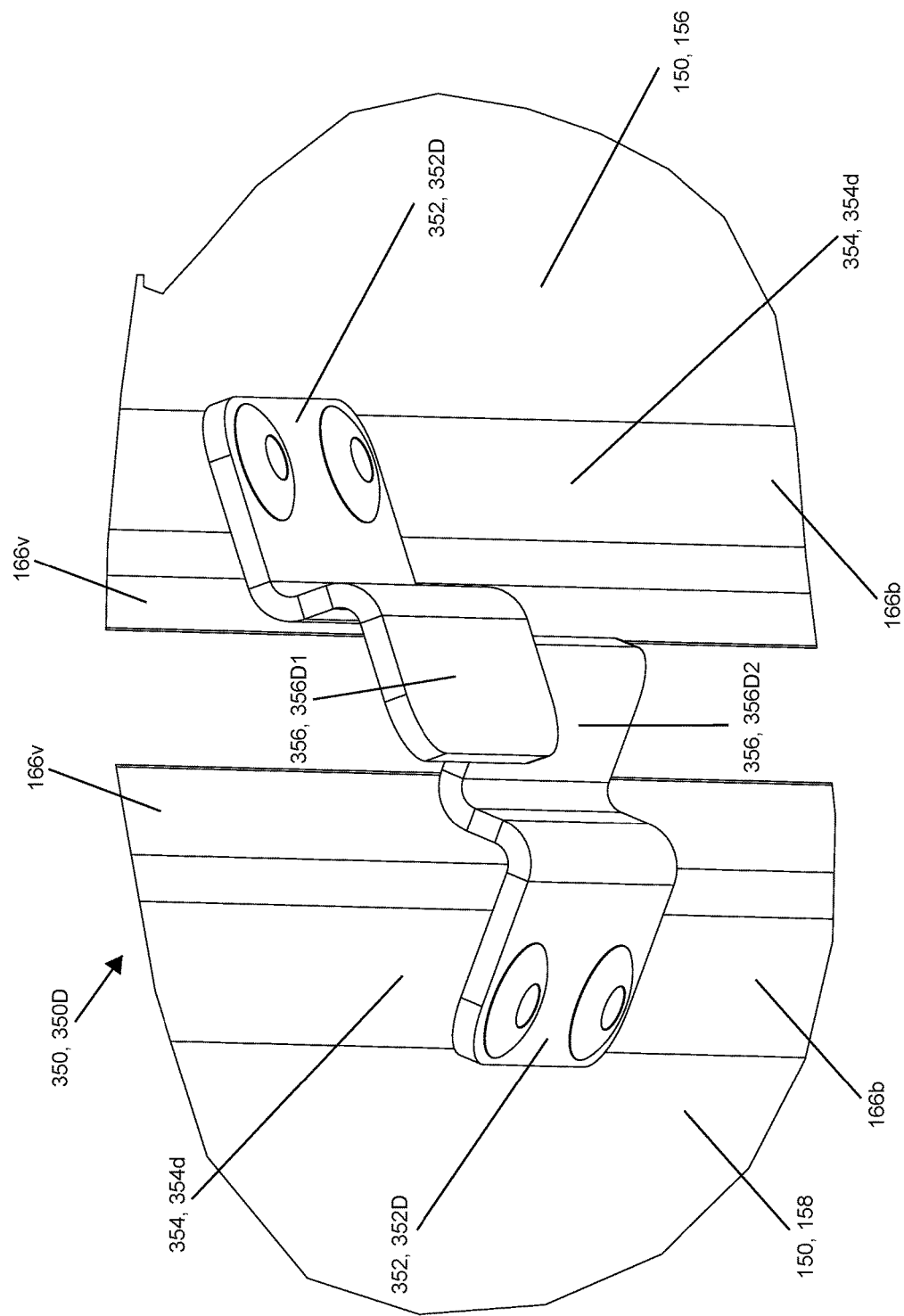
FIG. 107 is a partial perspective view of the interlocking structures of FIG. 102 shown in a transitioning configuration.
Figure 108:
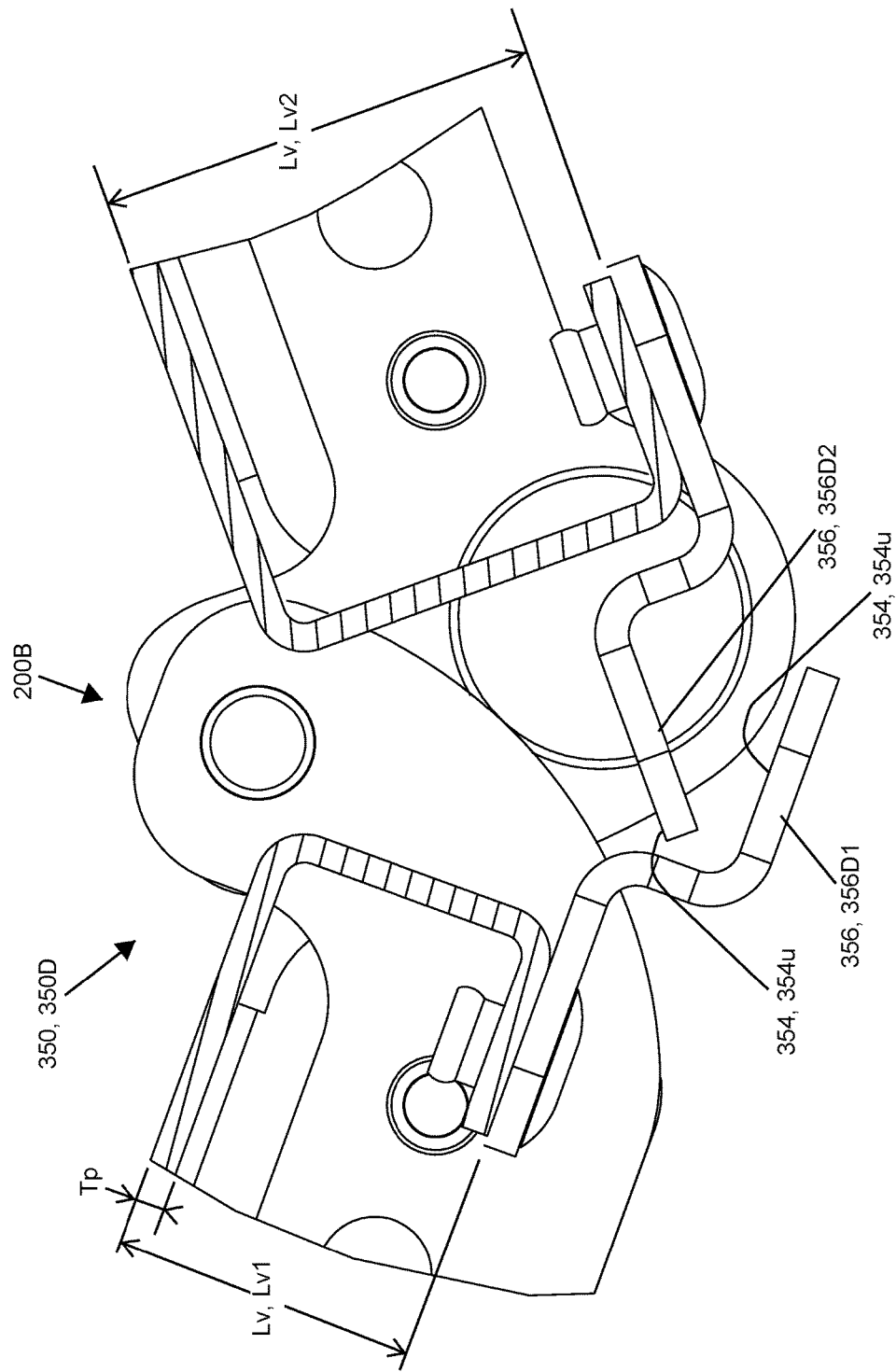
FIG. 108 is a cross-sectional side view of the interlocking structures of FIG. 102 shown in a transitioning configuration.

Turning now to FIGS. 102-111, the connecting structure 350D will be described in detail. The connecting structure 350D includes a pair of connecting pieces 352D of the connecting pieces 352 and portions of the bottom leg 166b of the C-channel feature 166 of the adjoining panels 156, 158. As illustrated at FIG. 104, the connecting pieces 352D are fastened to the bottom leg 166b of the C-channel feature 166. As depicted, the connecting pieces 352D are connected with a pair of the fasteners 366t through a pair of holes 368. As illustrated at FIG. 105, the connecting pieces 352D, and therefore the fasteners 366t, are staggered. By including a staggered pattern, the connecting structure 350D can be made more compact. By staggering the connecting pieces 352D, the connecting pieces 352D avoid interfering with each other. In addition, the fasteners 366t and the heads of the fasteners 366t also avoid interfering with the fasteners 366t of the opposite connecting piece 352D. As illustrated at FIG. 107, the down-facing bearing surfaces 354d are included on a portion of the bottom leg 166b of the C-channel feature 166. As illustrated at FIG. 108, the up-facing bearing surfaces 354u are included on tabs 356D1, 356D2 of the connecting piece 352D. A first of the connecting pieces 352D is on a first panel 156 of an adjacent pair 260 of the panels 156, 158, and a second of the connecting pieces 352D is connected to the opposite panel 158. As depicted, the connecting pieces 352D can be identical parts used flipped over from each other.

Figure 109:
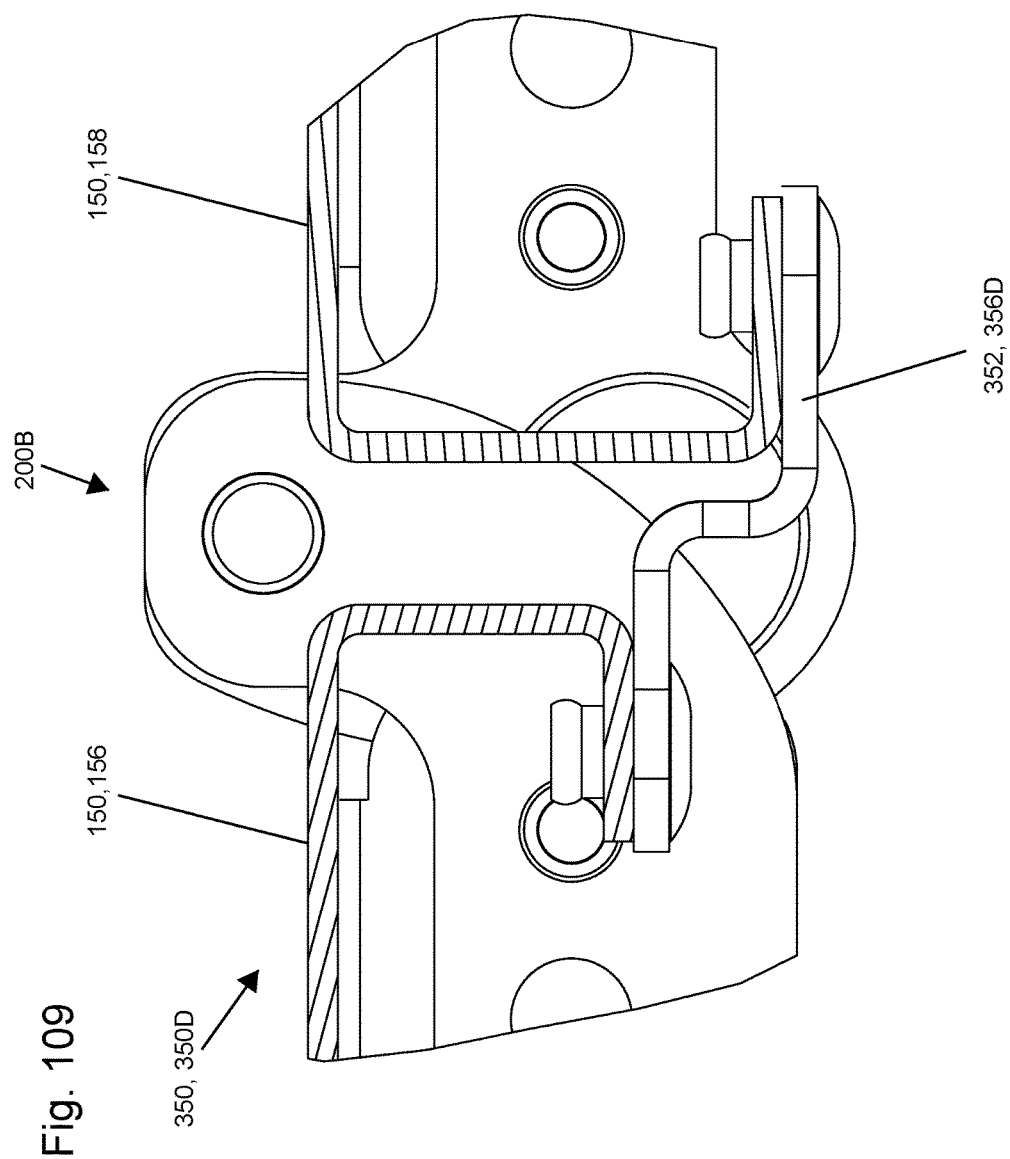
FIG. 109 is a cross-sectional side view of the interlocking structures of FIG. 102 shown in an engaged configuration.
Figure 110:
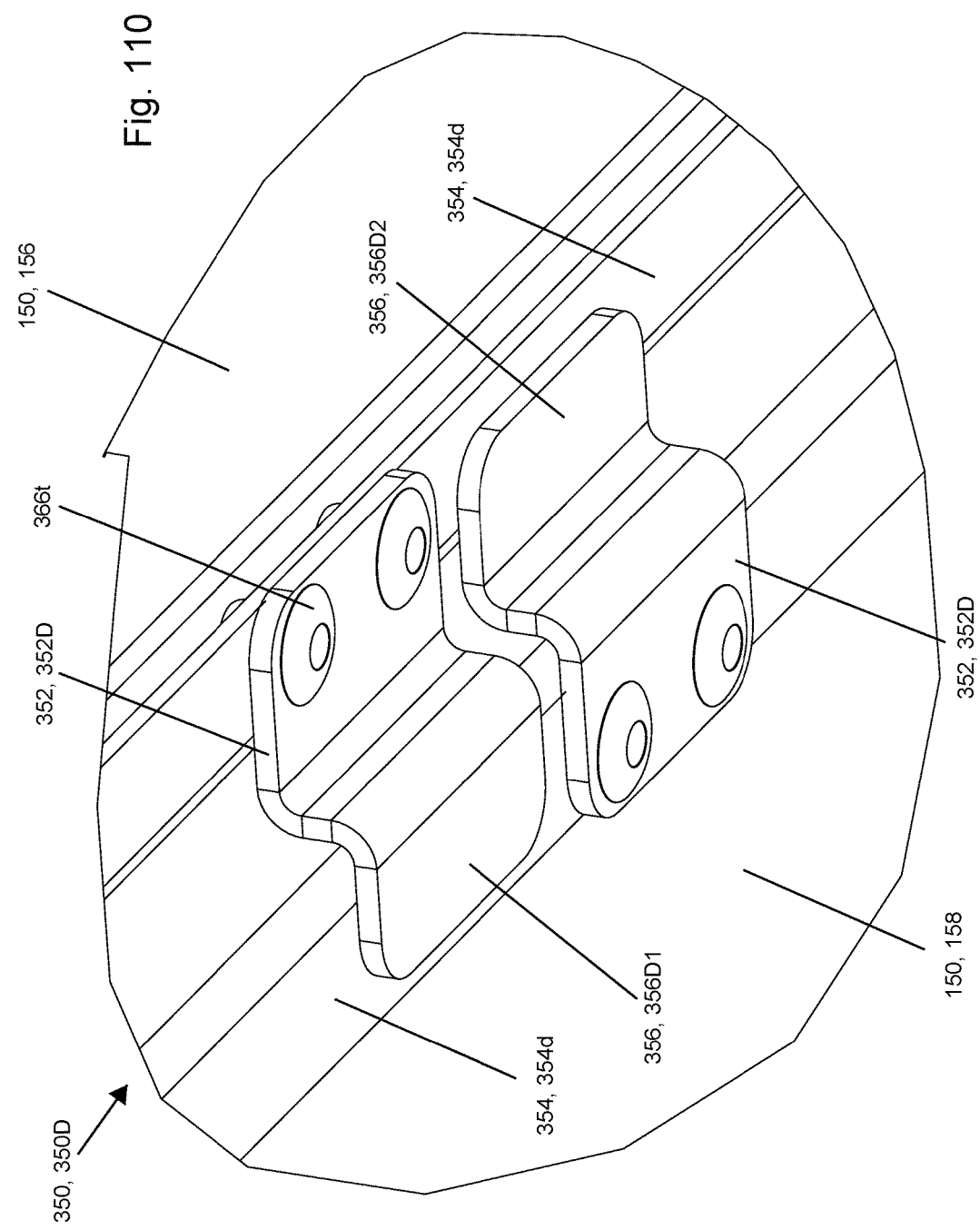
FIG. 110 is a partial perspective view of the interlocking structures of FIG. 102 shown in the engaged configuration.
Figure 111:
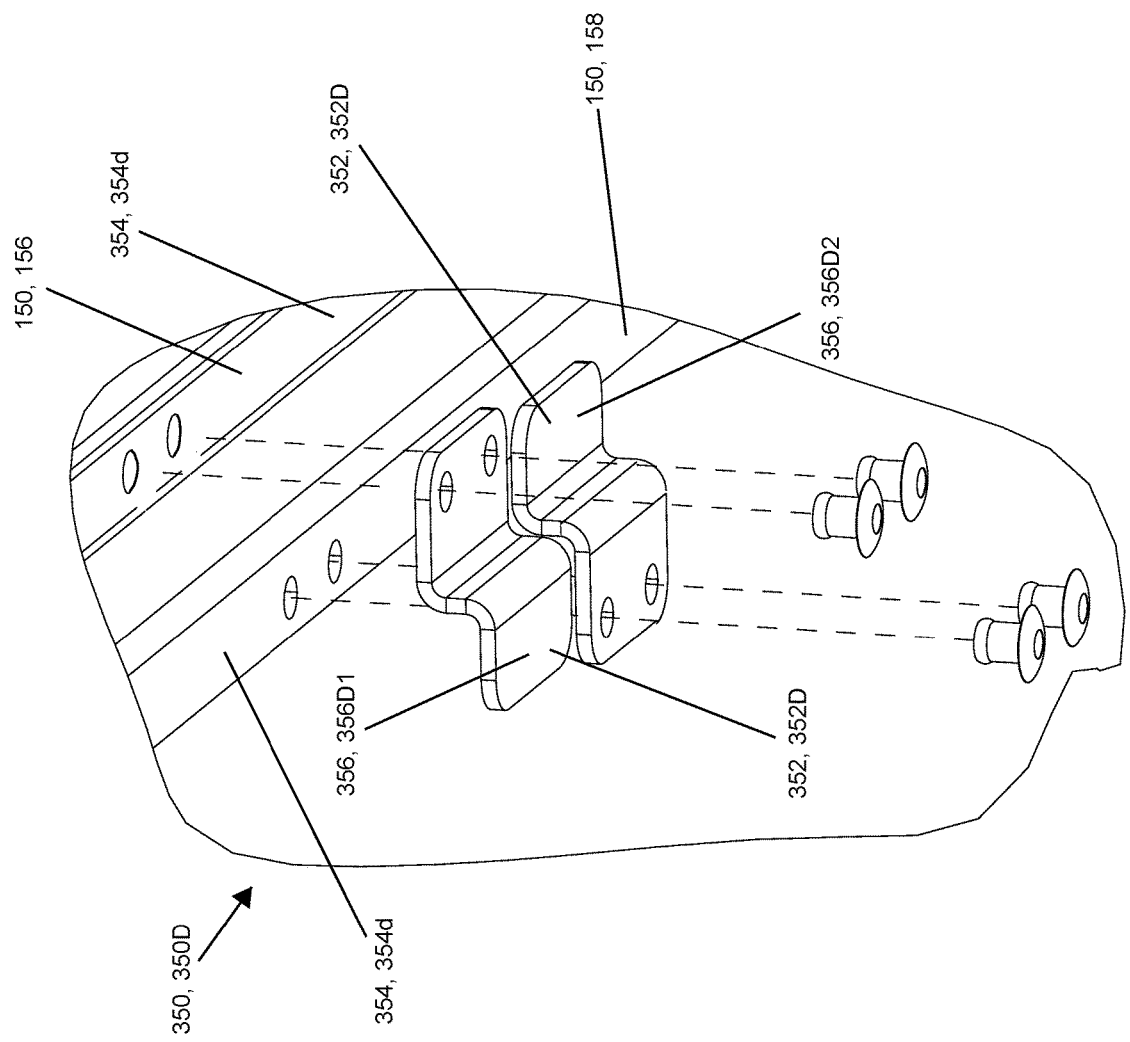
FIG. 111 is a partial exploded perspective view of the interlocking structures of FIG. 102 shown in the engaged configuration.

Turning now to FIGS. 103, 108, and 109, an engagement/disengagement sequence of the connecting structure 350D is illustrated. FIG. 103 illustrates the connecting structure 350D when the retractable cover system 100 is in the fully retracted configuration 104. In this configuration, the up-facing surfaces 354u and the down-facing surfaces 354d face in a forward/rearward direction that is generally horizontal. FIG. 108 illustrates the adjacent pair 258 of panels 150 between the extended 102 and the retracted configurations 104. As illustrated at FIG. 108, as the retractable cover system 100 moves toward the extended (i.e., deployed) configuration, the up-facing surfaces 354u increasingly face in an upward direction and the down-facing surfaces 354d increasingly face in a downward direction. FIG. 109 illustrates the connecting structure 350D in an engaged configuration with the retractable cover system 100 fully deployed. In the fully deployed configuration, the up-facing surfaces 354u engage the down-facing surface 354d of the opposite panel. Likewise, the up-facing surface 354u of the opposite tab 356D1, 356D2 engages the down-facing surface 354d of the opposite panel 150.

Therefore, as illustrated at FIG. 109, the pair of the tabs 356D1, 356D2 of the connecting pieces 352D engage with opposite portions of the bottom leg 166b of the C-channel features 166 and thereby prevent upward and downward movement across the adjacent pair 258 of the panels 150. FIGS. 108 and 109 generally illustrate the joint 200B as the axis of the joint 200B is above the top surfaces 150t of the panels 156, 158 when the retractable cover system 100 is in the deployed configuration.

The connecting structure 350D is similar to the connecting structure 350B except that the panel 158 includes a thickness Lv2 that is substantially greater than a thickness Lv1 of the adjacent panel 156. For this reason, the connecting pieces 352D include a jog that matches a difference between the thickness Lv1 and the thickness Lv2. As with the connecting structure 350B, the connecting pieces 352D are staggered with respect to each other and thereby avoid interfering with each other along the width W of the panels 150 (see FIG. 8). As with the connecting structure 350B, the connecting structure 350D includes the upward facing bearing surfaces 354u on the connecting piece 352B. As illustrated at FIG. 97, the downward facing bearing surfaces 354d are included on a portion of the bottom leg 166b of the corresponding panel 150.

The connecting structures 350B are used to act as a reinforcing structure at or near the center of the panels 150 of the same thickness across the joints 200B where the pivot axis is above the top 150t of the panels 150, when extended, thereby joining the panels 150 to one another. When the cover 100 is open, the brackets 352B hang below the cover 100. As the cover 100 is closed, the brackets 352B rotate up and mate with a portion of the underside long leg 166b of the panel 150 opposite the joint. Each mating pair of the brackets 352B is offset from the center of the panels 150 in opposite directions slightly for clearance as they swing up into place. This forms a joint because neither of the panels 150 is able to translate up or down in the center once the cover 100 is closed.

The connecting structures 350C are used to act as a reinforcing structure and mesh together and join where the pivot axis is below the top 150t of the panels 150, when extended (i.e., at the joints 200A). The connecting structure 350A is similar but is between the first panel 152 and the cross-member 130. When the cover 100 is open, the brackets 352C are opposite each other at or near the center of the panels 150. When the cover 100 is open, the brackets 352C extend above the cover 100. As the cover 100 is closed, the brackets 352C rotate and mesh together. In the closed position of the cover 100, the tab 356C2 of each bracket 352C is offset upward above the opposing flat tab 356C1 of the mating bracket 352C. This forms a joint when these offset tabs 356C1 and 356C2 (i.e., sections) slide over the mating tab 356C1 and 356C2 on the opposite bracket 352C. In certain embodiments, both brackets 352C are equal and opposite and both have an offset 356C2 and a flat tab 356C1 and thus do not allow either adjacent panel 150 to translate up or down at the location of the connecting structures 350C (e.g., in the center of the panel 150) once the connecting structure 350C (i.e., joint) is locked. The rivets 366t of the connecting structures 350C are offset from each other when the cover 100 is folded open. This allows the panel assembly 101 to take up minimum space and not have excessive bow when the joint is collapsed. For the connecting structure 350A between the first panel 152 and the rail crosspiece 130, the rail crosspiece bracket 352A is stationary in a horizontal position and the mating bracket 352C rotates up and into mesh, similar to the connecting structures 350C.

The connecting structure 350D is used at the final two panels 156, 158 on the underside of the long legs 166b in generally the same manner as the other center supports 350B on upper pivot joints 200B. The brackets 352D are used to act as a reinforcing structure at or near the center of the panels 156, 158 of different thickness at the joints 200B where the pivot axis is above the panels 150 thereby joining the panels 156, 158 to one another in the middle. When the cover 100 is open, the brackets 352D hang below the cover 100. As the cover 100 is closed, the brackets 352D rotate up and mate with the underside long leg 166b of the panel 150 opposite the joint. The mating pair is offset from the center of the panels 150 in opposite directions slightly for clearance as they swing up into place. The difference between this pair of brackets 352D and the pairs of brackets 352B that support the other upper pivot joints 200B is an offset jog in the brackets 352D. The long leg on the last panel 158 is taller than that of the mating panel 156 and so requires that the tabs 356D1, 356D2 be offset to complete the joint. As with the connecting structure 350B, the connecting structure 350D forms a joint because neither panel 156, 158 is able to translate up or down in the center once the cover 100 is closed.

As illustrated at FIGS. 81, 88, 89, 92, and 102, a bumper 950 may be mounted on the panels 150 for use in the stowed configuration 104. In particular, the bumper 950 includes an attachment portion 950A adapted to attach to the panel permanently or semi-permanently. The bumper 950 also includes a bumper portion 950B adapted to contact an opposite panel 150 when the retractable cover system 100 is in the stowed configuration 104. As illustrated, the attachment portion 950A includes a projection adapted to insert through a mounting hole of the panel 150. The projection may include a latching feature to retain the attachment portion 950A within the hole. The bumpers 950 may compress when the retractable cover system 100 is in the stowed configuration 104 and thereby reduce or prevent rattling of the retractable cover system 100 when in the stowed configuration 104. The bumpers 950 may prevent the panels 950 from directly contacting each other and thereby prevent the panels 950 from scratching, scrapping, and/or marring each other.

As illustrated at FIGS. 2 and 3, the bumpers 950 may be hidden under the rails 110*l*, 110*r* when the retractable cover system 100 is in the extended configuration 102 and thereby be protected from external objects and/or avoid detracting from the otherwise smooth appearance of the retractable cover system 100, when in the extended configuration 102.

Figure 12:
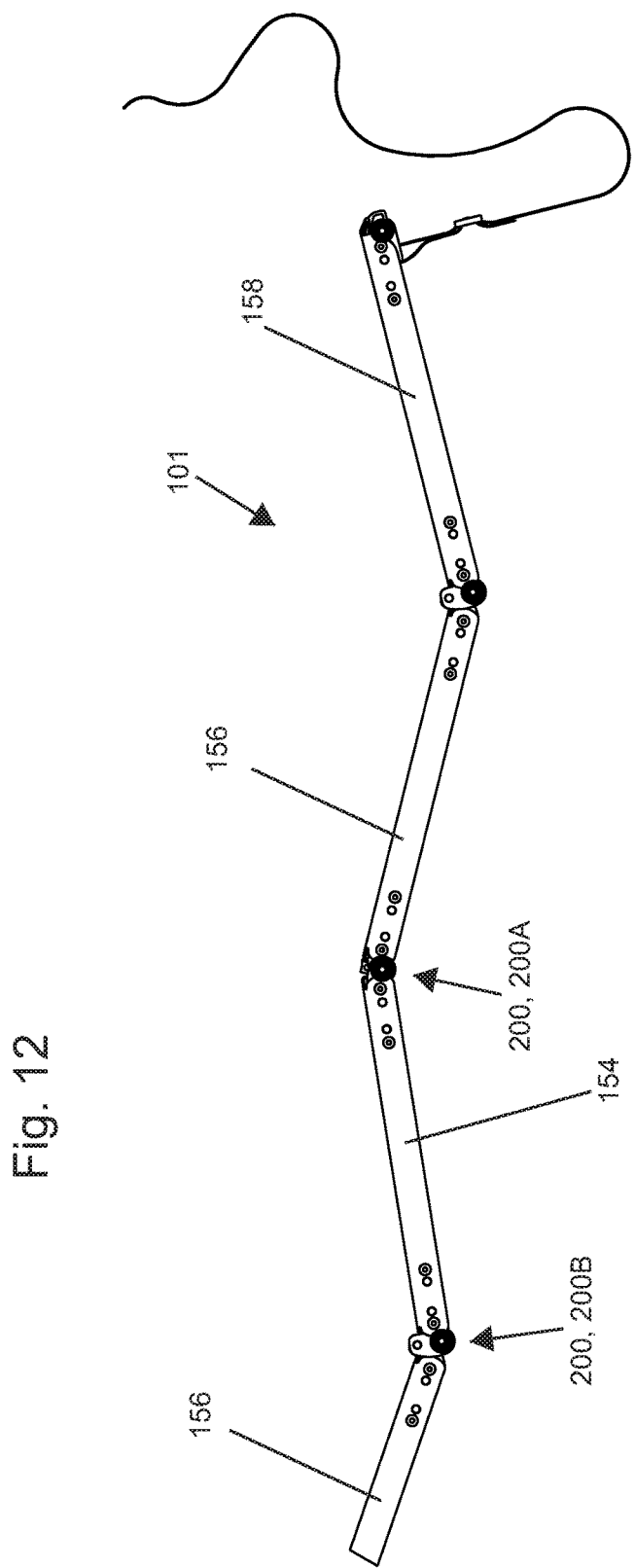
FIG. 12 is a partial left-side elevation view illustrating hinging movement between panels of the panel assembly of FIG. 8.
Figure 124:
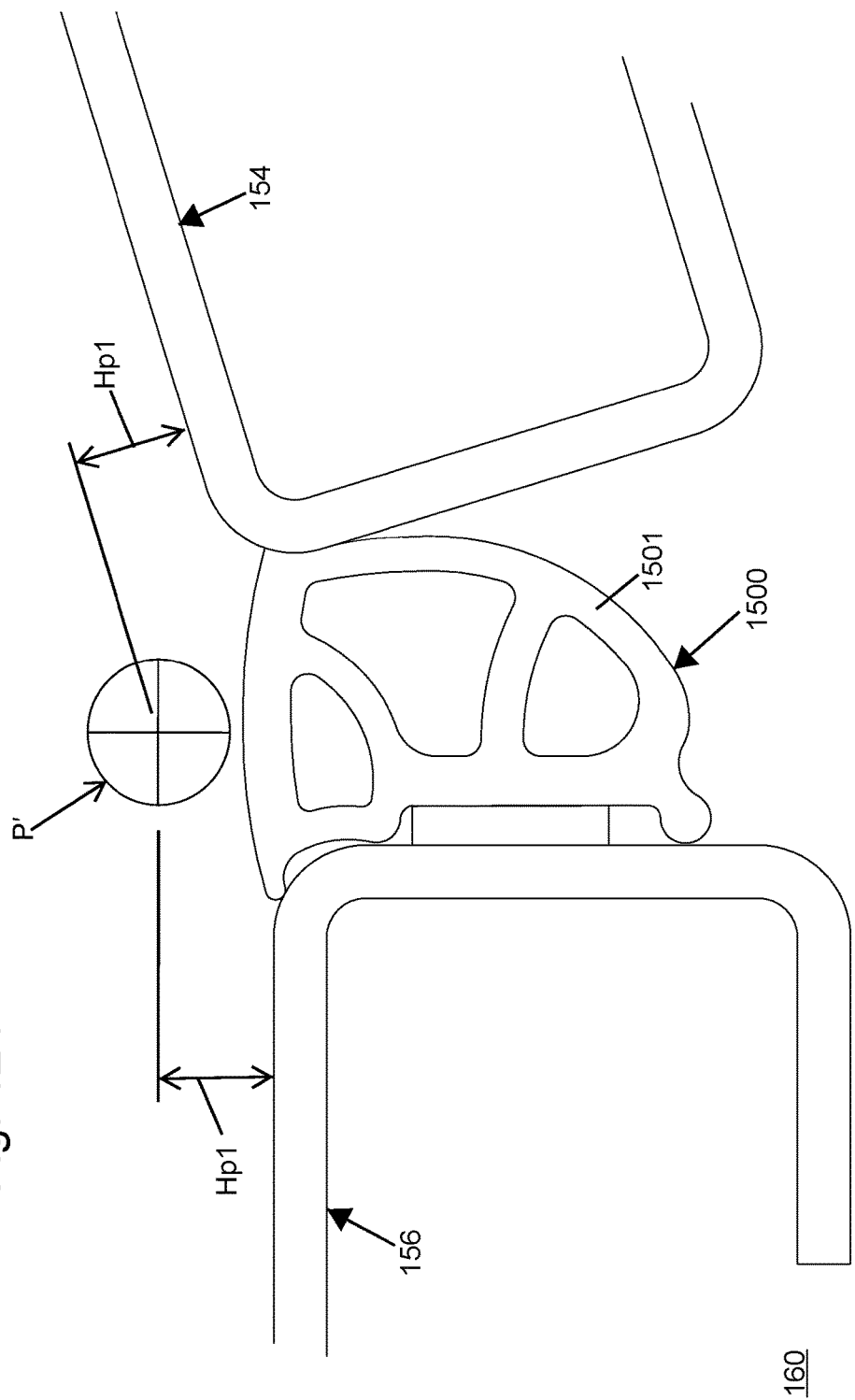
FIG. 124 is the partial cross-sectional left side elevation view of FIG. 123, but with the first and the second panels moved toward the extended configuration of FIG. 3.
Figure 125:
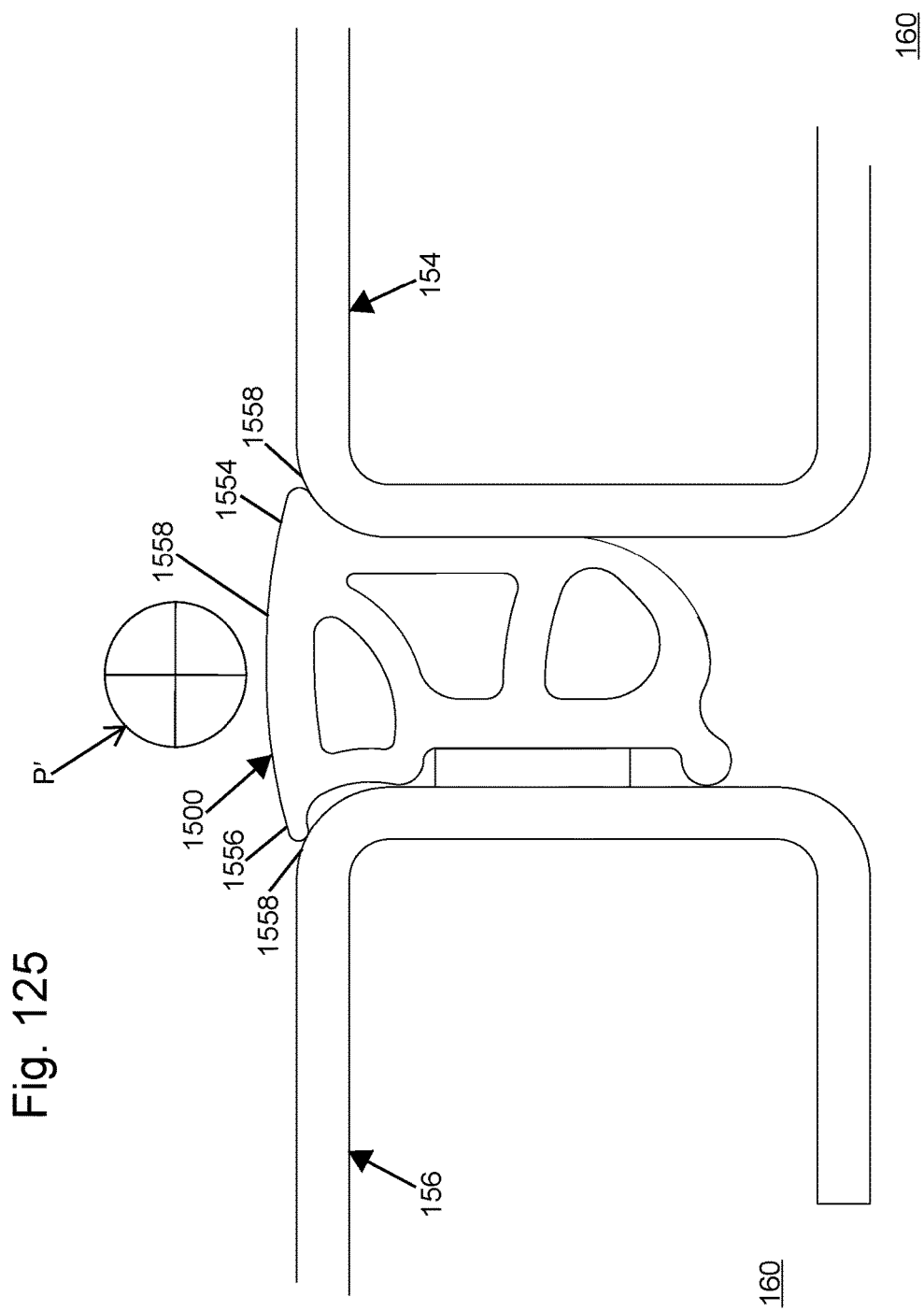
FIG. 125 is the partial cross-sectional left side elevation view of FIG. 123, but with the first and the second panels at the extended configuration of FIG. 3.

Turning now to FIGS. 121-129, a seal 1500 for the retractable cover system 100 is illustrated according to the principles of the present disclosure. The seal 1500 may be an extruded seal, in certain embodiments. In other embodiments, the seal 1500 may be non-extruded. The seal 1500 may generally be used in a similar manner as the seal 500, described above. In particular, the seal 1500 may be used between the panels 150 of the retractable cover system 100. In certain embodiments, the same seal 1500 may be used across joints, such as the joints 200A, with the pivot P positioned inside an interior 160 of the panels 150 (see FIGS. 12 and 127) and also used across joints, such as the joints 200B, with the pivot P' positioned outside an exterior of the panels 150 (e.g., outside the top surface 150*t*). In other embodiments, the seal 1500 may include different features when used with the joints 200A that pivot on the inside of the panels 150 than when used with the joints 200B that pivot on the outside of the panels 150. As illustrated at FIGS. 12 and 125, the joints 200B have the pivot P' above the top surface 150*t* of the panels 150 when the panels 150 are in the covering configuration 102.

Figure 126:
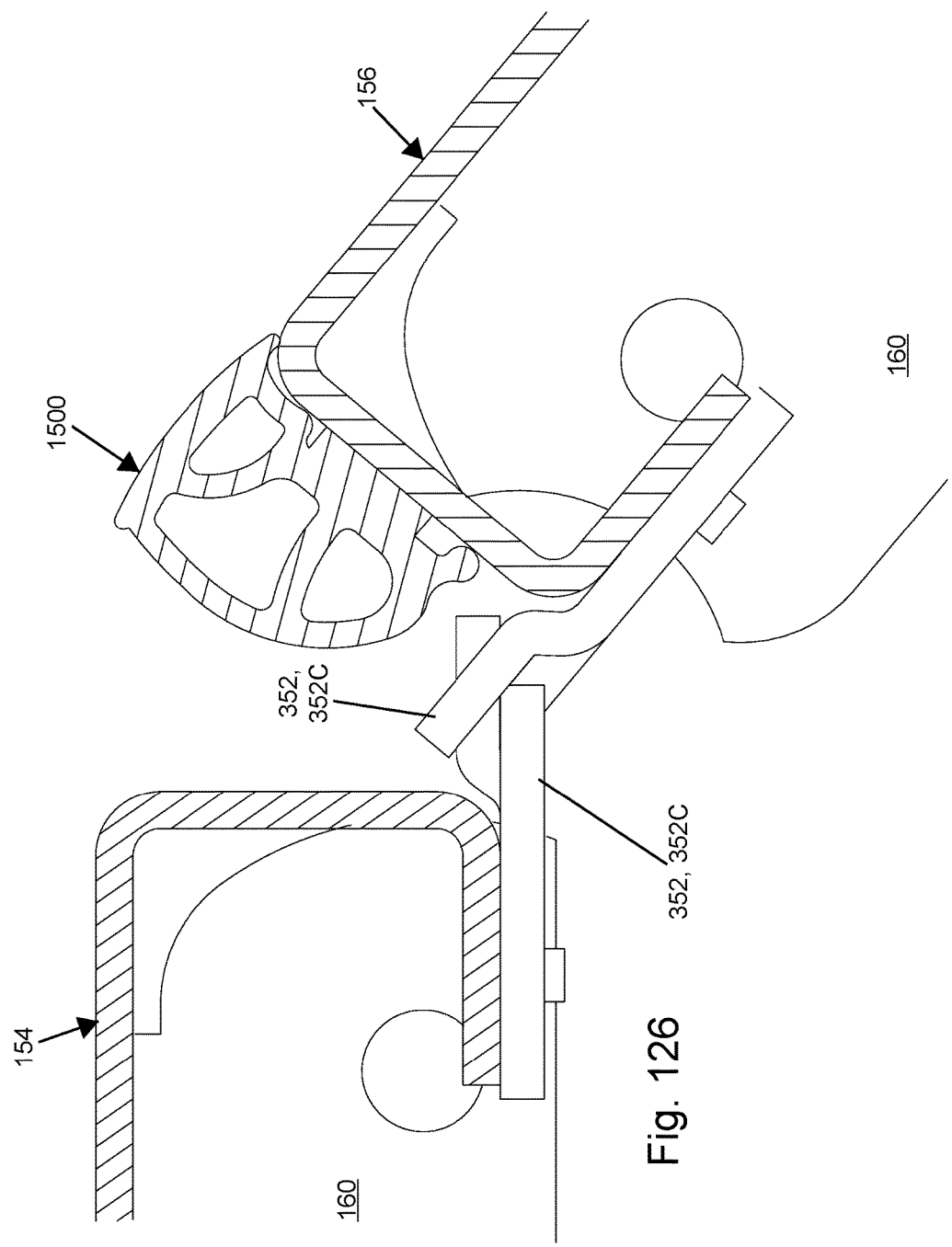
FIG. 126 is a partial cross-sectional left side elevation view illustrating the seal of FIG. 121 positioned between the first and the second panels of FIG. 22 with the first and the second panels joined by the first joint type of FIG. 18 thereby positioning the joint pivot axis of FIG. 56 below the top surfaces of the first and the second panels, and further illustrating certain of the interlocking structures of FIG. 81.
Figure 128:
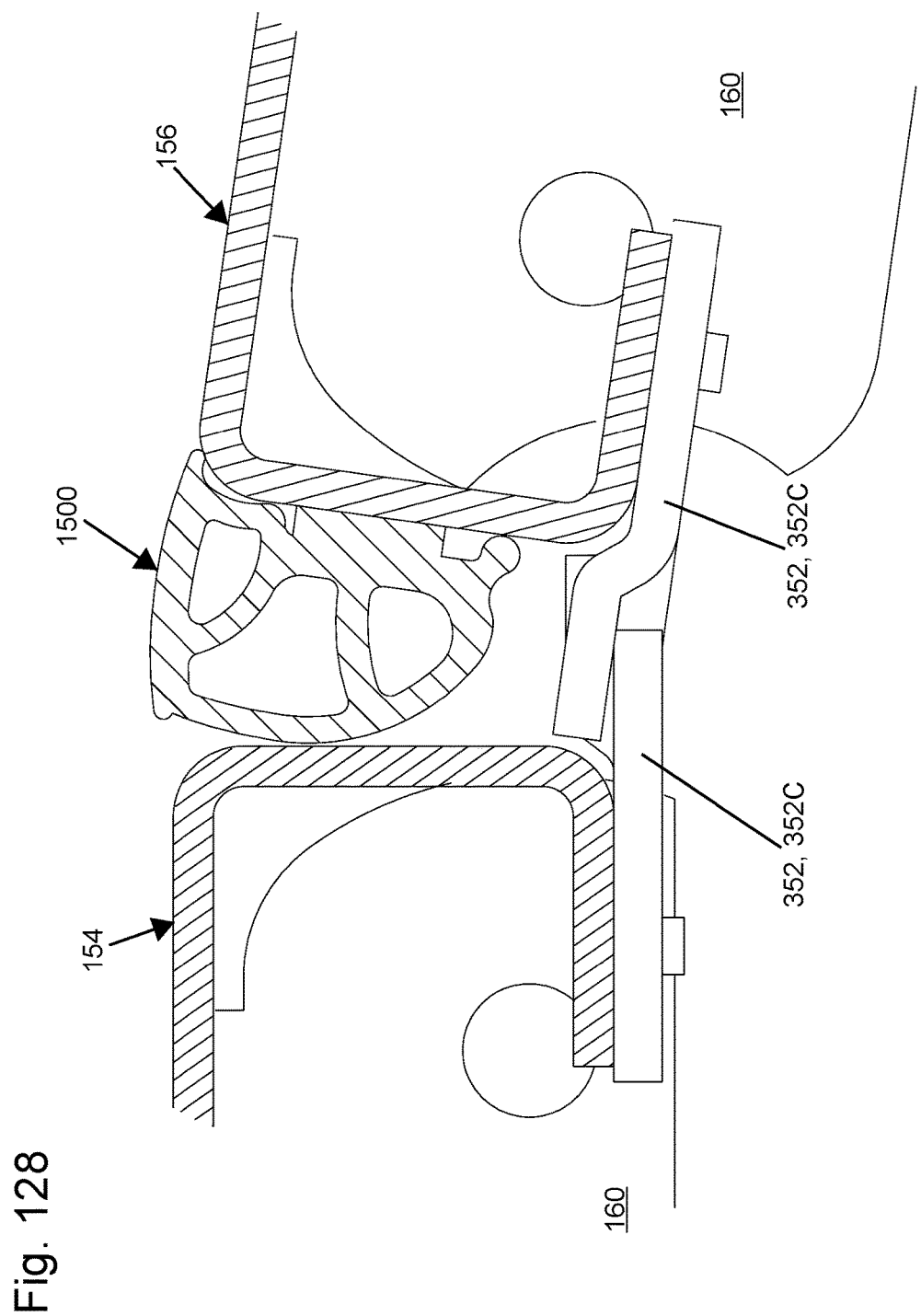
FIG. 128 is the partial cross-sectional left side elevation view of FIG. 126, but with the first and the second panels moved toward the extended configuration of FIG. 3.
Figure 129:
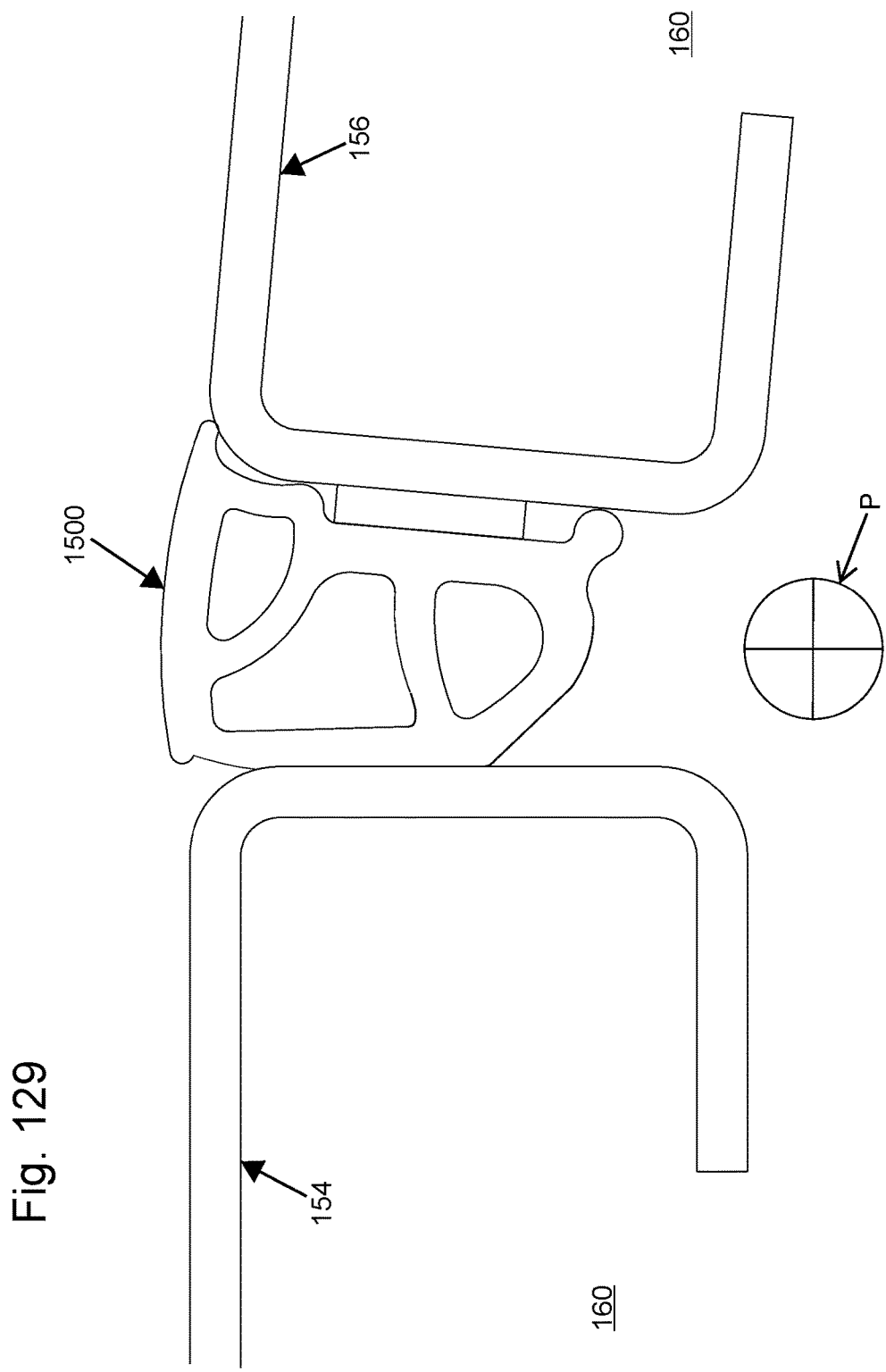
Figure 130:
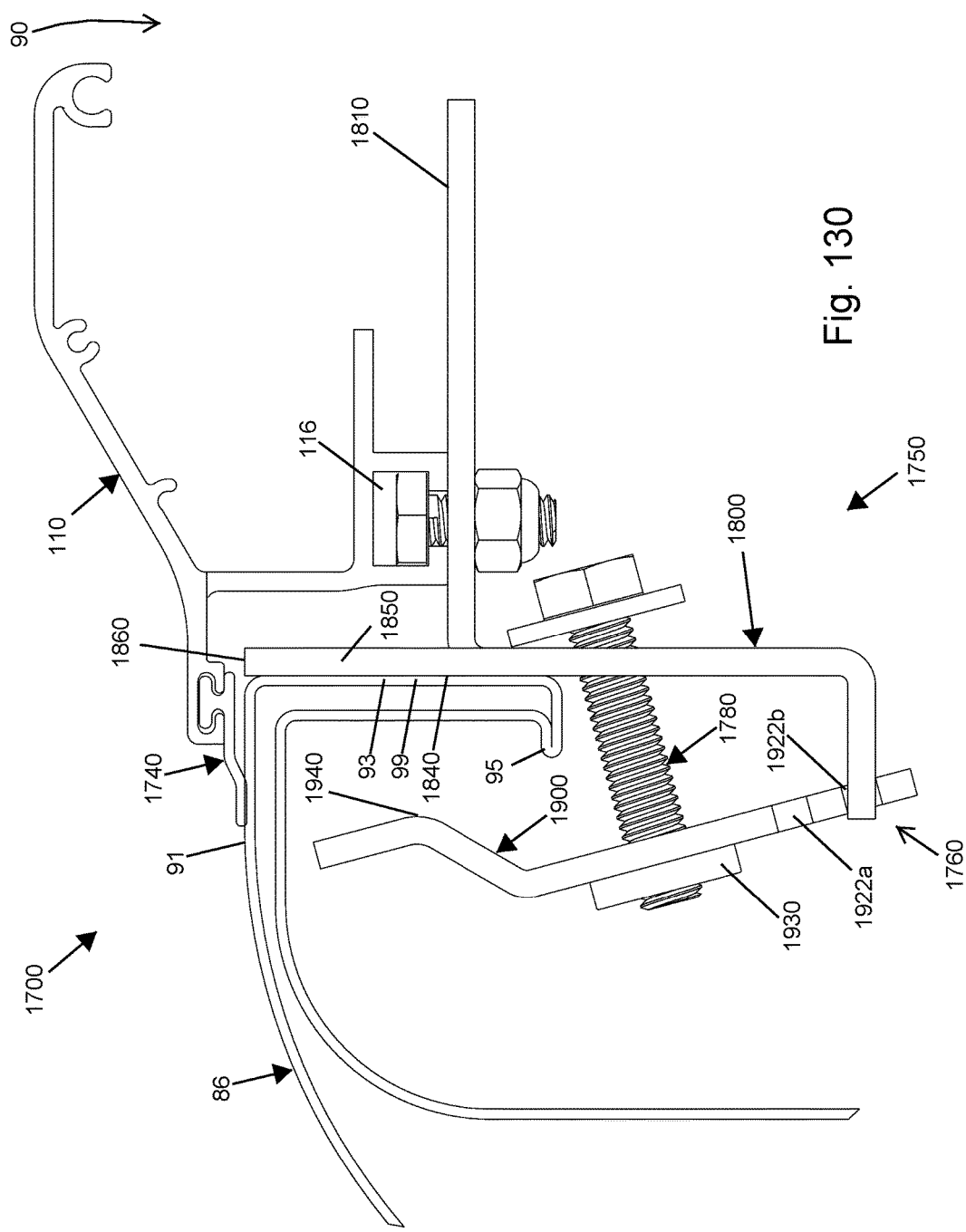
Figure 131:
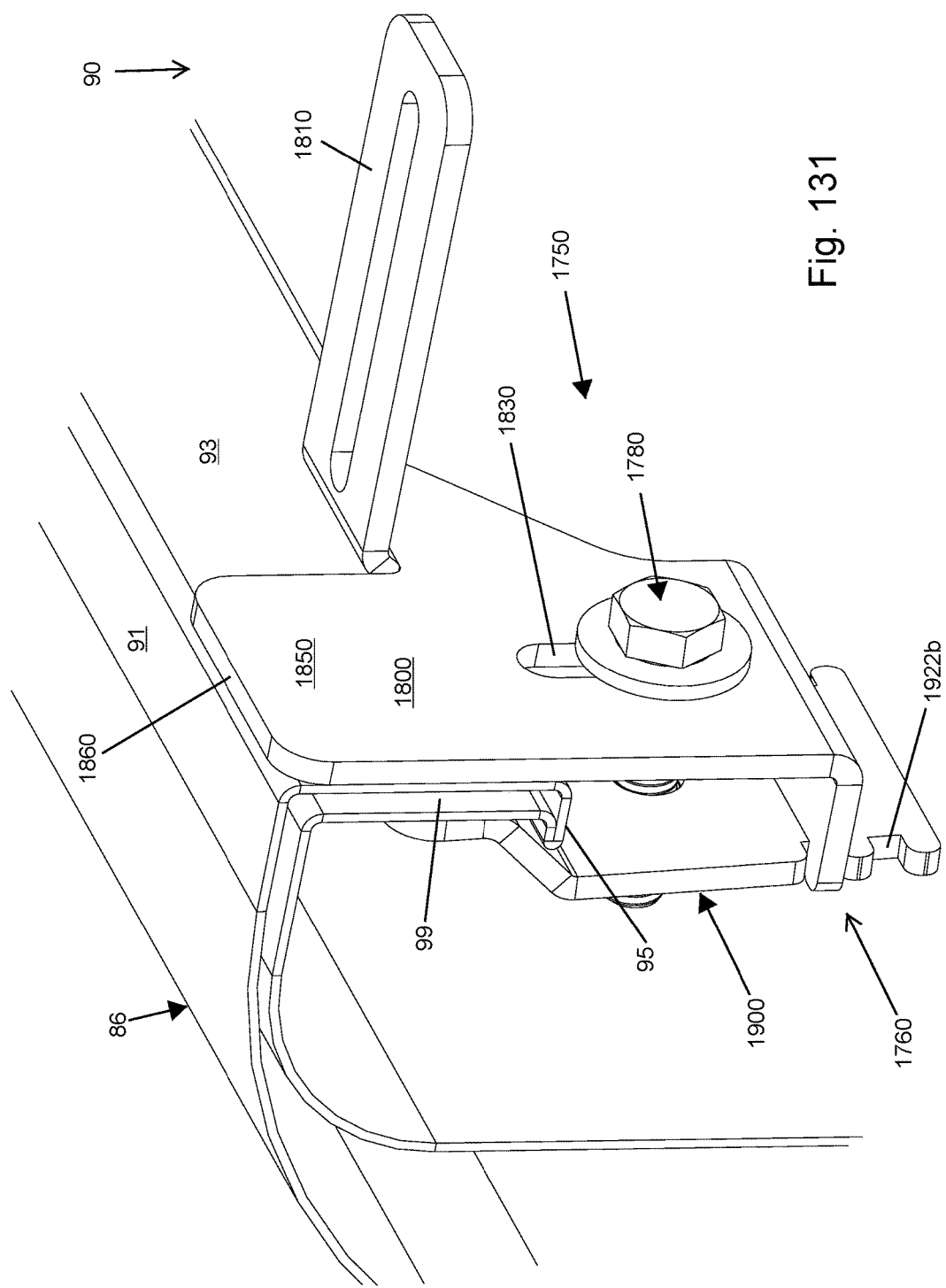
Figure 132:
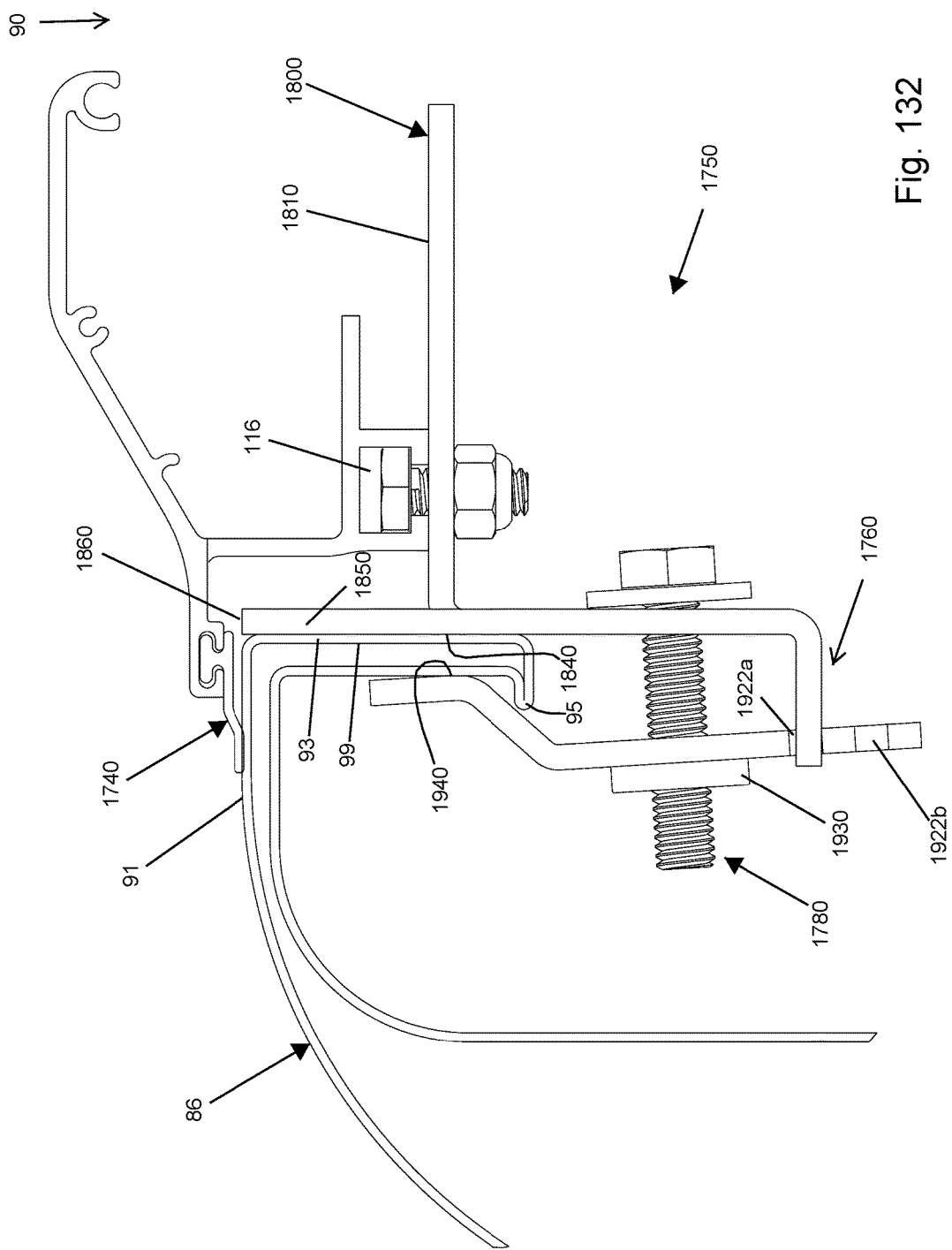
Figure 133:
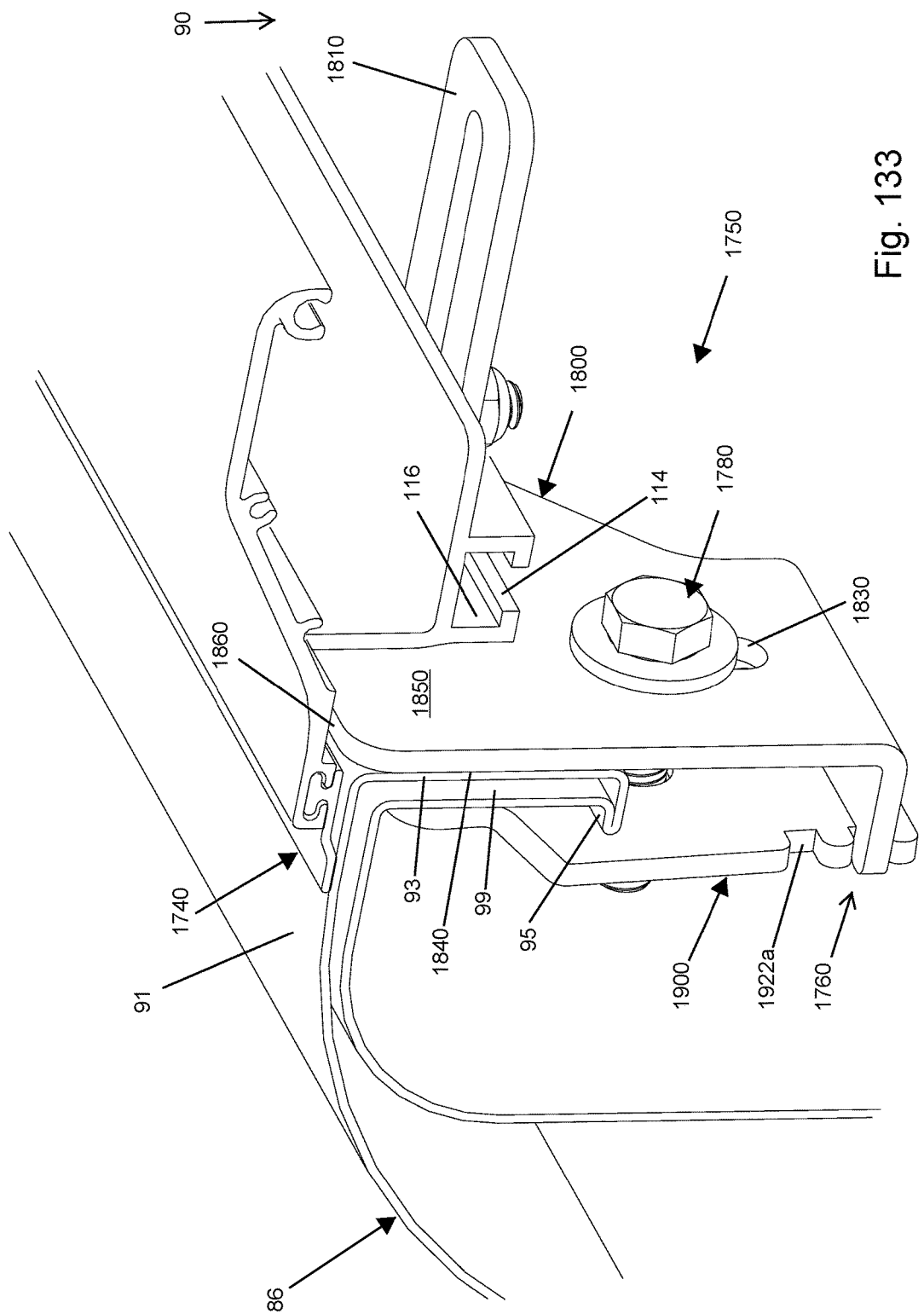

As with the seal 500, the seal 1500 extends between a pair of ends 1501. One or both of the ends 1501 may be open. Alternatively, one or both of the ends 1501 may be plugged. By plugging the ends 1501, a hollow interior 1524 or portions thereof may be pressurized. As illustrated at FIG. 123, the seal 1500 extends between a top surface 1502 and a bottom 1512. The top surface 1502 generally corresponds with the top surface 150*t* of the panels 150. The bottom 1512 is generally positioned opposite the top surface 1502 and between pairs of the panels 150 when the panels 150 are in the covering configuration 102. As illustrated at FIGS. 126 and 128, the bottom 1512 of the seal 1500 is preferably positioned above the connecting structures 350 and can thereby be used together with the connecting structures 350, described above.

As illustrated at FIG. 123, the seal 1500 also extends between a first side 1518 and a second side 1508. As depicted, the first side 1518 is attached to the mounting surface 168 of one of the panels 150 of a pair of the panels 105, and the second side 1508 is adapted to seal against the sealing surface 170 of another of the panels 150 of the pair of panels 150 when the pair of the panels 150 is in the covering configuration 102.

Turning now to FIG. 123, the top surface 1502 and the second side 1508 may intersect at a corner 1504. The corner 1504 may define a radius Rs1 (see FIG. 122). As illustrated at FIG. 122, the corner 1504 may include an undercut 1506. Similarly, the top surface 1502 and the first side 1518 may intersect at a corner 1522. The corner 1522 may define a radius Rs2 (see FIG. 121). As illustrated at FIG. 121, the corner 1522 may include an undercut 1520. As illustrated at FIG. 125, the undercut 1506 may form a radius covering portion 1554, and the undercut 1520 may form a radius covering portion 1556. The radius covering portions 1554, 1556 may be adapted to cover the bend radii R of the panels 150. As depicted, the first side 1518 includes a pocket 1516. In the depicted embodiment, the pocket 1516 is adapted to hold an adhesive strip 1600. A portion of the first side 1518 may thereby be constrained by a fastening system such as the adhesive strip 1600. As depicted, the first side 1518 also includes a free portion 1519 that is free to separate from and move relative to the adjacent panel 150.

As depicted, opposite the free portion 1519, is a corner 1514 between the first side 1518 and the bottom 1512. As depicted, the corner 1514 may form a free tip. The free tip may be substantially defined by a radius Rs3 that extends around an angle greater than 180 degrees (see FIG. 121). The free tip may interface with the adjacent panel 150 such that contact is maintained around the radius of the free tip as the seal 1500 deforms when the panels 150 are moved to the covering configuration 102. The free tip of the corner 1514 may thereby influence deformation of the seal 1500. Similarly, the free portion 1519 may be constrained by bearing contact with the adjoining panel 150 but be free to slip and/or separate from the adjoining panel 150. The deformation of the seal 1500 may be favorably controlled and/or managed by selecting appropriate geometry of the free tip of the corner 1514 and the free portion 1519 in conjunction with the portion of the first side 1518 that is fastened to the adjoining panel 150.

FIG. 121 illustrates various dimensions of the seal 1500. In particular, a dimension Ws generally extends between the corner 1504 and the corner 1522. A dimension Wg generally extends between the second side 1508 and the corner 1514. A dimension Wb extends between the pocket 1516 and the second side 1508. A dimension Hs extends between the top surface 1502 and the bottom 1512, excluding the corner 1514. As illustrated at FIG. 123, an undercut 1513 may be included at the bottom 1512 adjacent the corner 1514.

The second side 1508 and the bottom 1512 may together form a curved portion 1510 of the seal 1500 (see FIG. 123). The curved portion 1510 may be continuous when the seal 1500 is undeformed. As illustrated at FIG. 125, the second side 1508 generally makes contact with the sealing surface 170 of the adjoining panel 150 when the panel 150 is at the covering configuration 102. In contrast, the bottom 1512 generally extends between the pair of the panels 150 and does not make contact with the panels 150 when they are at the covering configuration 102.

Figure 127:
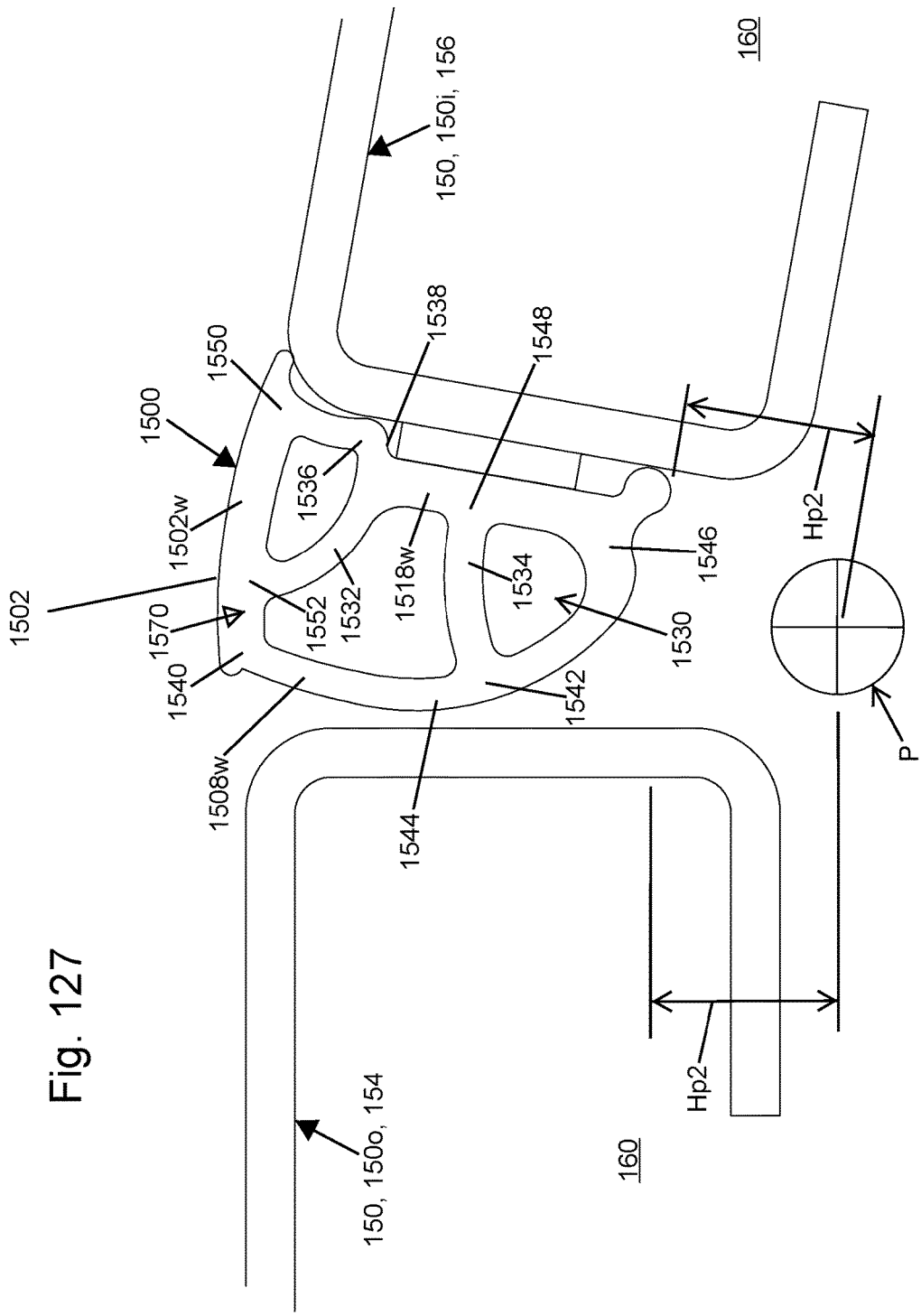
FIG. 127 is a partial cross-sectional left side elevation view illustrating the seal of FIG. 121 positioned between the first and the second panels of FIG. 22 with the first and the second panels joined by the first joint type of FIG. 18 thereby positioning the joint pivot axis of FIG. 56 below the top surfaces of the first and the second panels.

As illustrated at FIG. 127, the seal 1500 includes a support structure 1530 that generally holds the seal 1500 when the panels 150 are at the covering configuration 102, the stowed configuration 104, and in a transition between the covering configuration 102 and the stowed configuration 104. The retractable cover system 100 includes relatively compact geometry between the joints, such as the joints 200A and 200B and the seal 1500. In particular, as illustrated at FIG. 127, a dimension Hp2 may be defined between the pivot P and the seal 1500. Likewise, as illustrated at FIG. 124, a dimension Hp1 may be defined between the pivot P' and the top surfaces 150*t* of the panels 150. The top surfaces 150*t* may generally correspond to the top surface 1502 of the seal 1500. As depicted, the dimension Hs is substantially larger than the dimensions Hp1 and Hp2. As depicted, the dimension Hs may be twice as large or larger than the dimensions Hp1 or Hp2. Likewise, as illustrated at FIG. 99, the dimensions Lv may also be substantially greater than the dimensions Hp1 or Hp2 (e.g., twice as large or larger). Such proportions contribute to an overall compact configuration of the retractable cover system 100 when the retractable cover system 100 is at the stowed configuration 104 (see FIG. 5).

However, the relatively small proportions of the dimensions Hp1 and Hp2 lead to substantial rotational scrubbing of the panels 150 against the seal 1500 when the panels 150 are moved between the covering configuration 102 and the stowed configuration 104 (i.e., about the axes A2 and A3). A goal of the seal 1500 design therefore is to manage the scrubbing of the panels 150 against the seal 1500. In addition, it is desired to use the same seal 1500 with multiple joint styles such as the joints 200A and 200B, mentioned above. The support structure 1530 helps achieve these goals.

The support structure 1530 includes a perimeter of the seal 1500. In particular, a wall 1502*w* generally corresponds with the top surface 1502, a wall 1508*w* generally corresponds with the second side 1508, a lower portion 1510*w* generally corresponds with the bottom 1512, and a wall 1518*w* generally corresponds with the first side 1518. In addition to the perimeter, the support structure 1530 further includes interior members. In particular, the interior members include a support member 1532 and a support member 1534 (see FIG. 127). As depicted, the support member 1532 extends between the wall 1518*w* and the wall 1502*w*, and the support member 1534 extends between the wall 1518*w* and the wall 1508*w*. As depicted, an intersection 1540 is formed between the wall 1508*w* and the wall 1502*w*. An intersection 1542 is formed between the support member 1534 and the wall 1508*w*. An intersection 1546 is formed between the lower portion 1510*w* and the wall 1518*w*. An intersection 1548 is formed between the support member 1534 and the wall 1518*w*. An intersection 1550 is formed between the wall 1518*w* and the wall 1502*w*. And, an intersection 1552 is formed between the support member 1532 and the wall 1502*w*. In certain embodiments, the support member 1534 intersects with the wall 1508*w* at a medial position 1544 of the wall 1508*w*. In the depicted embodiment, the intersection 1542 is a three-way intersection between the wall 1508*w*, the support member 1534, and the lower portion 1510*w*. As depicted, the wall 1518*w* includes a jog 1536. The support member 1532 may intersect with the wall 1518*w* at the jog 1536. The jog 1536 forms a ledge 1538 at the first side 1518, as depicted at FIG. 127. The walls 1502*w*, 1508*w*, 1510*w*, and 1518*w* and the support members 1532 and 1534 may each define a thickness (e.g., a thickness Ts illustrated at FIG. 121).

In the embodiments depicted at FIGS. 121-129, the hollow interior 1524 includes a first interior portion 1524*a*, a second interior portion 1524*b*, and a third interior portion 1524*c* (see FIG. 121). As depicted, the support structure 1530, described above, defines the hollow interior 1524 and the interior portions 1524*a*, 1524*b*, and 1524*c*. The hollow interior 1524 and the corresponding interior portions 1524*a*, 1524*b*, and/or 1524*c* provide benefits to the seal 1500 for use in the retractable pickup truck box cover system 100. In particular, the retractable pickup truck box cover system 100 includes the pairs 250, 252, 254, 256, 258, and 260 of first and second panels 150 that are rotatably attached to each other along one of the axes (e.g., A2 or A3). Movement of the retractable cover system 100 between the covering configuration 102 and the stowed configuration 104 includes relative rotational movement between the first and second panels of the pairs 260 about the one of the axes A2, A3. The hollow interior 1524 of the seal 1500 may extend along a length of the seal 1500 (e.g., parallel to the dimension W, illustrated at FIG. 8, when the seal 1500 is installed). The length extends between a pair of ends 1501 that include a first end and a second end.

In the depicted embodiment, the plurality of interior portions 1524*a*, 1524*b*, and 1524*c* of the hollow interior 1524 each extend substantially parallel to the length of the seal 1500. The second interior portion 1524*b* is adapted to be compressed between the pair 260 of the panels 150 when in the covering configuration 102. As depicted, the first interior portion 1524*a* of the hollow interior 1524 is adapted to bulge when the panel pair 260 is in the covering configuration 102. In certain embodiments, the third interior portion 1524*c* is adapted to expand between the first and second panels 150 when the pair 260 is in the covering configuration 102. The first interior portion 1524*a* may be adapted to expand above a top 150*t* of the first panel 150 and/or a top 150*t* of the second panel 150 when in the covering configuration 102. The compressing of the second interior portion 1524*b* may directly or indirectly cause the bulging of the first interior portion 1524*a* and/or the third interior portion 1524*c*. As illustrated at FIG. 125, the bulging of the first interior portion 1524*a* may cause and/or be related to a deviation from flat 1558 (e.g., a crown) of the top surface 1502.

In the depicted embodiment, the seal 1500 includes an extruded length (e.g., parallel to the dimension W), a mounting side (e.g., the first side 1518), a sealing side (e.g., the second side 1508), a top side (e.g., the top surface 1502), a transverse rib (e.g., the support member 1534), and an angled rib (e.g., the support member 1532). The seal 1500 is adapted for installation on the retractable cover system 100 with the extruded length substantially parallel to the axes A2, A3. The mounting side (e.g., the first side 1518) is adapted for mounting to one of the panels of the pairs 260, and the sealing side (e.g., the second side 1508) is adapted to seal against another one of the panels of the pairs 260 when the cover system 100 is in the covering configuration 102. The sealing side (e.g., the second side 1508) is adapted to separate from the another panel when the retractable cover system 100 is moved from the covering configuration 102 to the stowed configuration 104. The top side 1502 extends between the mounting side 1518 and the sealing side 1508. The angled rib 1532 extends between the mounting side 1518 and the top side 1502. The angled rib 1532 is adapted to support the top side 1502, at least when the panel 150 pivotally scrubs against the seal 1500.

The mounting side may include an adhesive strip 1600 that is adapted to adhesively mount the sealing side 1508 to the adjacent panel 150. As illustrated at FIG. 121, the adhesive strip 1600 includes a seal side 1602, a panel side 1604, a first edge 1606, and a second edge 1608. As depicted, the edge 1606 is adjacent the ledge 1538 of the mounting side 1518. The free portion 1519 of the mounting side 1518 may extend between the ledge 1538 and the top side 1502. The angled rib 1532 may extend between the ledge 1538 and the medial position 1552 of the top side 1502. The mounting side 1518 may include the free tip (at the corner 1514) that is positioned opposite the ledge 1538 about the adhesive strip 1600. The sealing side 1508 may extend from the top side 1502 and curve toward the free tip as the sealing side 1508 further extends to the mounting side 1518. The transverse rib 1534 may extend between the medial position 1548 of the mounting side 1518 and the medial position 1544 of the sealing side 1508. The transverse rib 1534 may be a horizontal rib.

The seal 1500 may be adapted for use both with the axis A3 positioned outside an exterior of the panels 150 when in the covering configuration 102, and with the axis A2 positioned inside the interior 160 of the panels 150 when in the covering configuration 102.

The seal 1500 may include an extruded body 1570 that includes a first material and may further include an extruded coating 1590 that includes a second material. The second material of the coating 1590 may be harder than the first material of the body 1570. The body 1570 and the coating 1590 may be co-extruded. In certain embodiments, the seal 500 and/or 1500 may be a dual durometer TPV seal (i.e., a thermoplastic vulcanizate seal). In other embodiments, the seal 500 and/or 1500 may be an EPDM seal (i.e., an ethylene propylene diene monomer rubber seal). The first material of the body 1570 may be a soft, 35 Shore A durometer material. The coating 1590 may be a harder, more durable 40 Shore D durometer coating to prevent/reduce wear and/or to stiffen the seal 1500. The coating 1590 may be about 0.005 inch thick. The coating 1590 may have a coefficient of friction of 0.28. The coating 1590 may be UV (i.e., ultraviolet) stable. The coating 1590 may be adapted to pivotally scrub against the panels 150. The coating 1590 may be adapted to stiffen the extruded body 1570. The coating 1590 may reduce stretch and thereby make the seal 1500 easier to install by reducing susceptibility to bending and/or twisting during the installation process. The coating 1590 may aid in reducing installation times. The dual durometer TPV seal may achieve more precise manufacturing tolerances. The dual durometer TPV seal may be aesthetically appealing.

As semi-schematically illustrated at FIG. 121, the coating 1590 may extend between a first end 1592 and a second end 1594. As depicted, the coating 1590 coats the top surface 1502 and the sealing side 1508. In other embodiments, the coating 1590 may coat an entire perimeter of the seal 1500. The coating 1590 may be selected to provide desired frictional characteristics with the panel 150 (e.g., the sealing surface 170). The coating may continue from the sealing area to cover the lower portion 1510w as it continues from the sealing portion 1508w to the mounting portion 1518w.

The rib 1534 may extend between the medial position 1548 of the mounting portion 1518w and the sealing portion 1508w. The rib 1534 may be adapted to support the sealing portion 1508w, at least when the cover system 100 is at the covering configuration 102. In certain embodiments, the rib 1534 extends to the medial position 1544 of the sealing portion 1508w. Alternatively, the rib 1534 may extend to the intersection 1542 of the sealing portion 1508w and the lower portion 1510w.

The angled rib 1532 may be adapted to support the top portion 1502w, at least when the sealing area 170 pivotally scrubs against the extruded seal 1500. The angled rib 1532 may extend between a medial position (e.g., the jog 1536) of the mounting portion 1518w and the medial position 1552 of the top portion 1502w. As depicted, the edge 1606 of the adhesive strip 1600 may directly support (e.g., by bearing) the ledge 1538 of the mounting side 1518. The edge 1606 of the adhesive strip 1600 may thereby support the angled rib 1532 and thereby support the top portion 1502w.

Turning now to FIGS. 130-136, a rail mounting system 1700 for the retractable cover system 100 is illustrated according to the principles of the present disclosure. The rail mounting system 1700 is adapted to mount the rails 110 of the retractable cover system 100 to the sides 86 of the pickup truck box 80. The rail mounting system 1700 includes the rail 110, a seal 1740, and a mounting clamp 1750.

In the depicted embodiment, the seal 1740 seals the rail 110 to a top surface 91 of the sides 86 of the pickup truck box 80. In the depicted embodiment, a plurality of the mounting clamps 1750 secure the rail 110 to the side 86 of the pickup truck box 80. As depicted, the rail 110 is held a distance away from the top surface 91 of the side 86. In other embodiments, the rail 110 may directly or indirectly rest against the top surface 91.

The mounting clamp 1750 clamps to the side 86 of the pickup truck box 80. Thus, no holes need be drilled into the side 86 of the pickup truck box 80 when installing the retractable cover system 100. In particular, in the depicted embodiment, the side 86 of the pickup truck box 80 includes a flange 99 with an inside surface 93 that extends downwardly from the top surface 91 and bounds a portion of the opening 90 of the pickup truck box 80. In the depicted embodiment, the flange 93 includes a lip 95 that extends outwardly toward an outside of the pickup truck box 80 from the inside surface 93 of the flange 99. The mounting clamp 1750 clamps against the flange 99 from both sides of the flange 99. In the depicted embodiment, the flange 99 is a double walled flange. In other embodiments, the flange 99 may include a single wall.

In the depicted embodiment, the mounting clamp 1750 includes a mounting piece 1800. The mounting piece 1800 includes a mounting surface 1810, a pivot portion 1820, a pair of tabs 1822, an actuator receiver 1830, a jaw 1840, and a locating member 1850 (see FIG. 35). In the depicted embodiment, the mounting piece 1800 is made of a single piece of sheet metal. As depicted, the mounting piece 1800 may be formed by bending a flat pattern. In particular, the mounting piece 1800 includes a leg 1826 that is substantially vertical when mounted to the pickup truck box 80. The mounting surface 1810 is bent away from the vertical leg 1826 about 90 degrees and thereby forms a transverse mounting surface.

In the depicted embodiment, the vertical leg 1826 includes the locating member 1850 and the locating member 1850 terminates at a locating surface 1860. In the depicted embodiment, the locating surface 1860 is substantially parallel to the mounting surface 1810. In the depicted embodiment, the locating member 1850 is included in the vertical leg 1826 and is thereby also substantially vertical when mounted to the pickup truck box 80. In the depicted embodiment, a substantially horizontal leg 1824 is positioned opposite the locating surface 1860. The horizontal leg 1824 extends away from the vertical leg 1826 and includes a pair of the tabs 1822.

In the depicted embodiment, the tabs 1822 form at least a portion of the pivot portion 1820 of the mounting piece 1800. In the depicted embodiment, the leg 1826 further includes the actuator receiver 1830. As depicted, the actuator receiver 1830 may be a slot. In other embodiments, the actuator receiver 1830 may be a weld nut, a hole, a weld stud, or other member adapted to place a load on the leg 1826. As depicted, the jaw 1840 is also included in the leg 1826. As illustrated, the same leg 1826 (i.e., the same tab) includes the locating member 1850, the actuator receiver 1830, and the jaw 1840.

The mounting piece 1800 is positioned on the side 86 of the pickup truck box 80 by abutting the jaw 1840 and/or the locating member 1850 against the inside surface 93 of the flange 99. The locating surface 1860 is aligned with the top surface 91 of the side 86 of the pickup truck box 80. A plurality of the mounting pieces 1800 may be similarly positioned along the inside surface 93 and the top surface 91 of the sides 86 along the fore-aft direction 108.

Rather than drill a hole through the flange 99 of the pickup truck box 80, the mounting piece 1800 is clamped against the flange 99 by a clamping piece 1900, described in detail below. However, in alternate embodiments, the mounting piece 1800 may be fastened to the flange 99 of the pickup truck box 80 with fasteners positioned through holes. In alternate embodiments, the mounting piece 1800 may be attached to the flange 99 of the pickup truck box 80 by bonding, welding, etc.

Upon securing the mounting piece 1800 to the side 86 with the location (e.g., the vertical location) of the mounting piece 1800 determined by the locating surface 1860 of the locating member 1850, the rail 110 may be laid upon the mounting surface 1810 and fastened to the mounting surface 1810. In particular, the mounting surface 1810 includes an elongated mounting slot 1812. The rail 110 includes a fastener slot 114 and a fastener head channel 116. As depicted, the fastener 1752 is installed with a head of the fastener 1752 in the fastener head channel 116. The fastener head channel 116 is adapted to prevent the fastener head, and thereby the fastener, from spinning. This provides convenience in that no wrench or tool is needed to hold the fastener 1752 from turning as a nut is tightened thereby fastening the mounting surface 1810 to the rail 110. A shank of the fastener 1752 may extend through the fastener slot 114 of the rail 110. The fastener 1752 is generally free to slide along the fastener head channel 116 and the fastener slot 114 thereby allowing the fastener 1752 to move in the fore-aft direction 108. Movement of the fastener in a direction perpendicular to the fore-aft direction 108 may be accommodated by the mounting slot 1812. Upon the rail 110 being positioned at a desired position, the nut of the fastener 1752 may be tightened thereby securing the rail 110 to the mounting piece 1800.

Figure 135:
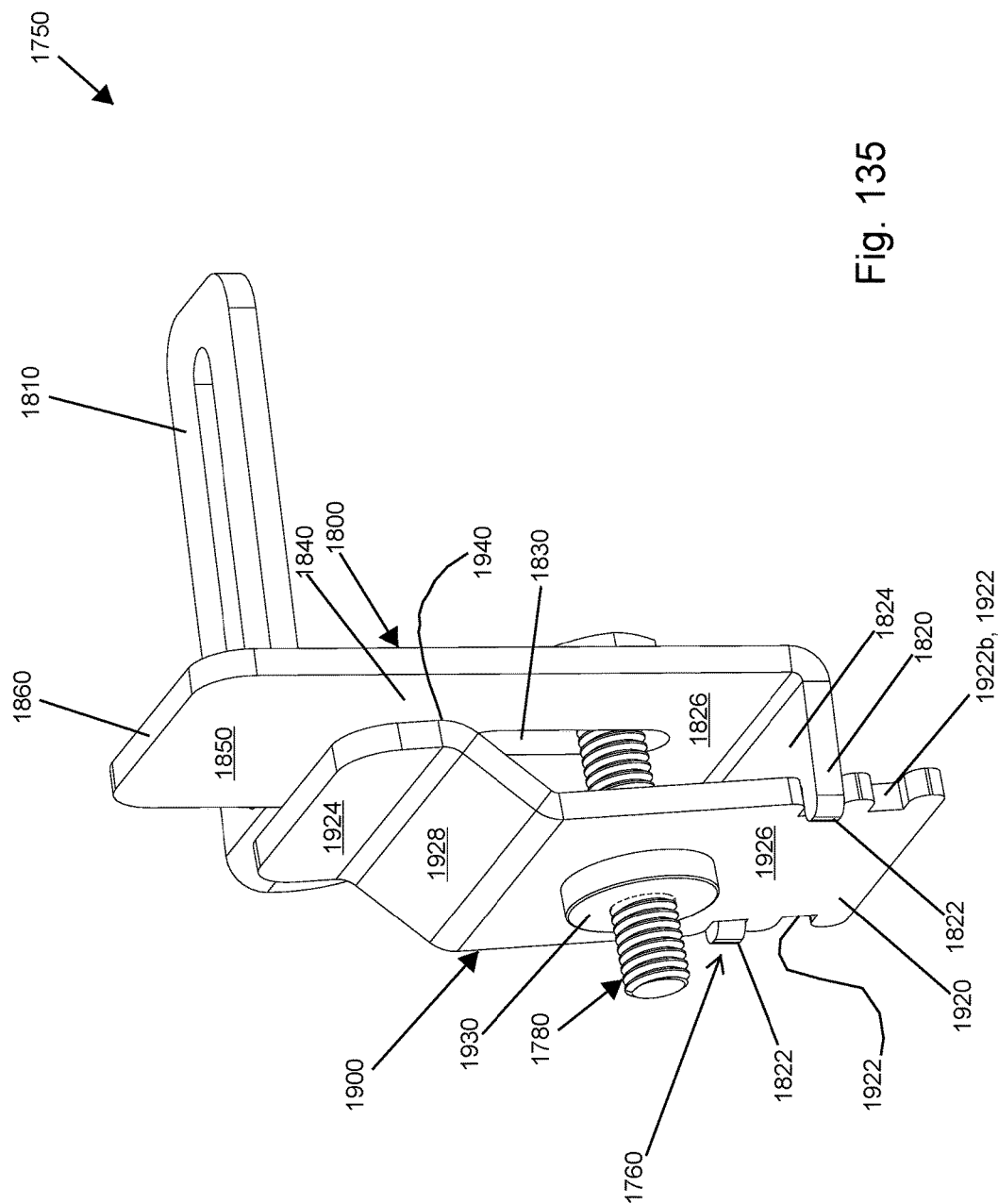

Turning now to FIG. 135, the clamping piece 1900 will be described in detail. The clamping piece 1900 includes a pivot portion 1920, a tab receiver 1922, a jaw leg 1924, a vertical leg 1926, a jog 1928, an actuator receiver 1930, and a jaw 1940. In the depicted embodiment, two pairs 1922a, 1922b of the tab receivers 1922 are included. As depicted, the clamping piece 1900 may also be formed of a single piece of sheet metal. As depicted, the jaw 1940 is included on the jaw leg 1924. The jaw leg 1924 is spaced away from the leg 1926 by the jog 1928. The jog 1928 is adapted to allow the clamping piece 1900 to clear the lip 95 of the flange 99. The leg 1926 includes the actuator receiver 1930. In the depicted embodiment, the actuator receiver 1930 is a weld nut. In other embodiments, the actuator receiver may be a slot, a hole, a weld stud, or other means of applying a load to the leg 1926.

The leg 1926 further includes the tab receivers 1922a and the tab receivers 1922b. The tab receivers 1922a and 1922b may generically be known as tab receivers 1922. The tab receivers 1922 form the pivot portion 1920 of the clamping piece 1900. As depicted, the tabs 1822 are received by either the pair of tab receivers 1922a or the pair of tab receivers 1922b. By selecting the tab receivers 1922 to engage the tabs 1822 of the mounting piece 1800, the jaw 1924 may be adjusted to accommodate various geometry found in various sides 86 of various pickup truck boxes 80.

Figure 136:
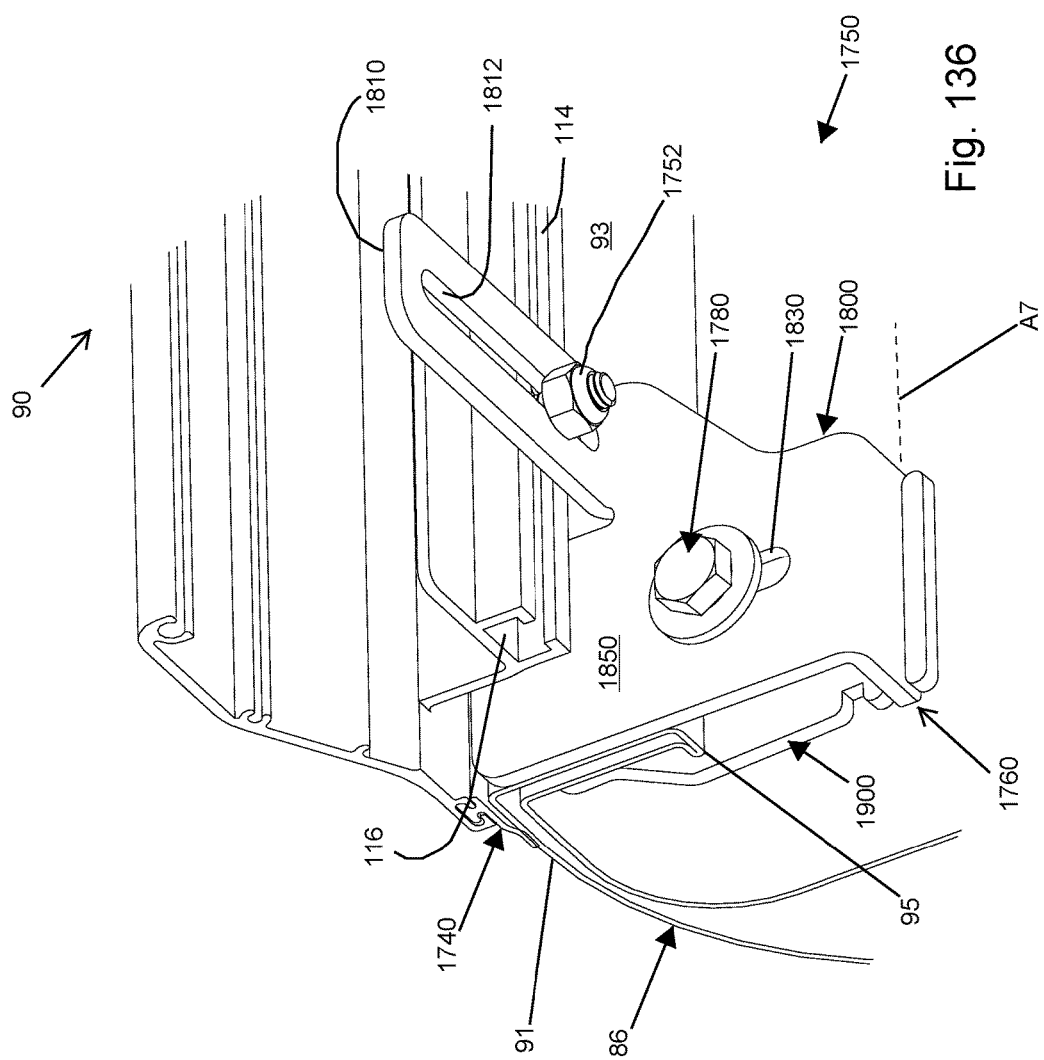

The mounting clamp 1750 further includes a pivot 1760 and an actuator 1780. As depicted, the pivot 1760 is formed by engaging the pivot portion 1820 of the mounting piece 1800 with the pivot portion 1920 of the clamping piece 1900. As illustrated at FIG. 136, an axis A7 is generally defined by the pivot 1760. As depicted, the actuator 1780 is a threaded fastener adapted to draw the mounting piece 1800 to the clamping piece 1900. By contracting the actuator 1780, the jaw 1940 is drawn to the jaw 1840 and thereby clamps the mounting clamp 1750 to the flange 99 of the pickup truck box 80. As the actuator receiver 1930 is a weld nut, only a single tool (e.g., a wrench) is needed to actuate the actuator 1780.

Figure 134:
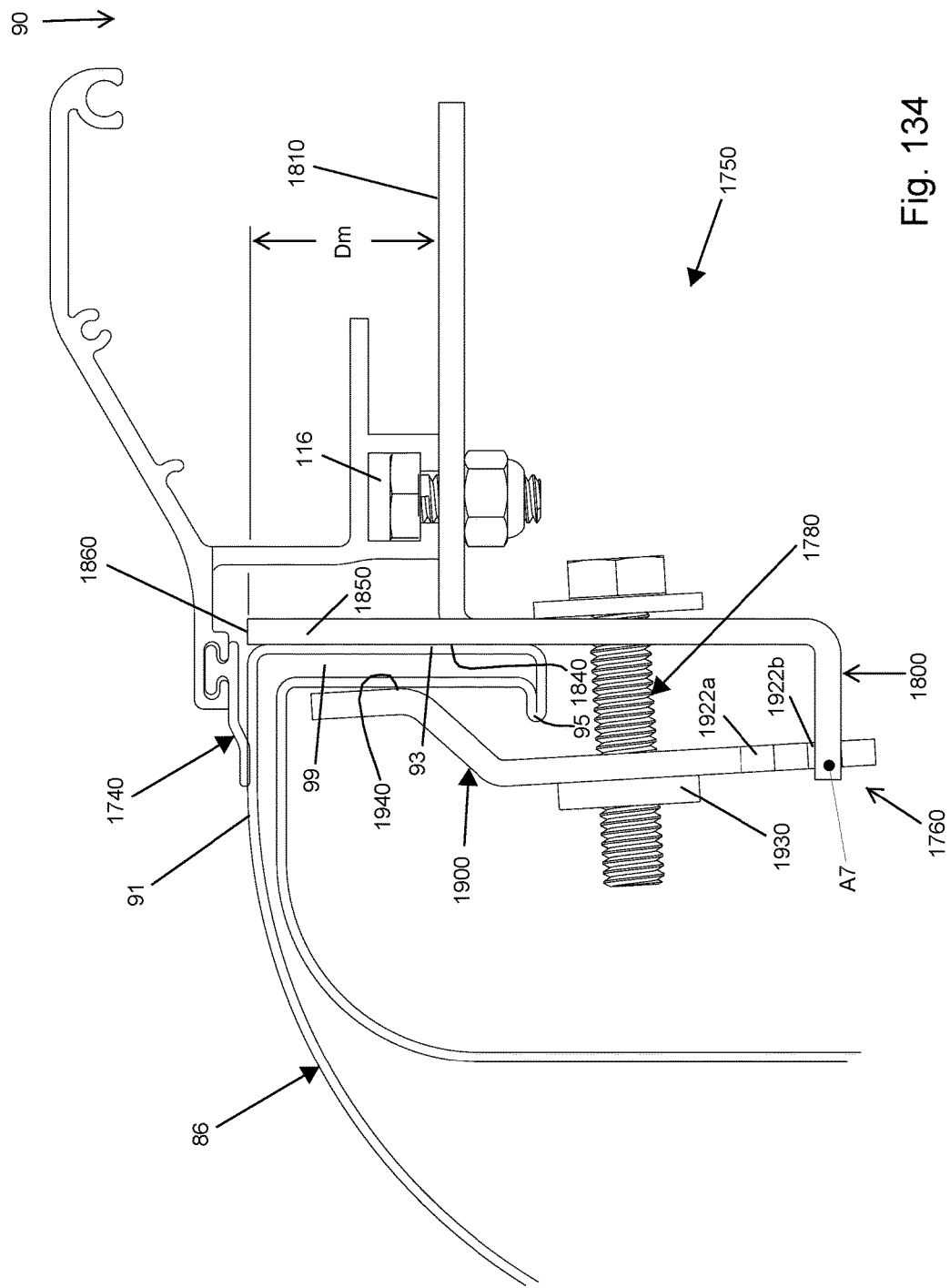

When installing the mounting clamp 1750, the locating member 1850 is adapted to establish a predetermined offset Dm between the top surface 91 of the side 86 of the pickup truck box 80 and the transverse mounting surface 1810 (see FIG. 134). In certain embodiments, the actuator 1780 is a threaded fastener and/or may apply tension between the first actuator receiver 1830 of the mounting piece 1800 and the second actuator receiver 1930 of the clamping piece 1900 to actuate the first and second jaws 1840, 1940 and thereby secure the mounting clamp 1750. The actuator 1780 may be positioned between the pivot 1760 and the first and second jaws 1840, 1940. A position of the pivot 1760 may be adjustable. The pivot 1760 may include a pair of tabs 1822, a first pair of tab receivers 1922a, and a second pair of tab receivers 1922b. One of the pairs of tab receivers 1922 may selectively receive the pair of tabs 1822. The position of the pivot 1760 may be adjusted by selecting another of the pairs of tab receivers 1922 to receive the pair of tabs 1822.

The mounting piece 1800 may include a single monolithic piece that includes the transverse mounting surface 1810, the first jaw 1840, and/or the locating member 1850. The transverse mounting surface 1810 mounts and vertically locates the rail member 110. The transverse mounting surface 1810 may include the slot 1812 that accommodates lateral adjustment of a corresponding one of the rail members 110. Each of the mounting clamps 1750 may include the clamping piece 1800 that pivots relative to the respective locating member 1850 about the pivot joint 1760 and thereby may clamp the respective mounting clamp 1750 to the respective side 86 of the pickup truck box 80.

The pickup truck box 80 may be a first pickup truck box, and the pivot joint 1760 may include multiple configurations that adapt the mounting clamps 1750 to interface with sides of a second pickup truck box that varies in style from the sides 86 of the first pickup truck box 80.

A method of installing the cover system 100 may include: 1) providing the cover system 100; 2) locating a right mounting clamp 1750, that includes the first locating member 1850, with respect to the top surface 91 of the right side 86r of the pickup truck box 80 by setting a first locating surface 1860 of the first locating member 1850 flush with the top surface 91 of the right side 86r; 3) clamping the right mounting clamp 1750 to the right side 86r of the pickup truck box 80; 4) locating a left mounting clamp 1750, that includes the second locating member 1850, with respect to the top surface 91 of the left side 86l of the pickup truck box 80 by setting a second locating surface 1860 of the second locating member 1850 flush with the top surface 91 of the left side 86l; 5) clamping the left mounting clamp 1750 to the left side 86l of the pickup truck box 80; 6) mounting the right rail member 110r of the cover system 100 to the right mounting clamp 1750; and 7) mounting the left rail member 110l of the cover system 100 to the left mounting clamp 1750.

The present application is related to U.S. Provisional Patent Application Ser. No. 61/598,338, entitled "RETRACTABLE COVER SYSTEM FOR A PICKUP TRUCK BOX", and filed on Feb. 13, 2012; to U.S. Provisional Patent Application Ser. No. 61/598,665, entitled "FOLDING/RETRACTABLE PICKUP TRUCK BOX COVER", and filed on Feb. 14, 2012; and to U.S. Non-Provisional patent application Ser. No. 13/766,396, entitled "FOLDING/RETRACTABLE PICKUP TRUCK BOX COVER", and filed on Feb. 13, 2013, which applications are hereby incorporated by reference in their entireties.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An extruded seal for a retractable cover system, the retractable cover system including a first panel and a second panel that are rotatably attached to each other along an axis, wherein movement of the retractable cover system between a covering configuration and a stowed configuration includes relative rotational movement between the first panel and the second panel about the axis, the extruded seal comprising:
    an extruded length that extends between a first end and a second end, the extruded seal adapted for installation on the retractable cover system with the extruded length substantially parallel to the axis;
    a mounting side adapted for mounting to the first panel;
    a sealing side adapted to seal against the second panel when the retractable cover system is in the covering configuration and adapted to separate from the second panel when the retractable cover system is moved from the covering configuration to the stowed configuration;
    a top side that extends between the mounting side and the sealing side, wherein the top side extends beyond the mounting side to form a first radius covering portion; and
    an angled rib that extends between the mounting side and the top side, the angled rib adapted to support the top side at least when the second panel pivotally scrubs against the extruded seal.

2. The extruded seal of claim 1, wherein the retractable cover system is adapted to cover a pickup truck box and the extruded seal is adapted to substantially extend between sides of the pickup truck box.

3. The extruded seal of 1, wherein the top side extends beyond the sealing side to form a second radius covering portion.

4. The extruded seal of claim 1, wherein the mounting side includes an adhesive strip adapted to adhesively mount the mounting side to the first panel, wherein the adhesive strip includes an edge adjacent a ledge of the mounting side, and wherein a free portion of the mounting side extends between the ledge and the top side.

5. The extruded seal of claim 3, wherein the angled rib extends between the ledge of the mounting side and a medial position of the top side.

6. The extruded seal of claim 3, wherein the mounting side includes a free tip positioned opposite the ledge about the adhesive strip.

7. The extruded seal of claim 6, wherein the sealing side extends from the top side and curves toward the free tip as the sealing side further extends to the mounting side.

8. The extruded seal of claim 1, further comprising a transverse rib extending between a medial position of the mounting side and a medial position of the sealing side.

9. The extruded seal of claim 1, wherein the extruded seal is adapted for use both with the axis positioned outside an exterior of the first panel and the second panel when the first panel and the second panel are in the covering configuration and with the axis positioned inside an interior of the first panel and the second panel when the first panel and the second panel are in the covering configuration.

10. The extruded seal of claim 1, further comprising an extruded body that includes a first material and an extruded coating that includes a second material, wherein the second material of the extruded coating is harder than the first material of the extruded body, and wherein the extruded coating is adapted to pivotally scrub against the second panel.

11. A seal for a retractable pickup truck box cover system, the retractable pickup truck box cover system including a first panel and a second panel that are rotatably attached to each other along an axis, wherein movement of the retractable pickup truck box cover system between a covering configuration and a stowed configuration includes relative rotational movement between the first panel and the second panel about the axis, the seal comprising:
    a length that extends between a first end and a second end;
    a hollow interior with a plurality of interior portions extending substantially parallel to the length, a first interior portion of the plurality of interior portions adapted to be compressed between the first panel and the second panel when in the covering configuration, and a second interior portion of the plurality of interior portions adapted to bulge when the first panel and the second panel are in the covering configuration.

12. The seal of claim 11, wherein the second interior portion is adapted to expand between the first panel and the second panel when the first panel and the second panel are in the covering configuration.

13. The seal of claim 11, wherein the second interior portion is adapted to expand above a top of the first panel and a top of the second panel when the first panel and the second panel are in the covering configuration.

14. The seal of claim 11, wherein the plurality of interior portions further includes a third interior portion adapted to bulge when the first panel and the second panel are in the covering configuration.

15. An extruded seal for a cover system, the cover system including a plurality of panels that are rotatably connected about substantially parallel axes defined by a plurality of joints of the cover system, the cover system configurable to a covering configuration and a stowed configuration, the extruded seal comprising:
    an extruded body that extends between a first end and a second end, the extruded body comprising:
        a mounting portion adapted for mounting to respective mounting areas of the plurality of panels;
        a sealing portion adapted to seal against respective sealing areas of the plurality of panels when the cover system is in the covering configuration and adapted to separate from the respective sealing areas when the cover system is moved from the covering configuration to the stowed configuration;
        a lower portion that continues from the sealing portion to the mounting portion;
        a top portion that extends between the sealing portion and the mounting portion; and
        a rib that extends between a medial position of the mounting portion and the sealing portion, the rib adapted to support the sealing portion at least when the cover system is at the covering configuration.

16. The extruded seal of claim 15, wherein the rib extends to a medial position of the sealing portion.

17. The extruded seal of claim 15, wherein the rib extends to an intersection of the sealing portion and the lower portion.

18. The extruded seal of claim 15, further comprising an angled rib that extends between the mounting portion and the top portion, the angled rib adapted to support the top portion at least when the sealing area pivotally scrubs against the extruded seal.

19. The extruded seal of claim 18, wherein the angled rib extends between a medial position of the mounting portion and a medial position of the top portion.

20. The extruded seal of claim 15, further comprising an extruded coating that is stiffer than the extruded body, wherein the extruded coating is adapted to stiffen the extruded body.

* * * * *